(12) United States Patent
Kimura et al.

(10) Patent No.: US 8,121,011 B2
(45) Date of Patent: *Feb. 21, 2012

(54) OPTICAL ELEMENT, ABERRATION CORRECTING ELEMENT, LIGHT CONVERGING ELEMENT, OBJECTIVE OPTICAL SYSTEM, OPTICAL PICKUP DEVICE, AND OPTICAL INFORMATION RECORDING REPRODUCING DEVICE

(75) Inventors: Tohru Kimura, Hachioji (JP); Kiyoshi Yamashita, Hachioji (JP); Nobuyoshi Mori, Hachioji (JP); Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,250

(22) Filed: Jan. 13, 2011

(65) Prior Publication Data

US 2011/0110216 A1     May 12, 2011

Related U.S. Application Data

(60) Continuation of application No. 12/417,964, filed on Apr. 3, 2009, which is a division of application No. 12/071,740, filed on Feb. 26, 2008, now Pat. No. 7,551,539, which is a division of application No. 10/866,902, filed on Jun. 15, 2004, now Pat. No. 7,369,481.

(30) Foreign Application Priority Data

| Jun. 18, 2003 | (JP) | 2003-173911 |
| Aug. 20, 2003 | (JP) | 2003-296556 |
| Sep. 10, 2003 | (JP) | 2003-318483 |
| Nov. 14, 2003 | (JP) | 2003-385393 |
| Dec. 26, 2003 | (JP) | 2003-435248 |
| Apr. 2, 2004 | (JP) | 2004-110368 |

(51) Int. Cl.
*G11B 7/00*     (2006.01)
(52) U.S. Cl. .................. 369/112.07; 369/121
(58) Field of Classification Search .................. None
See application file for complete search history.

(56) References Cited

U.S. PATENT DOCUMENTS 6,687,209 B2   2/2004 Ota et al.
(Continued)

FOREIGN PATENT DOCUMENTS

EP     0747 893 A2     12/1996
(Continued)

OTHER PUBLICATIONS

European Search Report dated Feb. 25, 2010, received from the European Patent Office in corresponding Application No. 04253512.0-1232 / 1489608.

*Primary Examiner* — Joseph Feild
*Assistant Examiner* — Parul Gupta
(74) *Attorney, Agent, or Firm* — Finnegan, Henderson, Farabow, Garrett & Dunner, L.L.P.

(57) ABSTRACT

An optical system for use in an optical pickup apparatus comprises a first optical surface having a superposition type diffractive structure including a plurality of ring-shaped zones which are formed concentrically around an optical axis, wherein each ring-shaped zone is composed of a plurality of stepped sections stepwise, and a second optical surface having a diffractive structure including a plurality of ring-shaped zones which are formed concentrically around an optical axis, wherein each of the plurality of ring-shaped zones are divided by a stepped section to generate a diffractive light ray of diffractive order whose absolute value is not small than 1 for the light flux.

10 Claims, 30 Drawing Sheets

U.S. PATENT DOCUMENTS

| | | |
|---|---|---|
| 6,807,139 B2 | 10/2004 | Sakamoto |
| 6,853,614 B2 | 2/2005 | Kim et al. |
| 6,987,615 B2 | 1/2006 | Shiono et al. |
| 7,206,276 B2 | 4/2007 | Kimura et al. |
| 7,289,415 B2 * | 10/2007 | Ikenaka et al. ........... 369/112.05 |
| 7,327,663 B2 | 2/2008 | Kimura et al. |
| 7,577,077 B2 * | 8/2009 | Ikenaka et al. ........... 369/112.07 |

FOREIGN PATENT DOCUMENTS

| | | |
|---|---|---|
| EP | 1 202 259 A2 | 5/2002 |
| EP | 1 471 514 A2 | 10/2004 |
| EP | 1 489 608 A2 | 12/2004 |

* cited by examiner

FIG. 8 ( a )  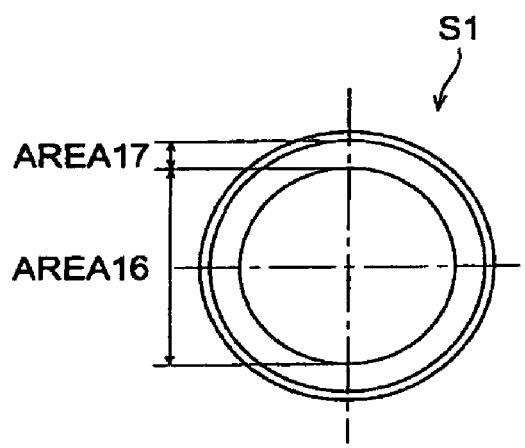
FIG. 8 ( b )  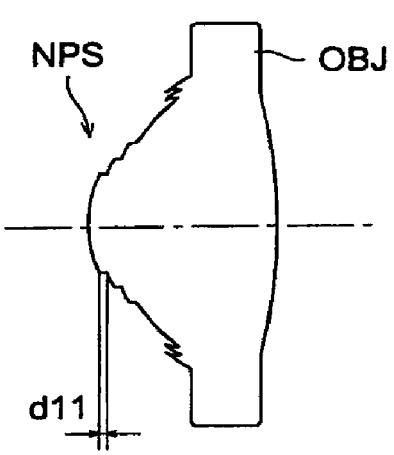

OPTICAL AXIS

OPTICAL AXIS

OPTICAL AXIS

OPTICAL AXIS

OPTICAL ELEMENT, ABERRATION CORRECTING ELEMENT, LIGHT CONVERGING ELEMENT, OBJECTIVE OPTICAL SYSTEM, OPTICAL PICKUP DEVICE, AND OPTICAL INFORMATION RECORDING REPRODUCING DEVICE

This application is a continuation of application Ser. No. 12/417,964, filed Apr. 3, 2009, which is a division of application Ser. No. 12/071,740, filed Feb. 26, 2008 now U.S. Pat. No. 7,551,539, which is a division of application Ser. No. 10/866,902, filed Jun. 15, 2004 now U.S. Pat. No. 7,369,481, which claims the benefit of priority to Japanese Patent Application Nos. 2003-173911, filed Jun. 18, 2003; 2003-296556, filed Aug. 20, 2003; 2003-318483, filed Sep. 10, 2003; 2003-385393, filed Nov. 14, 2003; 2003-435248, filed Dec. 26, 2003; and 2004-110368, filed Apr. 2, 2004, the entire disclosures of which are incorporated herein by reference.

BACKGROUND OF THE INVENTION

The present invention relates to an optical element for an optical pickup device, aberration correcting element, light converging element, objective optical system, optical pickup device using these optical elements, and optical information recording reproducing device.

Recently, in the optical pickup device, a tendency to reduce the wavelength of a laser light source used as the light source for recording the information into an optical disk, is advanced, for example, a laser light source of a wavelength 405 nm such as a blue violet semiconductor laser or a blue violet SHG laser in which the wavelength conversion of the infrared semiconductor laser is conducted by using the second harmonics generation, is being put to practical use.

When these blue violet laser light sources are used, in the case where an objective lens whose numerical aperture (NA) is the same as that of DVD (digital versatile disk) is used, the information of 15-20 GB can be recorded in an optical disk of 12 cm diameter, and in the case where NA of the objective lens is increased to 0.85, the information of 23-25 GB can be recorded in the optical disk of 12 cm diameter. Hereinafter, in the present specification, the optical disk and optical magnetic disk using the blue violet laser light source are generally called as "high density optical disk".

Hereupon, in the high density optical disk using the objective lens of NA 0.85, because a coma generated caused by the skew of the optical disk is increased, a protective layer is designed thinner than in DVD (0.1 mm to 0.6 mm of DVD), and an amount of the coma due to the skew is reduced.

Hereupon, only by a fact that the information can be appropriately recorded/reproduced for such a high density optical disk, it can not be said that a value as a product of an optical disk player is sufficient. In the present time, when the actuality that DVD and CD (compact disk) in which various kinds of information are recorded, are sold in a market, is taken into account, it is not sufficient only by a fact that the information can be recorded/reproduced for the high density optical disk, but, for example, when it is structured in such a manner that, also to DVD or CD which is owned by the user, the information can be appropriately recorded/reproduced in the same manner, it leads to an increase of the product value as an optical disk player for a high density optical disk. From such a background, in the optical pickup device mounted on the optical disk player for the high density optical disk, it is desired that it has the performance by which the information can be appropriately recorded/reproduced, while keeping the interchangeability also for any one of the high density optical disk and DVD, further, CD.

A method is considered by which the optical parts for the high density optical disk and the optical system for DVD or CD are selectively switched corresponding to the recording density of the optical disk for which the information is recorded/reproduced, as a method by which the information is appropriately recorded/reproduced while keeping the interchangeability also for any one of the high density optical disk and DVD, further, CD, however, because a plurality of optical systems are necessary, it is disadvantageous for size-reduction, further, the cost is increased.

Accordingly, for the purpose of simplification of the structure of the optical pickup device and cost-reduction, also in the optical pickup device having the interchangeability, it is preferable that the optical system for the high density optical disk and the optical system for DVD or CD are in common with each other, and the number of optical parts constituting the optical pickup device is reduced as largely as possible.

As the objective optical system for the optical system which can be used in common with a plurality of kinds of optical disks whose recording density is different each other, a technology by which the ring shaped zone structure around the optical axis as written in Patent Documents 1 and 2, is provided on the lens surface, and in respective ring shaped zones, a plurality of concave and convex structures are formed, is well known.
(Patent Document 1) Tokkaihei 9-306018
(Patent Document 2) Tokkai 2002-277732

The technology written in 2 above-described Patent Documents is a technology in which, when the depth of a stepped section of the concave-convex structure formed in the ring shaped zone is made a depth so that practically the phase difference is not added in mutual adjoining concave-convex structures to the wavelength (for example, $\lambda 1$) of either one of the recording/reproducing wavelength $\lambda 1$ of DVD or the recording/reproducing wavelength $\lambda 2$ of CD, it is made in such a manner that, by the concave-convex structure, the phase difference is given only to the other side wavelength (for example, $\lambda 2$).

Further, by the number of concave-convex structures formed in each of ring shaped zones, because when the light flux of wavelength $\lambda 2$ passes the ring shaped zone structure, the phase difference of integer times of the wavelength is given in mutual adjoining ring shaped zones, only the light flux of wavelength $\lambda 2$ is diffracted by the ring-shaped zone structure. The concave-convex structure formed in each ring shaped zone in this case, is set so that both transmission factors (diffraction efficiency)for the wavelength $\lambda 1$ and the wavelength $\lambda 2$ are largely secured.

In the objective optical system written in Patent Document 1, when the light flux of the wavelength $\lambda 2$ is diffracted by the ring-shaped zone structure, the light flux of the wavelength $\lambda 2$ is projected as the diverging light flux so that spherical aberrations generated due to the difference of protective layer thickness between DVD and CD are cancelled, and in the objective optical system in Patent Document 2, when the light flux of the wavelength $\lambda 2$ is diffracted by the ring shaped zone structure, because the spherical aberration by which spherical aberrations generated due to the difference of protective layer thickness between DVD and CD are cancelled, is added to the light flux of the wavelength $\lambda 2$, recording/reproducing of the information for the DVD and CD can be conducted by a common objective optical system.

Both of technologies disclosed in Patent Documents 1 and 2 are technologies by which the interchange between 2 kinds of optical disks of DVD and CD is realized, and because there is no disclosure for the optimum ring shaped zone structure (for example, the number of concave-convex structures formed in each ring shaped zone) for the purpose in which, for the recording/reproducing wavelength (the vicinity of 400 nm) of the high density optical disk and the recording/reproducing wavelength (the vicinity of 650 nm) of DVD, the spherical aberrations generated due to the difference of the protective layer thickness between the high density optical disk and DVD are corrected, and the high transmission factor (diffraction efficiency) is secured, for the purpose in which the interchange between the high density optical disk and DVD is realized, it is difficult that the technologies disclosed in the above-described Patent Documents are applied as they are.

Further, in order to conduct the recording/reproducing of the information by using the common objective optical system on the high density optical disk and DVD, as described above, other than the spherical aberration generated due to the difference of the protective layer thickness between the high density optical disk and DVD, it is necessary that problems proper to the high density optical disk are solved.

Problems proper to the high density optical disk are (1) the chromatic aberration accompanied by a reduction of wavelength of the laser optical source (2) the spherical aberration change accompanied by an increase of numerical aperture. In them, (1) is the problem actualized for the reason that the wavelength dispersion (a change of refractive index to a minute wavelength change) of optical materials is large in the blue violet wavelength area. When the mode is switched for the optical disk, from the reproducing of the information to the recording or from the recording of the information to the reproducing, because the output of the semiconductor laser light source is changed, the oscillation wavelength is changed (so-called mode-hopping). This wavelength change is about several nm, however, because the wavelength dispersion is large in the blue violet wavelength area, while the objective optical system is focused again, it is in the de-focus condition, and the adequate recording/reproducing characteristic is not obtained.

Further, (2) is a problem actualized for the reason that the spherical aberration generated in the objective optical system is increased in proportion to fourth power of the numerical aperture. In the objective optical system of high numerical aperture, because the spherical aberration when the wavelength of the incident light flux is changed, is increased, the allowance for the wavelength of the laser light source becomes severe. Particularly, because there is an influence of the wavelength dispersion in the blue violet wavelength area, this problem is more actualized. Further, in order to reduce a production cost, it is effective that the objective optical system is formed of a plastic lens, however, because the spherical aberration generated due to the refractive index change accompanied by the temperature change is increased, when the temperature in the optical pickup device is changed, the recording/reproducing characteristic of the information for the high density optical disk is interfered.

SUMMARY OF THE INVENTION

The aspect of the present invention considers the above-described problems, and the object of the present invention is to provide an optical element for an optical pickup device by which the recording and/or reproducing of the information can be appropriately conducted on a plurality kinds of optical information recording media, including the high density optical disk and DVD using the blue violet laser light source, whose using wavelengths are different, aberration correcting element for the optical pickup device, light converging element for the optical pickup device, objective optical system, optical pickup device, and optical information recording reproducing device.

(1) An optical system for use in an optical pickup apparatus in which reproducing and/or recording information is conducted for a first optical information recording medium equipped with a protective layer having a thickness t1 by using a light flux having a first wavelength $\lambda 1$ emitted from a first light source and reproducing and/or recording information is conducted for a second optical information recording medium equipped with a protective layer having a thickness t2 ($t2 \geq t1$) by using a light flux having a second wavelength $\lambda 2$ ($\lambda 2 > \lambda 1$) emitted from a second light source, comprising:

a first optical surface having a superposition type diffractive structure including a plurality of ring-shaped zones which are formed concentrically around an optical axis, wherein each ring-shaped zone is composed of a plurality of stepped sections stepwise, and a second optical surface having a diffractive structure including a plurality of ring-shaped zones which are formed concentrically around an optical axis, wherein each of the plurality of ring-shaped zones are divided by a stepped section to generate a diffractive light ray of diffractive order whose absolute value is not small than 1 for the light flux.

(2) An optical system for use in an optical pickup apparatus in which reproducing and/or recording information is conducted for a first optical information recording medium equipped with a protective layer having a thickness t1 by using a light flux having a first |wavelength $\lambda 1$ emitted from a first light source and reproducing and/or recording information is conducted for a second optical information recording medium equipped with a protective layer having a thickness t2 ($t2 \geq t1$) by using a light flux having a second wavelength $\lambda 2$ ($\lambda 2 > \lambda 1$) emitted from a second light source, comprising:

a first optical surface having a superposition type diffractive structure including a plurality of ring-shaped zones which are formed concentrically around an optical axis, wherein each ring-shaped zone is composed of a plurality of stepped sections stepwise, and a second optical surface having an optical path difference providing structure including a plurality of ring-shaped zones which are formed concentrically around an optical axis, wherein each of the plurality of ring-shaped zones is divided by a stepped section so as to provide a predetermined optical path difference, and wherein an optical path length of each of the plurality of ring-shaped zones changes in response to a height from the optical axis.

(3) An optical system for use in an optical pickup apparatus in which reproducing and/or recording information is conducted for a first optical information recording medium equipped with a protective layer having a thickness t1 by using a light flux having a first wavelength $\lambda 1$ emitted from a first light source and reproducing and/or recording information is conducted for a second optical information recording medium equipped with a protective layer having a thickness t2 ($t2 \geq t1$) by using a light flux having a second wavelength $\lambda 2$ ($\lambda 2 > \lambda 1$) emitted from a second light source, comprising:

a correcting optical system;

a light converging element to converge a light flux having a wavelength $\lambda 1$ emitted from the correcting optical system on an information recording plane of the first optical information recording medium and to converge a light flux having a wavelength $\lambda 2$ emitted from the correcting optical system on an information recording plane of the second optical information recording medium;

wherein an optical surface of the correcting optical system has a plurality of optical functional zones, and a superposition type diffractive structure is formed within one of the plurality of optical functional zones such that a plurality of ring-shaped zones are formed concentrically around the optical axis and plural stepped sections shaped stepwise are formed within each ring-shaped zone.

(4) A correcting optical system for use in an optical pickup apparatus in which reproducing and/or recording information is conducted for a first optical information recording medium equipped with a protective layer having a thickness t1 by using a light flux having a first wavelength λ1 emitted from a first light source and reproducing and/or recording information is conducted for a second optical information recording medium equipped with a protective layer having a thickness t2 (t2≧t1) by using a light flux having a second wavelength λ2 (λ2>λ1) emitted from a second light source, wherein the correcting optical system is provided on an optical path between both of the first and second light sources and a light converging element to converge a light flux having the first wavelength λ1 emitted from the first light source and a light flux having the second wavelength λ2 emitted from the second light source respectively onto an information recording plane of the first and second optical information recording mediums; and the correcting optical system comprising:

an optical surface having a plurality of ring-shaped optical functional zones, and a superposition type diffractive structure is formed on one of the plurality of optical functional zones such that a plurality of ring-shaped zones are formed concentrically around the optical axis and plural stepped sections shaped stepwise are formed within each ring-shaped zone.

(5) A light converging element for use in an optical pickup apparatus in which reproducing and/or recording information is conducted for a first optical information recording medium equipped with a protective layer having a thickness t1 by using a light flux having a first wavelength λ1 emitted from a first light source and reproducing and/or recording information is conducted for a second optical information recording medium equipped with a protective layer having a thickness t2 (t2≧t1) by using a light flux having a second wavelength λ2 (λ2>λ1) emitted from a second light source, comprising:

an optical surface of the light converging element having a plurality of optical functional zones, and a superposition type diffractive structure is formed within one of the plurality of optical functional zones such that a plurality of ring-shaped zones are formed around the optical axis and plural stepped sections shaped stepwise are formed within each ring-shaped zone.

(6) An optical pickup apparatus for conducting recording and/or reproducing information for plural different recording mediums with plural wavelength light fluxes, comprising:

a first light source to emit a light flux having a first wavelength λ1 for conducting recording and/or reproducing information for a first information recording medium equipped with a protective substrate having a thickness t1;

a second light source to emit a light flux having a second wavelength λ2 (λ2>λ1) for conducting recording and/or reproducing information for a second information recording medium equipped with a protective substrate having a thickness t2 (t2≧t1);

a third light source to emit a light flux having a third wavelength λ3 (λ3>λ2>λ1) for conducting recording and/or reproducing information for a third information recording medium equipped with a protective substrate having a thickness t3 (t3≧t2);

an objective optical system to converge a light flux having the wavelength λ1, λ2 or λ3 onto the first, second or third information recording medium respectively;

a diaphragm;

a driving device to drive the objective system and the diaphragm as one unit in a direction perpendicular to the optical axis;

an entering devise to make at least one light flux among light fluxes having the first, second and third wavelengths λ1, λ2 and λ3 enter in not parallel to the optical axis into the objective optical system; and a coma aberration correcting element provided between the objective lens and a light source to emit a light flux which enters in not parallel to the optical axis into the objective optical system and to reduce a coma aberration generated when the objective optical system is driven in the direction perpendicular to the optical axis by the driving device;

wherein an optical surface of the objective optical system has a plurality of optical functional zones, and a superposition type diffractive structure is formed within the optical functional zone including an optical axis of the plurality of optical functional zones such that a plurality of ring-shaped zones are formed around the optical axis and plural stepped sections shaped stepwise are formed within each ring-shaped zone.

(7) An optical pickup apparatus for conducting recording and/or reproducing information for plural different recording mediums with plural wavelength light fluxes, comprising:

a first light source to emit a light flux having a first wavelength λ1 for conducting recording and/or reproducing information for a first information recording medium equipped with a protective substrate having a thickness t1;

a second light source to emit a light flux having a second wavelength λ2 (λ2>λ1) for conducting recording and/or reproducing information for a second information recording medium equipped with a protective substrate having a thickness t2 (t2≧t1);

a third light source to emit a light flux having a third wavelength λ3 (λ3>λ2>λ1) for conducting recording and/or reproducing information for a third information recording medium equipped with a protective substrate having a thickness t3 (t3≧t2);

an objective optical system to converge a light flux. having the wavelength λ1, λ2 or λ3 onto the fist, second or third information recording medium respectively, wherein an optical surface of the objective optical system has a plurality of optical functional zones, and a superposition type diffractive structure is formed within an optical functional zone including an optical axis of the plurality of optical functional zones such that a plurality of ring-shaped zones are formed around the optical axis and plural stepped sections shaped stepwise are formed within each ring-shaped zone;

an entering device to enter at least two light fluxes with respective different magnifications into the objective optical system among light fluxes having the first, second and third wavelengths λ1, λ2 and λ3;

an divergent angle converting element having an optical surface including a superposition type diffractive structure, wherein the superposition type diffractive structure includes a plurality of ring-shaped zones which are formed concentrically around an optical axis, wherein each ring-shaped zone is composed of a plurality of stepped section stepwise, the divergent angle converting element to convert a divergent angle of at least a light flux having one of the first, second and third wavelengths λ1, λ2 and λ3;

wherein light sources to emit at least two light fluxes entering with respective different magnifications into the objective optical system among the first, second and third light sources are packaged in a light source module and the divergent angle converting element is located on a optical path between the light source module and the objective optical system.

(8) An optical pickup apparatus for conducting recording and/or reproducing information for plural different recording mediums with plural wavelength light fluxes, comprising:

a first light source to emit a light flux having a first wavelength λ1 for conducting recording and/or reproducing information for a first information recording medium equipped with a protective substrate having a thickness t1;

a second light source to emit a light flux having a second wavelength λ2 (λ2>λ1) for conducting recording and/or reproducing information for a second information recording medium equipped with a protective substrate having a thickness t2 (t2≧t1);

a third light source to emit a light flux having a third wavelength λ3 (λ3>λ2>λ1) for conducting recording and/or reproducing information for a third information recording medium equipped with a protective substrate having a thickness t3 (t3≧t2);

a diffractive lens having an optical surface including a superposition type diffractive structure, wherein the superposition type diffractive structure includes a plurality of ring-shaped zones which are formed concentrically around an optical axis, wherein each ring-shaped zone is composed of a plurality of stepped section stepwise, wherein the superposition type diffractive structure has a function to provide substantially no optical path difference to the first and third light fluxes and to provide an optical path difference only to the second light flux; and a light converging element to converge a light flux having the wavelength λ1, λ2 or λ3 having passed through the diffractive lens onto the first, second or third information recording medium respectively;

wherein the following formula (173) is satisfied:

$$m1 \geq m2 > m3 \quad (173)$$

where m1 is a magnification of an optical system structured by the diffractive lens and the light converging element for a light flux having the first wavelength λ1, m2 is a magnification of an optical system structured by the optical member and the light converging element for a light flux having the second wavelength λ2 and m3 is a magnification for a light flux having the third wavelength λ3.

(9) An optical pickup apparatus for conducting recording and/or reproducing information for plural different recording mediums with plural wavelength light fluxes, comprising:

a first light source to emit a light flux having a first wavelength λ1 for conducting recording and/or reproducing information for a first information recording medium equipped with a protective substrate having a thickness t1;

a second light source to emit a light flux having a second wavelength λ2 (λ2>λ1) for conducting recording and/or reproducing information for a second information recording medium equipped with a protective substrate having a thickness t2 (t2≧t1);

a third light source to emit a light flux having a third wavelength λ3 (λ3>λ2>λ1) for conducting recording and/or reproducing information for a third information recording medium equipped with a protective substrate having a thickness t3 (t3≧t2);

a light converging element to converge a light flux having the wavelength λ1, λ2 or λ3 onto the first, second or third information recording medium respectively;

a correcting optical system having an optical surface including a predetermined stepped structure; and a spherical aberration correcting member;

wherein the correcting optical system has a function to correct a spherical aberration generated by the light converging element due to a difference between the first wavelength λ1 and the second wavelength λ2 and/or a spherical aberration caused due to a difference between t1 and t2 and the spherical aberration correcting member has a function to correct a spherical aberration caused due to a difference between t1 and t3.

(10) An optical pickup apparatus for conducting recording and/or reproducing information for plural different recording mediums with plural wavelength light fluxes, comprising:

a first light source to emit a light flux having a first wavelength λ1;

a second light source to emit a light flux having a second wavelength λ2 (λ2>λ1);

an objective optical system for converging a light flux having the first wavelength λ1 onto a recording plane of a first information recording medium equipped with a protective substrate having a thickness t1 and for converging a light flux having the second wavelength λ2 onto a recording plane of a second information recording medium equipped with a protective substrate having a thickness t2 (t2≧t1);

wherein the objective optical system comprises a first optical surface to provide substantially no optical path difference for an incident light flux having the first wavelength λ1 and to provide an optical path difference for an incident light flux having the second wavelength λ2 and a second optical surface to refrain a chromatic aberration change caused due to wavelength dispersion when the first wavelength λ1 fluctuates within a range of ±10 nm.

(11) An optical pickup apparatus for conducting recording and/or reproducing information for plural different recording mediums with plural wavelength light fluxes, comprising:

a first light source to emit a light flux having a first wavelength λ1;

a second light source to emit a light flux having a second wavelength λ2 (λ2>λ1);

an objective optical system for converging a light flux having the first wavelength λ1 onto a recording plane of a first information recording medium equipped with a protective substrate having a thickness t1 and for converging a light flux having the second wavelength λ2 onto a recording plane of a second information recording medium equipped with a protective substrate having a thickness t2 (t2≧t1);

wherein the objective optical system comprises a plastic lens having a positive paraxial power, a first optical surface to provide substantially no optical path difference for an incident light flux having the first wavelength λ1 and to provide an optical path difference for an incident light flux having the second wavelength λ2, and a second optical surface to refrain a change of a spherical aberration caused due to a change of a refractive index of the plastic lens when environmental temperature changes.

BRIEF DESCRIPTION OF THE DRAWINGS

FIGS. 8(a) and 8(b) each is a view showing a structure of a superposition type diffraction optical element.

DETAILED DESCRIPTION OF THE PREFERRED EMBODIMENT

In the present specification, as a light source for the recording/reproducing, the optical disk for which the blue violet semiconductor laser or blue violet SHG laser is used, is generally called as "high density optical disk", and the recording/reproducing of the information by the objective optical system of NA 0.85 is conducted, and the recording/reproducing of the information by the objective optical system of NA 0.65 is conducted other than the optical disk of the standard whose protective layer thickness is about 0.1 mm, and the optical disk of the standard whose protective layer thickness is about 0.6 mm, is also included. Further, other than the optical disk having such a protective layer on its information recording surface, the optical disk having the protective layer whose thickness is about several several tens nm, on its information recording surface, or the optical disk whose protective layer thickness, or protective film thickness is 0, is also included. Further, in the present specification, in the high density optical disk, the optical magnetic disk which uses the blue violet semiconductor laser or blue violet SHG laser as the light source for the recording/reproducing of the information, is also included.

In the present specification, DVD is a general term of the optical disk of DVD series such as DVD-ROM, DVD-Video, DVD-Audio, DVD-RAM, DVD-R, DVD-RW, DVD+R, and DVD+RW, and CD is a general term of the optical disk of CD series such as CD-ROM, CD-Audio, CD-Video, CD-R, and CD-RW.

"Optical system" in the present specification means an optical system-which emits a light flux emitted from a light source, has a predetermined optical function and is composed of one optical element or plural optical elements. "Objective optical system" and "correcting optical system" mentioned later on are one example of it.

Figure 26:
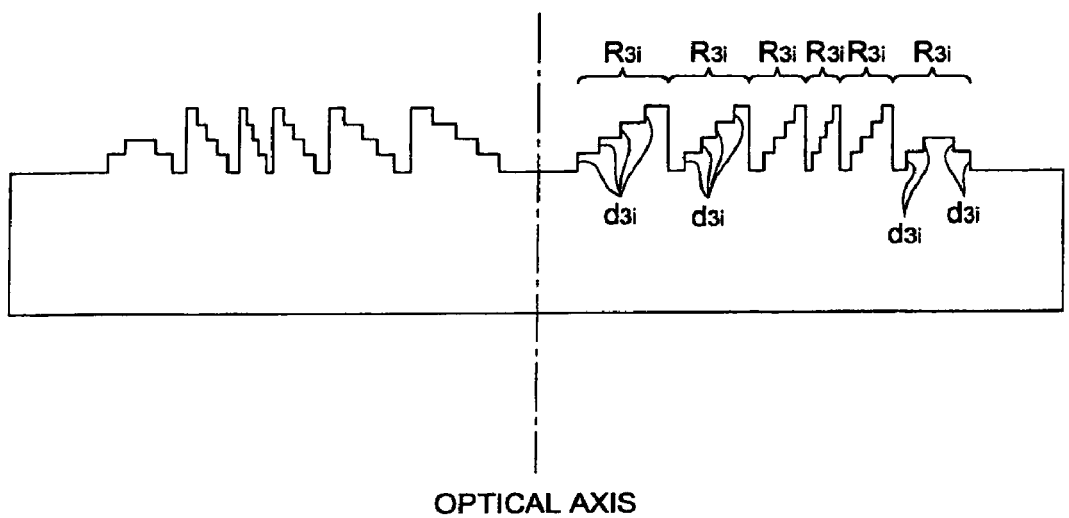
FIG. 26 is a view for explaining a superposition type diffractive structure.

"Superposition type diffractive structure" indicates, as typically shown in FIG. 26, in a plurality of ring-shaped zones R3$i$ which are continuously arranged around the optical axis, a structure in which each of ring-shaped zones R3$i$ is further divided stepwise by a plurality of stepped sections d3$i$ in the optical axis direction. When the depth Δ of the stepped section d3$i$ and the number of stepped section N of such a superposition type diffractive structure are adequately set, as described above, an action by which only one of a plurality of light fluxes whose wavelengths are different, is selectively diffracted, and the light fluxes having the other wavelength are not diffracted and transmitted as they are, or the diffraction orders of the light fluxes of a plurality of wavelengths are made different each other, or for the light flux of specific wavelength, the diffraction efficiency is extremely reduced, can be given to a plurality of incident light fluxes whose wavelengths are different. Hereupon, such an action by which the diffraction action or diffraction efficiency is extremely reduced, is given to the diffracted light ray having the maximum diffraction efficiency in the diffracted light ray of various degrees generated from the light fluxes of respective wavelengths. Hereupon, in the present specification, the light flux which is not diffracted by this "superposition type diffractive structure" (that is, the actual optical path difference is not given), but transmitted as it is, is called "0-degree diffracted light ray" for convenience.

Figure 27:
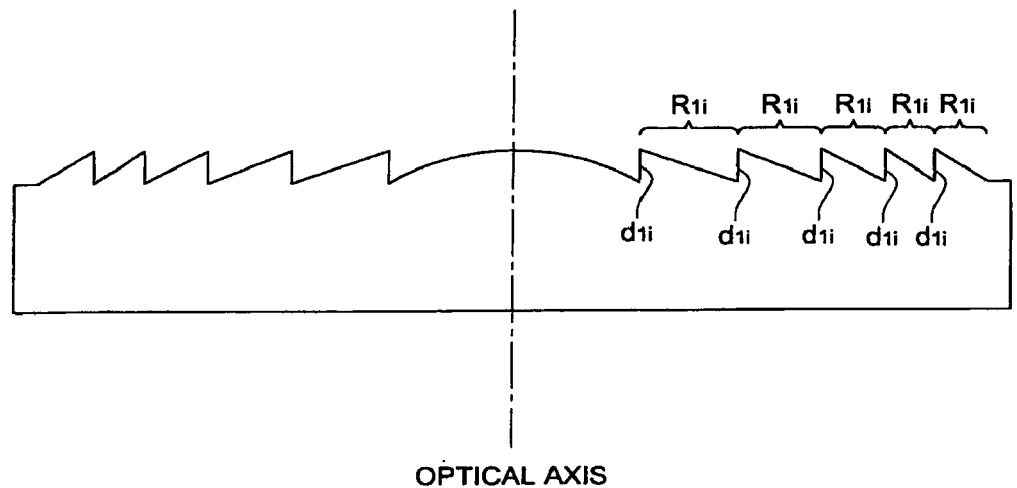
FIGS. 27(a) and 27(b) each is a view for explaining a diffractive structure.
Figure 27:
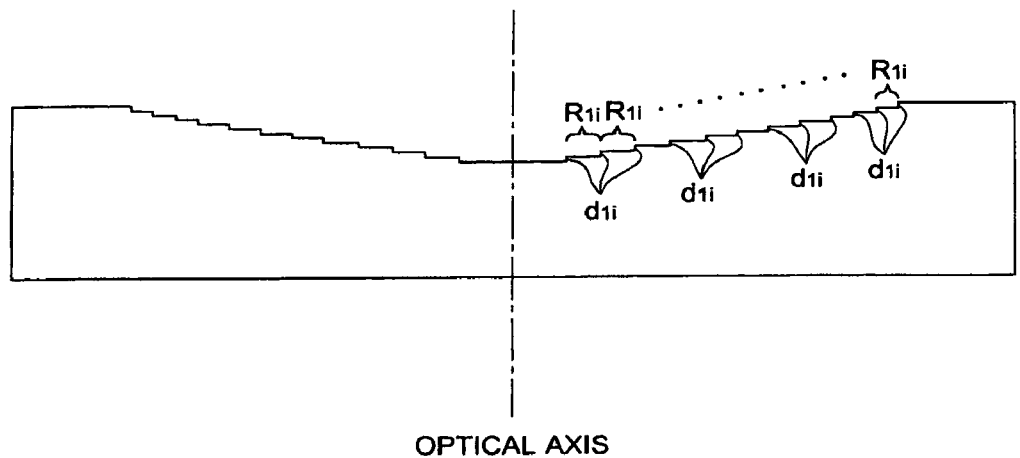

In the present specification, the "diffractive structure" indicates, as typically shown in FIG. 27, a structure which is structured by a plurality of ring-shaped zones R1$i$ of saw-toothed shape (FIG. 27(a)) or step shape (FIG. 27(b)), which is continuously arranged around the optical axis, and each of ring-shaped zones R1$i$ is divided by the stepped section d1$i$ in the optical axis direction. This "diffractive structure" generates the diffracted light ray of diffraction order whose absolute value is not smaller than 1. In the present specification, the above-described "superposition type diffractive structure" in which each ring-shaped zone is further divided stepwise, is distinguished from this "diffractive structure". Further, although FIG. 27 shows the case that the directions of the stepped sections d1$i$ are the same in the effective diameter, "diffractive structure" of the present invention includes the case that the directions of the stepped sections d1$i$ are inverted in the effective diameter.

Figure 28:
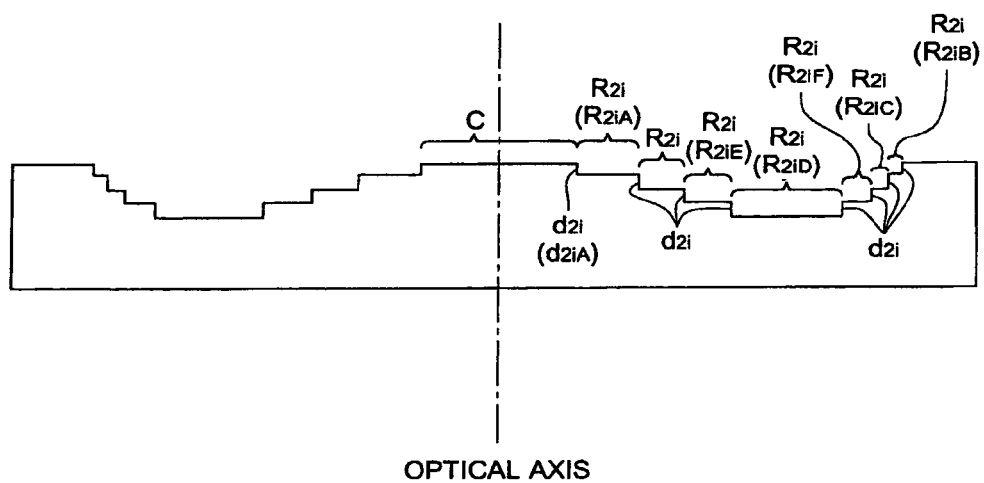
FIG. 28 is a view for explaining an optical path difference grant structure.

In the present specification, an "optical path difference grant structure" indicates, as typically shown in FIG. 28, a structure structured by a plurality of ring-shaped zones R2$i$ which are continuously arranged around the optical axis and divided by the stepped section d$2i$ of the optical axis direction. That is, it means a stepped structure in which a plurality of ring-shaped zones are formed continuously around the optical axis as the center are divided with a stepped section so as to provide a predetermined optical path difference. In these ring-shaped zones R$2i$, the ring-shaped zone of the inner side than the ring-shaped zone positioned at a predetermined height within the maximum effective diameter is shifted in the optical axis direction in such a manner that the optical path length is reduced as it is separated from the optical axis, and the ring-shaped zone of the outer side than the ring-shaped zone positioned at a predetermined height within the maximum effective diameter is shifted in such a manner that the optical path length is increased as it is separated from the optical axis. As the ring-shaped zone positioned at a predetermined height called herein, it is preferable that the height from the optical axis in its central portion is the height within the range of 60% to 85% of the maximum effective diameter.

Further, in the present specification, the "optical path difference grant structure" can also be expressed as a structure which is structured by a plurality of ring-shaped zones R$2i$ divided by minute stepped section d$2i$ in the central area C including the optical axis and outside the central area C, and in which the ring-shaped zone R$2i$A adjoining the outside of the central area C is formed by shifting in the optical axis direction so that the optical axis length is more increased than the ring-shaped zone R$2i$C adjoining its inside, and one ring-shaped zone R$2i$D whose central portion is positioned at the height within the range of 60% to 85% of the maximum effective diameter is formed by shifting in the optical axis so that the optical path length is more reduced than the ring-shaped zone $2i$E adjoining its inside and the ring-shaped zone $2i$F adjoining its outside. The "central area C" called herein, is an optical function area which is surrounded by the stepped section d$2i$A which includes the optical axis and is positioned at the nearest position from the optical axis.

Figure 29:
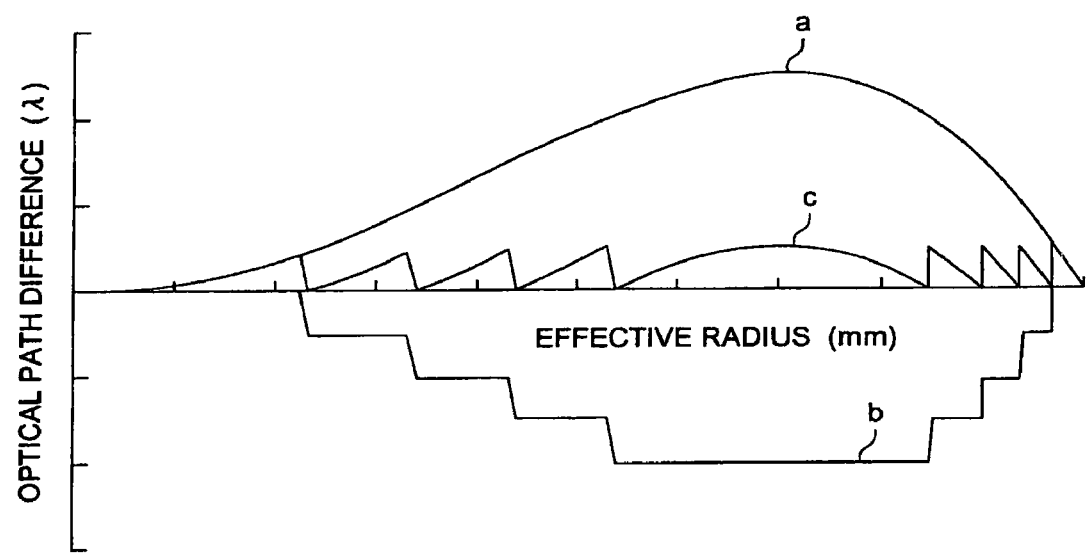
FIG. 29 is a view for explaining a function of the optical path difference grant structure.

It becomes possible that the spherical aberration is corrected by the optical path difference grant structure structured in this manner. For example, in the objective optical system structured by the aberration correcting element and light converging element both of which are formed of plastic lenses, when the spherical aberration change accompanied by the temperature increase (refer to the wave-front aberration a in FIG. 29) is corrected by the aberration correcting element by which the optical path difference grant structure is formed, the depth of the stepped section d$2i$ is set so as to satisfy d$2i$=p·λ0/(N0−1). Where, p is an integer not smaller than 1, λ0 (μm) is a designed wavelength, and N0 is the refractive index of the plastic lens at the design reference temperature.

At the reference temperature, because the optical path difference by the stepped section d$2i$ is integer times of designed wavelength, practically the optical path difference is not given. In contrast to this, when the temperature is risen, because the refractive index of the plastic lens is decreased, the optical path difference by the stepped section d$2i$ is minutely shifted from the integer times of the designed wavelength, as shown by b in FIG. 29, and the wave-front aberration of reversal sign to the wave-front aberration (a in FIG. 29) of the light converging element when the temperature rises, is generated, and respective wave-front aberrations act in the direction of cancelled-out (c in FIG. 29).

Hereupon, FIG. 26 to FIG. 28 are outline views when each structure is formed on parallel plane plate, and in the present specification, each structure is not limited to only the shape Of FIG. 26 to FIG. 28, as far as it does not depart from the above-described definition.

In the present specification, the "aberration correcting element" indicates an optical element on whose optical surface the above-described superposition type diffractive structure is formed, and which has a function to suppress the spherical aberration generated due to the difference of the protective layer thickness between a plurality of optical disks whose protective layer thickness is different. Further, in the present specification, the aberration correcting element is not only one optical element, but it may also be a structure formed of a plurality of optical elements. Further, the "light converging element" indicates an optical element which is arranged in the position facing the optical disk in the optical pickup device, and which has a function by which the light flux projected from the aberration correcting element is light-converged, and image-focused on respective information recording surfaces of a plurality of kinds of optical disks whose standards are different. Also this "light converging element" is not only one optical element, but may also be a structure formed of a plurality of optical elements. And herein, as the aberration correcting element like this, "aberration correcting element" means an optical system composed of one optical element or plural optical elements so as to correct an optical aberration caused by various factors.

In the present specification, the "objective optical system" indicates an optical system including at least the above-described light converging element. The objective optical system may also be structured by only the light converging element.

Further, in the present specification, when there is an optical element which conducts the tracking and focusing by the actuator by being integrated with such a light converging element, the optical system structured by these optical element and light converging element is defined as the objective optical system. Accordingly, in the optical element which is integrated with the light converging element and which conducts tracking and focusing by the actuator, the above-described aberration correcting element is included.

In the present specification, a phrase of "fine wave-front is formed" on the information recording surface of the optical disk is the same meaning as a case in which the incident light flux is light-converged on the information recording surface so that the wave-front aberration is in the situation not larger than 0.07λ RMS.

In order to solve the problems as described above, the invention written in item 1 is an optical element for an optical pickup device by which, by using the light flux of the first wavelength λ1 projected from the first light source, the reproducing and/or recording of the information is conducted for the first optical information recording medium having the protective layer of thickness t1, and by using the light flux of the second wavelength λ2 (λ2>λ1) projected from the second light source, the reproducing and/or recording of the information is conducted for the second optical information recording medium having the protective layer of thickness t2 (t2≧t1), and characterized in that: the optical element has an optical function surface on which the superposition type diffractive structure which is a structure in which a plurality of ring-shaped zones in which a plurality of stepped section are formed, are arranged around the optical axis, is formed; and an optical function surface on which the diffractive structure structured by a plurality of ring-shaped zones which are divided by the stepped section of the optical axis direction is formed.

The invention written in item 2 is characterized in that: in the optical element for the optical pickup device written in item 1, when the diffraction order of the diffracted light ray having the maximum diffraction efficiency in the diffracted light ray generated when the light flux of the first wavelength λ1 enters into the diffractive structure is n1, and the diffraction order of the diffracted light ray having the maximum diffraction efficiency in the diffracted light ray generated when the light flux of the second wavelength λ2 enters into the diffractive structure is n2, the depth of stepped section of the diffractive structure is set so as to satisfy the following expression (1).

$$n1 > n2 \quad (1)$$

The invention written in item 3 is characterized in that: in the optical element for the optical pickup device written in item 1 or 2, the first wavelength λ1 (μm), the second wavelength λ2 (μm) respectively satisfy the following expressions (2) and (3), and a combination of the diffraction order n1 of the diffracted light ray having the maximum diffraction efficiency in the diffracted light ray generated when the light flux of the first wavelength λ1 enters into the diffractive structure, and the diffraction order n2 of the diffracted light ray having the maximum diffraction efficiency in the diffracted light ray generated when the light flux of the second wavelength λ2 enters into the diffractive structure, is any one of (n1, n2)=(2, 1), (3, 2), (5, 3), (8, 5), (10, 6).

$$0.39 < \lambda 1 < 0.42 \quad (2)$$

$$0.63 < \lambda 2 < 0.68 \quad (3)$$

The invention written in item 4 is characterized in that: in the optical element for the optical pickup device written in any one of items 1 to 3, the element having the optical function surface on which diffractive structure is formed, in the optical elements, is formed of the material in which its refractive index in the first wavelength λ1 is within the range of 1.5-1.6, and Abbe's number on the d line is within the range of 50-60, and the depth d1 in the optical axis direction of the stepped section closest to the optical axis in the stepped section of the diffractive structure, satisfies any one of the following expressions (4) to (8).

$$1.\ 2\ \mu m < d1 < 1.7\ \mu m \quad (4)$$

$$2.\ 0\ \mu m < d1 < 2.6\ \mu m \quad (5)$$

$$3.\ 4\ \mu m < d1 < 4.1\ \mu m \quad (6)$$

$$5.\ 6\ \mu m < d1 < 6.5\ \mu m \quad (7)$$

$$6.\ 9\ \mu m < d1 < 8.1\ \mu m \quad (8)$$

The invention written in item 5 is characterized in that: in the optical element for the optical pickup device written in any one of items 1 to 4, the sectional shape including the optical axis of the diffractive structure is a step shape.

The invention written in item 6 is characterized in that: in the optical element for the optical pickup device written in any one of items 1 to 4, the sectional shape including the optical axis of the diffractive structure is a saw-toothed shape.

The invention written in item 7 is characterized in that: in the optical element for the optical pickup device written in any one of items 1 to 6, the optical element is formed of one element, and the superposition type diffractive structure is formed on one optical function surface of the optical element, and the diffractive structure is formed on the other optical function surface of the optical element.

The invention written in item 8 is characterized in that: in the optical element for the optical pickup device written in any one of items 1 to 7, the superposition type diffractive structure does not actually give the optical path difference between adjoining ring-shaped zones to the light flux of the first wavelength λ1, but gives the optical path difference to the light flux of the second wavelength λ2.

The invention written in item 9 is characterized in that: in the optical element for the optical pickup device written in any one of items 1 to 8, the first wavelength λ1 (μm), the second wavelength λ2 (μm) respectively satisfy the following expressions (2) and (3).

$$0.39 < \lambda 1 < 0.42 \quad (2)$$

$$0.63 < \lambda 2 < 0.68 \quad (3)$$

The invention written in item 10 is characterized in that: it is an optical element for the optical pickup device by which the reproducing and/or recording of the information is conducted for the first optical information recording medium having the protective layer of thickness t1 by using the light flux of the first wavelength λ1 projected from the first light source, and the reproducing and/or recording of the information is conducted for the second optical information recording medium having the protective layer of thickness t2 (t2≧t1) by using the light flux of the second wavelength λ2 (λ2>λ1) projected from the second light source, and the optical element has; an optical function surface on which the superposition type diffractive structure which is a structure in which a plurality of ring-shaped zones in which a plurality of stepped section are formed, are arranged around the optical axis, is formed; and an optical function surface on which the optical path grant structure, structured by a plurality of ring-shaped zones divided by stepped section in the optical axis direction, is formed.

The invention written in item 11 is characterized in that: in the optical element for the optical pickup device written in item 10, in the ring-shaped zones of the optical path grant structure, the ring-shaped zone of inner side than the ring-shaped zone positioned at a predetermined height in the maximum effective diameter is shifted in the optical axis direction so that the optical path is more reduced as it is separated from the optical axis, and the ring-shaped zone of outer side than the ring-shaped zone positioned at a predetermined height in the maximum effective diameter is shifted in the optical axis direction so that the optical path is more increased as it is separated from the optical axis.

The invention written in item 12 is characterized in that: in the optical element for the optical pickup device written in item 11, the height from the optical axis in the central portion of the ring-shaped zone positioned at the predetermined height is a height within the range of 60% to 85% of the maximum effective diameter.

The invention written in item 13 is characterized in that: in the optical element for the optical pickup device written in any one of items 10 to 12, Φ1, Φ2 respectively expressed by following expressions (9) and (10), by the first wavelength λ1 (μm), second wavelength λ2 (μm), the depth d2 (μm) in the optical axis direction of the stepped section nearest the optical axis in the stepped sections of the optical path difference grant structure, refractive index Nλ1 to the first wavelength λ1 of the element having the optical function surface on which the optical path difference grant structure is formed, in the optical elements, and refractive index Nλ2 to the second wavelength λ2 of the optical element, satisfy the following expressions (11) to (13).

$$\Phi 1 = d2(N\lambda 1 - 1)/\lambda 1 \quad (9)$$

$$\Phi 2 = d2(N\lambda 2 - 1)/\lambda 2 \quad (10)$$

$$INT(\Phi 1) \leqq 20 \quad (11)$$

$$0 \leq |INT(\Phi 1) - \Phi 1| \leq 0.4 \quad (12)$$

$$0 \leq |INT(\Phi 2) - \Phi 2| \leq 0.4 \quad (13)$$

Where, $INT(\Phi i)$ ($i=1, 2$) is an integer obtained by half-adjusting $\Phi i$.

The invention written in item 14 is characterized in that: in the optical element for the optical pickup device written in item 13, in the optical elements, the element having the optical function surface on which the optical difference grant structure is formed, is formed of a material in which the refractive index in the first wavelength $\lambda 1$ is within the range of 1.5-1.6, and Abbe's number on d line is within the range of 50-60, and satisfies the following expressions (14) and (15).

$$INT(\Phi 1) = 5p \quad (14)$$

$$INT(\Phi 2) = 3p \quad (15)$$

Where, p is an integer not smaller than 1.

The invention written in item 15 is characterized in that: in the optical element for the optical pickup device written in any one of items 10-14, the optical element is structured by one element, and the superposition type diffractive structure is formed on one optical function surface of the optical element, and the optical path difference grant structure is formed on the other optical function surface of the optical element.

The invention written in item 16 is characterized in that: in the optical element for the optical pickup device written in any one of items 10-15, the superposition type diffractive structure does not practically give the optical path difference between adjoining ring-shaped zones to the light flux of the first wavelength $\lambda 1$, but gives the optical path difference to the light flux of the second wavelength $\lambda 2$.

The invention written in item 17 is characterized in that: in the optical element for the optical pickup device written in any one of items 10-16, the first wavelength $\lambda 1$ (μm), second wavelength $\lambda 2$ (μm) respectively satisfy the following expressions (2) and (3).

$$0.39 < \lambda 1 < 0.42 \quad (2)$$

$$0.63 < \lambda 2 < 0.68 \quad (3)$$

The invention written in item 18 is characterized in that: in the optical element for the optical pickup device written in any one of items 1-17, the first wavelength $\lambda 1$ (μm), second wavelength $\lambda 2$ (μm) satisfy the following expressions (2) and (3), and in the superposition type diffractive structure, the depth $\Delta$ (μm) in the optical axis direction of the stepped section formed in each ring-shaped zone, and in the optical elements, refractive index $N\lambda 1$ to the first wavelength $\lambda 1$ of the element having the optical function surface on which the superposition type diffractive structure is formed, practically satisfy the following expression (16).

$$0.39 < \lambda 1 < 0.42 \quad (2)$$

$$0.63 < \lambda 2 < 0.68 \quad (3)$$

$$\Delta = 2m \cdot \lambda 1 / (N\lambda 1 - 1) \quad (16)$$

Where, N is any one of 3 or 4, or 5, and m is an integer not smaller than 1.

The invention written in item 19 is characterized in that: in the optical element for the optical pickup device written in item 18, in the optical elements, the element having the optical function surface on which the superposition type diffractive structure is formed, is formed of the material in which the refractive index in the first wavelength $\lambda 1$ is within the range of 1.5-1.6, and Abbe's number on d line is within the range of 50-60, and in the superposition type diffractive structure, a combination of the number N of the stepped sections formed in each ring-shaped zone and the depth D (μm) in the optical axis direction of the ring-shaped zone nearest the optical axis in the ring-shaped zones, is any one of the following expressions (17) to (19).

$$\text{When } N=3, 4.1 \leq D \leq 4.8 \quad (17)$$

$$\text{When } N=4, 5.4 \leq D \leq 6.4 \quad (18)$$

$$\text{When } N=5, 7.0 \leq D \leq 7.9 \quad (19)$$

The invention written in item 20 is characterized in that: it is an objective optical system which is used for the optical pickup device by which the reproducing and/or recording of the information is conducted for the first optical information recording medium having the protective layer of the thickness t1 by using the light flux of the first wavelength $\lambda 1$ projected from the first light source, and the reproducing and/or recording of the information is conducted for the second optical information recording medium having the protective layer of the thickness t2 (t2$\geq$t1) by using the light flux of the second wavelength $\lambda 2$ ($\lambda 2 > \lambda 1$) projected from the second light source, and is used for the purpose in which the light flux of the first wavelength $\lambda 1$ is light-converged on the information recording surface of the first optical information recording medium and the light flux of the second wavelength $\lambda 2$ is light-converged on the information recording surface of the second optical information recording medium; it includes the optical element for the optical pickup device written in any one of items 1 to 9; and the diffractive structure has a function by which the chromatic aberration generated due to the wavelength dispersion of the objective optical system is suppressed when the first wavelength $\lambda 1$ is changed within the range of $\pm 10$ nm.

The invention written in item 21 is characterized in that: in the objective optical system written in item 20, the diffractive structure has a function by which the chromatic aberration on axis of the objective optical system is suppressed when the first wavelength $\lambda 1$ is changed within the range of $\pm 10$ nm.

The invention written in item 22 is characterized in that: in the objective optical system written in item 20 or 21, the diffractive structure has a function by which the spherical aberration change generated due to the wavelength dispersion of the objective optical system is suppressed when the first wavelength $\lambda 1$ is changed within the range of $\pm 10$ nm.

The invention written in item 23 is characterized in that: it is an objective optical system which is used for the optical pickup device by which the reproducing and/or recording of the information is conducted for the first optical information recording medium having the protective layer of thickness t1 by using the light flux of the first wavelength $\lambda 1$ projected from the first light source, and the reproducing and/or recording of the information is conducted for the second optical information recording medium having the protective layer of thickness t2 (t2$\geq$t1) by using the light flux of the second wavelength $\lambda 2$ ($\lambda 2 > \lambda 1$) projected from the second light source; and which is used for the purpose by which the light flux of the first wavelength $\lambda 1$ is light-converged on the information recording surface of the first information recording medium, and the light flux of the second wavelength $\lambda 2$ is light-converged on the information recording surface of the second information recording medium; it includes the optical element for the optical pickup device written in any one of items 1 to 9; and the objective optical system has a plastic lens whose paraxial power is positive, and the diffractive structure has a function by which the spherical aberration change generated due to the refractive index change of the plastic lens accompanied by the environmental temperature change is suppressed.

The invention written in item 24 is characterized in that: in the objective optical system written in item 23, the objective optical system has the wavelength dependency of the spherical aberration by which, when the first wavelength λ1 is changed toward the long wavelength side, the spherical aberration is changed to under correction direction, and when the first wavelength λ1 is changed toward the short wavelength side, the spherical aberration is changed to over correction direction.

The invention written in item 25 is characterized in that: in the objective optical system written in any one of items 20-24, the objective optical system is structured by an aberration correcting element, and a light converging element used for a purpose by which the light flux of the first wavelength λ1 projected from the aberration correcting element is light-converged on the information recording surface of the first optical information recording medium, and the light flux of the second wavelength λ2 projected from the aberration correcting element is light-converged on the information recording surface of the second optical information recording medium, and the superposition type diffractive structure and the diffractive structure are formed on the optical function surface of the aberration correcting element.

The invention written in item 26 is characterized in that: in the objective optical system written in any one of items 20-25, the sectional shape including the optical axis of the diffractive structure is a step shape.

The invention written in item 27 is characterized in that: in the objective optical system written in any one of items 20-27, the sectional shape including the optical axis of the diffractive structure is a saw-toothed shape.

The invention written in item 28 is characterized in that: in the objective optical system written in any one of items 20-27, the superposition type diffractive structure has a function by which the spherical aberration generated due to the difference of the thickness between the protective layer of the first optical information recording medium and the protective layer of the second optical information medium, is corrected.

The invention written in item 29 is characterized in that: an objective optical system used for an optical pickup device by which the reproducing and/or recording of the information is conducted for the first optical information recording medium having the protective layer of thickness t1 by using the light flux of the first wavelength λ1 projected from the first light source, and the reproducing and/or recording of the information is conducted for the second optical information recording medium having the protective layer of thickness t2 (t2≧t1) by using the light flux of the second wavelength λ2 (λ2>λ1) projected from the second light source, and used for a purpose by which the light flux of the first wavelength λ1 is light-converged on the information recording surface of the first optical information recording medium, and the light flux of the second wavelength λ2 is light-converged on the information recording surface of the second optical information recording medium; and it includes an optical element for the optical pickup device written in any one of items 10 to 17, and the objective optical system has a plastic lens whose paraxial power is positive, and the optical path grant structure has a function by which the spherical aberration change generated due to the wavelength dispersion of the objective optical system is suppressed, when the first wavelength λ1 is changed within the range of ±10 nm.

The invention written in item 30 is characterized in that: an objective optical system used for the optical pickup device by which the reproducing and/or recording of the information is conducted for the first optical information recording medium having the protective layer of thickness t1 by using the light flux of the first wavelength λ1 projected from the first light source, and the reproducing and/or recording of the information is conducted for the second optical information recording medium having the protective layer of thickness t2 (t2≧t1) by using the light flux of the second wavelength λ2 (λ2>λ1) projected from the second light source, and used for a purpose by which the light flux of the first wavelength λ1 is light-converged on the information recording surface of the first optical information recording medium, and the light flux of the second wavelength λ2 is light-converged on the information recording surface of the second optical information recording medium; and it includes an optical element for the optical pickup device written in any one of items 10 to 17, and the objective optical system has a plastic lens whose paraxial power is positive, and the optical path grant structure has a function by which the spherical aberration change generated due to the refractive index change of the plastic lens accompanied by the environmental temperature change is suppressed.

The invention written in item 31 is characterized in that: in the objective optical system written in item 30, the optical path grant structure has the temperature dependency of the spherical aberration like as that, when the environmental temperature rises, the spherical aberration added to the light flux of the first wavelength λ1 is changed toward the under correction direction, and when the environmental temperature lowers, the spherical aberration added to the light flux of the first wavelength λ1 is changed toward the under correction direction.

The invention written in item 32 is characterized in that: in the objective optical system written in item 30 or 31, in the ring-shaped zone of the optical path difference grant structure, the ring-shaped zone of the inner side than the ring-shaped zone positioned at a predetermined height in the maximum effective diameter is shifted in the optical axis direction in such a manner that the optical path is reduced as it is separated from the optical axis, and the ring-shaped zone of the outer side than the ring-shaped zone positioned at a predetermined height in the maximum effective diameter is shifted in the optical axis direction in such a manner that the optical path is increased as it is separated from the optical axis.

The invention written in item 33 is characterized in that: in the objective optical system written in item 32, the height from the optical axis at the central portion of the ring-shaped zone positioned at a predetermined height is the height within the range of 60% to 85% of the maximum effective diameter.

The invention written in item 34 is characterized in that: in the objective optical system written in any one of items 29 to 33, the objective optical system is structured by an aberration correcting element, and a light converging element used for a purpose by which the light flux of the first wavelength λ1 projected from the aberration correcting element is light-converged on the information recording surface of the first optical information recording medium, and the light flux of the second wavelength λ2 projected from the aberration correcting element is light-converged on the information recording surface of the second optical information recording medium, and the superposition type diffractive structure and the optical path difference grant structure are formed on the optical function surface of the aberration correcting element.

The invention written in item 35 is characterized in that: in the objective optical system written in any one of items 29 to 34, the superposition type diffractive structure has a function by which the spherical aberration generated due to the difference of the thickness between the protective layer of the first optical information recording medium and the protective layer of the second optical information recording medium is corrected.

The invention written in item 36 is characterized in that: in the objective optical system written in any one of items 20 to 35, when the optical path difference added to the transmission wave-front by the superposition type diffractive structure is defined by the following arithmetic expression, signs of $B_2$ and $B_4$ are different each other.

$$\phi_b = \lambda/\lambda_B \times n \times \sum_{j=1} B_{2j} h^{2j}$$ [Arith. 1]

Where, $\lambda$ is a wavelength of the incident light flux, $\lambda_B$ is a production wavelength, h is the height (mm) in the direction perpendicular to the optical axis, $B_{2j}$ is a optical path difference function coefficient, and n is the diffraction order.

The invention written in item 37 is characterized in that: in the objective optical system written in any one of items 20 to 36, the objective optical system is structured by an aberration correcting element having the optical function surface on which the superposition type diffractive structure is formed; and a light converging element which is a plastic lens of 1 group 1 lens composition used for a purpose by which the light flux of the first wavelength λ1 projected from the aberration correcting element, is light-converged on the information recording surface of the first optical information recording medium, and the light flux of the second wavelength λ2 projected from the aberration correcting element, is light-converged on the information recording surface of the second optical information recording medium; and the paraxial power P1 (mm$^{-1}$) of the aberration correcting element for the first wavelength λ1 satisfies the following expression (20).

$$P1>0 \quad (20)$$

The invention written in item 38 is characterized in that: in the objective optical system written in any one of items 20 to 37, the objective optical system is structured by an aberration correcting element having the optical function surface on which the superposition type diffractive structure is formed; and a light converging element of 1 group 1 lens composition used for a purpose by which the light flux of the first wavelength λ1 projected from the aberration correcting element, is light-converged on the information recording surface of the first optical information recording medium, and the light flux of the second wavelength λ2 projected from the aberration correcting element, is light-converged on the information recording surface of the second optical information recording medium; and a ratio of the paraxial power P1 (mm$^{-1}$) of the aberration correcting element for the first wavelength λ1 and the paraxial power P2 (mm$^{-1}$) of the light converging element for the first wavelength λ1 satisfies the following expression (21).

$$|P1/P2|\leq 0.2 \quad (21)$$

The invention written in item 39 is characterized in that: in the objective optical system written in item 38, the light converging element is a ring poly-olefin series plastic lens, and in the plastic lens, the refractive index N405 to the wavelength 405 nm at temperature 25° C., and Abbe's number vd in d line, the change ratio dN405/dT of the refractive index to the wavelength 405 nm accompanied by the temperature change within the temperature range of −5° C.-70° C., satisfy the following expressions (22) to (24).

$$1.54<N405<1.58 \quad (22)$$

$$50<vd<60 \quad (23)$$

$$-10\times 10^{-5}(° C.^{-1})<dN405/dT<-8\times 10^{-5}(° C.^{-1}) \quad (24)$$

The invention written in item 40 is characterized in that: in the objective optical system written in item 38, the light converging element is molded by using the material in which particles whose diameter is not larger than 30 μm, are dispersed in plastic materials.

The invention written in item 41 is characterized in that: in the objective optical system written in item 38, the light converging element is a glass lens.

The invention written in item 42 is characterized in that: an optical pickup device by which the reproducing and/or recording of the information is conducted for the first optical information recording medium having the protective layer of thickness t1 by using the light flux of the first wavelength λ1 projected from the first light source, and the reproducing and/or recording of the information is conducted for the second optical information recording medium having the protective layer of thickness t2 (t2≧t1) by using the light flux of the second wavelength λ2 (λ2>λ1) projected from the second light source, and it has an optical element for the optical pickup device written in any one of items 1 to 19.

The invention written in item 43 is characterized in that: an optical pickup device by which the reproducing and/or recording of the information is conducted for the first optical information recording medium having the protective layer of thickness t1 by using the light flux of the first wavelength λ1 projected from the first light source, and the reproducing and/or recording of the information is conducted for the second optical information recording medium having the protective layer of thickness t2 (t2≧t1) by using the light flux of the second wavelength λ2 (λ2>λ1) projected from the second light source, and it has an objective optical system written in any one of items 20 to 41.

The invention written in item 44 is characterized in that: it is an optical information recording reproducing device in which the optical pickup device written in item 42 or 43 is mounted, and which can conduct at least one of the following (I) to (IV).

(I) the recording of the information for the first optical information recording medium, and the recording of the information for the second optical information recording medium (II) the recording of the information for the first optical information recording medium, and the reproducing of the information recorded in the second optical information recording medium (III) the reproducing of the information recorded in the first optical information recording medium, and the recording of the information for the second optical information recording medium (IV) the reproducing of the information recorded in the first optical information recording medium, and the reproducing of the information recorded in the second optical information recording medium According to the invention written in item 1, when the number of stepped sections formed in each ring-shaped zone of the superposition type diffractive structure, the depth of the stepped section formed in each ring-shaped zone, and the arrangement of each ring-shaped zone are adequately set, because, to the light flux of the first wavelength λ1, the optical path difference is not practically given, and the light flux is not diffracted and passed as it is, and to the light flux of the second wavelength λ2, the optical path difference is given, and the light flux can be diffracted, the spherical aberration generated due to the difference of the protective layer thickness between the high density optical disk and DVD can be corrected, and the high transmission factor (diffraction efficiency) can be secured also to the light flux of any wavelength. Further, on the superposition type diffractive structure, a role of a dichroic filter by which the light flux of the first wavelength λ1 is not diffracted, and transmitted as it is, and to the light flux of the second wavelength λ2, the diffraction efficiency is extremely reduced, and the light flux is made flare, can also be charged.

For example, in the common objective optical system of the high density optical disk and DVD, when, in numerical aperture NA2 of DVD, the first superposition type diffractive structure for correcting the spherical aberration generated due to the difference of the protective layer thickness between the high density optical disk and DVD is formed, and further, in the range from numerical aperture NA2 to numerical aperture NA1 of the high density optical disk, the second superposition type diffractive structure by which the light flux of the first wavelength λ1 is not diffracted and passed as it is, and to the light flux of the second wavelength λ2, the diffraction efficiency is extremely reduced and the light flux is made flare, is formed, the objective optical system by which the recording/reproducing of the information can be adequately conducted for any optical disk, and which has an aperture switching function for DVD can be provided.

Further, in order to enable the recording/reproducing of the information to be conducted adequately for the high density optical disk, by providing a means for correcting the chromatic aberration on the axis, it is necessary to prevent the deterioration of the light converging performance due to the instantaneous wavelength change of the laser light source, which is called mode-hopping. This is for the reason that, because the wavelength dispersion of the optical material in the blue violet area is very increased, the dislocation of the focus position is largely generated for even a slight wavelength change.

Further, as one standard of the high density optical disk, an optical disk in which the numeral aperture of the objective optical system is increased to about 0.85, is proposed, however, as the numerical aperture of the objective optical system is increased, because the spherical aberration change generated by the wavelength change of the incident light flux is increased, a problem that the laser light source having the wavelength error by the production error can not be used, is actualized. Therefore, because it is necessary that laser light sources are selected, the production cost of the optical pickup device is increased.

Further, because the specific gravity of plastic lens is smaller than that of glass lens, the burden on the actuator to drive the objective optical system can be reduced, and the following of the objective optical system can be conducted at high speed. Further, the plastic lens produced by the injection molding can be mass-produced high accurately at the stable quality, when a desired metallic mold is accurately produced. However, in the case where the numerical aperture of the objective optical system is increased, when the objective optical system is formed of the plastic lens, the influence of the refractive index change following the temperature change is increased. This is for the reason that the spherical aberration generated by the refractive index change is increased in proportion to fourth power of the numerical aperture.

Accordingly, in the present invention, when the diffractive structure is provided on the optical function surface of the optical element, because a function to suppress the dislocation of the focus position to the wavelength change of the incident light flux, or the spherical aberration change to the wavelength change of the incident light flux, or the spherical aberration change following the refractive index change, is added, even when the wavelength change of the incident light flux or temperature change is generated, the recording/reproducing characteristic to the high density optical disk can be finely maintained.

However, because, in the light source for the high density optical disk and the light source for DVD, the wavelength difference is large, when the diffracted light ray of the same diffraction order generated in the above-described diffractive structure is used as the light flux for the recording/reproducing for respective optical disks, the diffraction efficiency sufficient for the light fluxes of the wavelength of 2 light sources, can not be obtained. For such a problem, as in the invention of item 2, when the diffractive structure is designed in such a manner that the diffraction order n2 of the diffracted light ray used for DVD is lower degree than the diffraction order n1 of the diffracted light ray used for the high density optical disk, the diffraction efficiency for the light fluxes of the wavelength of 2 light sources can be sufficiently secured.

Specifically, as the diffraction orders n1, n2, when they have a combination as in the invention of item 3, it is preferable because the high diffraction efficiency can be secured for the wavelength of the wavelength λ1, λ2. There is a combination of the diffraction orders n1, n2 by which the high diffraction efficiency can be secured also for the light flux having any wavelength, except the combination written in item 3, however, when the diffraction order is too increased, because the lowering of the diffraction efficiency following the wavelength change of the incident light flux becomes large, it is not preferable.

In the case where the element on which the diffractive structure is formed, is formed of the material in which the refractive index to the first wavelength λ1 is within the range of 1.5-1.6, and Abbe's number on d-line is within the range of 50-60, as written in the invention of item 4, when, in the stepped section of the diffractive structure, the depth d1 of the stepped section at a position closest to the optical axis is set so as to satisfy any one of expressions (4)-(8), the high diffraction efficiency can be secured for the light fluxes of the first wavelength λ1 and the second wavelength λ2. Hereupon, a combination of the diffraction orders n1, n2 and the stepped section d1 has a relationship in which (n1, n2)=(2, 1) corresponds to expression (4), (n1, n2)=(3, 2) corresponds to expression (5), (n1, n2)=(5, 3) corresponds to expression (6), (n1, n2)=(8, 5) corresponds to expression (7), and (n1, n2)=(10, 6) corresponds to expression (8).

As the specific shape of such a diffractive structure, as in the invention written in item 5, the shape in which the sectional shape including the optical axis is step shape, is listed. Further, as the specific shape of such a diffractive structure, as in the invention written in item 6, the shape in which the sectional shape including the optical axis may also be sawtoothed shape.

In order to give the high added value to the optical element and simultaneously to attain the cost reduction, as written in the invention of item 7, it is preferable that the optical element is formed of one element, and the superposition type diffractive structure and the diffractive structure are formed on respective optical function surfaces of the element.

As described above, because the wavelength dispersion is increased by making the light source wavelength short, in the objective optical system, a problem of the chromatic aberration is actualized. The "chromatic aberration" said herein, indicates at least one of the "chromatic aberration on axis" in which the paraxial focusing position is moved by the wavelength change, and the "chromatic spherical aberration" in which the spherical aberration is changed by the wavelength change. Particularly, because the spherical aberration is increased in proportion to the fourth power of the numerical aperture, when the objective optical system is made to increase the numerical aperture, the problem of the above-described "chromatic spherical aberration" is more actualized. Accordingly, as in the inventions of items 20 to 22, in order to make enable to adequately conduct the recording/reproducing of the information for the high density optical disk, it is preferable to give a function by which the chromatic aberration generated due to the wavelength dispersion of the objective optical system is suppressed, to the diffractive structure. Further, it is advantageous for the cost reduction and weight reduction that the objective optical system is structured by plastic lens, however, because the influence of the refractive index change following the temperature change becomes large, when the temperature in the optical pickup device is changed, the recording/reproducing characteristic of the information for the high density optical disk is interfered. In order to maintain the fine recording/reproducing characteristic even when the temperature in the optical pickup device is changed, as in the invention of item 23, it is preferable to give a function by which the spherical aberration generated due to the refractive index change of the plastic lens is suppressed, to the diffractive structure.

Specifically, as in the invention of item 24, it is preferable that the wavelength dependency of the spherical aberration in such a manner that, when the first wavelength $\lambda 1$ is increased, the spherical aberration is changed to under correction direction, and when the first wavelength $\lambda 1$ is reduced, the spherical aberration is changed to over correction direction, is given to the objective optical system by the action of the diffractive structure.

Further, when the structure having the stepped section of the optical axis direction such as the superposition type diffractive structure or diffractive structure, is formed on the optical element whose curvature is large, the transmission factor is lowered by the influence of shading of the light flux by the stepped section portion. In order to prevent such a lowering of transmission factor, as in the invention written in item 25, it is preferable that the objective optical system is structured by the aberration correcting element and the light converging element, and the superposition type diffractive structure and diffractive structure are formed on the aberration correcting element.

According to the invention written in item 10, as the same as the invention written in item 1, by the superposition type diffractive structure, the spherical aberration generated due to the difference of the protective layer thickness between the high density optical disk and DVD can be corrected, and the high transmission factor (diffraction efficiency) can be secured also for the light flux of any wavelength. Further, on the superposition type diffractive structure, a role of a dichroic filter by which the light flux of the first wavelength $\lambda 1$ passes as it is without being diffracted, and for the light flux of the second wavelength $\lambda 2$, the diffraction efficiency is extremely reduced and the light flux is made flare, can be burdened.

Further, in the present invention, when the optical path difference grant structure is provided on an optical function surface of the optical element, because a function to suppress the spherical aberration change to the wavelength change of the incident light flux, or the spherical aberration change following the refractive index change, is given to the optical function surface, even when the wavelength change of the incident light flux or temperature change is caused, the recording/reproducing characteristic for the high density optical disk can be finely maintained.

In order to correct the spherical aberration by the optical path difference grant structure, as in the invention of item 11, in the ring-shaped zones of the optical path difference grant structure, a structure in which the ring-shaped zone of the inner side than the ring-shaped zone positioned at a predetermined height within the maximum effective diameter is shifted in the optical axis direction in such a manner that, as it is separated from the optical axis, the optical path length is shortened, is preferable, hereby, the spherical aberration change to the wavelength change of the incident light flux or the spherical aberration change following the refractive index change can be suppressed.

It is preferable that above-described height from the optical axis at the central portion of the ring-shaped zone positioned at a predetermined height is, as in the invention of item 12, the height within the range of 60% to 85% of the maximum effective diameter.

As in the invention of item 13, in order to increase the transmission factor of the optical path difference grant structure to the light fluxes of the first wavelength $\lambda 1$ and the second wavelength $\lambda 2$, it is preferable that, in the stepped section of the optical path difference grant structure, the depth d2 of the stepped section positioned at the closest position to the optical axis, and the optical path differences $\Phi 1$ and $\Phi 2$ added to the light fluxes of the first wavelength $\lambda 1$ and the second wavelength $\lambda 2$ by the stepped section are set so that they satisfy expressions (11) to (13). When these expressions are not satisfied, at the time of the wavelength change of the incident light flux or at the time of the refractive index change following the temperature change, the high degree of spherical aberration is generated to the light flux of any wavelength. Although it is said that the high degree of spherical aberration does not influence on the recording/reproducing performance, it is practically equivalence to the lowering of the transmission factor. When these expressions are satisfied, the generation of the high degree of spherical aberration can be suppressed also to the light flux of any wavelength, and the transmission factor can be increased.

When the element on which the optical path difference grant structure is formed is formed of the material in which the refractive index to the first wavelength $\lambda 1$ is within the range of 1.5-1.6, and Abbe's number on d-line is within the range of 50-60, as in the invention of item 14, it is preferable that the optical path differences $\Phi 1$ and $\Phi 2$ satisfy expressions (14) and (15). The expression (14) means that the optical path $\Phi 1$ added to the light flux of the first wavelength $\lambda 1$ by the stepped section positioned at the position closest to the optical axis is about 5 times of the first wavelength $\lambda 1$. When the depth d2 of the stepped section positioned at the position closes to the optical axis is set in this manner, because the optical path difference $\Phi 2$ added to the second wavelength $\lambda 2$ is practically about 3 times of the second wavelength $\lambda 2$, the generation of the high degree of spherical aberration can be suppressed to the light flux of any wavelength, and the transmission factor can be increased.

A specific example will be listed and explained below. In an optical plastic material "ZEONEX 330R" (trade name) made by Nippon Zeon (co.), when the first wavelength $\lambda 1$ and the second wavelength $\lambda 2$ are respectively 0.405 μm, and 0.655 μm, the refractive index N$\lambda 1$ to the first wavelength $\lambda 1$ is 1.5252, and the refractive index N$\lambda 2$ to the second wavelength $\lambda 2$ is 1.5070. When the depth d2 of the stepped section positioned at a position closest to the optical axis is a depth determined by $$d2 = 5 \cdot \lambda1/(N\lambda1-1) = 5 \cdot 0.405/(1.5252-1) = 3.856 \, \mu m.$$

the optical path difference $\Phi1$ added to the light flux of the first wavelength $\lambda1$ by this stepped section is 5 times of the first wavelength $\lambda1$ (that is, p=1 in the expression (14)). The optical path difference $\Phi2$ added to the light flux of the first wavelength $\lambda2$ by this stepped section of this depth is, from the expression (10), $$\Phi2 = d2 \cdot (N\lambda2-1)/\lambda2 = 3.856 \cdot (1.5070-1)/0.655 = 2.98,$$

and because the optical path difference $\Phi2$ is practically 3 times of the second wavelength $\lambda2$, the generation of the high degree of spherical aberration can be suppressed also to the light flux of the second wavelength $\lambda2$, and the transmission factor can be increased.

Further, in order to give high added value to the optical element, and simultaneously to attain the cost reduction, as in the invention of item 15, it is preferable that the optical element is formed of one element, and the superposition type diffractive structure and the optical path difference grant structure are formed on respective optical function surfaces of the element.

As described above, by reducing the light source wavelength, and by increasing the numerical aperture of the objective optical system, a problem of the "chromatic spherical aberration" in which the spherical aberration is changed by the wavelength change, is actualized. Accordingly, as in the invention of item 29, for the purpose by which the recording/reproducing of the information can be adequately conducted for the high density optical disk, it is preferable that a function by which the chromatic aberration generated due to the wavelength dispersion of the objective optical system is suppressed, is given to the diffractive structure.

Further, when the objective optical system is structured by plastic lenses, it is advantageous for the cost reduction and weight reduction, however, because the influence of the refractive index change following the temperature change becomes large, when the temperature in the optical pickup device is changed, the recording/reproducing of the information for the high density optical disk is interfered. In order to maintain the good recording/reproducing characteristic, even when the temperature in the optical pickup device is changed, as in the invention of item 30, it is preferable that a function by which the spherical aberration generated due to the refractive index change of the plastic lens is suppressed, is given to the optical path difference grant structure.

Specifically, as in the invention of item 31, in the case where the optical path difference grant structure having the temperature dependency of the spherical aberration by which the spherical aberration added to the light flux of the first wavelength $\lambda1$ is changed to the under correction direction when the refractive index is lowered following the environmental temperature rise, and is changed to the over correction direction when the refractive index is increased following the environmental temperature fall, is formed, the spherical aberration generated in the plastic lens following the temperature change can be suppressed.

In this manner, in a method by which the spherical aberration change following the temperature change of the plastic lens is suppressed by the optical path difference grant structure, because the spherical aberration change following the refractive index change of the optical path difference grant structure, is used, different from the case by the diffractive structure in which the wavelength dependency is used, even when the wavelength change of the laser light source is not generated following the temperature change, the suppression effect of the spherical aberration change is actuated.

A specific structure of the is, as in the invention of item 32, a structure is preferable in which, in the ring-shaped zones of the optical path difference grant structure, the ring-shaped zone of the inner side than the ring-shaped zone positioned at a predetermined height within the maximum effective diameter, is shifted to the optical axis direction so that, as it is separated from the optical axis, the optical path length is reduced, and the ring-shaped zone of the outer side than the ring-shaped zone positioned at a predetermined height within the maximum effective diameter, is shifted to the optical axis direction so that, as it is separated from the optical axis, the optical path length is increased, and hereby, the spherical aberration change to the wavelength change of the incident flux or the spherical aberration change following the refractive index change, can be suppressed.

It is preferable that the height from the optical axis at the central portion of the ring-shaped zone positioned at the predetermined height is, as in the invention of item 33, the height within the range of 60% to 85% of the maximum effective diameter.

Further, when the structure having the stepped section in the optical axis direction such as the superposition type diffractive structure or the optical path difference grant structure is formed on the optical element whose curvature is large, the transmission factor is lowered by the influence of the shading of the light flux by the stepped section portion. In order to prevent such a lowering of the transmission factor, as in the invention written in item 34, it is preferable that the objective optical system is structured by an aberration correcting element and a light converging element, and the superposition type diffractive structure and the optical path difference grant structure are formed on the aberration correcting element.

As a specific structure of the superposition type diffractive structure, as in the invention of item 18, it is preferable that the number N of the stepped sections formed in each ring-shaped zone is any one of 3 or 4 or 5 (that is, each ring-shaped zone is divided by 4, or 5, or 6) and the optical path difference added to the light flux of the first wavelength $\lambda1$ by the depth $\Delta$ of the optical axis direction of the stepped section is practically, 2m times of the first wavelength $\lambda1$ (where, m is an integer not smaller than 1), hereby, when the superposition type diffractive structure, practically, does not give the optical path difference to the light flux of the first wavelength $\lambda1$, but gives the optical path difference to the light flux of the second wavelength $\lambda2$, the light flux of the second wavelength $\lambda2$ can be selectively diffracted, and the high transmission factor (diffraction efficiency) can be secured also to the light flux of any wavelength.

As in the invention written in item 19, when the element on which the superposition type diffractive structure is formed, is formed of the material in which the refractive index to the wavelength $\lambda1$ is within the range of 1.5-1.6, and Abbe's number in d-line is within the range of 50-60, it is preferable that the number of stepped sections N formed in each ring-shaped zone and the depth $D=\Delta (N+1)$ for one ring-shaped zone structured by N stepped sections, are set so that they satisfy any one of expressions (17)-(19).

Hereby, because the 0 degree diffracted light ray which does not practically give the optical path difference to the light flux of the first wavelength $\lambda1$, and +1 degree diffracted light ray, when the optical path difference is given to the light flux of the first wavelength $\lambda2$, can be generated, the spherical aberration generated due to the difference of the protective layer thickness between the high density optical disk and DVD, can be effectively corrected, and the high transmission factor (diffraction efficiency) can be secured also to the light flux of any wavelength.

Figure 16:
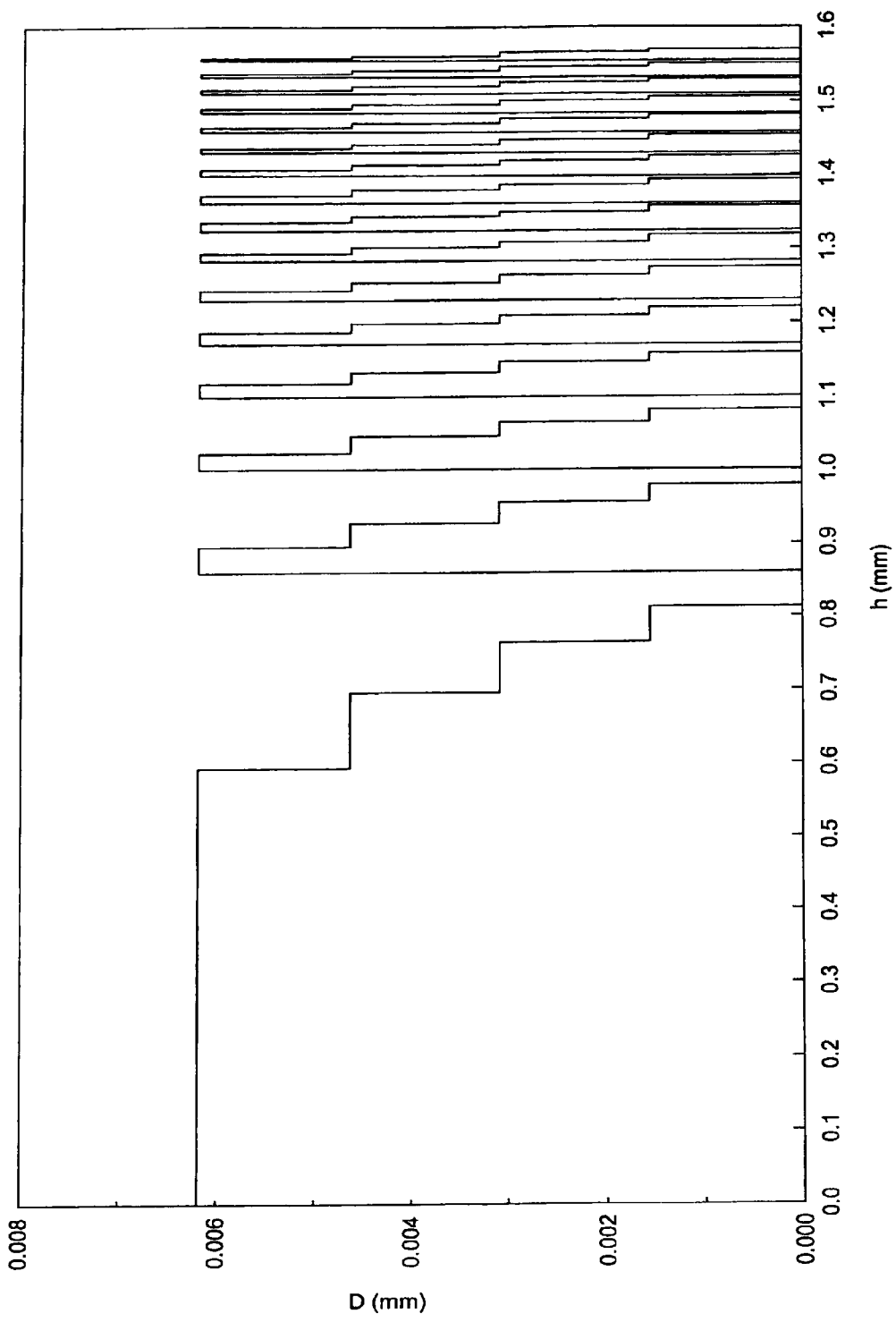
FIG. 16 is a sectional view showing a structure of a superposition type diffraction optical element.
Figure 17:
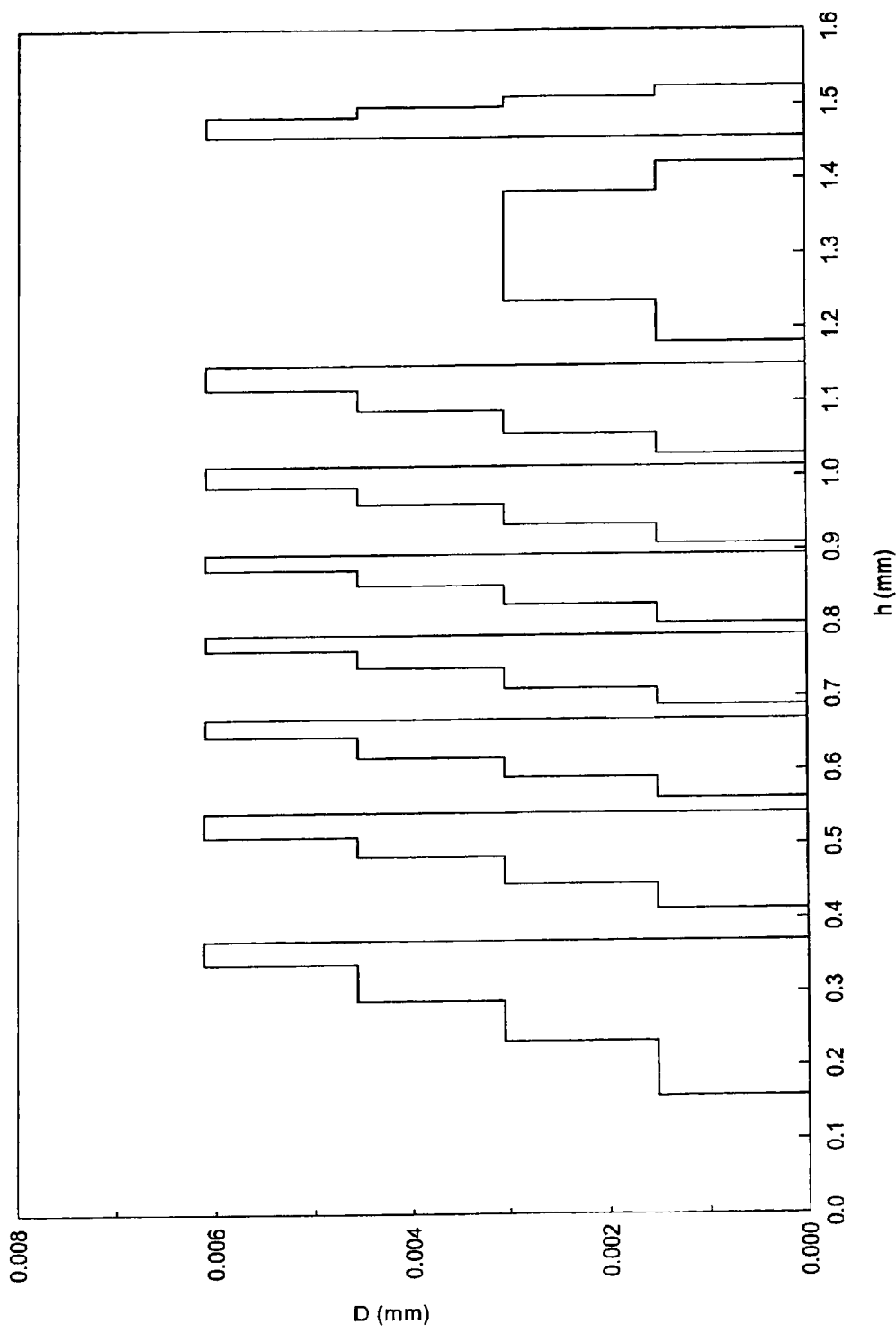
FIG. 17 is a sectional view showing a structure of a superposition type diffraction optical element.

Further, as in the invention of item 36, when the signs B2 and B4 are different from each other, the change amount of h per a unit change amount of the optical path function φb can be increased. This corresponds to that the minimum width of the ring-shaped zone of the superposition type diffractive structure is increased, and the increase of the transmission factor, and making the metallic mold processing easy can be attained. In order to further attain these effects, it is preferable that the magnitude of B2 and B4 is set so that the optical path difference function φb has the inflection point within the effective diameter. Herein, the difference of actual shape between a case where the optical path difference function φb has the inflection point within the effective diameter, and a case where it does not have the inflection point, will be described. In the shape in the case where the optical path difference function φb has the inflection point within the effective diameter, as shown in FIG. 17, the inclination direction of the ring-shaped zone is switched, forming the ring-shaped zone positioned at the inflection point (in FIG. 17, 8th ring-shaped zone from the inner side) as the boundary. In the shape in the case where the optical path difference function φb does not have the inflection point within the effective diameter, as shown in FIG. 16, the inclination direction of all the ring-shaped zone is the same.

As in the invention written in item 37, in the case where the objective optical system is structured by the aberration correcting element and the light converging element which is a plastic lens of one group one lens composition, when the paraxial power P1 of the aberration correcting element to the first wavelength λ1 is made positive, the structure by which the light flux of the first wavelength λ1 enters into the light converging element as the converging light flux, is preferable. Generally, NA∞ (hereinafter, called conversion NA) in which the numerical aperture NA of the light converging element of finite conjugate type (magnification m≠0) is converted into infinite conjugate type, can be expressed by NA∞=NA (1−m). Accordingly, in the light converging element on which the converging light flux enters (that is, m>0), because the conversion NA can be reduced, the spherical aberration change generated in the light converging element following the temperature change can be suppressed small.

Further, as in the invention of item 38, it is preferable that the paraxial power P1 of the aberration correcting element to the first wavelength λ1, and the paraxial power P2 of the light converging element to the first wavelength λ1 are set so that they satisfy the expression (21). In this manner, when the refractive power to the incident light flux is wholly given to the light converging element arranged on the optical disk side, the working distance to DVD can be sufficiently secured. Further, because, on the optical function surface, a structure having the stepped section in the optical axis direction such as the superposition type diffractive structure is formed, the track is blocked by the stepped section portion, and a ratio of the light flux which does not contribute the formation of the light converging spot can be suppressed, and the lowering of the transmission factor can be prevented.

The active effect of item 39 is the same as that of item 112 which will be described later.

The active effect of item 40 is the same as that of item 114 which will be described later.

The active effect of item 41 is the same as that of item 113 which will be described later.

The invention written in item 45 is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, the reproducing and/or recording of the information is conducted for the third optical information recording medium having the protective layer of thickness t3 (t3>t2) by using the light flux of the third wavelength λ3 projected from the third light source, and it is characterized in that: the optical element is structured by the aberration correcting element and the light converging element by which the light flux projected from the aberration correcting element is image-formed on respective information recording surfaces of the first optical information recording medium to the third optical information recording medium; and at least one optical function surface in the optical function surfaces of the aberration correcting element is divided into a plurality of ring-shaped zone optical function areas around the optical axis; and on at least one optical function area in a plurality of ring-shaped zone optical function areas, the superposition type diffractive structure which is a structure in which a plurality of ring-shaped zones in which a predetermined number of discontinuous stepped sections are formed, are continuously arranged around the optical axis, is formed.

According to the invention written in item 45, when the optical function surface of the aberration correcting element is divided into a plurality of optical function area around the optical axis, and the superposition type diffractive structure is formed in the specific optical function area, because only one of 3 wavelengths is selectively diffracted, and the other wavelengths are not diffracted and can be passed as they are, when the arrangement of each ring-shaped zone of the superposition type diffractive structure is adequately set, it is possible that, while the spherical aberration generated due to the difference of the protective layer among 3 kinds of optical disks of the high density optical disk, DVD, and CD, is corrected, the high transmission factor (diffraction efficiency) can be secured for all of 3 wavelengths. Further, when the diffraction order of 3 wavelengths is deferred, the degree of freedom of the of the optical design is spread, and a role of dichroic filter by which, for the specific wavelength, the diffraction efficiency is extremely reduced, specific wavelength is blocked, and the other wavelengths are transmitted, can be given to the specific wavelength. Further, when the refractive power to the incident light flux is wholly given to the light converging element arranged on the optical disk side, in 3 kinds of optical disks whose standard is different each other, the working distance to CDs whose protective layer thickness is largest, can be sufficiently secured.

Further, because a structure having the minute stepped section such as the superposition type diffractive structure is formed on the optical function surface of the aberration correcting element, its tack is blocked by the stepped section portion and the rate of the light flux which does not contribute to the formation of the light converging spot can be suppressed, and the lowering of the transmission factor can be prevented.

The invention written in item 46 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ1) projected from the third light source; and the optical element is structured by the aberration correcting element, and the light converging element by which the light flux projected from the aberration correcting element is image-formed on respective information recording surfaces of the first optical information recording medium to the third optical information recording medium, and in the optical function surfaces of the aberration correcting element, at least one optical function surface is divided into a plurality of ring-shaped zone-like optical function areas around the optical axis, and in the plurality of ring-shaped zone-like optical function areas, on the optical function area including the optical axis, the superposition type diffractive structure which is a structure in which a plurality of ring-shaped zones in which a predetermined number of discontinuous stepped sections are formed, are continuously arranged around the optical axis, is formed, and the first magnification m1 in the case where the reproducing and/or recording of the information is conducted for the first optical information recording medium, and the second magnification m2 in the case where the reproducing and/or recording of the information is conducted for the second optical information recording medium, are almost equal.

According to the invention of item 46, when the optical function surface of the aberration correcting element is divided into a plurality of optical function areas around the optical axis, and the superposition type diffractive structure is formed on the optical function area including the optical axis, because only one of 3 wavelengths is selectively diffracted, and the other wavelengths are not diffracted and can be passed as they are, in the case where the arrangement of each ring-shaped zone of the superposition type diffractive structure is adequately set, when the protective layer thickness of the high density optical disk is 0.6 mm which is same as DVD, while the magnification m1 for the high density optical disk, and the magnification m2 for DVD are almost the same, the spherical aberration generated due to the difference of the protective layer thickness between the high density optical disk and DVD can be corrected.

Hereby, a collimator lens for the high density optical disk and a collimator lens for DVD can be common with each other, and further, because a light source module in which the light source for the high density optical disk and the light source for DVD are packaged, can be used, the number of optical parts of the optical pickup device can be reduced.

As the stepped section amount Δ of the superposition type diffractive structure, and the number of stepped sections, it is preferable that it is made a combination as in tables 1-8 which will be described later.

Further, when the refractive power to the incident light flux is wholly given to the light conversing element arranged on the optical disk side, in 3 kids of optical disks whose standard is different, the working distance to CD whose protective layer thickness is maximum in 3 kinds of optical disks whose standard is different, can be assured enough.

Further, because a structure having minute stepped sections such as the superposition type diffractive structure is formed on the optical function surface of the aberration correcting element, its track is intercepted by the stepped section portion, and a rate of the light flux which does not contribute to the formation of the light converging spot, can be suppressed, and the lowering of the transmission factor can be prevented.

The invention written in item 47 is characterized in that: in the optical element for the optical pickup device written in item 46, the paraxial diffraction power of the superposition type diffractive structure to the second wavelength λ2 is negative.

According to the invention written in item 47, in the case where the protective layer thickness is thinner than DVD as in the optical disk whose protective layer thickness is 0.1 mm, when the magnification m1 to the high density optical disk and the magnification m2 to DVD are made the same, because the protective layer of the DVD is thick, the spherical aberration to DVD is changed to over correction direction.

In such a case, as in the invention of item 47, when the paraxial power to the second wavelength λ2 of the superposition type diffractive structure is made negative, and the light flux of the second wavelength λ2 is made incident on the light converging element as the diverging light, by the magnification change of the light converging element, the spherical aberration change to the over correction direction can be cancelled.

When such a structure is applied, because the generation of the coma by the optical axis dislocation of the aberration correcting element and the light converging lens to the second wavelength λ2 is reduced, a process by which the aberration correcting element and the light converging lens are integrated, becomes easy.

The invention written in item 48 is characterized in that: in the optical element for the optical pickup device written in item 47 or 47, the superposition type diffractive structure adds the under correction spherical aberration to the second wavelength λ2.

Alternatively, as in the invention written in item 48, when the spherical aberration in the under correction direction is added to the second wavelength λ2 by the superposition type diffractive structure, the spherical aberration change toward the over correction direction can be cancelled.

When such a structure is applied, because the coma generated when the slant light flux of the second wavelength λ2 enters, is reduced, as a result in which the allowance to the optical axis dislocation of the light source for DVD and the optical element is increased, the production cost of the optical pickup device is reduced.

Hereupon, the paraxial power of the superposition type diffractive structure to the second wavelength λ2 is made negative, and the spherical aberration in the under correction direction may also be made to be added to the second wavelength λ2 by the superposition type diffractive structure.

The invention written in item 49 is characterized in that: in the optical element for the optical pickup device written in any one of items 46 to 48, the first magnification m1 and the second magnification m2 satisfy the following expression (25).

$$m1=m2=0 \qquad (25)$$

As in the invention written in item 49, when the magnification m1 to the high density optical disk and the magnification m2 to DVD are made 0, even when the optical element is shifted to the track direction of the optical disk, because there is no change of the object point position, the good tracking characteristic can be obtained.

The invention written in item 50 is characterized in that: in the optical element for the optical pickup device written in any one of items 46 to 49, the third magnification m3 when the reproducing and/or recording of the information is conducted for the third optical information recording medium, satisfies the following expression (26).

$$-0.25 < m3 < -0.10 \quad (26)$$

As will be described later as an example in Tables 1-8, when the stepped section amount $\Delta$ and number of stepped sections N of the superposition type diffractive structure are adequately set in such a manner that only the second wavelength $\lambda 2$ is selectively diffracted, and other wavelengths are not diffracted, and passed as they are, by the action of the superposition type diffractive structure, the spherical aberration change in the over correction direction generated to CD whose protective layer thickness is maximum, can not be corrected. Accordingly, as in the invention of item 50, when the magnification m3 to CD is made within the range of expression (26), such aspherical aberration change can be corrected.

Further, when the diverging light flux is made incident on CD, even it is an optical element whose focal distance is small, because the working distance to CD can be secured enough, it is advantageous to the size reduction of the optical pickup device.

The invention written in item 51 is characterized in that: in the optical element for the optical pickup device written in any one of items 46 to 50, the first light source and the second light source are a packaged light source module, the optical element light-converges the light flux of the first wavelength $\lambda 1$ projected from the light source module on the information recording surface of the first optical information recording medium, and light-converges the light flux of the second wavelength $\lambda 2$ projected from the light source module on the information recording surface of the second optical information recording medium.

According to the invention written in item 51, because the magnification m1 to the high density optical disk and the magnification m2 to DVD are almost the same, the light source module into which the light source for the high density optical disk and the light source for DVD are packaged, can be used. Hereby, the number of optical parts of the optical pickup device can be reduced.

The invention written in item 52 is characterized in that: it is an optical element for the optical pickup device by which the reproducing and/or recording of the information is conducted for the first optical information recording medium having the protective layer of thickness t1 by using the light flux of the first wavelength $\lambda 1$ projected from the first light source, the reproducing and/or recording of the information is conducted for the second optical information recording medium having the protective layer of thickness t2 (t2 $\geq$ t1) by using the light flux of the second wavelength $\lambda 2$ ($\lambda 2 > \lambda 1$) projected from the second light source, and the reproducing and/or recording of the information is conducted for the third optical information recording medium having the protective layer of thickness t3 (t3>t2) by using the light flux of the third wavelength $\lambda 3$ ($\lambda 3 > \lambda 2$) projected from the third light source; the optical element is structured by the aberration correcting element, and the light converging element for a purpose by which the light flux projected from the aberration correcting element is image-formed on respective information recording surfaces of the first optical information recording medium to the third optical information recording medium; in the optical function surfaces of the aberration correcting element, at least one optical function surface is divided into a plurality of ring-shaped zone-like optical function areas around the optical axis; in the plurality of ring-shaped zone-like optical function areas, in the optical function area including the optical axis, the superposition type diffractive structure which is a structure in which a plurality of ring-shaped zones inside of which predetermined number of discontinuous stepped sections are formed, are continuously arranged around the optical axis, is formed; and the second magnification m2 when the reproducing and/or recording of the information is conducted for the second optical information recording medium, and the third magnification m3 when the reproducing and/or recording of the information is conducted for the third optical information recording medium, are almost coincident.

According to the invention written in item 52, when the optical function surface of the aberration correcting element is divided into a plurality of optical function areas around the optical axis, and when the superposition type diffractive structure is formed in the optical function area including the optical axis, because it becomes possible that only one of 3 wavelengths is selectively diffracted, and the other wavelengths are not diffracted, and passed as they are, when the arrangement of each ring-shaped zone of the superposition type diffractive structure is adequately set, while it is made as they are that the magnification m2 for DVD and the magnification m3 for CD are almost the same, the spherical aberration generated due to the difference of the protective layer thickness between DVD and CD, can be corrected.

Hereby, because the light source module into which the light source for DVD and light source for CD are packaged, can be used, the number of optical parts of the optical pickup device can be reduced.

As the stepped section amount $\Delta$ and the number of stepped sections of the superposition type diffractive structure, it is preferable that the combination as in the above-described Tables 1-8, is applied.

Further, when the refractive power to the incident light flux is wholly given to the light converging element arranged on the optical disk side, in three kinds of optical disks whose standard is different, the working distance to CD whose protective layer thickness is maximum, can be secured enough.

Further, because, on the optical function surface of the aberration correcting element, a structure having minute stepped sections such as the superposition type diffractive structure is formed, the track is intercepted by the stepped section portion, and the rate of the light flux which does not contribute to the formation of the light converging spot, can be suppressed, and the lowering of the transmission factor can be prevented.

The invention written in item 53 is characterized in that: in the optical element for the optical pickup device written in item 52, the paraxial diffraction power of the superposition type diffractive structure to the second wavelength $\lambda 2$ is positive.

When the magnification m2 to DVD and the magnification m3 to CD are the same, because the protective layer of DVD is thinner than that of CD, the spherical aberration to DVD is changed to the under correction direction.

In such a case, as in the invention of item 53, when the paraxial power of the superposition type diffractive structure to the second wavelength $\lambda 2$ is made positive, and the light flux of the second wavelength $\lambda 2$ is made incident on the light converging element as the converging light, by the magnification change of the light converging element, the spherical aberration change to the under correction direction can be cancelled.

When such a structure is applied, because the generation of the coma by the optical axis dislocation of the aberration correcting element and light converging lens to the second wavelength λ2 is reduced, a process by which the aberration correcting element and the light converging lens are integrated, becomes easy.

The invention written in item 54 is characterized in that: in the optical element for the optical pickup device written in item 52 or 53, the superposition type diffractive structure adds the spherical aberration of over correction to the second wavelength λ2.

Alternatively, as in the invention of item 54, when, by the superposition type diffractive structure, the spherical aberration toward the over correction direction is added to the second wavelength λ2, the spherical aberration change toward the under correction direction can be cancelled.

When such a structure is applied, because the coma generated when the slant light flux of the second wavelength λ2 enters, is reduced, as a result in which the allowance to the optical axis dislocation of the light source for DVD and the optical element is increased, the production cost of the optical pickup device is reduced.

Hereupon, the paraxial power of the superposition type diffractive structure to the second wavelength λ2 is made positive, and by the superposition type diffractive structure, the spherical aberration toward the over correction direction may also be added to the second wavelength λ2.

The invention written in item 55 is characterized in that: in the optical element for the optical pickup device written in any one of items 52 to 54, the first magnification m1 when the reproducing and/or recording of the information is conducted for the first optical information recording medium, satisfies the following expression (27).

$$m1=0 \qquad (27)$$

According to the invention written in item 55, for example, when the magnification m1 to the high density optical disk is made 0, even when the optical element is shifted toward the track distance of the optical disk, because there is not a change of the object point, the good tracking characteristic can be obtained.

The invention written in item 56 is characterized in that: in the optical element for the optical pickup device written in any one of items 52 to 55, the second magnification m2 and the third magnification m3 satisfy the following expressions (28) and (29).

$$m2=m3 \qquad (28)$$

$$-0.25<m2<-0.10 \qquad (29)$$

As will be described later as an example in Tables 1-8, when the stepped section amount Δ, and the number of stepped sections are adequately set in such a manner that only the second wavelength λ2 in 3 wavelengths is selectively diffracted, and the other wavelengths are not diffracted, and passed as they are, by the action of the superposition type diffractive structure, the spherical aberration change toward the over correction direction generated to CD whose protective layer is thickest, can not be corrected. Accordingly, as in the invention of item 56, when the magnification m3 to CD is made within the range of the expression (28), such aspherical aberration change can be corrected.

The invention written in item 57 is characterized in that: in the optical element for the optical pickup device written in any one of items 52 to 56, the second light source and the third light source are a packaged light source module, and the optical element light-converges the light flux of the second wavelength λ2 projected from the light source module on the information recording surface of the second optical information recording medium, and light-converges the light flux of the third wavelength λ3 projected from the light source module on the information recording surface of the third optical information recording medium.

According to the invention written in item 57, because the magnification m2 to DVD, and the magnification m3 to CD are made almost the same, the light source module into which the light source for DVD and the light source for CD are packaged, can be used. Hereby, the number of optical parts of the optical pickup device can be reduced.

The invention written in item 58 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in the optical function area including the optical axis in the plurality of ring-shaped zone-like optical function areas; and the first light flux λ1 and the minimum value P of the interval in the perpendicular direction to the optical axis between adjoining stepped sections in the discontinuous stepped sections formed in each ring-shaped zone in the superposition type diffractive structure, satisfy the following expressions (30) and (31).

$$0.39 \ \mu m<\lambda1<0.42 \ \mu m \qquad (30)$$

$$P>3 \ \mu m \qquad (31)$$

According to the invention written in item 58, when the optical function surface of the aberration correcting element is divided into a plurality of optical function areas around the optical axis, and the superposition type diffractive structure is formed in a specific optical function area, because it becomes possible that only one of 3 wavelengths is selectively diffracted, and the other wavelengths are not diffracted, and passed as they are, when the arrangement of each ring-shaped zone of the superposition type diffractive structure is adequately set, while the spherical aberration generated due to the difference of the protective layer thickness among 3 kinds of optical disks such as the high density optical disk, DVD, and CD is corrected, the high transmission factor (diffraction efficiency) to all of 3 wavelengths can be secured. Further, when the diffraction order of 3 wavelengths is made different, the degree of freedom of optical design is spread, and a role of the dichroic filter by which, to specific wavelength, the diffraction efficiency is extremely reduced, the specific wavelength is cut-off, and the other wavelengths are passed, can be charged on it.

Further, the superposition type diffractive structure of the present invention has a structure in which each ring-shaped zone is divided stepwise by a plurality of discontinuous stepped sections in the optical axis direction, however, when the interval between adjoining stepped sections, in the direction perpendicular to the optical axis, (width of each step structure), is too small, a problem that the metallic mold processing by SPDT is difficult, is actualized. Further, the lowering of the diffraction efficiency due to the shape error of the metallic mold is larger as the wavelength is shorter.

Accordingly, in the present invention, the minimum value P of the width of such a step structure is made not larger than 3 μm, the metallic mode processing by SPDT is made easy, and the diffraction efficiency lowering due to the shape error of the metallic mold is made not too large to the wavelength λ1 of the blue violet range.

Further, when the refractive power to the incident light flux is wholly given to the light converging element arranged on the optical disk side, the working distance to CD whose protective layer thickness is maximum in three kinds of optical disks whose standard is different, can be secured enough.

Further, because a structure having the minute stepped section such as the superposition type diffractive structure is formed on the optical function surface of the aberration correcting element, the track is cut off by the stepped section portion and a rate of light flux which does not contribute to the formation of light converging spot, can be suppressed, and the lowering of the transmission factor can be prevented.

The invention written in item 59 is characterized in that: in the optical element for the optical pickup device written in item 58, in the discontinuous stepped section formed in each ring-shaped zone in the superposition type diffractive structure, the minimum value P of the interval in the direction perpendicular to the optical axis between adjoining stepped sections satisfies the following expression (32).

$$P > 5 \text{ μm} \quad (32)$$

As in the invention written in item 59, in order to make the effect more effective, it is preferable that the minimum value P of the width of the step structure is made larger than 5 μm.

The invention written in item 60 is characterized in that: in the optical element for the optical pickup device written in item 58, in the discontinuous stepped section formed in each ring-shaped zone in the superposition type diffractive structure, the minimum value P of the interval in the direction perpendicular to the optical axis between adjoining stepped sections satisfies the following expression (33).

$$P > 10 \text{ μm} \quad (33)$$

As in the invention written in item 60, in order to make the effect more effective, it is preferable that the minimum value P of the width of the step structure is made larger than 10 μm.

The invention written in item 61 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in the optical function area including the optical axis in the plurality of ring-shaped zone-like optical function areas; and when the optical path difference added to the transmission wave-front by the superposition type diffractive structure is defined by the arith. 1, signs of B2 and B4 are different from each other.

According to the invention of item 61, when signs of B2 and B4 are made different from each other, the change amount of h per unit change amount of the optical path function φb can be made large. This corresponds to a case where the minimum width of the ring-shaped zone of the superposition type diffractive structure is increased, and the increase of the transmission factor and to make easy the metallic mold processing can be attained. In order to further attain these effects, it is preferable that magnitudes of B2 and B4 are set so that the optical path function φb has the inflection point.

The invention written in item 62 is characterized in that: in the optical element for the optical pickup device written in any one of items 58 to 61, the first magnification m1 in the case where the reproducing and/or recording of the information is conducted for the first optical information recording medium, the second magnification m2 in the case where the reproducing and/or recording of the information is conducted for the second optical information recording medium, and the third magnification m3 in the case where the reproducing and/or recording of the information is conducted for the third optical information recording medium, are different form each other.

When it is tried to largely secure the minimum value P of the width of the step structure, the aberration correction effect by the superposition type diffractive structure can not be obtained enough, and a problem that the spherical aberration generated due to the difference of the protective layer thickness among 3 kinds of optical disks such as the high density optical disk, DVD, and CD, can not be corrected, is actualized. Accordingly, as in the invention of item 62, it is preferable that the magnification m1 for the high density optical disk, the magnification m2 for DVD, and the magnification m3 for CD are made different from each other, and the spherical aberration remained without being corrected, is corrected.

The invention written in item 63 is characterized in that: in the optical element for the optical pickup device written in item 62, the first magnification m1, the second magnification m2 and the third magnification m3 satisfy the following expressions (34) to (36).

$$m1 = 0 \quad (34)$$

$$-0.08 < m2 < -0.01 \quad (35)$$

$$-0.25 < m3 < -0.10 \quad (36)$$

Specifically, as the magnification m1 to the high density optical disk, the magnification m2 to DVD, and the magnification m3 to CD, as in the invention of item 63, it is preferable that they are within the range of expressions (34)-(36).

The invention written in item 64 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in at least one optical function area in the plurality of ring-shaped zone-like optical function areas; and in the superposition type diffractive structure, either one of the number N of the discontinuous stepped sections formed in each ring-shaped zone, or the depth Δ (μm) in the optical axis direction of the discontinuous stepped section, is different for each optical function area.

According to the invention written in item 64, in the case where the optical function surface of the aberration correcting element is divided into a plurality of optical function areas around the optical axis, and the superposition type diffractive structures are formed in the plurality of optical function areas, and either one of the number of discontinuous stepped section formed in each ring-shaped zone, or the depth Δ (μm) in the optical axis direction of the discontinuous stepped section, is made different for each optical function area, when the diffraction order of 3 wavelengths is made different, a role of the dichroic filter by which the degree of freedom of the optical design is spread, or the diffraction efficiency is extremely reduced to the specific wavelength, and the specific wavelength is cut off and the other wavelengths are passed, can be charged on it.

Further, when the refractive power to the incident light flux is wholly given to the light converging element arranged on the optical disk side, the working distance to CD whose protective layer thickness is maximum in 3 kinds of optical disks whose standard is different, can be secured enough.

Further, because a structure having the minute stepped section such as the superposition type diffractive structure is formed on the optical function surface of the aberration correcting element, and the track is cut off by the stepped section portion, and a rate of the light flux which does not contribute to the formation of the light converging spot, can be suppressed, and the lowering of the transmission factor can be prevented.

The invention written in item 65 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in at least one optical function area in the plurality of ring-shaped zone-like optical function areas; and in optical function surfaces of the aberration correcting element, on at least one optical function surface, the diffractive structure formed of a plurality of ring-shaped zones divided by the stepped section around the optical axis, is formed.

The invention written in item 66 is characterized in that: in the optical element for the optical pickup device written in item 65, the depth of the stepped section of the diffractive structure is designed in such a manner that, to the diffraction order n1 of the diffracted light ray having the maximum diffraction efficiency in the diffracted light ray generated when the light flux of the first wavelength λ1 enters, the diffraction order n2 of the diffracted light ray having the maximum diffraction efficiency in the diffracted light ray generated when the light flux of the second wavelength λ2 enters, the diffraction order n3 of the diffracted light ray having the maximum diffraction efficiency in the diffracted light ray generated when the light flux of the third wavelength λ3 enters, are both lower degree.

The invention written in item 67 is characterized in that: in the optical element for the optical pickup device written in item 66, the first wavelength λ1 (μm), second wavelength λ2 (μm), third wavelength λ3 (μm), respectively satisfy the following expressions (37) to (39), and a combination of the diffraction order n1, the diffraction order n2, and the diffraction order n3, is any one of (n1, n2, n3)=(2, 1, 1), (4, 2, 2), (6, 4, 3), (8, 5, 4), (10, 6, 5).]

$$0.39 < \lambda 1 < 0.42 \quad (37)$$

$$0.63 < \lambda 2 < 0.68 \quad (38)$$

$$0.75 < \lambda 3 < 0.85 \quad (39)$$

The invention written in item 68 is characterized in that: in the optical element for the optical pickup device written in item 67 or 67, the aberration correcting element is formed of the material in which the refractive index at the first wavelength λ1 is within the range of 1.5-1.6, and Abbe's number in d-line is within the range of 50-60, and the depth d1 in the optical axis direction of the stepped section closest to the optical axis in the stepped sections of the diffractive structure, satisfies any one of the following expressions (40) to (44).

$$1.\ 2\ \mu m > d1 > 1.7\ \mu m \quad (40)$$

$$2.\ 6\ \mu m > d1 > 3.0\ \mu m \quad (41)$$

$$4.\ 4\ \mu m < d1 < 5.0\ \mu m \quad (42)$$

$$5.\ 6\ \mu m < d1 < 6.5\ \mu m \quad (43)$$

$$6.\ 9\ \mu m > d1 > 8.1\ \mu m \quad (44)$$

The invention written in item 69 is characterized in that: in the optical element for the optical pickup device written in any one of items 65 to 68, the diffractive structure has a function to suppress the focus position dislocation generated due to the chromatic aberration of the light converging element when the first wavelength λ1 is changed within the range of ±10 nm.

The invention written in item 70 is characterized in that: in the optical element for the optical pickup device written in item 69, the diffractive structure has a function to suppress the chromatic aberration on axis generated due to the chromatic aberration of the light converging element when the first wavelength λ1 is changed within the range of ±10

The invention written in item 71 is characterized in that: in the optical element for the optical pickup device written in item 69 or 70, the diffractive structure has a function to suppress the spherical aberration change generated due to the chromatic aberration of the light converging element when the first wavelength λ1 is changed within the range of ±10 nm.

The invention written in item 72 is characterized in that: in the optical element for the optical pickup device written in any one of items 65 to 71, the light converging element is formed of a plastic lens, and when the diffractive structure has the wavelength dependency in which the spherical aberration changes toward the under correction direction when the first wavelength λ1 changes to long wavelength side, and the spherical aberration changes toward the over correction direction when the first wavelength λ1 changes to short wavelength side, the diffractive structure has a function to suppress the spherical aberration change generated due to the refractive index change of the light converging element following the environmental temperature change.

The invention written in item 73 is characterized in that: in the optical element for the optical pickup device written in item 72, at least one optical function surface in the optical function surfaces of the aberration correcting element, is divided into a central optical function area including the optical axis, and a peripheral optical function area which surrounds the periphery of the central optical function area, and the diffractive structure is formed only in the peripheral optical function area.

The invention written in item 74 is characterized in that: in the optical element for the optical pickup device written in any one of items 65 to 73, the sectional shape of the diffractive structure including the optical axis is the stepped shape.

The invention written in item 75 is characterized in that: in the optical element for the optical pickup device written in any one of items 65 to 73, the sectional shape of the diffractive structure including the optical axis is the saw-toothed shape.

The invention written in item 76 is characterized in that: in the optical element for the optical pickup device written in any one of items 65 to 75, the superposition type diffractive structure is formed on one optical function surface of the aberration correcting element, and the diffractive structure is formed on the other optical function surface of the aberration correcting element.

According to the invention written in item 65, when the optical function surface of the aberration correcting element is divided into a plurality of optical function areas around the optical axis, and the superposition type diffractive structure is formed in the specific optical function area, because it becomes possible that only one of 3 wavelengths is selectively diffracted, and the other wavelengths are not diffracted and passed as they are, when the arrangement of each ring-shaped zone of the superposition type diffractive structure is adequately set, while the spherical aberration generated due to the difference of the protective layer thickness among 3 kinds of optical disks such as the high density optical disk, DVD, and CD, is corrected, the high transmission factor (diffraction efficiency) can be secured to all of 3 wavelengths. Further, when the diffraction order of 3 wavelengths is made different, a role of the dichroic filter by which the degree of freedom of the optical design is spread, the diffraction efficiency is extremely reduced to the specific wavelength, the specific wavelength is cut off, and the other wavelengths are passed, can be charged on it.

Further, in order to enable to adequately conduct the recording/reproducing of the information for the high density optical disk, it is necessary that, when a means for correcting the chromatic aberration is provided, the deterioration of the light converging performance by the instantaneous wavelength change of the laser light source, which is called mode-hopping, is prevented. This is for the reason that, because the wavelength dispersion of the lens material becomes very large in the blue violet region, the focus position dislocation is largely generated also to a slight wavelength change.

Further, as a standard of the high density optical disk, an optical disk in which NA of the objective lens is increased to about 0.85, is proposed, however, because NA of the optical element is more increased, the larger the spherical aberration change generated by the wavelength change of the incident light flux is, a problem that the laser light source having the wavelength error by the production error can not be used, is actualized. Therefore, because it is necessary that the laser light source is selected, the production cost of the optical pickup device is increased.

Hereupon, because the specific gravity of the plastic lens is smaller than the glass lens, the load onto the actuator for driving the objective optical system can be reduced, and the follow-up of the objective optical system can be conducted at high speed. Further, in the plastic lens produced by the injection molding, when a desired metallic mold is accurately produced, the mass-production can be high-accurately conducted with the stable quality. However, in the case where NA of the objective optical system is increased, when such an objective optical system is made plastic lens, the influence of the refractive index change following the temperature change becomes large. This is for the reason that the spherical aberration generated by the refractive index change is increased in proportion to the fourth power of NA.

Accordingly, in the present invention, when the diffractive structure is provided on the optical function surface of the aberration correcting element, because the focus position dislocation to the wavelength change of the incident light flux generated in the light converging element, the spherical aberration change to the wavelength change of the incident light flux, or the spherical aberration change following the refractive index change are suppressed, even when the wavelength change of the incident light flux or the temperature change occurs, the recording/reproducing characteristic to the high density optical disk can be maintained good.

Further, when the refractive power to the incident light flux is wholly given to the light converging element arranged on optical disk side, the working distance to CD whose protective layer thickness is maximum in 3 kinds of optical disks whose standard is different, can be secured enough.

Further, because, on the optical function surface of the aberration correcting element, a structure having the minute stepped sections such as the superposition type diffractive structure or the diffractive structure, is formed, the track is cut off by the stepped section portion, and a rate of the light flux which does not contribute to the formation of the light converging spot, can be suppressed, and the lowering of the transmission factor can be prevented.

However, because, in the light source for the high density optical disk, and the light source for DVD or CD, the wavelength difference is large, when the same degree diffracted light ray generated in the diffractive structure is used as the light flux for recording/reproducing to respective optical disks, the enough diffraction efficiency can not be obtained to 3 wavelengths. For such a problem, as in the invention of item 66, when the diffractive structure is designed in such a manner that the diffraction order n2 of the diffracted light ray used for DVD, and the diffraction order n3 of the diffracted light ray used for CD, are lower degree than the diffraction order n1 of the diffracted light ray used for the high density optical disk, the diffraction efficiency to 3 wavelengths can be secured enough.

Specifically, when a combination as in the invention of item 67 is applied, as the diffraction orders n1, n2, n3, it is preferable because the high diffraction efficiency can be secured to all wavelengths of the wavelength $\lambda 1$-$\lambda 3$.

When the aberration correcting element is formed of the material in which the refractive index to the wavelength $\lambda 1$ is within the range of 1.5-1.6, and Abbe's number in d-line is within the range of 50-60, as in the invention of item 68, when the depth d1 of the stepped section positioned at the position closest to the optical axis in the stepped sections of the diffractive structure is set so that it satisfies any one of expressions (40)-(44), the high diffraction efficiency can be secured to all of wavelengths $\lambda 1$-$\lambda 3$. Hereupon, the combination of the diffraction orders n1, n2, n3 and the stepped section d1 have a relationship in which (n1, n2, n3)=(2, 1, 1) corresponds to the expression (40), (n1, n2, n3)=(4, 2, 2) corresponds to the expression (41), (n1, n2, n3)=(6, 4, 3) corresponds to the expression (42), (n1, n2, n3)=(8, 5, 4) corresponds to the expression (43), and (n1, n2, n3)=(10, 6, 5) corresponds to the expression (44).

Generally, in the optical pickup device, a case where the information is recorded to the optical disk, requires larger laser power than a case where the information is reproduced. Therefore, when the information is switched from the reproducing to recording, there is a case where the wavelength change is caused following the laser power change (mode hopping). By such a mode hopping, because the focus position dislocation is generated in the objective optical system, the defocus condition is continued until the focus servo, corresponds. In the invention of item 69, because it is structured so that the focus position dislocation in the blue violet region of the light converging element is suppressed by the diffractive structure of the aberration correcting element, even when the blue violet laser light source causes the mode hopping, the good light converging performance can be maintained.

In order to suppress the focus position dislocation in the blue violet region of the light converging element, specifically, as in the invention of item 70, it is preferable that the light converging element is structured so that, when the paraxial power of the diffractive structure is made positive, the chromatic aberration on axis is suppressed.

Further, in order to suppress the spherical aberration change generated in the light converging element by the wavelength change of the incident light flux, which is actualized when NA of the optical element is increased, specifically, as in the invention of item 72, it is preferable that, when the wavelength dependency in which, when the wavelength of the incident light flux is increased, the spherical aberration changes toward the under correction direction, and when the wavelength of the incident light flux is reduced, the spherical aberration changes toward the over correction direction, is given to the diffractive structure, the spherical aberration generated in the light converging element is suppressed.

Further, in order to suppress the spherical aberration change generated in the light converging element which is a plastic lens, by the refractive index change, actualized when NA of the optical element is increased, it is preferable that, the wavelength dependency of the spherical aberration in which, when the wavelength of the incident light flux is increased, the spherical aberration changes toward the under correction direction, and when the wavelength of the incident light flux is reduced, the spherical aberration changes toward the over correction direction, is given to the diffractive structure. In the light converging element which is a plastic lens, because when the temperature rises, the refractive index is lowered, the spherical aberration changes toward the over correction direction, and when the temperature falls, because the refractive index is increased, the spherical aberration changes toward the under correction direction. On the one hand, the laser light source has a characteristic in which, when the temperature rises, the wavelength is increased, and when the temperature falls, the wavelength is reduced. When this characteristic is used, when the wavelength dependency of the above-described spherical aberration is spherical aberration change generated in the light converging element given to the diffractive structure, the can be cancelled. Hereupon, in order to effectively suppress the spherical aberration change generated in the light converging element, it is preferable that the diffractive structure is formed on the aspherical surface.

The diffractive structure to suppress the spherical aberration change generated in the light converging element is used to form the spot on the information recording surfaces of 3 optical disks. When it is formed in common optical function area of the light fluxes of 3 wavelengths, it is necessary to form the diffractive structure as in the invention of items 66 to 68. In such a case, it is impossible in the principle that the diffraction efficiency is made 100% to all of 3 wavelengths. Accordingly, as in the invention of item 73, it is preferable that the optical function surface of the aberration correcting element is divided into the central optical function area including the optical axis, and the peripheral optical function area which surrounds the periphery of this central optical function area, and only in the peripheral optical function area, the diffractive structure is formed. For example, in the case where this peripheral optical function area is the optical function area (for example, NA 0.60-NA 0.85) corresponding to NA from NA of DVD to NA of the high density optical disk, when the optimizing wavelength of the diffractive structure is made coincident to the wavelength $\lambda 1$, the diffraction efficiency to the wavelength $\lambda 1$ can be made 100%, and further, the transmission factor to the wavelength $\lambda 2$ and wavelength $\lambda 3$ in the central optical function area which is made the continuous aspherical surface on which the diffractive structure is not formed, can be made high. Because the spherical aberration is increased in proportion to 4th power of NA, even though the diffractive structure is not formed in the central optical function area whose NA is small, the spherical aberration can be effectively corrected by the diffractive structure of the peripheral optical function area.

As a specific shape of such a diffractive structure, as in the invention written in item 74, a shape in which the sectional shape including the optical axis is stepped shape, is listed.

Further, as a specific shape of such a diffractive structure, as in the invention written in item 75, the sectional shape including the optical axis may also be the saw-toothed shape.

In order to make the processing of the metallic mold of the aberration correcting element easy, as in the invention of item 76, it is preferable that the superposition type diffractive structure and the diffractive structure are respectively formed on another optical function surface.

The invention written in item 77 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in at least one optical function area in the plurality of ring-shaped zone-like optical function areas; and in optical function surfaces of the aberration correcting element, on at least one optical function surface, the optical path difference grant structure structured by a plurality of ring-shaped zones divided by the stepped section, in the central area including the optical axis, and outside the central area, is formed.

According to the invention written in item 77, when the optical function surface of the aberration correcting element is divided into a plurality of optical function areas around the optical axis, and the superposition type diffractive structure is formed on the specific optical function area, because it becomes possible that only one of 3 wavelengths is selectively diffracted, and the other wavelengths are not diffracted and passed as they are, when the arrangement of each ring-shaped zone of the superposition type diffractive structure is adequately set, while the spherical aberration generated due to the difference of the protective layer thickness among 3 kinds of optical disks such as the high density optical disk, DVD, and CD, is corrected, the high transmission factor (diffraction efficiency) to all of 3 wavelengths can be secured. Further, when the diffraction order of 3 wavelengths is made different, a role of the dichroic filter by which the degree of freedom of the optical design is spread, the diffraction efficiency is extremely reduced to the specific wavelength, the specific wavelength is cut off, and the other wavelengths are passed, can be charged on it.

Further, in the present invention, when the optical path difference grant structure is provided on the optical function surface of the aberration correcting element, because the focus position dislocation to the wavelength change of the incident light flux generated in the light converging element, the spherical aberration change to the wavelength change of the incident light flux, or the spherical aberration change following the refractive index change is suppressed, even when the wavelength change of the incident light flux or temperature change is caused, the recording/reproducing characteristic to the high density optical disk can be maintained good.

Further, when the stepped section amount between adjoining ring-shaped zones of the optical path difference grant structure is adequately set, in the same manner as the above-described superposition type diffractive structure, because a function by which the spherical aberration generated due to the difference of the protective layer thickness among a plurality of kinds of optical disks whose protective layer thickness is different, is suppressed, is given, the degree of freedom of the design of optical disk of the present invention can be increased.

Further, when the refractive power to the incident light flux is wholly given to the light converging element arranged on the optical disk side, the working distance to CD whose protective layer thickness is maximum in 3 kinds of optical disks whose standard is different, can be secured enough.

Further, because a structure having the minute stepped section such as the superposition type diffractive structure or optical path difference grant structure is formed on the optical function surface of the aberration correcting element, the track is cut off by the stepped section portion, and a rate of the light flux which does not contribute to the formation of the light converging spot, can be suppressed, and the lowering of the transmission factor can be prevented.

The invention written in item 78 is characterized in that: in the optical element for the optical pickup device written in item 77, both of the light converging element and the aberration correcting element are plastic lenses, and when the optical path difference grant structure has the temperature dependency of the spherical aberration in which, when the environmental temperature rises, the spherical aberration to be added to the first wavelength λ1 changes toward the under correction direction, and when the environmental temperature falls, the spherical aberration to be added to the first wavelength λ1 changes toward the over correction direction, it has a function by which the spherical aberration change generated by the refractive index change of the light converging element following the environmental temperature change is suppressed.

The invention written in item 79 is characterized in that: in the optical element for the optical pickup device written in item 78, in the optical path difference grant structure, the ring-shaped zone adjoining the outside of the central area is formed by shifting to the optical axis direction so that the optical path length is reduced to the central area, and the ring-shaped zone at the maximum effective diameter position is formed by shifting to the optical axis direction so that the optical path length is increased to the ring-shaped zone adjoining its inside, and the ring-shaped zone at the position of 75% of the maximum effective diameter is formed by shifting to the optical axis direction so that the optical path length is reduced to the ring-shaped zone adjoining its inside and the ring-shaped zone adjoining its outside.

The invention written in item 80 is characterized in that: in the optical element for the optical pickup device written in any one of items 77 to 79, by the first wavelength λ1 (μm), the second wavelength λ2 (λm), the third wavelength λ3 (μm), the depth d2 (μm) in the optical axis direction of the stepped section closest to the optical axis in stepped sections of the optical path difference grant structure, the refractive index Nλ1 to the first wavelength λ1 of the aberration correcting element, the refractive index Nλ2 to the second wavelength λ2 of the aberration correcting element, and the refractive index Nλ3 to the third wavelength λ3 of the aberration correcting element, Φ1, Φ2, Φ3 respectively expressed by the following expressions (45) to (47) satisfy the following expressions (48) to (51).

$$\Phi1 = d2(N\lambda1-1)/\lambda1 \quad (45)$$

$$\Phi2 = d2(N\lambda2-1)/\lambda2 \quad (46)$$

$$\Phi3 = d2(N\lambda3-1)/\lambda3 \quad (47)$$

$$INT(\Phi1) \leq 10 \quad (48)$$

$$0 \leq |INT(\Phi1) - \Phi1| \leq 0.4 \quad (49)$$

$$0 \leq |INT(\Phi2) - \Phi2| \leq 0.4 \quad (50)$$

$$0 \leq |INT(\Phi3) - \Phi3| \leq 0.4 \quad (51)$$

Where, INT(Φi) (i=1, 2, 3) is an integer obtained by half-adjusting Φi.

The invention written in item 78 is characterized in that: in the optical element for the optical pickup device written in any one of items 77 to 80, the superposition type diffractive structure is formed on one optical function surface of the aberration correcting element, and the optical path difference grant structure is formed on the other optical function surface of the aberration correcting element.

According to the invention written in item 78, in order to suppress the spherical aberration change generated by the refractive index change of the light converging element which is a plastic lens, when the aberration correcting element is made a plastic lens, and the optical path difference grant structure having the refractive index dependency of the spherical aberration by which, when the refractive index is reduced, the spherical aberration changes to the under correction direction, and when the refractive index is increased, the spherical aberration changes to the over correction direction, is formed, the spherical aberration change generated in the light converging element following the temperature change can be cancelled. Hereby, even when NA of the optical element is increased, an optical element in which a change of recording/reproducing characteristic to the high density optical disk following the temperature change is small, can be provided.

Further, as in the present invention, when the spherical aberration change following the temperature change is suppressed by the optical path difference, grant structure, because the refractive index change of the aberration correcting element is used, different from the case where the spherical aberration change of the light converging element is suppressed by using the wavelength dependency of the diffractive structure, even when the wavelength change of the laser light source is not caused, the suppression effect of the spherical aberration is actuated.

The specific structure of such a optical path difference grant structure is, as in the invention written in item 79, a structure in which the ring-shaped zone adjoining the outside of the central area is formed by shifting to the optical axis direction so that the optical path length is reduced to the central area, and the ring-shaped zone at the maximum effective diameter position is formed by shifting to the optical axis direction so that the optical path length is increased to the ring-shaped zone adjoining its inside, and the ring-shaped zone at the position of 75% of the maximum effective diameter is formed by shifting to the optical axis direction so that the optical path length is reduced to the ring-shaped zone adjoining its inside and the ring-shaped zone adjoining its outside. When such a structure is applied, the refractive index dependency of the spherical aberration by which, when the refractive index is lowered, the spherical aberration changes toward the under correction direction, and when the refractive index is increased, the spherical aberration changes toward the over correction direction, can be given to the optical path difference grant structure.

When the above-described optical path difference grant structure is formed in the common optical function area of the light flux of 3 wavelengths used for forming the spot on the information recording surfaces of 3 optical disks, as in the invention of item 80, it is preferable that the depth d2 of the stepped section at the position closest to the optical axis, and the optical path differences Φ1-Φ3 added to each of wavelengths λ1-λ3 by the stepped section are set so that they satisfy expressions (45)-(51).

When these expression are not satisfied, because the wavelength difference is large between the light source for the high density optical disk and the light source for DVD or CD, the high degree of the spherical aberration is generated to any one of wavelengths. Although it is said that the high degree of spherical aberration does not influence on the recording/reproducing performance, it is practically equivalent to the lowering of the transmission factor. When these expressions are satisfied, the generation of high degree of spherical aberration can be suppressed, and the transmission factor can be increased.

In order to make the processing of the metallic mold of the aberration correcting element easy, as in the invention of item 81, it is preferable that the superposition type diffractive structure and the optical path difference grant structure are respectively formed on another optical function surface.

The invention written in item 82 is characterized in that: it is an optical element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; and the optical element is structured by the aberration correcting element and the light converging element by which the light flux projected from the aberration correcting element is image-formed on respective information recording surfaces of the first optical information recording medium to third optical information recording medium; the light converging element is a plastic lens of 1-group 1-lens composition; at least one optical function surface in optical function surfaces of the aberration correcting element is divided into a plurality of ring-shaped zone-like optical function areas around the optical axis; the superposition type diffractive structure which is a structure in which a plurality of ring-shaped zones inside of which a predetermined number of discontinuous stepped sections are formed, are continuously arranged around the optical axis, is formed in at least one optical function area in the plurality of ring-shaped zone-like optical function areas; and the paraxial power P1 (mm$^{-1}$) of the aberration correcting element to the first wavelength λ1 satisfies the following expression (52).

$$P1>0 \tag{52}$$

The invention written in item 83 is characterized in that: in the optical element for the optical pickup device written in item 82, the aberration correcting element is a plastic lens, and the paraxial refractive power PR (mm$^{-1}$) of the aberration correcting element satisfies the following expression (53).

$$PR>0 \tag{53}$$

The invention written in item 84 is characterized in that: in the optical element for the optical pickup device written in any one of items 45 to 83, the optical function area in which the superposition type diffractive structure is formed, is the optical function area including the optical axis.

The invention written in item 85 is characterized in that: in the optical element for the optical pickup device written in item 84, in the first wavelength λ1 (μm), second wavelength λ2 (μm), third wavelength λ3 (μm), the superposition type diffractive structure formed in the optical function area including the optical axis, by the number N of discontinuous stepped sections formed in each ring-shaped zone, the depth Δ (μm) in the optical axis direction of the discontinuous stepped section, the refractive index Nλ1 to the first wavelength λ1 of the aberration correcting element, refractive index Nλ2 to the second wavelength λ2 of the aberration correcting element, and refractive index Nλ3 to the third wavelength λ3 of the aberration correcting element, φ1, φ2, φ3 respectively expressed by the following expressions (54) to (56) satisfy the following expressions (57) to (59).

$$\phi1=\Delta(N\lambda1-1)(N+1)/\lambda1 \tag{54}$$

$$\phi2=\Delta(N\lambda2-1)(N+1)/\lambda2 \tag{55}$$

$$\phi3=\Delta(N\lambda3-1)(N+1)/\lambda3 \tag{54}$$

$$0\leq|INT(\phi1)-\phi1|\leq0.4 \tag{57}$$

$$0\leq|INT(\phi2)-\phi2|\leq0.4 \tag{58}$$

$$0\leq|INT(\phi3)-\phi3|\leq0.4 \tag{59}$$

Where, INT(φi) (i=1, 2, 3) is an integer obtained by half-adjusting φi.

The invention written in item 86 is characterized in that: in the optical element for the optical pickup device written in item 85, φ1 and the number N of discontinuous stepped sections formed in each ring-shaped zone satisfy the following expressions (60) and (61).

$$\phi1\leq24 \tag{60}$$

$$3\leq N\leq11 \tag{61}$$

The invention written in item 87 is characterized in that: in the optical element for the optical pickup device written in any one of items 84 to 86, the superposition type diffractive structure formed in the optical function area including the optical axis, gives an equivalent first optical action to the light flux of the first wavelength λ1 and the light flux of the third wavelength λ3, and to the light flux of the second wavelength λ2, the second optical action which is different from the first optical action, is given.

The invention written in item 88 is characterized in that: in the optical element for the optical pickup device written in item 87, the first optical action is 0-degree diffraction which does not practically give the optical path difference in between adjoining ring-shaped zones to the light flux of the first wavelength λ1 and the light flux of the third wavelength λ3, and the second optical action is the first degree diffraction by which the light flux of the second wavelength λ2 is diffracted to the first degree direction.

The invention written in item 89 is characterized in that: in the optical element for the optical pickup device written in item 88, the aberration correcting element is formed of the material in which the refractive index in the first wavelength λ1 is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (62) to (64), and in the superposition type diffractive structure formed in the optical function area including the optical axis, a combination of the number N of discontinuous stepped sections formed in each ring-shaped zone, and the depth D (μm) in the optical axis direction of the ring-shaped zone, is respectively any one of the following expressions (65)-(68).

$$0.39<\lambda1<0.42 \tag{62}$$

$$0.63<\lambda2<0.68 \tag{63}$$

$$0.75<\lambda3<0.85 \tag{64}$$

$$\text{When } N=3, 4.1\leq D\leq4.8 \tag{65}$$

$$\text{When } N=4, 5.4\leq D\leq6.4 \tag{66}$$

$$\text{When } N=5, 7.0\leq D\leq7.9 \tag{67}$$

$$\text{When } N=6, 8.45\leq D\leq9.0 \tag{68}$$

The invention written in item 90 is characterized in that: in the optical element for the optical pickup device written in item 87, the first optical action is 0-degree diffraction by which the optical path difference is not practically given in between adjoining ring-shaped zones to the light flux of the first wavelength λ1 and the light flux of the third wavelength λ3, and the second optical action is the second-degree diffraction by which the light flux of the second wavelength λ2 is diffracted in the second-degree direction.

The invention written in item 91 is characterized in that: in the optical element for the optical pickup device written in item 90, the aberration correcting element is formed of the material in which the refractive index in the first wavelength λ1 is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (69) to (71), and in the superposition type diffractive structure formed in the optical function area including the optical axis, the number N of discontinuous stepped sections formed in each ring-shaped zone, and the depth D (μm) in the optical axis direction of the ring-shaped zone, are respectively any one of the following expressions (72)-(75).

$$0.39<\lambda1<0.42 \tag{69}$$

$$0.63<\lambda2<0.68 \tag{70}$$

$$0.75<\lambda3<0.85 \tag{71}$$

When $N=8, 11.3 \leq D \leq 12.7$ (72)

When $N=9, 12.8 \leq D \leq 14.1$ (73)

When $N=10, 14.2 \leq D \leq 15.6$ (74)

When $N=11, 15.7 \leq D \leq 17.2$ (75)

The invention written in item 92 is characterized in that: in the optical element for the optical pickup device written in any one of items 84 to 91, the superposition type diffractive structures are formed in all of the plurality of optical function areas.

The invention written in item 93 is characterized in that: in the optical element for the optical pickup device written in any one of items 45 to 91, the superposition type diffractive structure is not formed in at least one optical function area of the plurality of optical function areas.

The invention written in item 94 is characterized in that: in the optical element for the optical pickup device written in any one of items 45 to 93, the superposition type diffractive structures are formed on a plurality of optical function surfaces of the aberration correcting element.

The invention written in item 95 is characterized in that: in the optical element for the optical pickup device written in any one of items 45 to 94, the thickness t1 of the protective layer of the first optical information recording medium, and the thickness t2 of the protective layer of the second optical information recording medium, satisfy the following expression (76).

$$0.8 \leq t1/t2 \leq 1.2$$ (76)

The invention written in item 96 is characterized in that: in the optical element for the optical pickup device written in item 95, the plurality of optical function areas are 2 optical function areas, the light fluxes which enters into the optical function area including the optical axis, in 2 optical function areas, of the first wavelength λ1 to the third wavelength λ3, respectively form good wave-fronts on the information recording surfaces of the first information recording medium to the third information recording medium, and the light fluxes of the first wavelength λ1 and the second wavelength λ2 which are incident on the optical function area not including the optical axis in 2 optical function areas, respectively form good wave-fronts on the information recording surfaces of the first optical information recording medium and the second optical information recording medium.

The invention written in item 97 is characterized in that: in the optical element for the optical pickup device written in item 96, in 2 optical function areas, in the optical function area not including the optical axis, the superposition type diffractive structure is formed, and the diffraction efficiency η3 of the diffracted light ray having the maximum diffraction efficiency in the diffracted light ray generated when the light flux of the third wavelength λ3 enters into the superposition type diffractive structure, is not larger than 40%.

The invention written in item 98 is characterized in that: in the optical element for the optical pickup device written in item 96 or 97, in 2 optical function areas, when the superposition type diffractive structure is formed in the optical function area not including the optical axis, and the superposition type diffractive structure gives an equivalent optical action to the light flux of the first wavelength λ1 and the light flux of the second wavelength λ2, and gives the optical action different from the above-described optical action to the light flux of the third wavelength λ3, the light flux of the third wavelength λ3 transmitted the superposition type diffractive structure is made a flare component which does not contribute to the spot formation onto the information recording surface of the third optical information recording medium. Here, The expression "a flare component which does not contribute to the spot formation onto an information recording surface" means to make a light flux to be in a situation that the light flux has an aberration of 0.1 λrms or more on a prescribed information recording surface.

The invention written in item 99 is characterized in that: in the optical element for the optical pickup device written in item 95, the plurality of optical function areas are 3 optical function areas, and in 3 optical function areas, the light flux of the first wavelength λ1 to the light flux of the third wavelength λ3 which are incident on the optical function area including the optical axis respectively form good wave-fronts on the information recording surfaces of the first optical information recording medium to the third optical information recording medium, and in 3 optical function areas, the light flux of the first wavelength λ1 and the light flux of the second wavelength λ2 which are incident on the optical function area adjoining the outside of the optical function area including the optical axis, respectively form good wave-fronts on the information recording surfaces of the first optical information recording medium and the second optical information recording medium, and in 3 optical function areas, the light flux of the first wavelength λ1 which enters into the most outside optical function area, forms a good wave-front on the information recording surface of the first optical information recording medium.

The invention written in item 100 is characterized in that: in the optical element for the optical pickup device written in item 99, in the optical function area adjoining the outside of the optical function area including the optical axis in 3 optical function areas, the superposition type diffractive structure is formed, and the diffraction efficiency η3 of the diffracted light ray having the maximum diffraction efficiency in the diffracted light ray generated when the light flux of the third wavelength λ3 enters into the superposition type diffractive structure is not larger than 40%.

The invention written in item 101 is characterized in that: in the optical element for the optical pickup device written in item 99 or 100, in the optical function area adjoining the outside of the optical function area including the optical axis in 3 optical function areas, the superposition type diffractive structure is formed, and when the superposition type diffractive structure gives the equivalent optical action to the light flux of the first wavelength λ1 and the light flux of the second wavelength λ2, and gives the optical action different from the above-described optical action to the light flux of the third wavelength λ3, the light flux of the wavelength λ3 transmitted the superposition type diffractive structure is made a flare component which does not contribute to the spot formation onto the information recording surface of the third optical information recording medium.

The invention written in item 102 is characterized in that: in the optical element for the optical pickup device written in any one of item 99 to 101, in the most outside optical function area in 3 optical function areas, the superposition type diffractive structure is formed, and the diffraction efficiency η2 of the diffracted light ray having the maximum diffraction efficiency in the diffracted light ray generated when the light flux of the second wavelength λ2 enters into the superposition type diffractive structure is not larger than 40%, and the diffraction efficiency η3 of the diffracted light ray having the maximum diffraction efficiency in the diffracted light ray generated when the light flux of the third wavelength λ3 enters into the superposition type diffractive structure is not larger than 40%.

The invention written in item 103 is characterized in that: in the optical element for the optical pickup device written in any one of item 99 to 102, in the most outside optical function area in 3 optical function areas, the superposition type diffractive structure is formed, and when the superposition type diffractive structure gives the optical action different from the optical action given to the light flux of the first wavelength λ1 to the light flux of the second wavelength λ2 and the light flux of the third wavelength λ3, the light fluxes of the second wavelength λ2 and the third wavelength λ3, which transmitted the superposition type diffractive structure, are respectively made flare components which does not contribute to the spot formation onto the information recording surfaces of the second optical information recording medium and the third optical information recording medium.

The invention written in item 104 is characterized in that: in the optical element for the optical pickup device written in any one of items 45 to 94, the thickness t1 of the protective layer of the first optical information recording medium and the thickness t2 of the protective layer of the second optical information recording medium satisfy the following expression (77).

$$t1/t2 \leq 0.4 \tag{77}$$

The invention written in item 105 is characterized in that: in the optical element for the optical pickup device written in item 104, the plurality of optical function areas are 3 optical function areas, and the light flux of the first wavelength λ1 to the light flux of the third wavelength λ3 which are incident on the optical function area including the optical axis, in 3 optical function areas, respectively form good wave-fronts on the information recording surfaces of the first optical information recording medium to the third optical information recording medium, and in 3 optical function areas, the light flux of the first wavelength λ1 and the light flux of the second wavelength λ2 which are incident on the optical function area adjoining the outside of the optical function area including the optical axis, respectively form good wave-front on the information recording surfaces of the first optical information recording medium and the second optical information recording medium, and the light flux of the first wavelength λ1 incident on the most outside optical function area in 3 optical function areas, forms a good wave-front on the information recording surface of the first optical information recording medium.

The invention written in item 106 is characterized in that: in the optical element for the optical pickup device written in item 105, the superposition type diffractive structure is formed in the optical function area adjoining the outside of the optical function area including the optical axis, and the diffraction efficiency η3 of the diffracted light ray having the maximum diffraction efficiency in the diffracted light ray generated when the light flux of the third wavelength λ3 enters into the superposition type diffractive structure, is not larger than 40%.

The invention written in item 107 is characterized in that: in the optical element for the optical pickup device written in item 105 or 106, the superposition type diffractive structure is formed in the optical function area adjoining the outside of the optical function area including the optical axis in 3 optical function areas, and when the superposition type diffractive structure gives the equivalent optical action to the light flux of the first wavelength λ1 and the light flux of the second wavelength λ2, and gives the optical action different from the above-described optical action to the light flux of the third wavelength λ3, the light flux of the third wavelength λ3 transmitted the superposition type diffractive structure is made a flare component which does not contribute to the spot formation onto the information recording surface of the third optical information recording medium.

The invention written in item 107 is characterized in that: in the optical element for the optical pickup device written in any one of items 105 to 107, the superposition type diffractive structure is formed in the most outside optical function area in 3 optical function areas, and the diffraction efficiency η2 of the diffracted light ray having the maximum diffraction efficiency in the diffracted light ray generated when the light flux of the second wavelength λ2 enters into the superposition type diffractive structure, is not larger than 40%, and the diffraction efficiency η3 of the diffracted light ray having the maximum diffraction efficiency in the diffracted light ray generated when the light flux of the third wavelength λ3 enters into the superposition type diffractive structure, is not larger than 40%.

The invention written in item 109 is characterized in that: in the optical element for the optical pickup device written in any one of items 105 to 108, in the most outside optical function area in 3 optical function areas, the superposition type diffractive structure is formed, and when the superposition type diffractive structure gives the optical action different from the optical action given to the light flux of the first wavelength λ1 to the light flux of the second wavelength λ2 and the light flux of the third wavelength λ3, the light fluxes of the second wavelength λ2 and the third wavelength λ3, which transmitted the superposition type diffractive structure, are respectively made flare components which do not contribute to the spot formation onto the information recording surfaces of the second optical information recording medium and the third optical information recording medium.

The invention written in item 110 is characterized in that: in the optical element for the optical pickup device written in any one of items 45 to 109, the paraxial power P1 (mm$^{-1}$) of the aberration correcting element to the first wavelength λ1 and the paraxial power P2 (mm$^{-1}$) of the light converging element to the first wavelength λ1 satisfy the following expression (78).

$$|P1/P2| \leq 0.2 \tag{78}$$

The invention written in item 111 is characterized in that: in the optical element for the optical pickup device written in any one of items 45 to 110, the aberration correcting element is a plastic lens.

The invention written in item 112 is characterized in that: in the optical element for the optical pickup device written in any one of items 45 to 111, the light converging element is a plastic lens.

The invention written in item 113 is characterized in that: in the optical element for the optical pickup device written in any one of items 45 to 111, the light converging element is a glass lens.

The invention written in item 114 is characterized in that: in the optical element for the optical pickup device written in any one of items 45 to 111, the light converging element is molded by using the material in which particles whose diameter is not larger than 30 nm are dispersed in the plastic material.

The invention written in item 115 is characterized in that: in the optical element for the optical pickup device written in any one of items 45 to 114, the light converging element is corrected so that the aberration is not larger than Mareshal limit to the first wavelength λ1 and the thickness t1 of the protective layer of the first optical information recording medium.

According to the invention written in item 82, when the optical function surface of the aberration correcting element is divided into a plurality of optical function areas around the optical axis, and the superposition type diffractive structure is formed in a specific optical function area, because it becomes possible that only one of 3 wavelengths is selectively diffracted, and the other wavelengths are not diffracted and passed as they are, when the arrangement of each ring-shaped zone of the superposition type diffractive structure is adequately set, while the spherical aberration generated due to the difference of the protective layer thickness among 3 kinds of optical disks such as the high density optical disk, DVD, and CD is corrected, the high transmission factor (diffraction efficiency) can be secured to all of 3 wavelengths. Further, when the diffraction order of 3 wavelengths is made different, the degree of freedom of the optical design is spread, and a role of dichroic filter by which the diffraction efficiency is extremely reduced to a specific wavelength, the specific wavelength is cut off, and the other wavelengths are passed, can be charged on it. Because the specific gravity of the plastic lens is smaller than the glass lens, a load on the actuator to drive the objective optical system can be lightened, and the follow of the objective optical system can be conducted at high speed. Further, the plastic lens produced by the injection molding can be mass-produced with a stable quality at the high accuracy when a desired metallic mold is accurately made. However, in the case where NA of the objective optical system is increased, when such an objective optical system is a plastic lens, the influence of the refractive index change following the temperature change becomes large. This is for the reason that the spherical aberration generated by the refractive index change is increased in proportion to the fourth power of NA.

Accordingly, in the present invention, when the paraxial power P1 of the aberration correcting element to the wavelength $\lambda 1$ is made positive, the light flux of the wavelength $\lambda 1$ is made incident on the light converging element as the converging light flux. Generally, $NA\infty$ (hereinafter, called converted NA) which is converted into the infinite light flux incidence for the light converging element of the finite conjugate type (magnification m≠0) of the numerical aperture NA, can be expressed by $NA\infty = NA(1-m)$. Accordingly, in the light converging element on which the converging light flux enters, and whose magnification m>0, because the converted NA can be reduced, the spherical aberration change generated in the light converging element following the temperature change can be suppressed small.

Further, when the refractive power to the incident light flux is wholly given to the light converging element arranged on the optical disk side, the working distance to CD whose protective layer thickness is maximum in 3 kinds of optical disks whose standard is different, can be secured enough.

Further, because a structure having the minute stepped section such as the superposition type diffractive structure or optical path difference grant structure is formed on the optical function surface of the aberration correcting element, the track is cut off by the stepped section portion, and a rate of the light flux which does not contribute to the formation of the light converging spot, can be suppressed, and the lowering of the transmission factor can be prevented.

In order to more effectively suppress the spherical aberration generated in the light converging element following the temperature change small, as in the invention written in item 83, it is preferable that the aberration correcting element is made a plastic lens, and the paraxial refractive power PR of the aberration correcting element to the wavelength $\lambda 1$ is made positive. Because, in the plastic lens, when the temperature rises, the refractive index is lowered, when the aberration correcting element is a positive lens, the degree of convergence of the incident light flux on the light converging element becomes small. Because this is equivalent to the case where the magnification m of the light converging element is reduced, by this magnification change, the spherical aberration changes toward the under correction direction. On the one hand, in the light converging element, when the temperature rises, because the spherical aberration changes toward the over correction direction, it can cancel with the spherical aberration change by the magnification change.

According to the invention of item 84, when the superposition type diffractive structure is formed in a optical function area including the optical axis, because it becomes possible that only one of 3 wavelengths is selectively diffracted, and the other wavelengths are not diffracted and passed as they are, when the arrangement of each ring-shaped zone of the superposition type diffractive structure is adequately set, the spherical aberration generated due to the difference of the protective layer thickness between the high density optical disk and DVD, or the spherical aberration generated due to the difference of the protective layer thickness between DVD and CD, can be corrected.

Hereupon, as the stepped section amount $\Delta$ of the superposition type diffractive structure, and the number of stepped sections, combinations in tables 1-8, which will be described later, are preferable.

When the superposition type diffractive structure is formed in a common optical function area of the light fluxes of 3 wavelengths used for forming the spot on the information recording surfaces of 3 optical disks, as in the invention of item 85, it is preferable that the depth $\Delta$ of the stepped section, and optical path difference addition amounts $\phi 1 \text{-} \phi 3$ to each wavelength of the wavelengths $\lambda 1 \text{-} \lambda 3$ for one pitch structured by N stepped sections are set so as to satisfy the expressions (54)-(59). Hereby, the high transmission factor (diffraction efficiency) can be secured to all of 3 wavelengths.

Further, when $\phi 1$ becomes too large, because the depth of one stepped section is increased, as a result, the depth $\Delta(N+1)$ for one pitch is increased, further, when the stepped section N becomes too many, the width of the stepped section for one pitch becomes small. Hereby, problems that the processing of the metallic mold is difficult, and variation of the transmission factor (diffraction efficiency) to the minute wavelength change of the incident light flux becomes large, are actualized. In order to prevent the actualization of these problems, as in the invention of item 86, it is preferable that the optical path difference addition amount $\phi 1$ for one pitch to the wavelength $\lambda 1$, and the number N of the stepped sections formed in each ring-shaped zone are made so as to satisfy the expressions (60), (61).

In order to effectively correct the spherical aberration generated due to the difference of the protective layer thickness of the high density optical disk and DVD, or the spherical aberration generated due to the protective layer thickness of DVD and CD by the superposition type diffractive structure, as in the invention of item 87, it is preferable that, by the superposition type diffractive structure, the depth $\Delta$ of the stepped section of the superposition type diffractive structure, and the optical difference addition amounts $\phi 1 \text{-} \phi 3$ to each wavelength of the wavelengths $\lambda 1 \text{-} \lambda 3$ for one pitch structured by N stepped sections are determined so that the equivalent optical action is given to the wavelength $\lambda 1$ and the wavelength $\lambda 3$, and to the wavelength $\lambda 2$, the optical action different from this, is given.

Hereby, it becomes possible that, while the magnification m1 to the high density optical disk and the magnification m2 to DVD are made almost the same, the spherical aberration generated due to the difference of the protective layer thickness between the high density optical disk and DVD is corrected, or while the magnification m2 to DVD and the magnification m3 to CD are made almost the same, the spherical aberration generated due to the difference of the protective layer thickness between DVD and CD is corrected.

Specifically, as in the invention written in item 88, a structure by which, when, to wavelength $\lambda 1$ and wavelength $\lambda 3$, practically the optical path difference is not given between adjoining ring-shaped zones (0-degree diffraction), and to the wavelength $\lambda 2$, the optical path difference is given between adjoining ring-shaped zones, 1-degree diffracted light ray is generated, is preferable.

More specifically, as in the invention written in item 89, it is preferable that, when the aberration correcting element is formed of the material in which the refractive index to the wavelength $\lambda 1$ is within the range of 1.5-1.6, and Abbe's number on d-line is within the range of 50-60, it is preferable that the number N of the stepped sections formed in each ring-shaped zone, and the depth $D=\Delta(n+1)$ for one pitch structured by N stepped sections are set so as to satisfy any one of the expressions (65)-(68).

Hereupon, expressions (65)-(68) which are preferable combinations of the number N of the stepped sections formed in each ring-shaped zone and the depth D for one pitch structured by N-stepped sections, have a relationship in which the Table 1, which will be described later, corresponds to the expression (65), Table 2 corresponds to expression (66), Table 3 corresponds to expression (67), and Table 4 corresponds to expression (68).

Hereby, to the wavelength $\lambda 1$ and the wavelength $\lambda 3$, 0-degree diffracted light ray which does not practically give the optical path difference between adjoining ring-shaped zones, and to the wavelength $\lambda 2$, 1-degree diffracted light ray can be generated when it gives the optical path difference between adjoining ring-shaped zones, and the high transmission factor (diffraction efficiency) can be secured to all of wavelengths $\lambda 1$-$\lambda 3$.

Further, the superposition type diffractive structure may also be made, as in the invention of item 90, a structure in which, to the wavelength $\lambda 1$ and the wavelength $\lambda 3$, when it is made practically not to give the optical path difference between adjoining ring-shaped zones (0-degree diffractive structure), and to the wavelength $\lambda 2$, it gives the optical path difference between adjoining ring-shaped zones, 2nd-degree diffracted light ray is generated.

In this case, as in the invention of item 91, it is preferable that the number N of the stepped sections formed in each ring-shaped zone, and the depth $D=\Delta(N+1)$ for one pitch structured by N stepped sections, are set so as to satisfy any one of expressions (72)-(75).

Hereby, to the wavelength $\lambda 1$ and wavelength $\lambda 3$, 0-degree diffracted light ray which practically does not give the optical path difference between adjoining ring-shaped zones, and when, to the wavelength $\lambda 2$, the optical path difference is given between adjoining ring-shaped zones, 2nd-degree diffracted light ray can be generated, and the high transmission factor (diffraction efficiency) can be secured to all of the wavelengths $\lambda 1$-$\lambda 3$. Hereupon, Table 5, which will be described later, corresponds to the expression (72), Table 6 corresponds to the expression (73), Table 7 corresponds to the expression (74), and Table 8 corresponds to the expression (75).

Further, as in the invention of item 92, the superposition type diffractive structure may be formed in not only the optical function area including the optical axis, but in all of optical function areas.

Alternatively, as in the invention of item 93, corresponding to the function given to the superposition type diffractive structure, the superposition type diffractive structure is formed only in necessary optical function area, and there may also be the optical function area in which the superposition type diffractive structure is not formed.

Further, as in the invention of item 94, the superposition type diffractive structure may also be formed in a plurality of optical function areas of the aberration correcting element, and in this case, because the width of each stepped section formed in each ring-shaped zone can be widened, the metallic mold processing by SPDT becomes easy, further, there is an advantage in which, to the wavelength $\lambda 1$ of the blue violet range, the lowering of the diffraction efficiency by the shape error of the metallic mold is not too large.

As in the invention of item 95, the optical element having the superposition type diffractive structure of the present invention can be applied also to the optical pickup device by which the recording/reproducing of the information is conducted by the objective optical system of NA 0.65, and which has the interchangeability with the high density optical disk, DVD and CD of a standard in which the protective layer thickness is about 0.6 mm.

In such a case, as in the invention of item 96, when the effective diameter of the aberration correcting element to the wavelength $\lambda 1$ and the effective diameter to the wavelength $\lambda 2$ are the same, it is preferable that the optical function surface of the aberration correcting element is divided into 2 optical function areas of the optical function area including the optical axis corresponding to that within the effective diameter to the wavelength $\lambda 3$, and the optical function area surrounding its periphery.

Then, as in the invention of item 97, it is preferable that the superposition type diffractive structure is formed in the optical function area corresponding to that from the effective diameter to the wavelength $\lambda 3$ to the effective diameter to the wavelengths $\lambda 1$ and $\lambda 2$, and the number N of the stepped sections formed in each ring-shaped zone of this superposition type diffractive structure, and the depth D for one pitch structured by N stepped sections are adequately set, and a role of a dichroic filter by which the light fluxes of the wavelength $\lambda 1$ and the wavelength $\lambda 2$ are transmitted with the high transmission factor (diffraction efficiency), and the diffraction efficiency to the light flux of the wavelength $\lambda 3$ is extremely reduced, is given to it.

Hereby, because the aperture limit to CD is automatically conducted, the simple structured optical element for which the aperture limit element of another member is not necessary, can be provided.

As an example of such a superposition type diffractive structure, a structure in Tables 11-13, which will be described later, can be listed.

When, in this manner, to the superposition type diffractive structure formed in the optical function area corresponding to that from the effective diameter to the wavelength $\lambda 3$ to the effective diameter to the wavelengths $\lambda 1$ and $\lambda 2$, the aperture limit function is given, as in the invention of item 98, it is preferable that a structure by which the equivalent optical action is given to the light fluxes of the wavelength $\lambda 1$ and the wavelength $\lambda 2$, and to the wavelength $\lambda 3$, the optical action different from this is given, is applied, and the light flux of the wavelength $\lambda 3$ transmitted the superposition type diffractive structure is made a flare component which does not contribute to the spot formation onto the information recording surface of CD.

A specific example of such a superposition type diffractive structure is a structure in Table 11 by which, to the light fluxes of wavelengths λ1 and λ2, the optical path difference is not practically given, and only the light flux of the wavelength λ3 is diffracted toward ±2nd-degree direction.

On the one hand, when the effective diameter to the wavelength λ1 of the aberration correcting element, and the effective diameter to the wavelength λ2 are different, as in the invention of item 99, it is preferable that the optical function surface of the aberration correcting element is divided into 3 optical function areas of the optical function area including the optical axis corresponding to that within the effective diameter to the wavelength λ3, and the optical function area corresponding to the effective diameter from the effective diameter to the wavelength λ3 surrounding its periphery to the effective diameter to the wavelength λ2, and further, the optical function area corresponding to that from the effective diameter to the wavelength λ2 surrounding its periphery to the effective diameter to the wavelength λ1.

Then, as in the invention of item 100, in the optical function area corresponding to that from the effective diameter to the wavelength λ3 to the effective diameter to the wavelength λ2, the superposition type diffractive structure is formed, and the number N of the stepped sections formed in each ring-shaped zone of this superposition type diffractive structure, and the depth D for one pitch structured by N-stepped sections are adequately set, and the light fluxes of the wavelength λ1 and the wavelength λ2 are transmitted with the high transmission factor (diffraction efficiency), and the diffraction efficiency to the light flux of the wavelength λ3 is extremely reduced, and it is preferable that a role of dichroic filter is given to it.

Hereby, because the aperture limit to CD is automatically conducted, a simple-structured optical element for which the aperture limit element of another member is not necessary, can be provided.

As an example of such a superposition type diffractive structure, a structure as in Tables 11-13, which will be described later, is listed.

As described above, when the aperture limit function is given to the superposition type diffractive structure formed in the optical function area corresponding to the effective diameter from the effective diameter to the wavelength λ3 to the effective diameter to the wavelength λ2, as in the invention of item 101, it is preferable that a structure is applied in which the equivalent optical action is given to the light fluxes of the wavelength λ1 and the wavelength λ2, and to the light flux of the wavelength λ3, the optical action different from this, is given, and the light flux of the wavelength λ3 transmitted the superposition type diffractive structure is made a flare component which does not contribute to the spot formation onto the information recording surface of CD.

A specific example of such a superposition type diffractive structure is a structure in Table 11 by which the optical path difference is not practically given to light fluxes of wavelengths λ1 and λ2, and only the light flux of the wavelength λ3 is diffracted toward ±2nd-degree direction.

Further, as in the invention of item 102, the superposition type diffractive structure is formed in the optical function area corresponding to that from the effective diameter to the wavelength λ2 to the effective diameter to the wavelength λ1, and the number N of the stepped sections formed in each ring-shaped zone of this superposition type diffractive structure, and the depth D for one pitch structured by N-stepped sections are adequately set, and the light flux of the wavelength λ1 is transmitted with the high transmission factor (diffraction efficiency), and the diffraction efficiency to the light fluxes of the wavelengths λ2 and λ3 is extremely reduced, and it is preferable that a role of dichroic filter is given to it.

Hereby, because the aperture limit to CD and DVD is automatically conducted, a simple-structured optical element for which the aperture limit element of another member is not necessary, can be provided.

As described above, when the aperture limit function is given to the superposition type diffractive structure formed in the optical function area corresponding to that from the effective diameter to the wavelength λ2 to the effective diameter to the wavelength λ1, as in the invention of item 103, a structure is applied in which the optical action different from the light flux of the wavelength λ1 is given to the light fluxes of the wavelength λ2 and the wavelength λ3, and it is preferable that the light fluxes of the wavelengths λ2 and λ3 transmitted the superposition type diffractive structure are made the flare component which does not contribute to the spot formation onto the information recording surfaces of DVD and CD.

A specific example of such a superposition type diffractive structure is a structure in Table 14 by which the optical path difference is not practically given to light flux of wavelength λ1, and the light flux of the wavelength λ2 is diffracted toward −2nd-degree direction, and the light flux of the wavelength λ3 is diffracted toward ±3rd-degree direction.

Hereupon, in the inventions from the item 99 to 103, a case where the effective diameter to the wavelength λ1 is larger than the effective diameter to the wavelength λ2, is taken as an example and the effect is described, however, also to a case where the effective diameter to the wavelength λ2 is larger than the effective diameter to the wavelength λ1, the same effect can be given.

As in the invention of item 104, the optical element having the superposition type diffractive structure of the present invention can be applied also to the optical pickup device having the interchangeability to the high density optical disk (for example, blue ray disk) of the standard in which the recording/reproducing of the information is conducted by the objective optical system of NA 0.85, and the thickness of the protective layer is about 0.1 mm, and DVD and CD.

In such a case, as in the invention of item 105, it is preferable that the optical function surface of the aberration correcting element is divided into 3 optical function areas of the optical function area including the optical axis corresponding to that within the effective diameter to the wavelength λ3, optical function area corresponding to the effective diameter from the effective diameter to the wavelength λ3 surrounding its periphery to the effective diameter to the wavelength λ2, and further, the optical function area corresponding to the effective diameter from the effective diameter to the wavelength λ2 surrounding its periphery to the effective diameter to the wavelength λ1.

Then, as in the invention of item 106, it is preferable that, in the optical function area corresponding to the effective diameter from the effective diameter to the wavelength λ3 to the effective diameter to the wavelength λ2, the superposition type diffractive structure is formed, and the number N of stepped sections formed in each ring-shaped zone of this superposition type diffractive structure, and the depth D for one pitch structured by N stepped sections are adequately set, and the light fluxes of the wavelength λ1 and the wavelength λ2 are transmitted with the high transmission factor (diffraction efficiency), the diffraction efficiency to the light flux of the wavelength λ3 is extremely reduced, and a role of the dichroic filter is given to it.

Hereby, because the aperture limit to CD is automatically conducted, a simple-structured optical element for which the aperture limit element of another member is not necessary, can be provided.

As an example of such a superposition type diffractive structure, a structure as in Tables 11-13, which will be described later, is listed.

As described above, when the aperture limit function is given to the superposition type diffractive structure formed in the optical function area corresponding to the effective diameter from the effective diameter to the wavelength $\lambda 3$ to the effective diameter to the wavelength $\lambda 2$, as in the invention of item 107, it is preferable that a structure is applied in which the equivalent optical action is given to the light fluxes of the wavelength $\lambda 1$ and the wavelength $\lambda 2$, and to the light flux of the wavelength $\lambda 3$, the optical action different from this, is given, and the light flux of the wavelength $\lambda 3$ transmitted the superposition type diffractive structure is made a flare component which does not contribute to the spot formation onto the information recording surface of CD.

A specific example of such a superposition type diffractive structure is a structure in Table 11 by which the optical path difference is not practically given to light fluxes of wavelengths $\lambda 1$ and $\lambda 2$, and only the light flux of the wavelength $\lambda 3$ is diffracted toward ±2nd-degree direction.

Further, as in the invention of item 108, it is preferable that, in the optical function area corresponding to the effective diameter from the effective diameter to the wavelength $\lambda 2$ to the effective diameter to the wavelength $\lambda 1$, the superposition type diffractive structure is formed, and the number N of stepped sections formed in each ring-shaped zone of this superposition type diffractive structure, and the depth D for one pitch structured by N stepped sections are adequately set, and the light flux of the wavelength $\lambda 1$ is transmitted with the high transmission factor (diffraction efficiency), the diffraction efficiency to light fluxes of the wavelengths $\lambda 2$ and $\lambda 3$ is extremely reduced, and a role of the dichroic filter is given to it.

Hereby, because the aperture limit to CD and DVD is automatically conducted, a simple-structured optical element for which the aperture limit element of another member is not necessary, can be provided.

As described above, when the aperture limit function is given to the superposition type diffractive structure formed in the optical function area corresponding to the effective diameter from the effective diameter to the wavelength $\lambda 2$ to the effective diameter to the wavelength $\lambda 1$, as in the invention of item 109, it is preferable that a structure is applied in which the optical action different from the light flux of the wavelength $\lambda 1$ is given to the light fluxes of the wavelength $\lambda 2$ and the wavelength $\lambda 3$, and the light fluxes of the wavelengths $\lambda 2$ and $\lambda 3$ transmitted the superposition type diffractive structure are made a flare component which does not contribute to the spot formation onto the information recording surfaces of DVD and CD.

A specific example of such a superposition type diffractive structure is a structure in Table 14 by which the optical path difference is not practically given to light fluxes of wavelengths $\lambda 1$, the light flux of the wavelength $\lambda 2$ is diffracted toward the −2nd-degree direction, and the light flux of the wavelength $\lambda 3$ is diffracted toward ±3rd-degree direction.

Further, as in the invention of item 110, it is preferable that the paraxial power P1 of the aberration correcting element to the wavelength $\lambda 1$ and the paraxial power P2 of the light converging element are set so as to satisfy the expression (78).

Hereby, because the refractive power to the incident light flux can be wholly given to the light converging element arranged on optical disk side, the working distance to CD whose protective layer thickness is the maximum in 3 kinds of optical disks whose standard is different, can be secured enough.

Further, by the stepped section portion of the superposition type diffractive structure, diffractive structure, or optical path difference grant structure, the track is cut off, and a rate of the light flux which does not contribute to the formation of light converging spot, can be suppressed, and the lowering of the transmission factor can be prevented.

As in the invention of item 111, when the aberration correcting element is a plastic lens, it is preferable because the transfer property when the minute structure such as the superposition type diffractive structure, diffractive structure, or optical path difference grant structure, is molded, can be increased.

As in the invention of item 112, when the light converging element is made a plastic lens, the mass-production can be high accurately conducted with the stable quality. Hereupon, when the light converging optical element having the large light converging power is made a plastic lens, although the influence of the refractive index change following the temperature change becomes large, when the aberration correcting element used in combination with this is made a structure as in items 64, 76, 81, the spherical aberration by the refractive index change can be effectively suppressed.

On the one hand, as in the invention of item 113, when the light converging optical element is made a glass lens, it can be made a light converging element having the high reliability for the light resistance to the light in the blue violet region, temperature resistance, and transmission factor.

When, as a glass lens, the glass material whose glass transition point Tg is not larger than 400° C., is used, because the molding at a comparatively low temperature, becomes possible, the life of the metallic mold can be prolonged. Hereby, the production cost of the light converging element can be lowered.

As such a glass material whose transition point Tg is low, for example, there is K-PG325 or K-PG375 (both are trade names) of (Co.) Sumita Glass.

Further, as a material of the light converging element, as in the invention of item 114, a material for which, in the plastic material, particles whose diameter is not larger than 30 nm, are dispersed, may also be used.

When, in a plastic material in which, when the temperature rises, the refractive index is reduced, the inorganic material in which, when the temperature rises, the refractive index is increased, is homogeneously mixed, the temperature dependency of the refractive index of both, can be cancelled. Hereby, while the molding property of the plastic material is maintained, the optical material in which the refractive index change following the temperature change is small, (hereinafter, such an optical material is called "a-thermal resin"), can be used.

Herein, the temperature change of the refractive index of the light converging element will be described. The changing rate of the refractive index to the temperature change is, according to the formula of Lorentz-Lorenz, when the refractive index n is differentiated by the temperature t, expressed by A shown by the following Arith. 2.

$$A = \frac{(n^2+2)(n^2-1)}{6n}\left\{(-3\alpha) + \frac{1}{[R]}\frac{\delta[R]}{\delta t}\right\}$$ (Arith. 2)

Where, n is the refractive index of the light converging lens to the wavelength of the laser light source, α is a line expansion coefficient, and [R] is a molecular refractive power of the light converging element.

In the case of a general plastic material, because the contribution of the term 2 is smaller than that of the term 1, the term 2 can be almost neglected. For example, in the case of acrylic resin (PMMA), linear expansion coefficient α is $7 \times 10^{-5}$, and when it is substituted into the above-expression, $A = -12 \times 10^{-5}$, and generally it is equal to the measured value.

Herein, in the light converging element in the present invention, when the inorganic material is dispersed into minute particle plastic material whose diameter is not larger than 30 nm, the contribution of the term 2 is practically increased, and is made to cancel out with the change by the linear expansion of the term 1.

Specifically, it is preferable that the refractive index changing rate to the temperature change, which is, conventionally, about $-12 \times 10^{-5}$, is suppressed to fewer than $10 \times 10^{-5}$ in the absolute value. More preferably, it is preferable to suppress it fewer than 8×10-5, further preferably, fewer than 6×10-5, for the reduction of the spherical aberration change following the temperature change of the light converging element.

For example, when the minute particles of niobium oxide ($Nb_2O_5$) are dispersed in acrylic resin (PMMA), such a dependency of the refractive index change to the temperature change can be dissolved.

The plastic material which is a base material, is 8.0 in a volume ratio, and niobium oxide is a rate of about 2.0, and these are uniformly mixed. Although there is a problem that the minute particles are easily coagulated, a technology by which the electric charge is given onto the particle surface, and particles are dispersed, is also well known, and necessary dispersion condition can be generated.

Hereupon, this volume ratio can be appropriately increased or decreased to control the rate of the change of the refractive index to the temperature change, and a plurality of kinds of nano-size inorganic particle are blended, and can be dispersed.

Although, in the volume ratio, in above example, it is 80:20, it can be appropriately adjusted within the range from 90:10- to 60:40. When the volume ratio is smaller than 90:10, the effect of the refractive index change suppression is reduced, inversely, when it exceeds 60:40, it is not preferable because a problem is generated in the molding property of α-thermal resin.

It is preferable that a particle is an inorganic substance, and further, it is preferable that it is an oxide. Then, it is preferable that the oxide condition is saturated, and it is an oxide which is not more oxidized.

A fact that it is an oxide, is preferable for suppressing low the reaction to the plastic material which is a high polymer organic compound, and further, by a fact that it is an oxide, the transmission factor deterioration or wave-front aberration deterioration following the irradiation of a long period of time of the blue violet laser can be prevented. Particularly, under the severe condition that the blue violet laser is irradiated under the high temperature, the oxidation is easily accelerated, however, when it is such an inorganic oxide, the transmission factor deterioration or wave-front aberration deterioration by the oxidation can be prevented.

Hereupon, when the diameter of the particle dispersed in the plastic material is large, the scattering of the incident light flux is easily generated, and the transmission factor of the light converging element is lowered. In the high density optical disk, in the blue violet laser used for the recording/reproducing of the information, because the laser power by which a stable laser oscillation can be obtained for a long period of time, is about 30 mW, when the transmission factor of the optical element to the blue violet laser is low, it is disadvantageous in the point of view of the speeding up of the recording of the information, and multi-layer disk correspondence. Accordingly, it is preferable for preventing the lowering of the transmission factor of the light converging element that the diameter of the particle dispersed in the plastic material is preferably not larger than 20 nm, more preferably, not larger than 10-15 nm.

Generally, in the optical element, the shorter the wavelength is, and the larger NA is, its production is more difficult. Accordingly, as in the invention of item 115, it is preferable that the aberration correction of the light converging element is made to be optimized to the wavelength λ1 of the high density optical disk and the thickness t1 of the protective layer, and when it is combined with the aberration correcting element, the performance as the optical element for the high density optical disk can be easily exerted.

The invention written in item 116 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording-medium having the protective layer of thickness t3 (t3>t2) by using the light flux of the third wavelength λ3 (λ3>λ2) projected from the third light source; and the optical pickup device has an objective optical system for respectively light-converging the light fluxes of the first wavelength λ1 to third wavelength λ3 onto recording surfaces of the first optical information recording medium to the third optical information recording medium; and as the objective optical system, the optical element written in any one of items 45 to 115 is used.

The invention written in item 117 is characterized in that: the optical pickup device written in item 116 is mounted, and at least one of the recording of the information for the first optical information recording medium to the third optical information recording medium, and the reproducing of the information for the first optical information recording medium to the third optical information recording medium, can be conducted.

The invention written in item 118 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; and in the optical function surfaces of the aberration correcting element, at least one optical function surface is divided into a plurality of ring-shaped zone-like optical function areas around the optical axis; and in at least one optical function area in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed.

The invention written in item 119 is characterized in that: in the aberration correcting element for the optical pickup device written in item 118, the optical function area in which the superposition type diffractive structure is formed, is an optical function area including the optical axis, and the paraxial diffraction power of the superposition type diffractive structure to the second wavelength λ2 is negative.

The invention written in item 120 is characterized in that: in the aberration correcting element for the optical pickup device written in item 118 or 119, the optical function area in which the superposition type diffractive structure is formed, is an optical function area including the optical axis, and the superposition type diffractive structure adds the under-correction spherical aberration to the second wavelength λ2.

The invention written in item 121 is characterized in that: in the aberration correcting element for the optical pickup device written in item 118, the optical function area in which the superposition type diffractive structure is formed, is an optical function area including the optical axis, and the paraxial diffraction power of the superposition type diffractive structure to the second wavelength λ2 is positive.

The invention written in item 122 is characterized in that: in the aberration correcting element for the optical pickup device written in item 118 or 121, the optical function area in which the superposition type diffractive structure is formed, is an optical function area including the optical axis, and the superposition type diffractive structure adds the over-correction spherical aberration to the second wavelength λ2.

The invention written in item 123 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; in the optical function surfaces of the aberration correcting element, at least one optical function surface is divided into a plurality of ring-shaped zone-like optical function areas around the optical axis; in the optical function area including the optical axis in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed; and the first light flux λ1, and in the superposition type diffractive structure, in the discontinuous stepped sections formed in each ring-shaped zone, the minimum value P of the interval in the perpendicular direction to the optical axis between adjoining stepped sections satisfy the following expressions (79) and (80).

$$0.39\ \mu m < \lambda 1 < 0.42\ \mu m \tag{79}$$

$$P > 3\ \mu m \tag{80}$$

The invention written in item 124 is characterized in that: in the aberration correcting element for the optical pickup device written in item 123, in the superposition type diffractive structure, the minimum value P of the interval in the direction perpendicular to the optical axis between adjoining stepped sections in the discontinuous stepped section formed in each ring-shaped zone, satisfies the following expression (81).

$$P > 5\ \mu m \tag{81}$$

The invention written in item 125 is characterized in that: in the aberration correcting element for the optical pickup device written in item 124, in the superposition type diffractive structure, the minimum value P of the interval in the direction perpendicular to the optical axis between adjoining stepped sections in the discontinuous stepped section formed in each ring-shaped zone, satisfies the following expression (82).

$$P > 10\ \mu m \tag{82}$$

The invention written in item 126 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; in the optical function surfaces of the aberration correcting element, at least one optical function surface is divided into a plurality of ring-shaped zone-like optical function areas around the optical axis; in the optical function area including the optical axis in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed; and when the optical path difference added to the transmission wave-front by the superposition type diffractive structure is defined by the arith-1, signs of B2 and B4 are different from each other.

The invention written in item 127 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; in the optical function surfaces of the aberration correcting element, at least one optical function surface is divided into a plurality of ring-shaped zone-like optical function areas around the optical axis; in at least two optical function areas in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed; and in the superposition type diffractive structure, any one of the number N of the discontinuous stepped sections formed in each ring-shaped zone, and the depth Δ (μm) in the optical axis direction of the discontinuous stepped sections, is different for each optical function area.

The invention written in item 128 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; in the optical function surfaces of the aberration correcting element, at least one optical function surface is divided into a plurality of ring-shaped zone-like optical function areas around the optical axis; in at least one optical function area in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed; and the diffractive structure formed of a plurality of ring-shaped zones divided by the stepped section around the optical axis, is formed.

The invention written in item 129 is characterized in that: in the aberration correcting element for the optical pickup device written in item 128, the depth of the stepped section of the diffractive structure is, to the diffraction order n1 of the diffracted light ray having the maximum diffraction efficiency in the diffracted light ray generated when the light flux of the first wavelength λ1 enters, the diffraction order n2 of the diffracted light ray having the maximum diffraction efficiency in the diffracted light ray generated when the light flux of the second wavelength λ2 enters, and the diffraction order n3 of the diffracted light ray having the maximum diffraction efficiency in the diffracted light ray generated when the light flux of the third wavelength λ3 enters, are designed so that they are the lower, degree with together.

The invention written in item 130 is characterized in that: in the aberration correcting element for the optical pickup device written in item 129, the first wavelength λ1 (μm), the second wavelength λ2 (μm), the third wavelength λ3 (μm) respectively satisfy the following expressions (83) to (85), and the combination of the diffraction order n1, diffraction order n2, and diffraction order n3 is any one of (n1, n2, n3)=(2, 1, 1), (4, 2, 2), (6, 4, 3,), (8, 5, 4), (10, 6, 5).

$$0.39 < \lambda 1 < 0.42 \tag{83}$$

$$0.63 < \lambda 2 < 0.68 \tag{84}$$

$$0.75 < \lambda 3 < 0.85 \tag{85}$$

The invention written in item 131 is characterized in that: in the aberration correcting element for the optical pickup device written in item 129 or 130, the aberration correcting element is formed of a material whose refractive index in the first wavelength λ1 is within the range of 1.5-1.6, and Abbe's number on d-line is within the range of 50-60, and the depth d1 in the optical axis direction of the stepped section closest to the optical axis in the stepped sections of the diffractive structure, satisfies any one of the following expressions (86) to (90).

$$1.2\ \mu m > d1 > 1.7\ \mu m \tag{86}$$

$$2.6\ \mu m > d1 > 3.0\ \mu m \tag{87}$$

$$4.4\ \mu m < d1 < 5.0\ \mu m \tag{88}$$

$$5.6\ \mu m < d1 < 6.5\ \mu m \tag{89}$$

$$6.9\ \mu m > d1 > 8.1\ \mu m \tag{90}$$

The invention written in item 132 is characterized in that: in the aberration correcting element for the optical pickup device written in any one of items 128 to 131, the paraxial diffraction power PD0 (mm$^{-1}$) to the first wavelength λ1 of the diffractive structure, the paraxial diffraction power PD1 (mm$^{-1}$) to the wavelength 10 nm longer than the first wavelength λ1 of the diffractive structure, and the paraxial diffraction power PD2 (mm$^{-1}$) to the wavelength 10 nm shorter than the first wavelength λ1 of the diffractive structure, satisfy the following expression (91).

$$PD2 < PD0 < PD1 \tag{91}$$

The invention written in item 133 is characterized in that: in the aberration correcting element for the optical pickup device written in any one of items 128 to 132, the diffractive structure has the wavelength dependency of the spherical aberration in which, when the first wavelength λ1 changes toward the long wavelength side, the spherical aberration changes toward the under correction direction, and when the first wavelength λ1 changes toward the short wavelength side, the spherical aberration changes toward the over correction direction.

The invention written in item 134 is characterized in that: in the aberration correcting element for the optical pickup device written in item 133, in the optical function surfaces of the aberration correcting element, at least one optical function surface is divided into the center optical function area and the peripheral optical function area surrounding the periphery of the central optical function area, and only in the peripheral optical function area, the diffractive structure is formed.

The invention written in item 135 is characterized in that: in the aberration correcting element for the optical pickup device written in any one of items 128 to 134, the sectional shape including the optical axis of the diffractive structure is a step shape.

The invention written in item 136 is characterized in that: in the aberration correcting element for the optical pickup device written in any one of items 128 to 134, the sectional shape including the optical axis of the diffractive structure is a saw-toothed shape.

The invention written in item 137 is characterized in that: in the aberration correcting element for the optical pickup device written in any one of items 128 to 136, the superposition type diffractive structure is formed on one optical function surface of the aberration correcting element, and the diffractive structure is formed on another optical function surface.

The invention written in item 138 is characterized in that: it is an aberration correcting element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the aberration correcting element is arranged in the optical path between the first light source to the third light source, and the light converging element by which the light flux of the first wavelength λ1 projected from the first light source to the light flux of the third wavelength λ3 projected from the third light source are respectively light converged on information recording surfaces of the first optical information recording medium to the third optical information recording medium; in the optical function surfaces of the aberration correcting element, at least one optical function surface is divided into a plurality of ring-shaped zone-like optical function areas around the optical axis; in at least one optical function area in the plurality of ring-shaped zone-like optical function areas, the superposition type diffractive structure which is a structure in which a plurality of ring-shaped zones inside of which a predetermined number of discontinuous stepped sections are formed, are continuously arranged around the optical axis, is formed; and the optical difference grant structure formed of a plurality of ring-shaped zones divided by the stepped section is formed in the central area including the optical axis and on the outside of the central area.

The invention written in item 139 is characterized in that: in the aberration correcting element for the optical pickup device written in item 138, the optical path difference grant structure has the temperature dependency in which, when the environmental temperature rises, the spherical aberration added to the first wavelength λ1 changes toward the under correction direction, and when the environmental temperature falls, the spherical aberration added to the first wavelength λ1 changes toward the over correction direction.

The invention written in item 140 is characterized in that: in the aberration correcting element for the optical pickup device written in item 139, in the optical path difference grant structure, the ring-shaped zone adjoining the outside of the central area is formed by shifting in the optical axis direction so that the optical path length is short to the central area, and the ring-shaped zone in the maximum effective diameter position is formed by shifting in the optical axis direction so that the optical path length becomes long to the ring-shaped zone adjoining its inside, and the ring-shaped zone at the 75% position of the maximum effective diameter is formed by shifting in the optical axis direction so that the optical path length becomes short to the ring-shaped zone adjoining its inside and to the ring-shaped zone adjoining its outside.

The invention written in item 141 is characterized in that: in the aberration correcting element for the optical pickup device written in any one of items 139 to 140, by the first wavelength λ1 (µm), the second wavelength λ2 (µm), the third wavelength λ3 (µm), the depth d2 (µm) in the optical axis direction of the stepped section closest to the optical axis in stepped sections of the optical path difference grant structure, the refractive index Nλ1 to the first wavelength λ1 of the aberration correcting element, the refractive index Nλ2 to the second wavelength λ2 of the aberration correcting element, and the refractive index Nλ3 to the third wavelength λ3 of the aberration correcting element, Φ1, Φ2, Φ3 respectively expressed by the following expressions (92) to (94) satisfy the following expressions (95) to (98).

$$\Phi 1 = d2 \cdot (N\lambda 1 - 1)/\lambda 1 \tag{92}$$

$$\Phi 2 = d2 \cdot (N\lambda 2 - 1)/\lambda 2 \tag{93}$$

$$\Phi 3 = d2 \cdot (N\lambda 3 - 1)/\lambda 3 \tag{94}$$

$$INT(\Phi 1) \leq 10 \tag{95}$$

$$0 \leq |INT(\Phi 1) - \Phi 1| \leq 0.4 \tag{96}$$

$$0 \leq |INT(\Phi 2) - \Phi 2| \leq 0.4 \tag{97}$$

$$0 \leq |INT(\Phi 3) - \Phi 3| \leq 0.4 \tag{98}$$

Where, INT(Φi) (i=1, 2, 3) is an integer obtained by half-adjusting Φi.

The invention written in item 142 is characterized in that: in the aberration correcting element for the optical pickup device written in any one of items 138 to 141, the superposition type diffractive structure is formed on one optical function surface of the aberration correcting element, and the optical path difference grant structure is formed on another optical function surface.

The invention written in item 143 is characterized in that: in the aberration correcting element for the optical pickup device written in any one of items 118 to 142, the optical function area on which the superposition type diffractive structure is formed, is an optical function area including the optical axis.

The invention written in item 144 is characterized in that: in the aberration correcting element for the optical pickup device written in item 143, in the first wavelength λ1 (μm), second wavelength λ2 (μm), third wavelength λ3 (μm), the superposition type diffractive structure formed in the optical function area including the optical axis, by the number N of discontinuous stepped sections formed in each ring-shaped zone, the depth Δ (μm) in the optical axis direction of the discontinuous stepped section, the refractive index Nλ1 to the first wavelength λ1 of the aberration correcting element, refractive index Nλ2 to the second wavelength λ2 of the aberration correcting element, and refractive index Nλ3 to the third wavelength λ3 of the aberration correcting element, φ1, φ2, φ3 respectively expressed by the following expressions (99) to (101) satisfy the following expressions (102) to (104).

$$\varphi1=\Delta\cdot(N\lambda1-1)\cdot(N+1)/\lambda1 \quad (99)$$

$$\varphi2=\Delta\cdot(N\lambda2-1)\cdot(N+1)/\lambda2 \quad (100)$$

$$\varphi3=\Delta\cdot(N\lambda3-1)\cdot(N+1)/\lambda3 \quad (101)$$

$$0\leq|INT(\varphi1)-\varphi1|\leq0.4 \quad (102)$$

$$0\leq|INT(\varphi2)-\varphi3|\leq0.4 \quad (103)$$

$$0\leq|INT(\varphi3)-\varphi3|\leq0.4 \quad (104)$$

Where, INT(φi) (i=1, 2, 3) is an integer obtained by half-adjusting φi.

The invention written in item 145 is characterized in that: in the aberration correcting element for the optical pickup device written in item 144, φ1 and the number N of discontinuous stepped sections formed in each ring-shaped zone satisfy the following expressions (105) and (106).

$$\varphi1\leq24 \quad (105)$$

$$3\leq N\leq11 \quad (106)$$

The invention written in item 146 is characterized in that: in the aberration correcting element for the optical pickup device written in any one of items 143 to 145, the superposition type diffractive structure formed in the optical function area including the optical axis, gives the equivalent first optical action to the light flux of the first wavelength λ1 and the light flux of the third wavelength λ3, and to the light flux of the second wavelength λ2, gives the second optical action different from the first optical action.

The invention written in item 147 is characterized in that: in the aberration correcting element for the optical pickup device written in item 146, the first optical action is 0-degree diffraction by which the optical path difference is not practically given between adjoining ring-shaped zones to the light flux of the first wavelength λ1 and the light flux of the third wavelength λ3, and the second optical action is the 1st-degree diffraction by which the light flux of the second wavelength λ2 is diffracted to the 1st-degree direction.

The invention written in item 148 is characterized in that: in the aberration correcting element for the optical pickup device written in item 147, the aberration correcting element is formed of the material in which the refractive index in the first wavelength λ1 is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (107) to (109), and in the superposition type diffractive structure formed in the optical function area including the optical axis, a combination of the number N of discontinuous stepped sections formed in each ring-shaped zone, and the depth D (μm) in the optical axis direction of the ring-shaped zone, is respectively any one of the following expressions (110)-(113).

$$0.39<\lambda1<0.42 \quad (107)$$

$$0.63<\lambda2<0.68 \quad (108)$$

$$0.75<\lambda3<0.85 \quad (109)$$

$$\text{When } N=3, 4.1\leq D\leq4.8 \quad (110)$$

$$\text{When } N=4, 5.4\leq D\leq6.4 \quad (111)$$

$$\text{When } N=5, 7.0\leq D\leq7.9 \quad (112)$$

$$\text{When } N=6, 8.4\leq D\leq9.0 \quad (113)$$

The invention written in item 149 is characterized in that: in the aberration correcting element for the optical pickup device written in item 146, the first optical action is 0-degree diffraction by which the optical path difference is not practically given between adjoining ring-shaped zones to the light flux of the first wavelength λ1 and the light flux of the third wavelength λ3, and the second optical action is the 2nd-degree diffraction by which the light flux of the second wavelength λ2 is diffracted to the 2nd-degree direction.

The invention written in item 150 is characterized in that: in the aberration correcting element for the optical pickup device written in item 149, the aberration correcting element is formed of the material in which the refractive index in the first wavelength λ1 is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (114) to (116), and in the superposition type diffractive structure formed in the optical function area including the optical axis, a combination of the number N of discontinuous stepped sections formed in each ring-shaped zone, and the depth D (μm) in the optical axis direction of the ring-shaped zone, is respectively any one of the following expressions (117)-(120).

$$0.39<\lambda1<0.42 \quad (114)$$

$$0.63<\lambda2<0.68 \quad (115)$$

$$0.75<\lambda3<0.85 \quad (116)$$

$$\text{When } N=8, 11.3\leq D\leq12.7 \quad (117)$$

$$\text{When } N=9, 12.8\leq D\leq14.1 \quad (118)$$

$$\text{When } N=10, 14.2\leq D\leq15.6 \quad (119)$$

$$\text{When } N=11, 15.7\leq D\leq17.2 \quad (120)$$

The invention written in item 151 is characterized in that: in the aberration correcting element for the optical pickup device written in any one of items 143 to 150, the superposition type diffractive structure is formed in all of the plurality of optical function areas.

The invention written in item 152 is characterized in that: in the aberration correcting element for the optical pickup device written in any one of items 118 to 150, the superposition type diffractive structure is not formed in at least one optical function area in the plurality of optical function areas.

The invention written in item 153 is characterized in that: in the aberration correcting element for the optical pickup device written in any one of items 118 to 152, the superposition type diffractive structure is formed in the plurality of optical function areas of the aberration correcting element.

The invention written in item 154 is characterized in that: in the aberration correcting element for the optical pickup device written in any one of items 118 to 153, the plurality of optical function areas are 2 optical function areas, and the superposition type diffractive structure is formed in the optical function area not including the optical axis in 2 optical function areas, and the diffraction efficiency η3 of the diffracted light ray having the maximum diffraction efficiency in the diffracted light ray generated when the light flux of third wavelength λ3 enters into the superposition type diffractive structure, is not larger than 40%.

The invention written in item 155 is characterized in that: in the aberration correcting element for the optical pickup device written in any one of items 118 to 154, the plurality of optical function areas are 2 optical function areas, and the superposition type diffractive structure is formed in the optical function area not including the optical axis in 2 optical function areas, and when the superposition type diffractive structure gives the equivalent optical action to the light flux of the first wavelength λ1 and the light flux of the second wavelength λ2, and to the light flux of the third wavelength λ3, the optical action different from the above-described optical action is given, the light flux of the third wavelength λ3 transmitted the superposition type diffractive structure is made a flare component which does not contribute to the spot formation onto the information recording surface of the third optical information recording medium.

The invention written in item 156 is characterized in that: in the aberration correcting element for the optical pickup device written in any one of items 118 to 153, the plurality of optical function areas are 3 optical function areas, and the superposition type diffractive structure is formed in the optical function area adjoining the outside of the optical function area including the optical axis in 3 optical function areas, and the diffraction efficiency η3 of the diffracted light ray having the maximum diffraction efficiency in the diffracted light ray generated when the light flux of third wavelength λ3 enters into the superposition type diffractive structure, is not larger than 40%.

The invention written in item 157 is characterized in that: in the aberration correcting element for the optical pickup device written in any one of items 118 to 153 and 156, the plurality of optical function areas are 3 optical function areas, and the superposition type diffractive structure is formed in the optical function area adjoining the outside of the optical function area including the optical axis in 3 optical function areas, and the superposition type diffractive structure gives equivalent optical action to the light flux of the first wavelength λ1 and the light flux of the second wavelength λ2, and when, to the light flux of the third wavelength λ3, the optical action different from the above-described optical action is given, the light flux of the third wavelength λ3 transmitted the superposition type diffractive structure is made a flare component which does not contribute to the spot formation onto the information recording surface of the third optical information recording medium.

The invention written in item 157 is characterized in that: in the aberration correcting element for the optical pickup device written in any one of items 118 to 153 and 156, the plurality of optical function areas are 3 optical function areas, and the superposition type diffractive structure is formed in the most outside optical function area in 3 optical function areas, and the diffraction efficiency η2 of the diffracted light ray having the maximum diffraction efficiency in the diffracted light ray generated when the light flux of the second wavelength λ2 enters into the superposition type diffractive structure is not larger than 40%, and the diffraction efficiency l13 of the diffracted light ray having the maximum diffraction efficiency in the diffracted light ray generated when the third wavelength λ3 enters into the superposition type diffractive structure is not larger than 40%.

The invention written in item 159 is characterized in that: in the aberration correcting element for the optical pickup device written in any one of items 118 to 153 and 156 to 158, the plurality of optical function areas are 3 optical function areas, and the superposition type diffractive structure is formed in the most outside optical function area in 3 optical function areas, and when the superposition type diffractive structure gives the optical action different from the optical action given to the light flux of the first wavelength λ1, to the light flux of the second wavelength λ2 and the light flux of the third wavelength λ3, the light fluxes of the second wavelength λ2 and the third wavelength λ3 transmitted the superposition type diffractive structure are made flare components which do not contribute to the spot formation onto the information recording surfaces of the second optical information recording medium and the third optical information recording medium.

The invention written in item 160 is characterized in that: in the aberration correcting element for the optical pickup device written in any one of items 118 to 159, the aberration correcting element is a plastic lens.

The invention written in item 161 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2≧λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the optical pickup device has the light converging element by which the light flux of the first wavelength λ1 projected from the first light source to the light flux of the third wavelength λ3 projected from the third light source are respectively light converged on the information recording surfaces of the first optical information recording medium to the third optical information recording medium, and the aberration correcting element written in any one of items 118 to 160 is arranged in the optical path between the first light source to the third light source, and the light converging element.

The invention written in item 162 is characterized in that: the optical pickup device written in item 161 is mounted, and in the recording of the information for the first optical information recording medium to the third optical information recording medium, and the reproducing of the information for the first optical information recording medium to the third optical information recording medium, at least one can be conducted.

The invention written in item 163 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2≧λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in the plurality of ring-shaped zone-like optical function areas, in at least one optical function area, the superposition type diffractive structure which is a structure in which a plurality of ring-shaped zones, inside of which a predetermined number of discontinuous stepped sections are formed, are continuously arranged around the optical axis, is formed.

The invention written in item 164 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and the first magnification m1 when the reproducing and/or recording of the information is conducted for the first optical information recording medium, and the second magnification m2 when the reproducing and/or recording of the information is conducted for the second optical information recording medium, are almost coincident.

The invention written in item 165 is characterized in that: in the light converging element for the optical pickup device written in item 164, the superposition type diffractive structure adds the under correction spherical aberration to the second wavelength λ2.

The invention written in item 166 is characterized in that: in the light converging element for the optical pickup device written in item 164 or 166, the first magnification m1 and the second magnification m2 satisfy the following expression (121).

$$m1=m2=0 \quad (121)$$

The invention written in item 167 is characterized in that: in the light converging element for the optical pickup device written in any one of items 164 to 166, the third magnification m3 when the reproducing and/or recording is conducted for the third optical information recording medium satisfies the following expression (122).

$$-0.25<m3<-0.10 \quad (122)$$

The invention written in item 168 is characterized in that: in the light converging element for the optical pickup device written in any one of items 164 to 167, the first light source and the second light source are a packaged light source module, and the light converging element light-converges the light flux of the first wavelength λ1 projected from the light source module onto the information recording surface of the first optical information recording medium, and light-converges the light flux of the wavelength λ2 projected from the light source module onto the information recording surface of the second optical information recording medium.

The invention written in item 169 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and the second magnification m2 when the reproducing and/or recording of the information is conducted for the second optical information recording medium, and the third magnification m3 when the reproducing and/or recording of the information is conducted for the third optical information recording medium, are almost coincident.

The invention written in item 170 is characterized in that: in the light converging element for the optical pickup device written in item 169, the superposition type diffractive structure adds the over correction spherical aberration to the second wavelength λ2.

The invention written in item 171 is characterized in that: in the light converging element for the optical pickup device written in item 169 or 170, the first magnification m1 when the reproducing and/or recording of the information is conducted to the first optical information recording medium satisfies the following expression (123).

$$m1=0 \tag{123}$$

The invention written in item 172 is characterized in that: in the light converging element for the optical pickup device written in any one of items 169 to 171, the second magnification m2 and the third magnification m3 satisfy the following expressions (124) and (125).

$$m2=m3 \tag{124}$$

$$-0.25<m2<-0.10 \tag{125}$$

The invention written in item 173 is characterized in that: in the light converging element for the optical pickup device written in any one of items 169 to 172, the second light source and the third light source are a packaged light source module, and the light converging element light-converges the light flux of the second wavelength λ2 onto the information recording surface of the second optical information recording medium, and light-converges the light flux of the third wavelength λ3 onto the information recording surface of the third optical information recording medium.

The invention written in item 174 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and the first light flux λ1, and in the superposition type diffractive structure, in the discontinuous stepped sections formed in each ring-shaped zone, the minimum value P of the interval in the direction perpendicular to the optical axis between the adjoining stepped sections satisfy the following expressions (126) and (127).

$$0.39\ \mu m < \lambda 1 < 0.42\ \mu m \tag{126}$$

$$P > 3\ \mu m \tag{127}$$

The invention written in item 175 is characterized in that: in the light converging element for the optical pickup device written in item 174, in the superposition type diffractive structure, in the discontinuous stepped sections formed in each ring-shaped zone, the minimum value P of the interval in the direction perpendicular to the optical axis between adjoining stepped sections satisfies the following expression (128).

$$P > 5\ \mu m \tag{128}$$

The invention written in item 176 is characterized in that: in the light converging element for the optical pickup device written in item 175, in the superposition type diffractive structure, in the discontinuous stepped sections formed in each ring-shaped zone, the minimum value P of the interval in the direction perpendicular to the optical axis between adjoining stepped sections satisfies the following expression (129).

$$P > 10\ \mu m \tag{129}$$

The invention written in item 177 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and when the optical path difference added to the transmission wave-front by the superposition type diffractive structure is defined by the Arith-1, signs of B2 and B4 are different from each other.

The invention written in item 178 is characterized in that: in the light converging element for the optical pickup device written in any one of items 174 to 177, the first magnification m1 when the reproducing and/or recording of the information is conducted for the first optical information recording medium, the second magnification m2 when the reproducing and/or recording of the information is conducted for the second optical information recording medium, and the third magnification m3 when the reproducing and/or recording of the information is conducted for the third optical information recording medium, are different from each other.

The invention written in item 179 is characterized in that: in the light converging element for the optical pickup device written in item 178, the first magnification m1, the second magnification m2, and the third magnification m3 satisfy the following expressions (130) to (132).

$$M1=0 \tag{130}$$

$$-0.08<m2<-0.01 \tag{131}$$

$$-0.25<m3<-0.10 \tag{132}$$

The invention written in item 180 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in at least one optical function area in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and in the superposition type diffractive structure, any one of the number N of the discontinuous stepped sections formed in each ring-shaped zone, and the depth Δ (μm) in the optical axis direction of the discontinuous stepped sections, is different for each optical function area.

The invention written in item 181 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in at least one optical function area in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and in at least one optical function surface, in the optical function surfaces of the aberration correcting element, the diffractive structure formed of a plurality of ring-shaped zones divided by the stepped section around the optical axis, is formed.

The invention written in item 182 is characterized in that: in the light converging element for the optical pickup device written in item 181, the depth of the stepped section of the diffractive structure is designed so that, to the diffraction order n1 of the diffracted light ray having the maximum diffraction efficiency in the diffracted light ray generated when the light flux of the first wavelength λ1 enters, both of the diffraction order n2 of the diffracted light ray having the maximum diffraction efficiency in the diffracted light ray generated when the light flux of the second wavelength λ2 enters, and the diffraction order n3 of the diffracted light ray having the maximum diffraction efficiency in the diffracted light ray generated when the light flux of the third wavelength λ3 enters, are lower degree.

The invention written in item 183 is characterized in that: in the light converging element for the optical pickup device written in item 182, the first wavelength λ1 (μm), the second wavelength λ2 (μm), the third wavelength λ3 (μm) respectively satisfy the following expressions (133) to (135), and the combination of the diffraction order n1, diffraction order n2, and diffraction order n3 is any one of (n1, n2, n3)=(2, 1, 1), (4, 2, 2), (6, 4, 3,), (8, 5, 4), (10, 6, 5).

$$0.39<\lambda 1<0.42 \tag{133}$$

$$0.63<\lambda 2<0.68 \tag{134}$$

$$0.75<\lambda 3<0.85 \tag{135}$$

The invention written in item 184 is characterized in that: in the light converging element for the optical pickup device written in item 182 or 183, the light converging element is formed of a material whose refractive index in the first wavelength λ1 is within the range of 1.5-1.6, and Abbe's number on d-line is within the range of 50-60, and the depth d1 in the optical axis direction of the stepped section closest to the optical axis in the stepped sections of the diffractive structure, satisfies anyone of the following expressions (136) to (140).

$$1.2 \,\mu m > d1 > 1.7 \,\mu m \tag{136}$$

$$2.6 \,\mu m > d1 > 3.0 \,\mu m \tag{137}$$

$$4.4 \,\mu m < d1 < 5.0 \,\mu m \tag{138}$$

$$5.6 \,\mu m < d1 < 6.5 \,\mu m \tag{139}$$

$$6.9 \,\mu m > d1 > 8.1 \,\mu m \tag{140}$$

The invention written in item 185 is characterized in that: in the light converging element for the optical pickup device written in any one of items 181 to 184, the diffractive structure has a function to suppress the focus position dislocation generated due to the chromatic aberration of the light converging element, when the first wavelength λ1 changes in the range of ±10 nm.

The invention written in item 186 is characterized in that: in the light converging element for the optical pickup device written in item 185, the paraxial diffraction power PD0 (mm$^{-1}$) to the first wavelength λ1 of the diffractive structure, the paraxial diffraction power PD1 (mm$^{-1}$) to the wavelength 10 nm longer than the first wavelength λ1 of the diffraction power, the paraxial diffraction power PD2 (mm$^{-1}$) to the wavelength 10 nm shorter than the first wavelength λ1 of the diffraction power, satisfy the following expression (141).

$$PD2 < PD0 < PD1 \quad (141)$$

The invention written in item 187 is characterized in that: in the light converging element for the optical pickup device written in item 185 or 186, the diffractive structure has the wavelength dependency of the spherical aberration like as, when the first wavelength λ1 changes toward the long wavelength side, the spherical aberration changes toward the under correction direction, and when the first wavelength λ1 changes toward the short wavelength side, the spherical aberration changes toward the over correction direction.

The invention written in item 188 is characterized in that: in the light converging element for the optical pickup device written in any one of items 181 to 187, the light converging element is a plastic lens, and when the diffractive structure has the wavelength dependency of the spherical aberration like as; when the first wavelength λ1 changes toward the long wavelength side, the spherical aberration changes toward the under correction direction, and when the first wavelength λ1 changes toward the short wavelength side, the spherical aberration changes toward the over correction direction, it has a function to suppress the spherical aberration change generated by the refractive index change of the light converging element following the environmental temperature change.

The invention written in item 189 is characterized in that: in the light converging element for the optical pickup device written in item 188, in the optical function surfaces of the light converging element, at least one optical function surface is divided into the central optical function area including the optical axis and the peripheral optical function area surrounding the periphery of the central optical area, and only in the peripheral optical function area, the diffractive structure is formed.

The invention written in item 190 is characterized in that: in the light converging element for the optical pickup device written in any one of items 181 to 189, the sectional shape including the optical axis of the diffractive structure is a saw-toothed shape.

The invention written in item 191 is characterized in that: in the light converging element for the optical pickup device written in any one of items 181 to 190, the superposition type diffractive structure is formed on one optical function surface, and the diffractive structure is formed on another optical function surface of the light converging element.

The invention written in item 192 is characterized in that: it is the light converging element for the optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the light converging element is arranged in the position opposite to the first optical information recording medium to the third optical information recording medium; at least one optical function surface in the optical function surfaces of the light converging element is divided into the plurality of ring-shaped zone-like optical function areas around the optical axis; in at least one optical function area in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and on at least one optical function surface, in the optical function surfaces of the light converging element, the optical path difference grant structure formed of a plurality of ring-shaped zones divided by the stepped section in the central area including the optical axis and outside the central area, is formed.

The invention written in item 193 is characterized in that: in the light converging element for the optical pickup device written in item 192, the light converging element is a plastic lens, and when the optical path difference grant structure has the temperature dependency of the spherical aberration like as when the environmental temperature rises, the spherical aberration added to the first wavelength λ1 changes toward the under correction direction, and when the temperature falls, the spherical aberration added to the first wavelength λ1 changes toward the over correction direction, it has a function to suppress the spherical aberration generated by the refractive index change of the light converging element following the environmental temperature change.

The invention written in item 194 is characterized in that: in the light converging element for the optical pickup device written in item 193, in the optical path difference grant structure, the ring-shaped zone adjoining the outside of the central are is formed by shifting in the optical axis direction so that the optical path length is shorter to the central area, the ring-shaped zone in the maximum effective diameter position is formed by shifting in the optical axis direction so that the optical path length is longer to the ring-shaped zone adjoining its inside, and the ring-shaped zone in the 75% position of the maximum effective diameter is formed by shifting in the optical axis direction so that the optical path length is shorter to the ring-shaped zone adjoining its inside and to the ring-shaped zone adjoining its outside.

The invention written in item 195 is characterized in that: in the light converging element for the optical pickup device written in any one of items 192 to 194, by the first wavelength λ1 (μm), the second wavelength λ2 (μm), the third wavelength λ3 (μm), the depth d2 (μm) in the optical axis direction of the stepped section closest to the optical axis in stepped sections of the optical path difference grant structure, the refractive index Nλ1 to the first wavelength λ1 of the light converging element, the refractive index Nλ2 to the second wavelength λ2 of the light converging element, and the refractive index Nλ3 to the third wavelength λ3 of the light converging element, Φ1, Φ2, Φ3 respectively expressed by the following expressions (142) to (144) satisfy the following expressions (145) to (148).

$$\Phi1 = d2 \cdot (N\lambda1 - 1)/\lambda1 \quad (142)$$

$$\Phi2 = d2 \cdot (N\lambda2 - 1)/\lambda2 \quad (143)$$

$$\Phi3 = d2 \cdot (N\lambda3 - 1)/\lambda3 \quad (144)$$

$$\mathrm{INT}(\Phi1) \leq 10 \quad (145)$$

$$0 \leq |\mathrm{INT}(\Phi1) - \Phi1| \leq 0.4 \quad (146)$$

$$0 \leq |\mathrm{INT}(\Phi2) - \Phi2| \leq 0.4 \quad (147)$$

$$0 \leq |\mathrm{INT}(\Phi3) - \Phi3| \leq 0.4 \quad (148)$$

Where, INT (Φi) (i=1, 2, 3) is an integer obtained by half-adjusting Φi.

The invention written in item 196 is characterized in that: in the light converging element for the optical pickup device written in any one of items 192 to 195, the superposition type diffractive structure is formed on one optical function surface of the light converging element, and the optical path difference grant structure is formed on another optical function surface of the light converging element.

The invention written in item 197 is characterized in that: in the light converging element for the optical pickup device written in any one of items 163 to 196, the optical function area in which the superposition type diffractive structure is formed, is an optical function area including the optical axis.

The invention written in item 198 is characterized in that: in the light converging element for the optical pickup device written in item 197, in the first wavelength λ1 (μm), the second wavelength λ2 (λm), the third wavelength λ3 (μm), the superposition type diffractive structure formed in the optical function area including the optical axis, by the number N of discontinuous stepped sections formed in each ring-shaped zone, the depth Δ (μm) in the optical axis direction of the discontinuous stepped section, the refractive index Nλ1 to the first wavelength λ1 of the light converging element, refractive index Nλ2 to the second wavelength λ2 of the light converging element, and refractive index Nλ3 to the third wavelength λ3 of the light converging element, φ1, φ2, φ3 respectively expressed by the following expressions (149) to (151) satisfy the following expressions (152) to (154).

$$\phi 1 = \Delta \cdot (N\lambda 1 - 1) \cdot (N-1)/\lambda 1 \quad (149)$$

$$\phi 2 = \Delta \cdot (N\lambda 2 - 1) \cdot (N-1)/\lambda 2 \quad (150)$$

$$\phi 3 = \Delta \cdot (N\lambda 3 - 1) \cdot (N-1)/\lambda 3 \quad (151)$$

$$0 \leq |INT(\phi 1) - \phi 1| \leq 0.4 \quad (152)$$

$$0 \leq |INT(\phi 2) - \phi 2| \leq 0.4 \quad (153)$$

$$0 \leq |INT(\phi 3) - \phi 3| \leq 0.4 \quad (154)$$

Where, INT(φi) (i=1, 2, 3) is an integer obtained by half-adjusting φi.

The invention written in item 199 is characterized in that: in the light converging element for the optical pickup device written in item 198, φ1 and the number N of the discontinuous steps formed in each ring-shaped zone, satisfy the following expressions (155) and (156).

$$\phi 1 \leq 24 \quad (155)$$

$$3 \leq N \leq 11 \quad (156)$$

The invention written in item 200 is characterized in that: in the light converging element for the optical pickup device written in any one of items 197 to 199, the superposition type diffractive structure formed in the optical function area including the optical axis gives the equivalent first optical action to the light flux of the first wavelength λ1 and the light flux of the third wavelength λ3, and to the second wavelength λ2, gives the second optical action different from the first optical action.

The invention written in item 201 is characterized in that: in the light converging element for the optical pickup device written in item 200, the first optical action is the 0-degree diffraction by which the optical path difference is not practically given to the light flux of the first wavelength λ1 and the light flux of the third wavelength λ3 between adjoining ring-shaped zones, and the second optical action is the 1st-degree diffraction by which the light flux of the second wavelength λ2 is diffracted toward the 1st-degree direction.

The invention written in item 202 is characterized in that: in the light converging element for the optical pickup device written in item 201, the light converging element is formed of the material in which the refractive index in the first wavelength λ1s is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (157) to (159), and in the superposition type diffractive structure formed in the optical function area including the optical axis, a combination of the number N of discontinuous stepped sections formed in each ring-shaped zone, and the depth D (μm) in the optical axis direction of the ring-shaped zone, is respectively any one of the following expressions (160)-(163).

$$0.39 < \lambda 1 < 0.42 \quad (157)$$

$$0.63 < \lambda 2 < 0.68 \quad (158)$$

$$0.75 < \lambda 3 < 0.85 \quad (159)$$

$$\text{When } N=3, 4.1 \leq D \leq 4.8 \quad (160)$$

$$\text{When } N=4, 5.4 \leq D \leq 6.4 \quad (161)$$

$$\text{When } N=5, 7.0 \leq D \leq 7.9 \quad (162)$$

$$\text{When } N=6, 8.4 \leq D \leq 9.0 \quad (163)$$

The invention written in item 203 is characterized in that: in the light converging element for the optical pickup device written in item 200, the first optical action is the 0-degree diffraction by which the optical path difference is not practically given to the light flux of the first wavelength λ1 and the light flux of the third wavelength λ3 between adjoining ring-shaped zones, and the second optical action is the 2nd diffraction by which the light flux of the second wavelength is diffracted toward the 2nd-degree direction.

The invention written in item 204 is characterized in that: in the light converging element for the optical pickup device written in item 203, the light converging element is formed of the material in which the refractive index in the first wavelength λ1 is within the range of 1.5-1.6, and Abbe's number on d-line is within the range of 50-60, and the first wavelength λ1 (μm), second wavelength λ2 (μm), and third wavelength λ3 (μm) respectively satisfy the following expressions (164) to (166), and in the superposition type diffractive structure formed in the optical function area including the optical axis, the number N of discontinuous stepped sections formed in each ring-shaped zone, and the depth D (μm) in the optical axis direction of the ring-shaped zone, are respectively any one of the following expressions (167)-(170).

$$0.39 < \lambda 1 < 0.42 \quad (164)$$

$$0.63 < \lambda 2 < 0.68 \quad (165)$$

$$0.75 < \lambda 3 < 0.85 \quad (166)$$

$$\text{When } N=8, 11.3 \leq D \leq 12.7 \quad (167)$$

$$\text{When } N=9, 12.8 \leq D \leq 14.1 \quad (168)$$

$$\text{When } N=10, 14.2 \leq D \leq 15.6 \quad (169)$$

$$\text{When } N=11, 15.7 \leq D \leq 17.2 \quad (170)$$

The invention written in item 205 is characterized in that: in the light converging element for the optical pickup device written in any one of items 197 to 204, the superposition type diffractive structure is formed in all of the plurality of optical function areas.

The invention written in item 206 is characterized in that: in the light converging element for the optical pickup device written in any one of items 163 to 204, in at least one optical function area in the plurality of optical function areas, the superposition type diffractive structure is not formed.

The invention written in item 207 is characterized in that: in the light converging element for the optical pickup device written in any one of items 163 to 206, the superposition type diffractive structure is formed on the plurality of optical function surfaces of the aberration correcting element.

The invention written in item 208 is characterized in that: in the light converging element for the optical pickup device written in any one of items 163 to 207, the thickness t1 of the protective layer of the first optical information recording medium and the thickness t2 of the protective layer of the second optical information recording medium satisfy the following expression (171).

$$0.8 \leq t1/t2 \leq 1.2 \tag{171}$$

The invention written in item 209 is characterized in that: in the light converging element for the optical pickup device written in item 208, the plurality of optical function areas are 2 optical function areas, and the light flux of the first wavelength $\lambda 1$ to the light flux of the third wavelength $\lambda 3$, which are incident on the optical function areas including the optical axis, respectively form good wave-fronts on the information recording surfaces of the first optical information recording medium to the third optical information recording medium, and in the two optical function areas, the light flux of the first wavelength $\lambda 1$ and the light flux of the second wavelength $\lambda 2$, which are incident on the optical function areas not including the optical axis, respectively form good wave-fronts on the information recording surfaces of the first optical information recording medium and the second optical information recording medium.

The invention written in item 210 is characterized in that: in the light converging element for the optical pickup device written in item 209, the superposition type diffractive structure is formed in the optical function area not including the optical axis in 2 optical function areas, and the diffraction efficiency 13 of the diffracted light ray having the maximum diffraction efficiency in the diffracted light ray generated when the light flux of the third wavelength $\lambda 3$ enters into the superposition type diffractive structure, is not larger then 40%.

The invention written in item 211 is characterized in that: in the light converging element for the optical pickup device written in item 209 or 210, in 2 optical function areas, the superposition type diffractive structure is formed in the optical function area not including the optical axis, and when the superposition type diffractive structure gives the equivalent optical action to the light flux of the first wavelength $\lambda 1$ and the light flux of the second wavelength $\lambda 2$, and to the light flux of the third wavelength $\lambda 3$, gives the optical action different from the above-described optical action, the light flux of the third wavelength $\lambda 3$ transmitted the superposition type diffractive structure is made a flare component which does not contribute to the spot formation onto the information recording surface of the third optical information recording medium.

The invention written in item 212 is characterized in that: in the light converging element for the optical pickup device written in item 208, the plurality of optical function areas are 3 optical function areas, and in 3 optical function areas, the light flux of the wavelength $\lambda 1$ to the light flux of the third wavelength $\lambda 3$ which are incident on the optical function area including the optical axis, respectively form good wave-front on the information recording surfaces of the first optical information recording medium to third optical information recording medium, and in 3 optical function areas, the light flux of the first wavelength $\lambda 1$ and the light flux of the second wavelength $\lambda 2$ which are incident on optical function areas adjoining the outside of the optical function area including the optical axis, respectively form the good wave-front on the information recording surfaces of the first optical information recording medium and second optical information recording medium, and the light flux of the first wavelength $\lambda 1$ incident on the most outside optical function area in 3 optical function areas, forms the good wave-front on the information recording surface of the first optical information recording medium.

The invention written in item 213 is characterized in that: in the light converging element for the optical pickup device written in item 212, in 3 optical function areas, in the optical function area adjoining the outside of the optical function area including the optical axis, the superposition type diffractive structure is formed, and the diffraction efficiency $\eta 3$ of the diffracted light ray having the maximum diffraction efficiency in the diffracted light ray generated when the light flux of the third wavelength $\lambda 3$ enters into the superposition type diffractive structure, is not larger than 40%.

The invention written in item 214 is characterized in that: in the light converging element for the optical pickup device written in item 212 or 213, in 3 optical function areas, in the optical function area adjoining the outside of the optical function area including the optical axis, the superposition type diffractive structure is formed, and when the superposition type diffractive structure gives the equivalent optical action to the light flux of the first wavelength $\lambda 1$ and the light flux of the second wavelength $\lambda 2$, and to the light flux of the third wavelength $\lambda 3$, gives the optical action different from the above-described optical action, the light flux of the third wavelength $\lambda 3$ which transmitted the superposition type diffractive structure, is made a flare component which does not contribute to the spot formation onto the information recording surface of the third optical information recording medium.

The invention written in item 215 is characterized in that: in the light converging element for the optical pickup device written in any one of items 212 to 214, in 3 optical function areas, in the most outside optical function area, the superposition type diffractive structure is formed, and the diffraction efficiency $\eta 2$ of the diffracted light ray having the maximum diffraction efficiency in the diffracted light ray generated when the light flux of the second wavelength $\lambda 2$ enters into the superposition type diffractive structure, is not larger than 40%, and the diffraction efficiency $\eta 3$ of the diffracted light ray having the maximum diffraction efficiency in the diffracted light ray generated when the light flux of the third wavelength $\lambda 3$ enters into the superposition type diffractive structure, is not larger than 40%.

The invention written in item 216 is characterized in that: in the light converging element for the optical pickup device written in any one of items 212 to 215, in 3 optical function areas, in the most outside optical function area, the superposition type diffractive structure is formed, and when the superposition type diffractive structure gives the optical action different from the optical action given to the light flux of the first wavelength $\lambda 1$ to the light flux of the first wavelength $\lambda 2$ and the light flux of the second wavelength $\lambda 3$, the light fluxes of the second wavelength $\lambda 2$ and the third wavelength λ3 which transmitted the superposition type diffractive structure, are respectively made flare components which do not contribute to the spot formation onto the information recording surfaces of the second optical information recording medium and the third optical information recording medium.

The invention written in item 217 is characterized in that: in the light converging element for the optical pickup device written in any one of items 163 to 207, the thickness t1 of the protective layer of the first optical information recording medium and the thickness t2 of the protective layer of the second optical information recording medium satisfy the following expression (172).

$$t1/t2 \leq 0.4 \qquad (172)$$

The invention written in item 218 is characterized in that: in the light converging element for the optical pickup device written in item 217, the plurality of optical function areas are 3 optical function areas, and the light flux of the first wavelength λ1 to the light flux of the third wavelength λ3, which are incident on the optical function areas including the optical axis in 3 optical function areas, respectively form good wave-fronts on the information recording surfaces of the first optical information recording medium to the third optical information recording medium, and in 3 optical function areas, the light flux of the first wavelength λ1 and the light flux of the second wavelength which are incident on the optical function areas adjoining the outside of the optical function area including the optical axis, respectively form good wave-fronts on the information recording surfaces of the first optical information recording medium and the second optical information recording medium, and in 3 optical function areas, the light flux of the first wavelength λ1 which enters in the most outside optical function area, forms a good wave-front on the information recording surface of the first optical information recording medium.

The invention written in item 219 is characterized in that: in the light converging element for the optical pickup device written in item 218, the superposition type diffractive structure is formed in the optical function area adjoining the outside of the optical function area including the optical axis in 3 optical function areas, and the diffraction efficiency η3 of the diffracted light ray having the maximum diffraction efficiency in the diffracted light ray generated when the light flux of the third wavelength λ3 enters into the superposition type diffractive structure, is not larger then 40%.

The invention written in item 220 is characterized in that: in the light converging element for the optical pickup device written in item 218 or 219, in 3 optical function areas, in the optical function area adjoining the outside of the optical function area including the optical axis, the superposition type diffractive structure is formed, and when the superposition type diffractive structure gives the equivalent optical action to the light flux of the first wavelength λ1 and the light flux of the second wavelength λ2, and to the light flux of the third wavelength λ3, gives the optical action different from the above-described optical action, the light flux of the third wavelength λ3 which transmitted the superposition type diffractive structure, is made a flare component which does not contribute to the spot formation onto the information recording surface of the third optical information recording medium.

The invention written in item 221 is characterized in that: in the light converging element for the optical pickup device written in any one of items 218 to 220, the superposition type diffractive structure is formed in the most outside optical function area, in 3 optical function areas, and the diffraction efficiency η2 of the diffracted light ray having the maximum diffraction efficiency in the diffracted light ray generated when the light flux of the second wavelength λ2 enters into the superposition type diffractive structure, is not larger then 40%, and the diffraction efficiency η3 of the diffracted light ray having the maximum diffraction efficiency in the diffracted light ray generated when the light flux of the third wavelength λ3 enters into the superposition type diffractive structure, is not larger then 40%.

The invention written in item 222 is characterized in that: in the light converging element for the optical pickup device written in any one of items 218 to 221, in 3 optical function areas, in the most outside optical function area, the superposition type diffractive structure is formed, and when the superposition type diffractive structure gives the optical action different from the optical action given to the light flux of the first wavelength λ1, to the light flux of the second wavelength λ2 and the light flux of the third wavelength λ3, the light fluxes of the second wavelength λ2 and third wavelength λ3 which transmitted the superposition type diffractive structure, are respectively made flare components which do not contribute to the spot formation onto information recording surfaces of the second optical information recording medium and the third optical information recording medium.

The invention written in item 223 is characterized in that: in the light converging element for the optical pickup device written in any one of items 163 to 222, the light converging element is a plastic lens.

The invention written in item 224 is characterized in that: in the light converging element for the optical pickup device written in any one of items 163 to 222, the light converging element is a glass lens whose glass transition point Tg is not higher than 400° C.

The invention written in item 225 is characterized in that: in the light converging element for the optical pickup device written in any one of items 163 to 223, the light converging element is molded by using a material in which particles whose diameter is not larger than 30 nm, are dispersed in the plastic material.

The invention written in item 226 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the optical pickup device has the objective optical system for the purpose by which the light fluxes of the first wavelength λ1 to the third wavelength λ3 are respectively light-converged on the information recording surfaces of the first optical information recording medium to the third optical information recording medium; and as the objective optical system, the light converging element written in any one of items 163 to 225 is used.

The invention written in item 227 is characterized in that: the optical pickup device written in item 226 is mounted, and at least one of the recording of the information for the first optical information recording medium to the third optical information recording medium, and the reproducing of the information for the first optical information recording medium to the third optical information recording medium, can be conducted.

The invention written in item 228 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the optical pickup device has the objective optical system for the purpose by which the light fluxes of the first wavelength λ1 to the third wavelength λ3 are respectively light-converged on the information recording surfaces of the first optical information recording medium to the third optical information recording medium, stop, and drive device to integrally drive the objective optical system and the stop in the direction perpendicular to the optical axis; in the objective optical system, at least one optical function surface in the optical function surfaces is divided into the plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and has a structure in which at least one light flux of light fluxes of the first wavelength λ1 to the third wavelength λ3 enters into the objective optical system in the non-parallel situation; in the first light source to the third light source, in the optical path between at least one light source of the light sources which project light fluxes incident on the objective optical system in non-parallel situation, and the objective optical system, the coma correcting element having a function to reduce the coma generated when the objective optical system is driven by the drive device in the direction perpendicular to the optical axis, is arranged.

The invention written in item 229 is characterized in that: in the optical pickup device written in item 228, when the objective optical system is not driven in the direction perpendicular to the optical axis by the drive device, the coma correcting element has the spherical aberration which is corrected so that it is not larger than diffraction limit, in the effective diameter in which the light flux incident on the objective optical system in non-parallel situation passes, and outside the effective diameter, has the spherical aberration in the over correction direction.

The invention written in item 230 is characterized in that: in the optical pickup device written in item 229, the light flux incident on the objective optical system in non-parallel situation, is a diverging light flux.

The invention written in item 231 is characterized in that: in the optical pickup device written in item 229 or 230, the light flux incident on the objective optical system in non-parallel situation, is the light flux of the third wavelength λ3.

The invention written in item 232 is characterized in that: in the optical pickup device written in any one of items 229 to 231, the light flux incident on the objective optical system in non-parallel situation, is the light flux of the second wavelength λ2.

The invention written in item 233 is characterized in that: in the optical pickup device written in any one of items 229 to 232, the light flux incident on the objective optical system in non-parallel situation, is the light flux of the second wavelength λ2 and the light flux of the third wavelength λ3.

The invention written in item 234 is characterized in that: in the optical pickup device written in item 233, the coma correcting element is arranged in a common optical path of the light flux of the second wavelength λ2 and the light flux of the third wavelength λ3; when the objective optical system is not driven in the direction perpendicular to the optical axis by the drive device, in the effective diameter through which the second wavelength λ2 which enters into the objective optical system in non-parallel situation, passes, the spherical aberration of the wavelength λ2 is corrected so that it is not larger than the diffraction limit, and outside the effective diameter, the spherical aberration of the wavelength λ2 is corrected in the over correction direction, and when the objective optical system is not driven in the direction perpendicular to the optical axis by the drive device, in the effective diameter through which the second wavelength λ3 which enters into the objective optical system in non-parallel situation, passes, the spherical aberration of the wavelength λ3 is corrected so that it is not larger than the diffraction limit, and outside the effective diameter, the spherical aberration of the wavelength λ3 is corrected in the over correction direction.

The invention written in item 235 is characterized in that: in the optical pickup device written in item 233 or 234, on at least one optical function surface of the coma correcting element, the diffractive structure formed of a plurality of ring-shaped zones divided by the stepped section around the optical axis, is formed.

The invention written in item 236 is characterized in that: in the optical pickup device written in any one of items 233 to 235, the second light source and the third light source are packaged light source module.

The invention written in item 237 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the optical pickup device has the objective optical system for the purpose by which the light fluxes of the first wavelength λ1 to the third wavelength λ3 are respectively light-converged on the information recording surfaces of the first optical information recording medium to the third optical information recording medium; in the objective optical system, at least one optical function surface in the optical function surfaces is divided into a plurality of ring-shaped zone-like optical function areas around the optical axis; in the optical function area including the optical axis in the plurality of ring-shaped zone-like optical function areas, the superposition type diffractive structure which is a structure in which a plurality of the ring-shaped zones are continuously arranged around the optical axis, inside of which a predetermined number of discontinuous stepped sections are formed, is formed; and has a structure in which at least two light fluxes of light fluxes of the first wavelength λ1 to the third wavelength λ3 are incident on the objective optical system in the magnification different from each other; in the first light source to the third light source, the light sources from which at least two light fluxes incident on the objective optical system in the magnification different from each other, are projected, are a packaged light source module; and a diverging angle conversion element for the purpose by which the diverging angle of at least one light flux in light fluxes projected from the light source module is converted, and guided to the objective optical system in which the superposition type diffractive structure which is a structure in which a plurality of the ring-shaped zones are continuously arranged around the optical axis, inside of which a predetermined number of discontinuous stepped sections are formed, is formed, on at least one optical function surface, is arranged in the optical path between the light source module and the objective optical system.

The invention written in item 238 is characterized in that: in the optical pickup device written in item 237, the superposition type diffractive structure formed in the diverging angle conversion element, gives the first optical action to a one light flux in light fluxes projected from the light source module, and to the light fluxes of the other wavelengths, gives the second optical action different from the first optical action.

The invention written in item 239 is characterized in that: in the optical pickup device written in item 238, the light fluxes projected from the light source module, are 2 light fluxes, and 2 light fluxes are the light flux of the first wavelength λ1 and the light flux of the second wavelength λ2.

The invention written in item 240 is characterized in that: in the optical pickup device written in item 238, the light fluxes projected from the light source module, are 2 light fluxes, and 2 light fluxes are the light flux of the second wavelength λ2 and the light flux of the third wavelength λ3.

The invention written in item 241 is characterized in that: in the optical element for the optical pickup device written in any one of items 45 to 115, on at least one optical function surface in optical function surfaces of the optical element, a wavelength selection filter is formed, and the optical function surface on which the wavelength selection filter is formed, is divided into an optical function area including the optical axis, and the peripheral optical function area surrounding its periphery, and the wavelength selection filter has the wavelength selectivity of the transmission factor by which the light flux of the first wavelength λ1 to the light flux of the third wavelength λ3, are transmitted in the optical function area including the optical axis, and in the peripheral optical function areas, the light flux of the third wavelength λ3 is cut off or reflected, and the light flux of the first wavelength λ1 and the light flux of the second wavelength λ2 are transmitted.

The invention written in item 242 is characterized in that: in the optical element for the optical pickup device written in any one of items 45 to 115, on at least one optical function surface in optical function surfaces of the optical element, a wavelength selection filter is formed, and the optical function surface on which the wavelength selection filter is formed, is divided into an optical function area including the optical axis, the first peripheral optical function area surrounding its periphery, and the second peripheral optical function area further surrounding its periphery; and the wavelength selection filter has the wavelength selectivity of the transmission factor by which the light flux of the first wavelength λ1 to the light flux of the wavelength λ3 are transmitted, in the optical function area including the optical axis, and in the first peripheral optical function area, the light flux of the third wavelength λ3 is cut off or reflected, and the light flux of the first wavelength λ1 and the light flux of the second wavelength λ2 are transmitted, and in the second peripheral optical function area, the light flux of the second wavelength λ2 and the light flux of the third wavelength λ3 are cut off or reflected, and the light flux of the first wavelength λ1 is transmitted.

The invention written in item 243 is characterized in that: in the optical element for the optical pickup device written in item 241 or 242, the wavelength selection filter is formed on at least one optical function surface of the aberration correcting element.

The invention written in item 244 is characterized in that: in the optical element for the optical pickup device written in item 241 or 242, the wavelength selection filter is formed on at least one optical function surface of the light converging element.

The invention written in item 245 is characterized in that: in the optical pickup device written in item 116, the optical pickup device has an aperture limit element arranged on the light flux incident surface side of the objective optical system; on at least one optical function surface of the aperture limit element, the wavelength selection filter is formed; the optical function surface on which the wavelength selection filter is formed, is divided into the optical function area including the optical axis, and the peripheral optical function area surrounding its periphery; the wavelength selection filter has the wavelength selectivity of the transmission factor by which the light flux of the wavelength λ1 to the light flux of the wavelength λ3 are transmitted, in the optical function area including the optical axis, and in the peripheral optical function area, the light flux of the third wavelength λ3 is cut off or reflected, and the light flux of the wavelength λ1 and the light flux of the second wavelength λ2 are transmitted.

The invention written in item 246 is characterized in that: in the optical pickup device written in item 116, the optical pickup device has an aperture limit element arranged on the light flux incident surface side of the objective optical system; on at least one optical function surface of the aperture limit element, the wavelength selection filter is formed; the optical pickup device has an aperture limit element arranged on the light flux incident surface side of the objective optical system; on at least one optical function surface of the aperture limit element, the wavelength selection filter is formed; the optical function surface on which the wavelength selection filter is formed, is divided into the optical function area including the optical axis, the first peripheral optical function area surrounding its periphery, and the second peripheral optical function area further surrounding its periphery; the wavelength selection filter has the wavelength selectivity of the transmission factor by which, in the optical function area including the optical axis; the light flux of the first wavelength λ1 to the light flux of the third wavelength λ3 are transmitted, in the first peripheral optical function area, the light flux of the third wavelength λ3 is cut off or reflected, and the light flux of the first wavelength λ1 and the light flux of the second wavelength λ2 are transmitted, and in the second peripheral optical function area, the light flux of the second wavelength λ2 and the light flux of the third wavelength λ3 are cut off or reflected, and the light flux of the first wavelength λ1 is transmitted.

The invention written in item 247 is characterized in that: in the optical pickup device written in item 245 or 246, the optical pickup device has a drive device to drive the objective optical system at least in the direction perpendicular to the optical axis, and the aperture limit element is driven integrally with the objective optical system in the direction perpendicular to the optical axis by the drive device.

The invention written in item 248 is characterized in that: it is an optical pickup device by which the reproducing and/or recording of the information is conducted for the first optical information recording medium having the protective layer of thickness t1 by using the light flux of the first wavelength λ1 projected from the first light source, the reproducing and/or recording of the information is conducted for the second optical information recording Medium having the protective layer of thickness t2 (t2≧t1) by using the light flux of the second wavelength λ2 (λ2>λ1) projected from the second light source, and the reproducing and/or recording of the information is conducted for the third optical information recording medium having the protective layer of thickness t3 (t3>t2) by using the light flux of the third wavelength λ3 (λ3>λ2) projected from the third light source; the optical pickup device is a structure in which a plurality of ring-shaped zones inside of which a predetermined number of discontinuous stepped sections are formed, are continuously arranged around the optical axis, and has a diffraction lens having at least one optical surface on which the superposition type diffractive structure which practically dose not give the phase difference to the first light flux and the third light flux, and to only the second light flux, gives the phase difference, is formed, and a light converging element to light-converge the light fluxes of the first wavelength λ1 to the third wavelength λ3 respectively onto the information recording surfaces of the first optical information recording medium to the third optical information recording medium; and when the magnification to the light flux of the first wavelength λ1 of the optical system structured by the diffraction lens and the light converging element, is made m1, the magnification to the light flux of the second wavelength λ2 of the optical system structured by the diffraction lens and the light converging element, is made m2, and the magnification to the light flux of the third wavelength λ3 of the optical system structured by the diffraction lens and the light converging element, is made m3, the following expression (173) is satisfied.

$$m1 \geq m2 > m3 \quad (173)$$

The invention written in item 249 is characterized in that: in the optical pickup device written in item 248, the following expression (174) is satisfied.

$$m1 = m2 \quad (174)$$

The invention written in item 250 is characterized in that: in the optical pickup device written in item 248, the following expressions (175) and (176) are satisfied.

$$m1 = m2 = 0 \quad (175)$$

$$-0.25 < m3 < -0.10 \quad (176)$$

According to the invention of item 248, when the magnification m3 of the optical system structured by the diffraction lens and the light converging element, to the third flux is set so as to satisfy the expression (173), the spherical aberration generated due to the difference of the thickness of the protective layer between the high density optical disk and CD, can be corrected.

Hereupon, because the second light flux used for the recording/reproducing of the information for DVD is subjected to the diffraction action when the phase difference is added by the superposition type diffractive structure, by such a diffraction action, the spherical aberration generated due to the difference of the thickness of the protective layer between the high density optical disk and DVD can be corrected.

In order to make the characteristic of the optical pickup device good, and further, to make the design and production of the optical pickup device easy, as in the invention of item 249, it is preferable that magnifications m1 and m2 of the optical system structured by the diffraction lens and the light converging element to the first light flux and the second light flux are made the same magnification as in the expression (174).

More preferably, as in the invention of item 250, magnifications m1 and m2 of the optical system structured by the diffraction lens and the light converging element to the first light flux and the second light flux are made 0 as in the expression (175), and in this case, it is preferable that the magnification m3 to the third light flux is set so as to satisfy the expression (176).

The invention described in Item 251 is an optical pickup device conducting reproducing and/or recording of information for the first optical information recording medium having a t1-thick protective layer by using a light flux with first wavelength λ1 emitted from the first light source, reproducing and/or recording of information for the second optical information recording medium having a t2-thick protective layer (t2≧t1) by using a light flux with second wavelength λ2 (λ2>λ1) emitted from the second light source, and reproducing and/or recording of information for the third optical information recording medium having a t3-thick protective layer (t3>t2) by using a light flux with third wavelength λ3 (λ3>λ2) emitted from the third light source, wherein the optical pickup device has therein a light-converging element for converging each of light fluxes having respectively the first wavelength λ1-third wavelength λ3 on an information recording surface of each of the first-third information recording media, an aberration correcting means having a phase structure and aspherical aberration correcting means, while, the aberration correcting means has a function to correct spherical aberration caused on the light-converging element by a difference between the first wavelength λ1 and the second wavelength λ2 and/or spherical aberration caused by a difference between t1 and t2, and the spherical aberration correcting means has a function to correct spherical aberration caused by a difference between t1 and t3.

The invention described in Item 252 is the optical pickup device described in Item 251, wherein the phase structure is either one of a superposed diffractive structure, a diffractive structure and an optical path difference providing structure.

The invention described in Item 253 is the optical pickup device described in Item 252, wherein an optical path difference added to the first light flux by the phase structure is an integer multiple of the first wavelength λ1.

The invention described in Item 254 is the optical pickup device described in Item 253, wherein an optical path difference added to the first light flux by the phase structure is even multiples of the first wavelength λ1.

The invention described in Item 255 is the optical pickup device described in Item 254, wherein the optical pickup device further has a second aberration correcting element that has a second phase structure which is either one of the diffractive structure and the optical path difference providing structure, and an optical path difference added to the first light flux by the second phase structure is odd multiples of the first wavelength λ1.

The invention described in Item 256 is the optical pickup device described in either one of Item 251-Item 255, wherein magnification m1 of an optical system composed of the light-converging element and the aberration correcting element for the first wavelength λ1 agrees substantially with magnification m2 for the second wavelength λ2.

The invention described in Item 257 is the optical pickup device described in either one of Item 251-Item 256, wherein the light-converging element is optimized in terms of spherical aberration correction for the first wavelength λ1 and for the t1-thick protective layer.

The invention described in Item 258 is the optical pickup device described in either one of Item 251-Item 257, wherein the light-converging element and the aberration correcting element are held so that their relative positional relationship may not be changed.

The invention described in Item 259 is the optical pickup device described in either one of Item 251-Item 258, wherein the spherical aberration correcting means is a liquid crystal phase control element composed of a liquid crystal layer that causes a phase change on a light flux that is transmitted by voltage impression and of electrode layers facing each other for impressing voltage, and the liquid crystal phase control element corrects spherical aberration caused by a difference between the thickness t1 and the thickness t3 by controlling the phase of the third light flux.

The invention described in Item 260 is the optical pickup device described in Item 259, wherein the liquid crystal phase control element conducts only phase control of the third light flux selectively.

The invention described in Item 261 is the optical pickup device described in either one of Item 251-Item 258, wherein the spherical aberration correcting means is a movable lens unit composed of an actuator and a movable lens group that can be moved by the actuator at least in the optical axis direction, and the movable lens unit corrects spherical aberration caused by a difference between the thickness t1 and the thickness t3, by changing the magnification of the light-converging element.

The invention described in Item 262 is the optical pickup device described in Item 261, wherein magnification m3 of the light-converging element for the third wavelength λ3 satisfies the following expression (177).

$$-0.15 < m3 < -0.02 \quad (177)$$

The invention described in Item 263 is the optical pickup device described in either one of Item 251-Item 261, wherein at least two of the first light source—the third light source are integrated solidly.

The invention described in Item 264 is the optical pickup device described in Item 263, wherein all of the first light source—the third light source are integrated solidly.

In the invention described in Item 251, it is possible to make the first optical information recording medium (for example, a high density optical disc) and the second optical information recording medium (for example, DVD) to be compatible, by the functions of the phase structure, and it is possible to make the first optical information recording medium (for example, a high density optical disc) and the third optical information recording medium (for example, CD) to be compatible, by the functions of the spherical aberration correcting means. In this case, the phase structure has a function to correct spherical aberration caused by a difference between the first wavelength λ1 and the second wavelength λ2 and/or spherical aberration caused by a difference between t1 and t2. The former corresponds to the occasion where t1 and t2 are the same each other (for example, HD DVD with t1=0.6 mm and DVD with t2=0.6 mm), while, the latter corresponds to the occasion where t1 and t2 are different each other (for example, a blue ray disc with t1=0.1 mm and DVD with t2=0.6 mm).

The phase structure may be either one of the superposed diffractive structure shown schematically in FIG. 26, the diffractive structure shown schematically in FIG. 27 and the optical path difference providing structure shown schematically in FIG. 28, as in the invention described in Item 252.

It is further preferable to design the phase structure so that an optical path difference added to the first light flux when passing through the phase structure may be an integer multiple of the first wavelength λ1, as shown in the invention in Item 253. Due to this, a decline of transmittance of the phase structure for the first light flux can be prevented.

It is possible to prevent also a decline of transmittance of a phase structure for the second light flux and the third light flux if the phase structure is designed in advance so that an optical path difference added to the first light flux when passing through the phase structure may be even multiples of the first wavelength λ1, as shown in the invention in Item 254.

However, if the phase structure is designed so that an optical path difference to be added to the first light flux may be even multiples of the first wavelength λ1, actions to be added to the first light flux and to the third light flux both passing through the phase structure become the same each other. Therefore, it is impossible for the phase structure to reduce spherical aberration caused by a difference between t1 and t3, which increases a burden for the spherical aberration correcting means.

It is therefore preferable to arrange the second aberration correcting element having the second phase structure which is either one of a diffractive structure and an optical path difference providing structure, and to design the second phase structure so that an optical path difference added to the first light flux may be odd multiples of the first wavelength λ1 when passing through the second phase structure, as shown in the invention described in Item 255. In this case, when the third light flux passes through the second phase structure, an optical path difference that is a half integer multiple of λ3 is added. Due to this, it is possible to reduce spherical aberration caused by a difference between t1 and t3 and thereby to lower a burden for the spherical aberration correcting means, because it is possible to add actions which are different from those for the first light flux to the third light flux that is transmitted through the second phase structure, although the transmittance of the second phase structure for the third light flux is lowered. Since the spherical aberration caused by a difference between t1 and t3 can be lowered by the phase structure as stated above, an absolute value of magnification m3 of the light-converging element for the third light flux λ3 does not become too great when using a movable lens unit having a lens group movable in the optical axis direction by an actuator described in the invention in Item 260 that will be stated later, resulting in an acquisition of excellent tracking characteristics of the light-converging element.

When the phase structure is a superposed diffractive structure, it is preferable to establish depth Δ of a step in each ring-shaped zone in the optical axis direction so that Δ=2m·λ1/(Nλ1−1) may be satisfied substantially, by making the number of division in each ring-shaped zone to be either one of 4, 5 and 6 (namely, by making the number of steps in each ring-shaped zone to be either one of 3, 4 and 5), and it is most preferable to make m=1 to hold under the condition that the number of division in each ring-shaped zone is 5. Due to this, it is possible to attain compatibility between the first optical information recording medium and the second optical information recording medium and to control a decline of transmittance of the phase structure for the second light flux to be small, because the second light flux alone is given a phase difference and is diffracted when passing through the superposed diffractive structure. Incidentally, the symbol m stated above represents a positive integer of 5 or less and Nλ1 represents a diffractive index of the aberration correcting element for the first wavelength $\lambda 1$.

When the phase structure is a diffractive structure, it is preferable to establish a depth of a step of each ring-shaped zone so that the following relationship may be satisfied by diffraction order n1 of diffracted light ray generated when the first light flux enters, diffraction order n2 of diffracted light ray generated when the second light flux enters and diffraction order n3 of diffracted light ray generated when the third light flux enters.

$$n1 \geq n2 \geq n3$$

Incidentally, the diffraction order mentioned here means a diffraction order of a diffracted light ray having the maximum diffraction efficiency among various diffracted light ray having respectively various diffraction orders generated by the diffractive structure. Among combinations of these diffraction orders, the preferable ones include (n1, n2, n3)=(1, 1, 1), (2, 1, 1), (3, 2, 1), (3, 2, 2), (8, 5, 4). To secure high diffraction efficiencies for all of the first light flux—the third light flux, combinations of (n1, n2, n3)=(2, 1, 1) and (8, 5, 4) are especially preferable.

When the phase structure is an optical path difference providing structure, it is preferable to make an optical path difference between ring-shaped zones adjoining each other (a wavelength of each light flux is expressed as a unit) to be either one of ($\Phi 1$, $\Phi 2$, $\Phi 3$)=($1\lambda 1$, $1\lambda 2$, $1\lambda 3$), ($2\lambda 1$, $1\lambda 2$, $1\lambda 3$), ($3\lambda 1$, $2\lambda 2$, $1\lambda 3$), ($3\lambda 1$, $2\lambda 2$, $2\lambda 3$), ($8\lambda 1$, $5\lambda 2$, $4\lambda 3$), when $\Phi 1$ is for the first light flux, $\Phi 2$ is for the second light flux and $\Phi 3$ is for the third light flux. To secure high diffraction efficiencies for all of the first light flux—the third light flux, combinations of ($\Phi 1$, $\Phi 2$, $\Phi 3$)=($2\lambda 1$, $1\lambda 2$, $1\lambda 3$), ($8\lambda 1$, $5\lambda 2$, $4\lambda 3$) are especially preferable.

The invention described in Item 256 makes it possible to make optical parts for the first light flux and optical parts for the second light flux to be common each other and thereby to simplify the structure of the optical pickup device, because a conjugated length of the optical system composed of a light-converging element and an aberration correcting element can be made the same for the first light flux and the second light flux.

In general, with respect to an optical element, the shorter the working wavelength is, the more strict the accuracy required for the optical element is. As shown in the invention described in Item 257, it becomes easy to attain characteristics of the light-converging element that is required to have especially high accuracy, by optimizing the light-converging element for the first wavelength $\lambda 1$ and for thickness t1 of a protective layer.

When the first optical information recording medium and the second optical information recording medium are used on a compatible basis by actions of the phase structure, coma-aberration is easily generated by eccentricity between a light-converging element and an aberration correcting element in the direction perpendicular to the optical axis direction. As shown in the invention described in Item 258, generation of the aforementioned coma-aberration can be controlled by conducting tracking drive by integrating the light converging element and the aberration correcting element solidly, and excellent tracking characteristics can be obtained.

As a method for integrating the light-converging element and the aberration correcting element solidly, flange portions of respective elements may be cemented, or both elements may be integrated through a separate cementing member, or each element may be incorporated in a bobbin to be integrated solidly.

As aspherical aberration correcting means for using the first optical information recording medium and the third optical information recording medium on a compatible basis, it is possible to use a liquid crystal phase control means which controls a phase of the transmitted third light flux by impressing voltage on a liquid crystal layer, such as that described in the invention in Item 259. The liquid crystal phase control means of this kind is advantageous for downsizing of the optical pickup device, because no mechanically movable portion is needed.

Since the spherical aberration is increased in proportion to the fourth power of the effective diameter (namely, numerical aperture NA of the light-converging element), if the liquid crystal phase control element is used in common for both the first light flux with a large effective diameter and the third light flux with a small effective diameter, correction of spherical aberration for the third light flux becomes insufficient, which is a problem that is getting more and more obvious. "Used in common" mentioned here means actions to conduct phase control for each light flux having its own wavelength. For example, when adding spherical aberration of $\pm 0.2$ $\lambda$RMS ($\lambda = \lambda 1$) to the first light flux under the condition that the third wavelength $\lambda 3$ is 785 nm, numerical aperture NA of CD is 0.45, the first wavelength $\lambda 1$ is 405 nm and numerical aperture NA of a high density optical disc is 0.85, the spherical aberration which can be added to the third light flux is about $\pm 0.01$ $\lambda$RMS ($\lambda = \lambda 3$) ($= \pm 0.2 \times \{(0.45^4/785)/(0.85^4/405)\}$). Since the spherical aberration capable of being corrected by a liquid crystal phase control element is about $\pm 0.2$ $\lambda$RMS, when a liquid crystal phase element is used commonly for the first and third light fluxes, an amount of adding spherical aberration for the third light flux is insufficient, and compatibility between the first optical information recording medium and the third optical information recording medium is lost. It is therefore preferable to arrange the structure wherein only phase control for the third light flux is conducted selectively as shown in the invention in Item 260, and to add sufficient spherical aberration to the third light flux.

As aspherical aberration correcting means that conducts compatibility between the first optical information recording medium and the third optical information recording medium, a movable lens unit having a lens group that can be moved in the optical axis direction by an actuator described in the invention in Item 261 may also be used. Since the movable lens unit corrects spherical aberration caused by a difference between t1 and t3 by changing magnification of the light-converging element, there is no occurrence of coma caused by optical axis deviation from the light-converging element, and it is not necessary to drive tracking solidly with the light-converging element, which is advantageous.

A specific embodiment of this movable lens unit may include a coupling lens that converts an angle of divergence of a divergent light flux emitted from the third light source and guides it to a light-converging element, a collimator lens that converts a divergent light flux emitted from the third light source into a parallel light flux and guides it to a light-converging element, or a beam expander arranged in the optical path located between the coupling lens that converts an angle of divergence of a divergent light flux emitted from the third light source and guides it to a light-converging element and the light-converging element.

In particular, by arranging the aforementioned movable lens in the common optical path through which the first-third light fluxes pass, it is possible to correct wavelength dispersion caused by manufacturing errors for the first light source, refractive index changes and refractive index distribution of the light-converging element caused by temperature changes, focus jump between layers in recording/reproducing for multi-layer optical information recording media such as of 2-layer and 4-layer types and spherical aberration caused by thickness dispersion resulting from manufacturing errors for protective layers of the first optical information recording medium and from thickness distribution, thus, recording/reproducing characteristics for the first optical information recording medium can be improved.

As an actuator that moves the movable lens group stated above, a stepping motor, a solenoid, a voice coil actuator and an actuator employing a piezoelectric element can be used. Since a technology to move an optical element by a stepping motor or by a voice coil actuator in the optical axis direction is publicly known, detailed explanation therefor will be omitted here. Further, as an actuator employing a piezoelectric element, it is possible to use a small-sized linear actuator employing a piezoelectric element such as one described in the following document.

OPTICS DESIGN, No. 26, 16-21 (2002)

A lens group moved in the movable lens unit may either be one lens group or be of the structure wherein a plurality of lens groups are moved while housing therein a plurality of actuators. Or, it is also possible to arrange a structure wherein one lens group is moved by plural actuators each having a different response frequency range.

When using a movable lens unit having a lens group capable of being moved in the optical axis direction by an actuator, as aspherical aberration correcting means, it is possible to correct properly the spherical aberration caused by a difference between t1 and t3 by moving the movable lens group so that magnification m3 of the light-converging element for the third light flux λ may satisfy expression (177), as shown in the invention described in Item 261.

Although the optical pickup device of the invention can be applied also to the structure wherein three light sources each having a different wavelength are arranged separately, if there is used a light source wherein at least two light sources among three light sources are integrated solidly as shown in the invention in Item 263, it is advantageous for downsizing of the optical pickup device and for cost reduction. In particular, it is preferable to use a light source wherein all of three light sources are integrated solidly as shown in the invention in Item 264. As a light source wherein these plural light sources are integrated solidly, there may be used either a light source (so-called, one-chip laser) wherein emitting points of respective light sources are formed on one semiconductor chip or a light source (so-called, one-can laser) wherein each light source is housed in one casing. Or a light source module wherein a light source in which a plurality of light sources are integrated and a photodetector are further integrated solidly can also be used.

According to the present invention, an optical element for the optical pickup device by which the recording and/or reproducing of the information can be adequately conducted for a plurality of kinds of optical information recording media whose using wavelength is different, including the'high density optical disk and DVD using the blue violet laser light source, aberration correcting element for the optical pickup device, light converging element for the optical pickup device, objective optical system, optical pickup device, and optical information recording reproducing device, can be obtained.

Initially, the action of the superposition type diffractive structure in the present invention will be described by taking an example.

Figure 9:
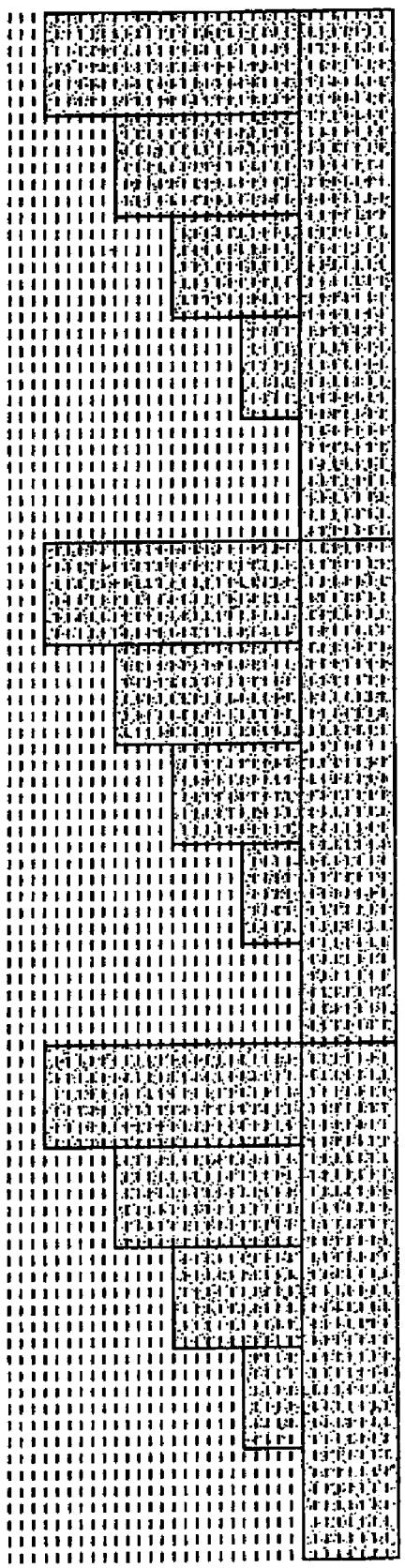
FIG. 9 is a view for explaining a principle of an action of a superposition type diffractive structure.
Figure 10:
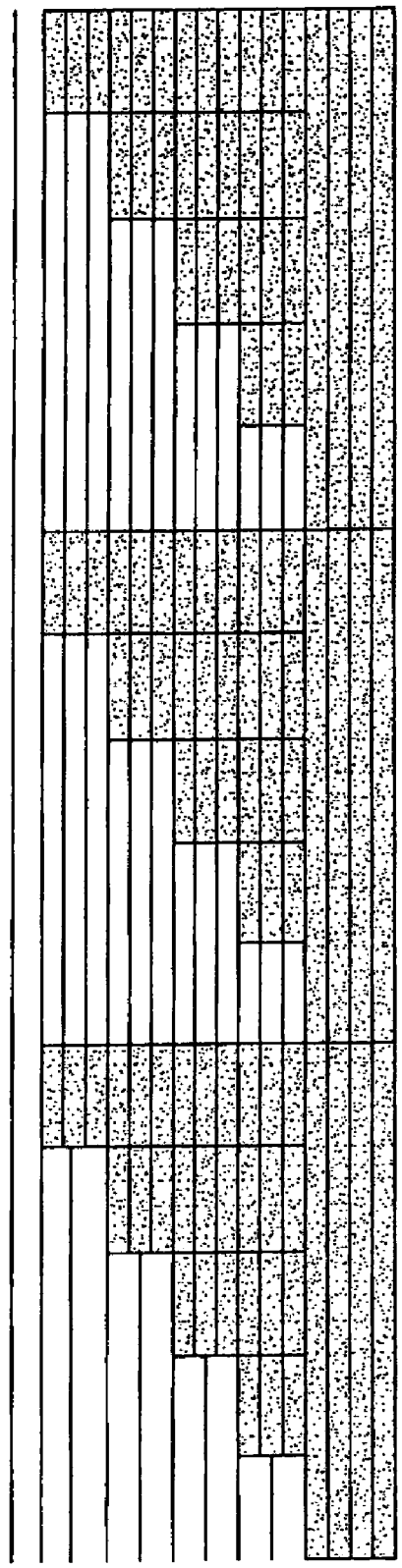
FIG. 10 is a view for explaining a principle of an action of a superposition type diffractive structure.
Figure 11:
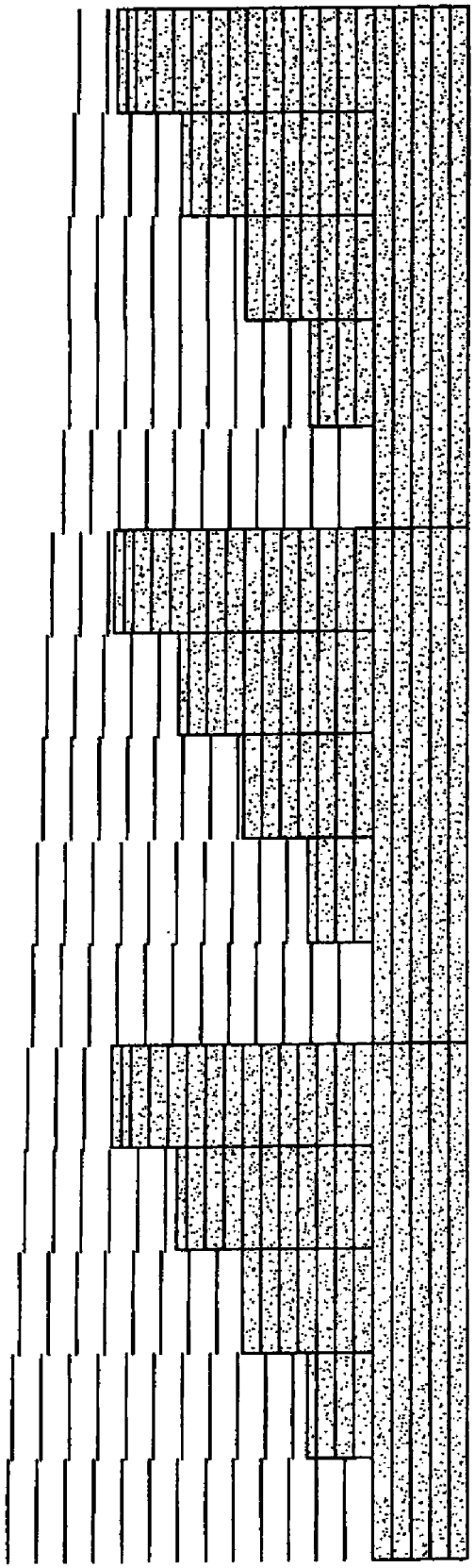
FIG. 11 is a view for explaining a principle of an action of a superposition type diffractive structure.

An example of the superposition type diffractive structure included in the optical element of the present invention is shown in FIGS. 9-11. In FIGS. 9-11, the superposition type diffractive structure has a structure in which the saw-toothed shape ring-shaped zone structure (diffraction relief surface) is divided like a plurality of steps, and in this example, each of adjoining steps is formed in such a manner that, in the shortest wavelength and the longest wavelength, the optical path difference is generated by integer times of each wavelength and the phase difference is not practically generated.

When the stepped section amount per one step is Δ, aimed-at wavelength is λ, and refractive index of the medium constituting the stepped section at this wavelength is n, because the optical path difference generated by this stepped section is expressed by Δ(n−1), when the stepped section amount Δ is determined so as to satisfy Δ(n−1)=jλ1, in this wavelength, the optical path difference is generated by j(integer)-times of the wavelength λ1. Further, when furthermore wavelength is λ3, integers j, k so as to satisfy jλ1≈kλ3 are selected, and the stepped section amount Δ is set so as to satisfy Δ(n−1)=jλ1=kλ3, by this stepped section, because the optical path difference is generated by j-times of wavelength for the wavelength λ1, and the optical path difference is generated by k-times of wavelength for the wavelength λ3, for these 2 wavelengths λ1 and λ3, the wave-fronts are practically uniform, and the phase difference is not generated.

For example, in the case where λ1=405 nm, λ3=785 nm, because, when j=2, K=1 are selected (that is, stepped section amount Δ=2×405/(n−1)), 2×405≈1×785, in this stepped section, in the wavelength λ1=405 nm, the optical path difference for 2 wavelengths is generated as shown in FIG. 9, and in λ3=785 nm, the optical path difference for about one wavelength is generated as shown in FIG. 10. In the structure in which a plurality of such stepped sections are collected, as for wavelengths of λ1 and λ3, because phases are uniform, no action is generated on the transmission light.

However, as for the light of the wavelength λ2=655 nm which is different from λ1 and λ3, because the optical path difference of δ=2×405(1.5066−1)/(1.5247−1)−655=127 nm is generated per one stepped section, (herein, 1.5247 is, as will be described later, a refractive index of the optical element raw material to the wavelength λ1, and 1.5066 is a refractive index of the optical element raw material to the wavelength λ2), and when the relief structure of almost sawtoothed shape of one pitch is divided by 4 stepped sections (that is, one pitch is divided by 5), the optical path difference for one wavelength of the wavelength λ2 is generated (127× 5=635 1×655), and as shown in FIG. 11, the wave-fronts of adjoining pitches are overlapped by respectively shifting by 1 wavelength. That is, +1-degree diffracted light ray is generated.

As shown in FIG. 11, wave-fronts of adjoining pitches are overlapped by respectively shifting by 1 wavelength. That is, +1-degree diffracted light ray is generated.

The m-degree diffraction efficiency by this superposition type diffractive structure is expressed by the following expressions (arith-3 and arith-4) when the number of discontinuous stepped sections included in one pitch is N, height of the stepped section per one step is Δ, wavelength is λ, and refractive index of the optical element raw material is n.

$$\eta m = \left[ \frac{\sin\{\pi(m-\phi)\}}{\pi m} \frac{\sin(\pi m/(N+1))}{\sin\{\pi(m-\phi)/(N+1)\}} \right]^2 \quad \text{(Arith-3)}$$

$$\phi = \frac{\Delta(n-1)(N+1)}{\lambda} \quad \text{(Arith-4)}$$

When calculation is conducted for the above example, for $\lambda 1$, $\lambda 3$, they are not diffracted, that is, 0-degree diffracted light ray is generated, and their diffraction efficiencies are respectively 100%, 99.6%, and for $\lambda 2$, the diffraction efficiency of +1-degree diffracted light ray is 87.2%.

Hereupon, in the above calculation, as an optical element raw material, a plastic material in which the refractive index nd on d-line is 1.5091, and Abbe's number νd is 56.5, is assumed, and the refractive index of the optical element raw material to $\lambda 1$, is 1.5247, refractive index of the optical element raw material to $\lambda 2$, is 1.5066, and refractive index of the optical element raw material to $\lambda 3$, is 1.5050.

As can be seen from this expression, when the number of stepped sections is increased, only left fractional expression in [ ] is remained, and right one gradually approaches 1, and the expression by which the diffraction efficiency of normal saw-toothed diffraction element is given, can be obtained. When N takes a finite value, various actions are conducted. As this action, in the case where $\lambda 1$=405 nm, $\lambda 2$=650 nm, and $\lambda 3$=785 nm, the above example is included, and other than that, combinations as shown in following tables (Table 1-Table 8) are considered.

In Tables, as $\phi$, the optical path difference of the superposition type diffractive structure for 1 pitch structured by stepped sections of N steps as given by (Arith-4) is expressed in a wavelength unit, inversely, the stepped section amount $\Delta(N+1)$ is given by using this $\phi$, as $\Delta(N+1)=\phi\lambda/(n-1)$. $\phi$ in each wavelength is different by the wavelength because the stepped section amount $\Delta(N+1)$ is the same. Further, m is the diffraction order in which the diffraction efficiency is maximum, and the diffraction efficiency at that time is ηm.

Hereupon, the calculation herein is assumed as the optical element raw material, the above plastic material.

TABLE 1

Number of stepped sections N = 3
Stepped section amount for 1 pitch $\Delta$ (N + 1) = 4.63 μm

|  | $\phi$ | Diffraction order m | Diffraction efficiency ηm |
|---|---|---|---|
| $\lambda 1$ | 8.00 | 0 | 100% |
| $\lambda 2$ | 4.77 | +1 | 69.1% |
| $\lambda 3$ | 3.97 | 0 | 99.8% |

TABLE 2

Number of stepped sections N = 4
Stepped section amount for 1 pitch $\Delta$ (N + 1) = 6.18 μm

|  | $\phi$ | Diffraction order m | Diffraction efficiency ηm |
|---|---|---|---|
| $\lambda 1$ | 10.0 | 0 | 100% |
| $\lambda 2$ | 5.97 | +1 | 87.2% |
| $\lambda 3$ | 4.97 | 0 | 99.6% |

TABLE 3

Number of stepped sections N = 5
Stepped section amount for 1 pitch $\Delta$ (N + 1) = 7.72 μm

|  | $\phi$ | Diffraction order m | Diffraction efficiency ηm |
|---|---|---|---|
| $\lambda 1$ | 12.0 | 0 | 100% |
| $\lambda 2$ | 7.16 | +1 | 83.7% |
| $\lambda 3$ | 5.96 | 0 | 99.5% |

TABLE 4

Number of stepped sections N = 6
Stepped section amount for 1 pitch $\Delta$ (N + 1) = 9.26 μm

|  | $\phi$ | Diffraction order m | Diffraction efficiency ηm |
|---|---|---|---|
| $\lambda 1$ | 14.0 | 0 | 100% |
| $\lambda 2$ | 8.36 | +1 | 60.9% |
| $\lambda 3$ | 6.95 | 0 | 99.2% |

TABLE 5

Number of stepped sections N = 8
Stepped section amount for 1 pitch $\Delta$ (N + 1) = 12.35 μm

|  | $\phi$ | Diffraction order m | Diffraction efficiency ηm |
|---|---|---|---|
| $\lambda 1$ | 18.0 | 0 | 100% |
| $\lambda 2$ | 10.74 | +2 | 68.2% |
| $\lambda 3$ | 8.94 | 0 | 98.7% |

TABLE 6

Number of stepped sections N = 9
Stepped section amount for 1 pitch $\Delta$ (N + 1) = 13.89 μm

|  | $\phi$ | Diffraction order m | Diffraction efficiency ηm |
|---|---|---|---|
| $\lambda 1$ | 20.0 | 0 | 100% |
| $\lambda 2$ | 11.94 | +2 | 86.4% |
| $\lambda 3$ | 9.93 | 0 | 98.4% |

TABLE 7

Number of stepped sections N = 10
Stepped section amount for 1 pitch $\Delta$ (N + 1) = 15.44 μm

|  | $\phi$ | Diffraction order m | Diffraction efficiency ηm |
|---|---|---|---|
| $\lambda 1$ | 22.0 | 0 | 100% |
| $\lambda 2$ | 13.13 | +2 | 84.7% |
| $\lambda 3$ | 10.92 | 0 | 98.1% |

TABLE 8

Number of stepped sections N = 11
Stepped section amount for 1 pitch $\Delta$ (N + 1) = 16.98 μm

|  | $\phi$ | Diffraction order m | Diffraction efficiency ηm |
|---|---|---|---|
| $\lambda 1$ | 24.0 | 0 | 100% |
| $\lambda 2$ | 14.32 | +2 | 63.7% |
| $\lambda 3$ | 11.92 | 0 | 97.8% |

As described above, when the stepped section amount $\Delta$, and number of stepped sections N are adequately set, because only one of 3 wavelengths can be selectively diffracted, and the other wavelengths are not diffracted, and can be transmitted as they are, when arrangement of each ring-shaped zone of the superposition type diffractive structure is adequately set, while the spherical aberration generated due to the difference of the protective layer thickness among 3 kinds of optical disks of high density optical disk, DVD, and CD is corrected, the high transmission factor (diffraction efficiency) can be secured for all of 3 wavelengths.

Further, the superposition type diffractive structure of the present invention can defer the diffraction order of 3 wavelengths or make the diffraction efficiency extremely small to a specific wavelength, and make it a flare, and make it not contribute to light-converging, other than the action by which, as described above, only one of 3 wavelengths is selectively diffracted, and other wavelengths are made transmitted as they are.

For example, as shown in Table 9-Table 10, when the stepped section amount Δ, the number of stepped sections N are set, because the diffraction orders of 3 wavelengths can be deferred, the degree of freedom of the optical design work can be increased.

TABLE 9

Number of stepped sections N = 10
Stepped section amount for 1 pitch Δ (N + 1) = 14.03 μm

|  | φ | Diffraction order m | Diffraction efficiency ηm |
|---|---|---|---|
| λ1 | 20.0 | −2 | 89.6% |
| λ2 | 11.94 | +1 | 96.1% |
| λ3 | 9.93 | −1 | 95.8% |

TABLE 10

Number of stepped sections N = 11
Stepped section amount for 1 pitch Δ (N + 1) = 15.57 μm

|  | φ | Diffraction order m | Diffraction efficiency ηm |
|---|---|---|---|
| λ1 | 22.0 | −2 | 91.2% |
| λ2 | 13.13 | +1 | 92.4% |
| λ3 | 10.92 | −1 | 95.9% |

Further, as shown in Table 11-Table 14, when the stepped section amount Δ, number of stepped sections N are set, the diffraction efficiency can be made extremely small to a specific wavelength, and it can be made not so as to contribute to the light-converging by making it flare.

TABLE 11

Number of stepped sections N = 3
Stepped section amount for 1 pitch Δ (N + 1) = 11.58 μm

|  | φ | Diffraction order m | Diffraction efficiency ηm |
|---|---|---|---|
| λ1 | 20.0 | 0 | 100% |
| λ2 | 11.94 | 0 | 98.8% |
| λ3 | 9.93 | ±2 | 39.9% |

TABLE 12

Number of stepped sections N = 7
Stepped section amount for 1 pitch Δ (N + 1) = 10.13 μm

|  | φ | Diffraction order m | Diffraction efficiency ηm |
|---|---|---|---|
| λ1 | 15.0 | −1 | 95.6% |
| λ2 | 8.95 | +1 | 94.3% |
| λ3 | 7.45 | +2 | 47.1% |

TABLE 13

Number of stepped sections N = 4
Stepped section amount for 1 pitch Δ (N + 1) = 9.26 μm

|  | φ | Diffraction order m | Diffraction efficiency ηm |
|---|---|---|---|
| λ1 | 15.0 | 0 | 100% |
| λ2 | 8.95 | −1 | 86.9% |
| λ3 | 7.45 | +2 | 28.9% |

TABLE 14

Number of stepped sections N = 5
Stepped section amount for 1 pitch Δ (N + 1) = 3.86 μm

|  | φ | Diffraction order m | Diffraction efficiency ηm |
|---|---|---|---|
| λ1 | 6.0 | 0 | 100% |
| λ2 | 3.58 | −2 | 37.6% |
| λ3 | 2.98 | ±3 | 40.5% |

In Tables 11-13, to the wavelength λ1 and wavelength λ2, the high transmission factors not smaller than 85% are secured, and to the wavelength λ3, the diffraction efficiency is extremely lowered and is not larger than 50%. Further, in Table 14, to the wavelength λ1, the high transmission factor (diffraction efficiency) of 100% is secured, and to the wavelength λ2 and wavelength λ3, the diffraction efficiency is extremely lowered, and is not larger than 50%. When such a superposition type diffractive structure is applied to the objective optical system which can be commonly used for DVD and CD, a role of a dichroic filter by which a specific wavelength is cut off and other wavelengths are transmitted, can be burdened.

For example, in the case where the numerical apertures of the high density optical disk, DVD and CD are different form each other, when one optical function surface of the objective optical system is divided into 3 optical function areas of the first optical function area corresponding to within NA of CD (for example, within NA 0.45), the second optical function area corresponding to from NA of CD to NA of DVD (for example, NA 0.45-NA 0.60), and the third optical function area corresponding to from NA of DVD to NA of the high density optical disk (for example, NA 0.60-NA 0.85), and the superposition type diffractive structure in Tables 11-13 is formed in the second optical function area, only the wavelength of λ3 can be cut off.

Further, when the superposition type diffractive structure in Table 14 is formed in the third optical function area, the wavelength of λ2 and wavelength of λ3 can be cut off. In this manner, when the superposition type diffractive structure in Tables 11-14 is formed in a specific optical function area, the simple-structured objective optical system which does not require the aperture limit element of separated member, can be realized.

Hereupon, the structure in above Tables 1-14, is an example of a part of the superposition type diffractive structure optimum for the optical element raw material whose using wavelengths λ1, λ2, λ3 are respectively 405 nm, 655 nm, 785 nm, and whose refractive indexes to λ1, λ2, λ3 are respectively 1.5247, 1.5066, 1.5050, and for the case where the wavelengths or optical element raw material, different from them, are used, it is not necessarily the optimum structure. That is, the superposition type diffractive structure in the present invention is not limited to only the structure in Tables 1-14, but various changes are possible corresponding to using wavelength or the characteristic of the optical element material.

Next, referring to drawings, the best mode to conduct the present invention will be described.

The First Embodiment

Figure 1:
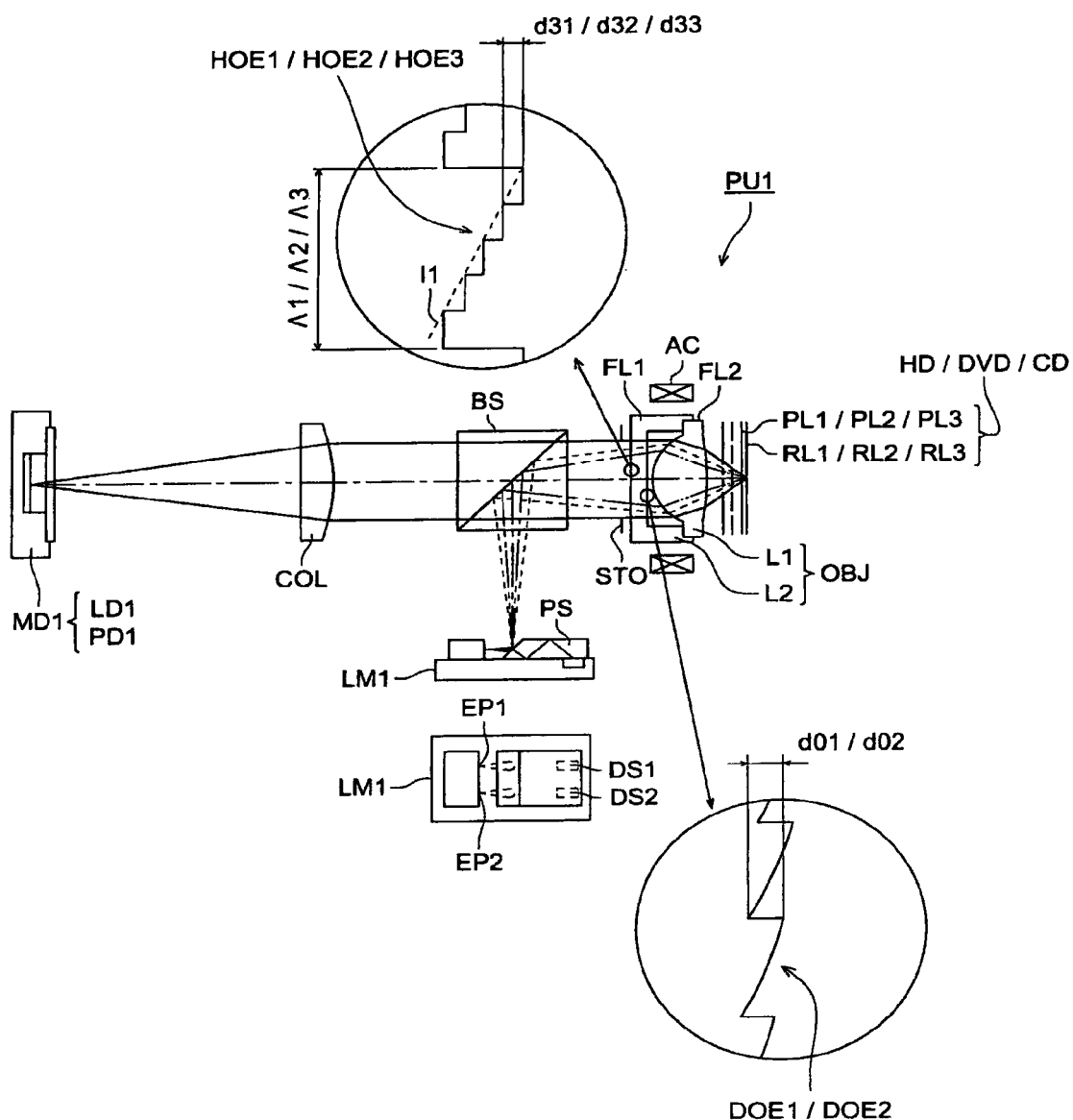
FIG. 1 is a plan view of a main portion showing a structure of an optical pickup device.

FIG. 1 is a view generally showing the structure of the first optical pickup device PU1 by which the recording/reproducing of the information can be adequately conducted also for any one of the high density optical disk HD, DVD, and CD. The optical specification of the high density optical disk HD is, the wavelength $\lambda 1=408$ nm, thickness t1 of protective layer PL1=0.0875 mm, numerical aperture NA1=0.85, the optical specification of DVD is, the wavelength $\lambda 2=685$ nm, thickness t2 of protective layer PL2=0.6 mm, numerical aperture NA2=0.60, and the optical specification of CD is, the wavelength $\lambda 3=785$ nm, thickness t3 of protective layer PL3=1.2 mm, and numerical aperture NA3=0.45. However, a combination of the wavelength, thickness of the protective layer, and numerical aperture, is not limited to this.

The optical pickup device PU1 is structured by: an objective optical system OBJ structured by: a module MD1 for the high density optical disk HD in which the blue violet semiconductor laser LD1 which is made to emit light when the recording/reproducing of the information is conducted for the high density optical disk HD, and which projects the laser light flux of 408 nm, with the optical detector PD1 are integrated; the first light emitting point EP1 which is made to emit light when the recording/reproducing of the information is conducted for DVD, and which projects the laser light of 658 nm; the second light emitting point EP2 which is made to emit light when the recording/reproducing of the information is conducted for CD, and which projects the laser light of 785 nm; the first light receiving section DS1 which light-receives the reflected light flux from the information recording surface RL2 of DVD; the second light receiving section DS2 which light-receives the reflected light flux from the information recording surface RL3 of CD; a laser module LM1 for DVD/CD structured by a prism PS; an aberration correcting element L1; a light converging element L2 which has a function by which the laser light fluxes transmitted this aberration correcting element L1, are light converged on the information recording surfaces RL1, RL2, RL3, and whose both surfaces are aspherical surfaces; 2-axes actuator AC; a stop STO corresponding to numerical aperture NA 0.85 of the high density optical disk HD; a polarized beam splitter BS; and a collimator lens COL.

Hereupon, as a light source for the high density optical disk HD, other than the above-described blue violet semiconductor laser LD1, a blue violet SHG laser can also be used.

In the optical pickup device PU1, when the recording/reproducing of the information is conducted for the high density optical disk, as its ray of light path is drawn by solid line in FIG. 1, a module MD1 for the high density optical disk HD is actuated and the blue violet semiconductor laser LD1 is made to emit light. The divergent light flux projected from the blue violet semiconductor laser LD1 is made almost parallel light flux through the collimator lens COL, and after it transmits the polarized beam splitter BS, its light flux diameter is regulated by a stop STO, and it becomes a spot formed on the information recording surface RL1 through the protective layer PL1 of the high density optical disk HD by the objective optical system OBJ. The objective optical system OBJ conducts the focusing or tracking by the 2-axes actuator AC arranged in its periphery. The reflected light flux modulated by the information pit on the information recording surface RL1 becomes a converging light flux, after passing again the objective optical system OBJ, stop STO, polarized beam splitter BS, and collimator lens COL, and is converged on the light receiving surface of the light detector PD1 of the module MD1 for the high density optical disk HD. Then, by using the output signal of the light detector PD1, the information recorded in the high density optical disk HD can be read.

Further, in the optical pickup device PU1, in the case where the recording/reproducing of the information is conducted for DVD, the first light emitting point EP1 is made to emit light. The divergent light flux projected from the first light emitting point EP1, as its ray of light path is drawn by a wave line in FIG. 1, is reflected by the prism PS, and after it is reflected by the polarized beam splitter BS, it becomes a spot formed on the information recording surface RL2 through the protective layer PL2 of DVD by the objective optical system OBJ. The objective optical system OBJ conducts the focusing or tracking by the 2-axes actuator AC arranged in its periphery. The reflected light flux modulated by the information pit on the information recording surface RL2, transmits again the objective optical system OBJ, and after it is reflected by the polarized beam splitter BS, it is reflected by 2 times inside the prism PS and is light converged in the light receiving section DS1. Then, by using the output signal of the light receiving section DS1, the information recorded in DVD can be read.

Further, in the optical pickup device PU1, in the case where the recording/reproducing of the information is conducted for CD, the second light emitting point EP2 is made to emit light. The divergent-light flux projected from the second light emitting point EP2, as its ray of light path is drawn by a two-dot chain line in FIG. 1, is reflected by the prism PS, and after it is reflected by the polarized beam splitter BS, it becomes a spot formed on the information recording surface RL1 through the protective layer PL1 of CD by the objective optical system OBJ. The objective optical system OBJ conducts the focusing or tracking by the 2-axes actuator arranged in its periphery. The reflected light flux modulated by the information pit on the information recording surface RL1, transmits again the objective optical system OBJ, and after it is reflected by the polarized beam splitter BS, it is reflected by 2 times inside the prism PS and is light converged in the light receiving section DS2. Then, by using the output signal of the light receiving section DS2, the information recorded in CD can be read.

Next, a structure of the objective optical system will be described. The aberration correcting element L1 is a plastic lens, in which the refractive index nd on d-line is 1.5091, and Abbe's number vd is 56.5, and the refractive index to $\lambda 1$ is 1.5242, and the refractive index to $\lambda 3$ is 1.5050. Further, the light converging element L2 is a plastic lens, in which the refractive index nd on d-line is 1.5435, and Abbe's number vd is 56.3. Further, in the periphery of respective optical function sections (areas of the aberration correcting element L1 and light converging element L2 through which the laser light flux from the blue violet semiconductor laser LD1 passes), flange sections FL1, FL2 integrally molded with the optical function section are provided, and when both of a part of such flange sections FL1, FL2 are mutually connected together, they are integrated.

Hereupon, when the aberration correcting element L1 and light converging element L2 are integrated, both may also be integrated through a connection member of separated member.

Figure 2:
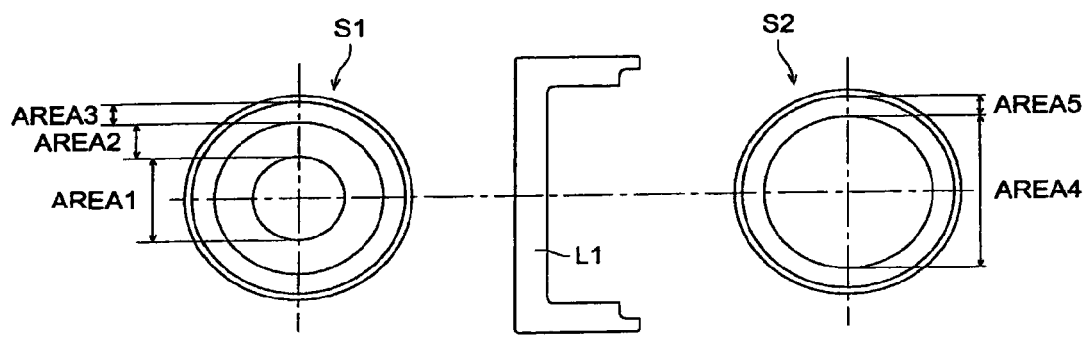
FIGS. 2(a) to 2(c) each is a view showing a structure of a superposition type diffraction optical element.

The optical function surface S1 on the semiconductor laser light source side of the aberration correcting element L1 is, as shown in FIG. 2, divided into the first optical function area AREA 1 including the optical axis corresponding to an area of the numerical aperture 0.45 of CD, the second optical function area AREA 2 corresponding to an area from the numerical aperture 0.45 of CD to the numerical aperture 0.60 of DVD, and the third optical function area AREA 3 corresponding to an area from the numerical aperture 0.60 of DVD to the numerical aperture 0.85 of the high density optical disk HD, and the superposition type diffractive structures HOE1, HOE2, HOE3, which are structures in which a plurality of ring-shaped zones inside of which the step structure is formed, are arranged around the optical axis, are respectively formed in the first optical function area AREA 1, second optical function area AREA 2, and third optical function area AREA 3.

In the superposition type diffractive structure HOE1 formed in the first optical function area AREA 1, the depth d31 of the step structure formed in each ring-shaped zone is set to a value calculated by d31=2 $\lambda1/(n-1)$ (μm), and the number of stepped sections N is set to 4. However, $\lambda1$ is a wavelength in which the wavelength of the laser light flux projected from the blue violet semiconductor laser LD1 is expressed in micron unit, (herein, $\lambda1$=0.408 μm), and n is a refractive index of the aberration correcting element L1 to the wavelength $\lambda1$. On the step structure in which the depth in the optical axis direction is set in such a manner, when the laser light flux of the wavelength $\lambda1$ enters, between adjoining step structures, the optical path difference of 2×$\lambda1$ (μm) is generated, and because, to the laser light flux of the wavelength $\lambda1$, the phase difference is not practically given, it passes as it is. Hereupon, in the following description, the light flux to which the phase difference is not practically given by the superposition type diffractive structure and which passes as it is, is called as the 0-degree diffracted light ray.

Further, on this step structure, the laser light flux of the wavelength $\lambda3$ (herein, $\lambda3$=0.785 μm) from the second light emitting point EP2 enters, between adjoining step structures, the optical path difference of (2×$\lambda1/\lambda3$)×$\lambda3$ (μm) is generated. Because $\lambda3$ is about 2 times of $\lambda1$, between adjoining step structures, the optical path difference of about 1×$\lambda3$ (μm) is generated, and because also to the laser light flux of the wavelength $\lambda3$, in the same manner as the laser light flux of the wavelength $\lambda1$, the optical path difference is not practically given, it is not diffracted, and passes as it is (0-degree diffracted light ray).

On the one hand, when the laser flux of the wavelength $\lambda2$ (herein, $\lambda2$=0.658 μm) from the second light emitting point EP2 enters into this step structure, because the number of stepped sections N in each ring-shaped zone is set to 4, to the light flux of wavelength $\lambda2$, the phase difference is given corresponding to an incident portion of the superposition type diffractive structure HOE1 and it is diffracted in +1-degree direction (+1-degree diffracted light ray). The diffraction efficiency of +1-degree diffracted light ray of the laser light flux of wavelength $\lambda2$ in this case, is 87.5%, and it is sufficient light amount for the recording/reproducing of the information for DVD.

The width $\Lambda1$ of each ring-shaped zone of the superposition type diffractive structure HOE1, and the inclination direction (in FIG. 1, the inclination direction of envelope 11 of each step structure) of each ring-shaped zone are set in such a manner that, because, when the laser light flux of wavelength $\lambda2$ enters, the spherical aberration in the over correction direction is added to +1-degree diffracted light ray by the diffraction action. The magnification m3 to the wavelength $\lambda3$ of the objective optical system OBJ is determined so that the spherical aberration due to the difference of thickness between the protective layer PL1 of the high density optical disk HD and the protective layer PL3 of CD is corrected, therefore, as the present embodiment, when the magnification m2 to the wavelength $\lambda2$ and the magnification m3 to the wavelength $\lambda3$ are almost the same, the spherical aberration due to the difference of thickness between the protective layer PL1 of the high density optical disk HD and the protective layer PL2 of DVD is too over-corrected, and the spherical aberration of laser light flux of wavelength $\lambda2$ transmitted the objective optical system OBJ and the protective layer PL2 of DVD is under-correction direction.

Herein, the width $\Lambda1$ of each ring-shaped zone off the superposition type diffractive structure HOE1, and the inclination direction of each ring-shaped zone are set so that, when the laser light flux of wavelength $\lambda2$ enters into the superposition type diffractive structure HOE1, the spherical aberration amount of the over-correction direction which is added to the +1-degree diffracted light ray by the diffraction action, and the spherical aberration of the under-correction direction generated due to a case where the magnification m2 to the wavelength $\lambda2$ and the magnification m3 to the wavelength $\lambda3$ are made almost the same, are cancelled each other. Hereby, the laser light flux of wavelength $\lambda2$ which transmits the superposition type diffractive structure HOE1 and the protective layer PL2 of DVD, forms a good spot on the information recording surface RL2 of DVD.

Further, in the superposition type diffractive structure HOE2 formed in the second optical function area AREA 2, the depth d32 of the step structure formed in each ring-shaped zone is set to a value calculated by d32=3 $\lambda1/(n-1)$ (μm), and the stepped section number N in each ring-shaped zone is set to 4.

When the laser light flux of wavelength $\lambda1$ enters into the step structure in which the depth of the optical axis direction is set in this manner, the optical path difference of 3×$\lambda1$ (μm) is generated between adjoining step structures, and to the laser light flux of wavelength $\lambda1$, because the phase difference is not practically given, it is not diffracted and passes as it is (0-degree diffracted light ray).

Further, when the laser light flux of wavelength $\lambda2$ from the first light emitting point EP1 enters into this step structure, because the stepped section number N in each ring-shaped zone is set to 4, to the laser light flux of wavelength $\lambda2$, the phase difference is given corresponding to a part of the superposition type diffractive structure HOE2 on which the light flux enters, and it is diffracted to −1-degree direction (−1-degree diffracted light ray). The diffraction efficiency of −1-order diffracted light ray of the laser light flux of wavelength $\lambda2$ at this time, is 87.5%, and it is a sufficient light amount for the recording/reproducing of the information for DVD.

Herein, the width $\Lambda2$ of each ring-shaped zone of the superposition type diffractive structure HOE2, and the inclination direction of each ring-shaped zone are set so that when the laser light flux of wavelength $\lambda2$ enters into the superposition type diffractive structure HOE2, the spherical aberration of the over correction direction added to −1-degree diffracted light ray by the diffraction action, and the spherical aberration of under correction direction generated due to a case where the magnification m2 to wavelength $\lambda2$ and the magnification m3 to wavelength $\lambda3$ are made almost the same, are cancelled each other. Hereby, the laser light flux of wavelength $\lambda2$ which transmits the superposition type diffractive structure HOE2 and the protective layer PL2 of DVD, forms a good spot on the information recording surface RL2 of DVD.

On the one hand, when the laser light flux of wavelength $\lambda3$ from the second light emitting point EP2 enters into this step structure, the phase difference is given to the laser light flux of the wavelength λ3 corresponding to a part of the superposition type diffractive structure HOE2 on which the light flux enters, and it is diffracted in −2-degree direction (−2-degree diffracted light ray). In this case, the diffraction efficiency of −2-degree diffracted light ray of the laser light flux of wavelength λ3, is 24.9% and extremely low.

Hereupon, when the laser light flux of wavelength λ3 enters into the superposition type diffractive structure HOE2, other than the above −2-degree diffracted light ray, +2-degree diffracted light ray and +3-degree diffracted light ray are also generated, however, their diffraction efficiencies are respectively 23.1%, 11.1%, and lower than the diffraction efficiency of −2-degree diffracted light ray.

In the above description, to correct the spherical aberration of the above under correction direction generated due to a case where the magnification m2 to the wavelength λ2 and the magnification m3 to the wavelength λ3 are made almost the same, the superposition type diffractive structures HOE1 and HOE2 are made structures which generate the spherical aberration of over correction direction when the laser light flux of the wavelength λ2 enters, however, structures in which the diffraction powers of superposition type diffractive structure HOE1 and HOE2 are set so as to be positive, and when the laser light flux of wavelength λ2 enters, the divergent degree of the laser light flux of wavelength λ2 is made small, and it is projected, may also be formed.

In this case, in the laser light fluxes of wavelength λ2 incident on the superposition type diffractive structures HOE1 and HOE2, the divergent degree becomes small, and they are projected. Because, for the light converging element L2, this corresponds to a case where the magnification is increased, to the laser light flux of wavelength λ2 incident on the light converging element L2, by this magnification change, the spherical aberration of the over correction direction is added. The widths Λ1, Λ2 between respective of ring-shaped zones of superposition type diffractive structures HOE1 and HOE2, and the inclination direction of each ring-shaped zone are determined so that the spherical aberration of this over correction direction, and the spherical aberration of the under correction direction generated due to a case where the magnification m2 to the wavelength λ2 and the magnification m3 to the wavelength λ3 are made almost the same, are cancelled.

Further, in the superposition type diffractive structure HOE23 formed in the third optical function area AREA 3, the depth d33 of the step structure formed in each ring-shaped zone is set to a value calculated by d33=1 λ1/(n−1) (μm), and the stepped section number N in each ring-shaped zone is set to 5.

When the laser light flux of wavelength λ1 enters into the step structure whose depth in the optical axis direction is set in this manner, the optical path difference of 1×λ1 (μm) is generated between adjoining step structures, and because the phase difference is not practically given to the laser light flux of wavelength λ1, it is not diffracted, and passes as it is (0-degree diffracted light ray).

On the one hand, when the laser light flux of wavelength λ2 from the first light emitting point EP1 enters into this step structure, to the laser light flux of wavelength λ2, the phase difference is given corresponding to a part of the superposition type diffractive structure HOE3 on which the light flux enters, and it is diffracted in −2-degree direction (−2-degree diffracted light ray). The diffraction efficiency of −2-degree diffracted light ray of the laser light flux of wavelength λ2 in this time is 39.1% and extremely low. Hereupon, when the laser light flux of wavelength λ2 enters into the superposition type diffractive structure HOE3, other than the above −2-degree diffracted light ray, ±3-degree diffracted light ray is also generated, however, this diffraction efficiency is 11.0%, and is further lower than the diffraction efficiency of the −2-degree diffracted light ray. That is, because the superposition type diffractive structure HOE3 actuates the same work as a dichroic filter by which the laser light flux of wavelength λ2 is selectively cut off, in the first optical pickup device PU1, it is not necessary that the aperture limit element to DVD is mounted separately, and the simple structure can be structured.

Further, when the laser light flux of wavelength λ3 from the second light emitting point EP2 enters into this step structure, to the laser light flux of wavelength λ3, the phase difference is given corresponding to a part of the superposition type diffractive structure HOE3 on which the light flux enters, and it is diffracted in ±3-degree direction (±3-degree diffracted light ray). The diffraction efficiency of ±3-degree diffracted light ray of the laser light flux of wavelength λ3 in this time is 40.5% and extremely low. That is, the above-described superposition type diffractive structure HOE2 and the superposition type diffractive structure HOE3 actuate the same work as a dichroic filter by which the laser light flux of wavelength λ3 is selectively cut off, in the first optical pickup device PU1, it is not necessary that the aperture limit element to CD is mounted separately, and the simple structure can be structured.

Further, the optical function surface S2 on the optical disk side of the aberration correcting element L1 is, as shown in FIG. 2, divided into the fourth optical function area AREA 4 including the optical axis corresponding to an area in numerical aperture 0.60 of DVD, and the fifth optical function area AREA 5 corresponding to an area from the numerical aperture 0.60 to the numerical aperture 0.85 of the high density optical disk HD, and the diffractive structures DOE1, DOE2 structured by a plurality of ring-shaped zones including the optical axis, whose sectional shape is the saw-toothed shape, are respectively formed in the optical function area AREA 4 and the optical function area AREA 5.

The diffractive structures DOE1, DOE2 are structures for suppressing the chromatic aberration of the objective optical system OBJ in the blue violet area, and the spherical aberration change following the incident wavelength change.

In the diffractive structure DOE1, the height d01 of the stepped section closest to the optical axis is designed so that the diffraction efficiency is 100% to the light flux of wavelength 390 nm (the refractive index of the aberration correcting element L1 to the wavelength 390 nm, is 1.5273), and satisfies the above-described expression (16). Because, on the diffractive structure DOE1 in which a depth of the stepped section is set in this manner, when the laser light flux of wavelength λ1 enters, +2-degree diffracted light ray is generated in the diffraction efficiency of 96.8%, when the laser light flux of wavelength λ2 enters into it, +1-degree diffracted light ray is generated in the diffraction efficiency of 93.9%, and when the laser light of wavelength λ3 enters into it, +1-degree diffracted light ray is generated in the diffraction efficiency of 99.2%, in any wavelength area, the sufficient diffraction efficiency can be obtained, and even when the chromatic aberration is corrected in the blue violet area, the chromatic aberration correction in the wavelength areas of the wavelength λ2 and wavelength λ3 is not too surplus.

On the one hand, because the diffractive structure DOE2 is optimized for the wavelength λ1, when the laser light flux of the wavelength λ1 enters into the diffractive structure DOE2, +2-degree diffraction light is generated in the diffraction efficiency of 100%.

Further, the diffractive structures DOE1, DOE2 has the wavelength dependency of the spherical aberration in which, in the blue, violet area, when the wavelength of incident light flux is increased, the spherical aberration changes in the under correction direction, and when the wavelength of the incident light flux is reduced, the spherical aberration changes in the over correction direction. Hereby, because the spherical aberration change generated in the light converging element following the incident wavelength change is cancelled, the regulation for the oscillation wavelength of the blue violet semiconductor laser LD1 can be softened.

In the aberration correcting element L1 of the present embodiment, a structure in which the superposition type diffractive structure is formed on the optical function surface S1 on the semiconductor laser light source, and type diffractive structure is formed on the optical function surface S2 on the optical disk side, is applied, in contrast to this, a structure in which the type diffractive structure is formed on the optical function surface S1 on the semiconductor laser light source side, and the superposition type diffractive structure is formed on the optical function surface S2 on the optical disk side, may also be applied.

The Second Embodiment

Figure 3:
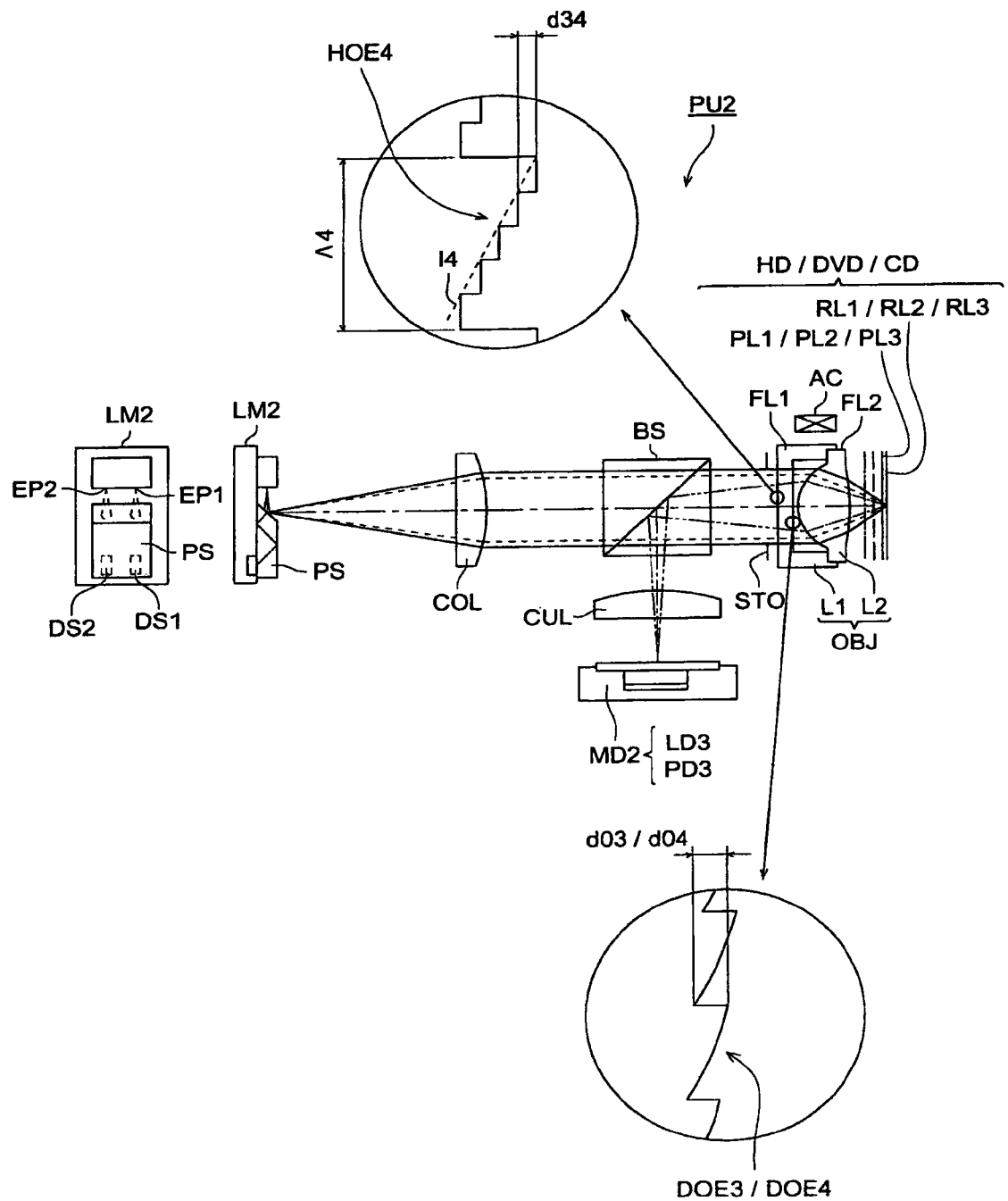
FIG. 3 is a plan view of a main portion showing a structure of an optical pickup device.

FIG. 3 is a view generally showing a structure of the second optical pickup device PU2 by which the recording/reproducing of the information can be adequately conducted for any one of the high density optical disk HD, DVD and CD. The optical specification of the high density optical disk is the wavelength $\lambda 1=408$ nm, the thickness t1 of the protective layer PL1=0.0875 mm, numerical aperture NA1=0.85, the optical specification of DVD is the wavelength $\lambda 2=658$ nm, the thickness t2 of the protective layer PL2=0.6 mm, numerical aperture NA2=0.67, and the optical specification of CD is the wavelength $\lambda 3=785$ nm, the thickness t3 of the protective layer PL3=1.2 mm, numerical aperture NA3=0.45. However, a combination of the wavelength, thickness of the protective layer, and numerical aperture is not limited to this.

The optical pickup device PU2 is structured by: a laser module LM2 for the high density optical disk HD/DVD structured by the first light emitting point EP1 which is made to emit light when the recording/reproducing of the information is conducted for the high density optical disk HD, and which projects the laser light flux of 408 nm, the second light emitting point EP2 which is made to emit light when the recording/reproducing of the information is conducted for DVD, and which projects the laser light flux of 658 nm, the first light receiving section DS1 which light-receives the reflected light flux from the information recording surface RL1 of the high density optical disk HD, the second light receiving section DS2 which light-receives the reflected light flux from the information recording surface RL2 of DVD, and a prism PS; a module MD2 for CD in which the infrared semiconductor laser LD3 which is made to emit light when the recording/reproducing of the information is conducted for CD, and which projects the laser light flux of 785 nm, and the light detector PD3 are integrated; objective optical system OBJ structured by an aberration correcting element L1 and a light converging element L2 having a function by which the laser light flux transmitted this aberration correcting element L1 is light-converged on the information recording surfaces RL1, RL2, RL3, and both surfaces of which are aspherical surfaces; 2-axis actuator AC; stop STO corresponding to numerical aperture NA 0.85 of the high density optical disk HD; polarized beam splitter BS; collimator lens COL; and coupling lens CUL.

In the optical pickup device PU2, when the recording/reproducing of the information is conducted for the high density optical disk, the first light emitting point EP1 is made to emit light. The divergent light flux projected from the first light emitting point EP1 is, as the ray of light path is drawn by a solid line in FIG. 3, reflected by the prism PS, and via the collimator lens COL, after it is made almost parallel light flux, it transmits the polarized beam splitter, the light flux diameter is regulated by the stop STO, and it becomes a spot formed on the information recording surface RL1 through the protective layer PL1 of the high density optical disk by the objective optical system OBJ. The objective optical system OBJ conducts the focusing and tracking by 2-axis actuator AC arranged in its periphery. The reflected light flux modulated by the information pit on the information recording surface RL1 is, after it transmits again the objective optical system OBJ, step STO, polarized beam splitter BS, it is made the converged light flux by the collimator lens COL, and reflected by 2 times inside the prism PS, and light-converged in the light receiving section DS1. Then, by using the output signal of the light receiving section DS1, the information recorded in the high density optical disk HD can be read.

Further, in the optical pickup device PU2, when the recording/reproducing of the information is conducted for DVD, the second light emitting point EP2 is made to emit light. The divergent light flux projected from the second light emitting point EP2 is, as the ray of light path is drawn by a dotted line in FIG. 3, reflected by the prism PS, and via the collimator lens COL, after it is made almost parallel light flux, it transmits the polarized beam splitter, and it becomes a spot formed on the information recording surface RL2 through the protective layer PL2 of the DVD by the objective optical system OBJ. The objective optical system OBJ conducts the focusing and tracking by 2-axis actuator AC arranged in its periphery. The reflected light flux modulated by the information pit on the information recording surface R2 is, after it transmits again the objective optical system OBJ, polarized beam splitter BS, it is made the converged light flux by the collimator lens COL, and reflected by 2 times inside the prism PS, and light-converged in the light receiving section DS2. Then, by using the output signal of the light receiving section DS2, the information recorded in DVD can be read.

Further, when the recording/reproducing of the information is conducted for CD, as the ray of light path is drawn by a two-dot chain line in FIG. 3, the module MD2 for CD is actuated, and the infrared semiconductor laser LD3 is made to emit light. The divergent light flux projected from the infrared semiconductor laser LD3 is, after the divergent angle is converted by the coupling lens CUL, reflected by the polarized beam splitter BS, and it becomes a spot formed on the information recording surface RL3 through the protective layer PL3 of CD by the objective optical system OBJ. The objective optical system OBJ conducts the focusing and tracking by 2-axis actuator AC arranged in its periphery. The reflected light flux modulated by the information pit on the information recording surface RL3 is, after it transmits again the objective optical system OBJ, it is reflected by the polarized beam splitter BS, and the divergent angle is converted by the coupling lens CUL, and converged on the light receiving surface of the light detector PD3 of the module MD2 for CD. Then, by using the output signal of the light detector PD3, the information recorded in CD can be read.

Next, a structure of the objective optical system will be described. The aberration correcting element L1 is a plastic lens, in which the refractive index nd on d-line is 1.5091, and Abbe's number $\nu d$ is 56.5, and the refractive index to $\lambda 1$ is 1.5242, and the refractive index to $\lambda 3$ is 1.5050. Further, the light converging element L2 is a plastic lens, in which the refractive index nd on d-line is 1.5435, and Abbe's number νd is 56.3. Further, in the periphery of respective optical function sections (areas of the aberration correcting element L1 and light converging element L2 through which the laser light flux from the blue violet semiconductor laser LD1 passes), flange sections FL1, FL2 integrally molded with the optical function section are provided, and when both of a part of such flange sections FL1, FL2 are mutually connected together, they are integrated.

Hereupon, when the aberration correcting element L1 and light converging element L2 are integrated, both may also be integrated through a connection member of separated member.

Figures 4A, 4B, 4C:
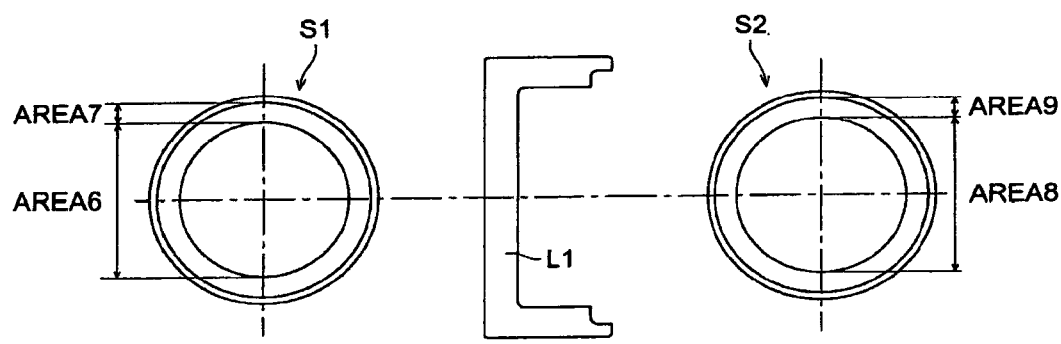
FIGS. 4(a) to 4(c) each is a view showing a structure of a superposition type diffraction optical element.

The optical function surface S1 on the semiconductor laser light source side of the aberration correcting element L1 is, as shown in FIG. 4, divided into the sixth optical function area AREA 6 including the optical axis corresponding to an area in the numerical aperture 0.67 of DVD, and the seventh optical function area AREA 7 corresponding to an area from the numerical aperture 0.67 of DVD to the numerical aperture 0.85 of the high density optical disk, and in the sixth optical function area AREA 6, the superposition type diffractive structures HOE4, which is a structure in which a plurality of ring-shaped zones inside of which the step structure is formed, are arranged around the optical axis, is formed. In the superposition type diffractive structures HOE4 formed in the sixth optical function area AREA 6, the depth d34 of step structure formed in each ring-shaped zone is set to a value calculated by d34=2 λ1/(n−1) (μm), and the stepped section number N in each ring-shaped zone is set to 4. Where, λ1 is the wavelength of the laser light flux projected from the blue violet semiconductor laser LD1 is expressed in a micron unit, (herein, λ1=0.408 μm), and n is a refractive index to the wavelength λ1 of the aberration correcting element L1.

When the laser light flux of wavelength λ1 from the first light emitting point EP1 enters into the step structure whose depth in the optical axis direction is set in such manner, the optical path difference of 2×λ1 (μm) is generated between adjoining step structures, and to the laser light flux of wavelength λ1, because the phase difference is not practically given, it is not diffracted and transmits as it is (0-degree diffracted light ray).

Further, when the laser light flux of the wavelength λ3 (herein, λ3=0.785 μm) enters into this step structure, because the wavelength λ3 is about 2 times of λ1, the optical path difference of 1×λ3 (μm) is generated between adjoining step structures, and in the same manner as the laser light flux of λ1, also to the laser light flux of wavelength λ3, because the phase difference is not practically given, it is not diffracted, and transmits as it is (0-degree diffracted light ray).

On the one hand, when the laser light flux of the wavelength λ2 (herein, λ2=0.658 μm) from the second light emitting point EP2 enters into this step structure, because the stepped section number in each ring-shaped zone is set to 5, to the laser light flux of λ2, the phase difference is given corresponding to a part on which the light flux enters, of the superposition type diffractive structure HOE1, and the laser light flux is diffracted in +1-degree direction (+1-degree diffracted light ray). The diffraction efficiency of +1-degree diffracted light ray at this time is 87.5%, and it is a light amount sufficient for the recording/reproducing of the information for DVD.

The width Λ4 of each ring-shaped zone of the superposition type diffractive structure HOE4, and the inclination direction of each ring-shaped zone (in FIG. 3, the inclination direction of the envelop 14 of each step structure) are set so that, when the laser light flux of wavelength λ2 enters, the spherical aberration of under correction direction is added to +1-degree diffracted light ray by the diffraction action.

The objective optical system OBJ is designed in such a manner that, to a combination of the wavelength λ1, magnification m1=0, and the protective layer PL1 of the high density optical disk HD, the spherical aberration becomes minimum. Therefore, as in the present embodiment, when the magnification m1 to the laser light flux of wavelength λ1, and the magnification m2 to the laser light flux of wavelength λ2, are made almost the same, due to the difference of the thickness between the protective layer PL1 of the high density optical disk and the protective layer PL2 of DVD, the spherical aberration of the laser light flux of the wavelength λ2 transmitted the objective optical system OBJ and the protective layer PL2 of DVD, is in the over correction direction.

Herein, the width Λ4 of each ring-shaped zone of the superposition type diffractive structure HOE4, and the inclination direction of each ring-shaped zone are set so that, when the laser light flux of wavelength λ2 enters into the superposition type diffractive structure HOE4, the spherical aberration of the under correction direction added to +1-degree diffracted light ray by the diffraction action, and the spherical aberration of over correction direction generated due to a case where the magnification m1 to wavelength λ1 and the magnification m2 to wavelength λ2 are made almost the same, are cancelled each other. Hereby, the laser light flux of wavelength λ2 which transmits the superposition type diffractive structure HOE4 and the protective layer PL2 of DVD, forms a good spot on the information recording surface RL2 of DVD.

In the above description, to correct the spherical aberration of the over correction direction generated due to a case where the magnification m1 to the wavelength λ1 and the magnification m2 to the wavelength λ2 are made almost the same, the superposition type diffractive structure HOE4 is made a structure in which, when the laser light flux of wavelength λ2 enters, the spherical aberration of the under correction direction is generated, however, a structure in which the diffraction power of the superposition type diffractive structure HOE4 is set so as to be negative, and when the laser light flux of wavelength λ2 enters, the divergent degree of the laser light flux of wavelength λ2 is increased, and it is projected, may also be applied.

In this case, in the laser light flux of wavelength λ2 incident on the superposition type diffractive structure HOE4, its divergent degree is increased and it is projected. Because this corresponds to a case where the magnification is reduced, for the light converging element L2, to the laser light flux of the wavelength λ2 incident on the light converging element L2, the spherical aberration in the under correction direction is added by this magnification change. The width Λ4 between each of ring-shaped zones of the superposition type diffractive structure HOE4 and the inclination direction of each ring-shaped zone are determined so that this spherical aberration of under correction direction and the spherical aberration of the over correction direction generated due to a case where the magnification m1 to the wavelength λ1 and the magnification m2 to λ2 are made almost the same, are cancelled.

Further, the optical function surface S2 on the optical disk side of the aberration correcting element L1 is, as shown in FIG. 4, divided into the eighth optical function area AREA 8 including the optical axis corresponding to an area in numerical aperture 0.67 of DVD, and the ninth optical function area AREA 9 corresponding to an area from the numerical aperture 0.67 to the numerical aperture 0.85 of the high density optical disk HD, and the diffractive structures DOE3, DOE4 structured by a plurality of ring-shaped zones including the optical axis, whose sectional shape is the saw-toothed shape, are respectively formed in the optical function area AREA 8 and the optical function area AREA 9.

The diffractive structures DOE3, DOE4 are structures for suppressing the chromatic aberration of the objective optical system OBJ in the blue violet area, and the spherical aberration change following the temperature change.

In the diffractive structure DOE3, the height d03 of the stepped section closest to the optical axis is designed so that the diffraction efficiency is 100% to the light flux of wavelength 390 nm (the refractive index of the aberration correcting element L1 to the wavelength 390 nm, is 1.5273), and satisfies the above-described expression (16). Because, on the diffractive structure DOE1 in which a depth of the stepped section is set in this manner, when the laser light flux of wavelength $\lambda 1$ enters, because +2-degree diffracted light ray is generated in the diffraction efficiency of 96.8%, when the laser light flux of wavelength $\lambda 2$ enters into it, +1-degree diffracted light ray is generated in the diffraction efficiency of 93.9%, and when the laser light of wavelength $\lambda 3$ enters into it, +1-degree diffracted light ray is generated in the diffraction efficiency of 99.2%, in any wavelength area, the sufficient diffraction efficiency can be obtained, and even when the chromatic aberration is corrected in the blue violet area, the chromatic aberration correction in the wavelength areas of the wavelength $\lambda 2$ and wavelength $\lambda 3$ is not too surplus.

On the one hand, because the diffractive structure DOE4 is optimized to the wavelength $\lambda 1$, when the laser light flux of wavelength $\lambda 1$ enters into the diffractive structure DOE4, +2-degree diffracted light ray is generated in the diffraction efficiency of 100%.

Further, the diffractive structure DOE3, DOE4 have a wavelength dependency of the spherical aberration, in the blue violet area, in which, when the wavelength of the incident light flux is increased, the spherical aberration changes in the under correction direction, and when the wavelength of the incident light flux is reduced, the spherical aberration changes in over correction direction. Hereby, when the spherical aberration generated in the light converging element following the environmental temperature change is cancelled, the temperature range which can be used in the objective optical system OBJ which is a plastic lens of high NA, is spread.

In the aberration correcting element L1 in the present embodiment, a structure in which the superposition type diffractive structure is formed on the optical function surface S1 on the semiconductor laser light source side, and the type diffractive structure is formed on the optical function surface S2 on the optical disk side, is applied, however, in contrast to this, a structure in which the type diffractive structure is formed on the optical function surface S1 on the semiconductor laser light source side, and the superposition type diffractive structure is formed on the optical function surface S2 on the optical disk side, may also be applied.

Further, because the objective optical system OBJ of the present embodiment, is an optical system in which the sinusoidal condition is corrected to the infinite object point, it does not satisfy the sinusoidal condition to the finite object point. Therefore, as in the case where the recording/reproducing of the information is conducted for CD, in the case where the divergent light flux enters into the objective optical system OBJ, when the objective optical system OBJ shifts in the direction perpendicular to the optical axis (track direction of CD), because the light emitting point of the infrared semiconductor laser LD3 becomes an off-axis object point, the coma is generated.

The coupling lens CUL is a coma correcting element having a function for reducing such a coma, and is designed so that, when the objective optical system OBJ is not driven by 2-axis actuator in the direction perpendicular to the optical axis, in the effective diameter through which the laser light flux of wavelength $\lambda 3$ passes, the spherical aberration is corrected so as to be less than diffraction limit, and outside this effective diameter, the spherical aberration is generated in the over correction direction.

Hereby, when the objective optical system OBJ shifts in the direction perpendicular to the optical axis, because the laser light flux of wavelength $\lambda 3$ passes the area designed so that it has large spherical aberration, the coma is added to the laser light flux of wavelength $\lambda 3$ passed the coupling lens CUL and the objective optical system OBJ. The direction and the magnitude of the spherical aberration outside the effective diameter of the coupling lens CUL are determined so that this coma and the coma due to a case where the light emitting point of the infrared semiconductor laser LD3 is an off-axis object point, are cancelled.

By using in combination with the coupling lens CUL designed in this manner, the tracking characteristic of the objective optical system OBJ for CD, which does not satisfy the sinusoidal condition to the finite object point, can be made good one.

Herein, an aperture switching when the recording/reproducing of the information is conducted for DVD and CD, in the second optical pickup device PU2 of the present embodiment, will be described.

In the second optical pickup device PU2, because NA1, NA2 and NA3 are respectively different, when the recording/reproducing of the information is conducted for DVD and CD, it is necessary that apertures are switched corresponding to the numerical aperture of respective optical disks.

Because the superposition type diffractive structure HOE4 is formed in the optical function area AREA 6 including the optical axis, the spherical aberration to the wavelength $\lambda 2$ is corrected only for the light flux passing the sixth optical function area AREA 6, and for the light flux passing the seventh optical function area AREA 7 surrounding its periphery, it is not corrected. Accordingly, in the light fluxes of wavelength $\lambda 2$ incident on the objective optical system OBJ, the light flux which passes the seventh optical function area AREA 7, becomes a flare component which does not contribute the spot formation onto the information recording surface RL2.

Because this is equivalent to a case where the aperture switching is automatically conducted corresponding to NA2, it is not necessary that the aperture limit element corresponding to the numerical aperture NA2 of DVD is provided separately, in the second optical pickup device PU2.

On the one hand, because the objective optical system OBJ is not provided with the aperture switching function to the wavelength $\lambda 3$, it is necessary that the aperture limit element corresponding to the numerical aperture NA3 of CD, is provided separately, and in the objective optical system OBJ, as such an aperture limit element, a wavelength selection filter WF is formed on the optical function surface S1 on the semiconductor laser light source side of the aberration correcting element L1.

Figure 12:
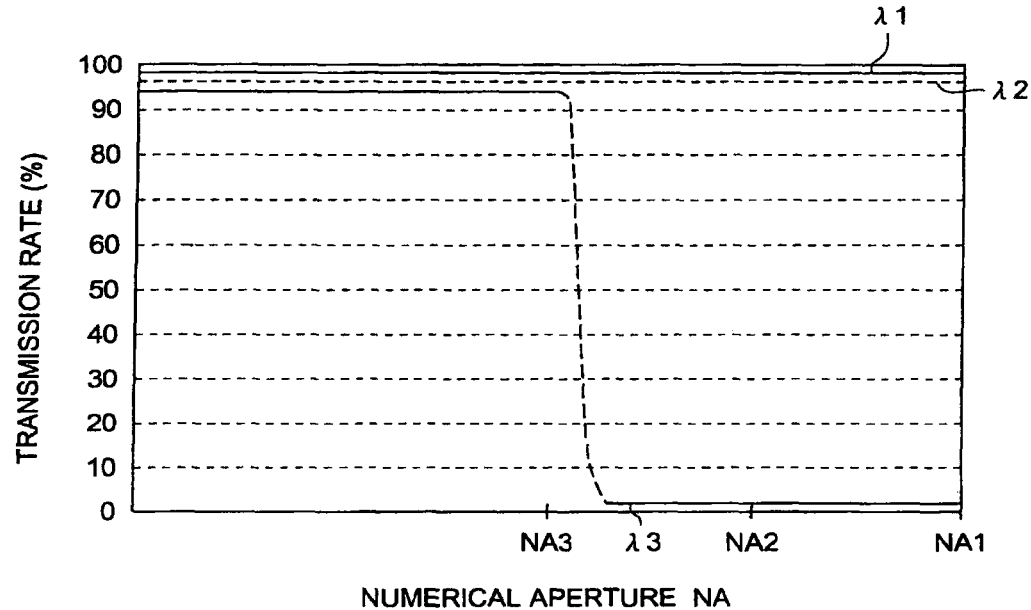
FIG. 12 is a graph showing a relationship between the transmission factor of a wavelength selection filter and a numerical aperture.

The wavelength selection filter WF has, as shown in FIG. 12, the wavelength selectivity of the transmission factor in which all of wavelengths of $\lambda 1$ to $\lambda 3$ are passed in an area in NA3, and in an area of the outside of NA3, only the wavelength λ3 is cut off, and by such a wavelength selectivity, the aperture switching corresponding to NA3 is conducted.

Figure 13:
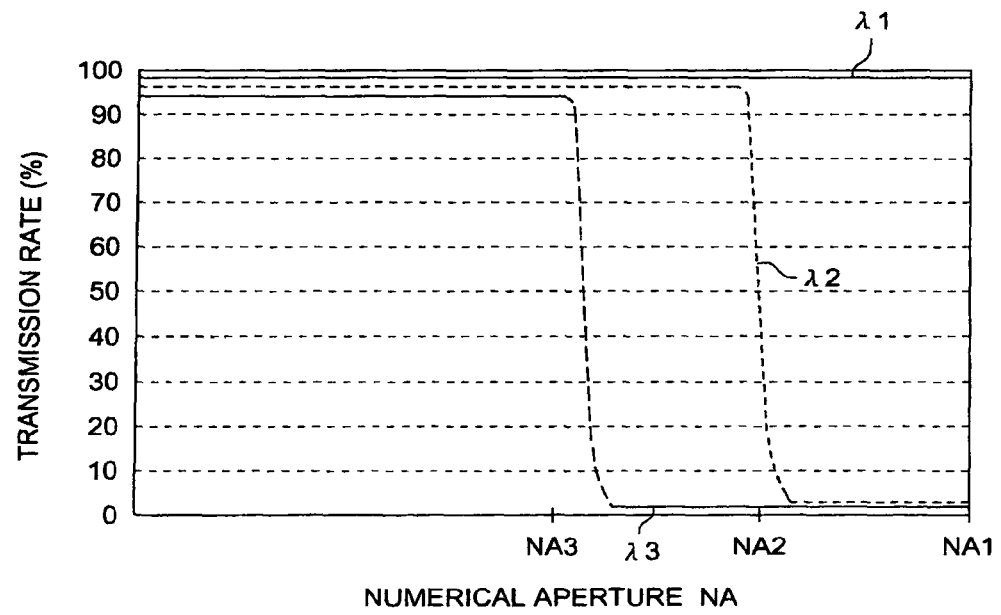
FIG. 13 is a graph showing a relationship between the transmission factor of a wavelength selection filter and a numerical aperture.

Hereupon, to the wavelength selection filter WF, the wavelength selectivity of transmission factor as shown in FIG. 13, may also be given. Because this wavelength selection filter WF has the wavelength selectivity of the transmission factor in which all of wavelengths of λ1 to λ3 are passed in an area in NA3, in an area from NA3 to NA2, only the wavelength λ3 is cut off, and in an area from NA2 to NA1, the wavelengths λ2 and λ3 cut off, by such a wavelength selectivity, the aperture switching corresponding to NA2 and NA3 can be conducted.

Further, in the present embodiment, the wavelength selection filter WF is formed on the optical function surface of the aberration correcting element L1, however, it may also be formed on the optical function surface of the light converging element L2, or an aperture limit element AP in which such a wavelength selection filter WF is formed on its optical function surface, may be mounted separately. In this case, it is preferable that the aperture limit element AP and the objective optical system OBJ are integrally tracking-driven.

The Third Embodiment

Figure 5:
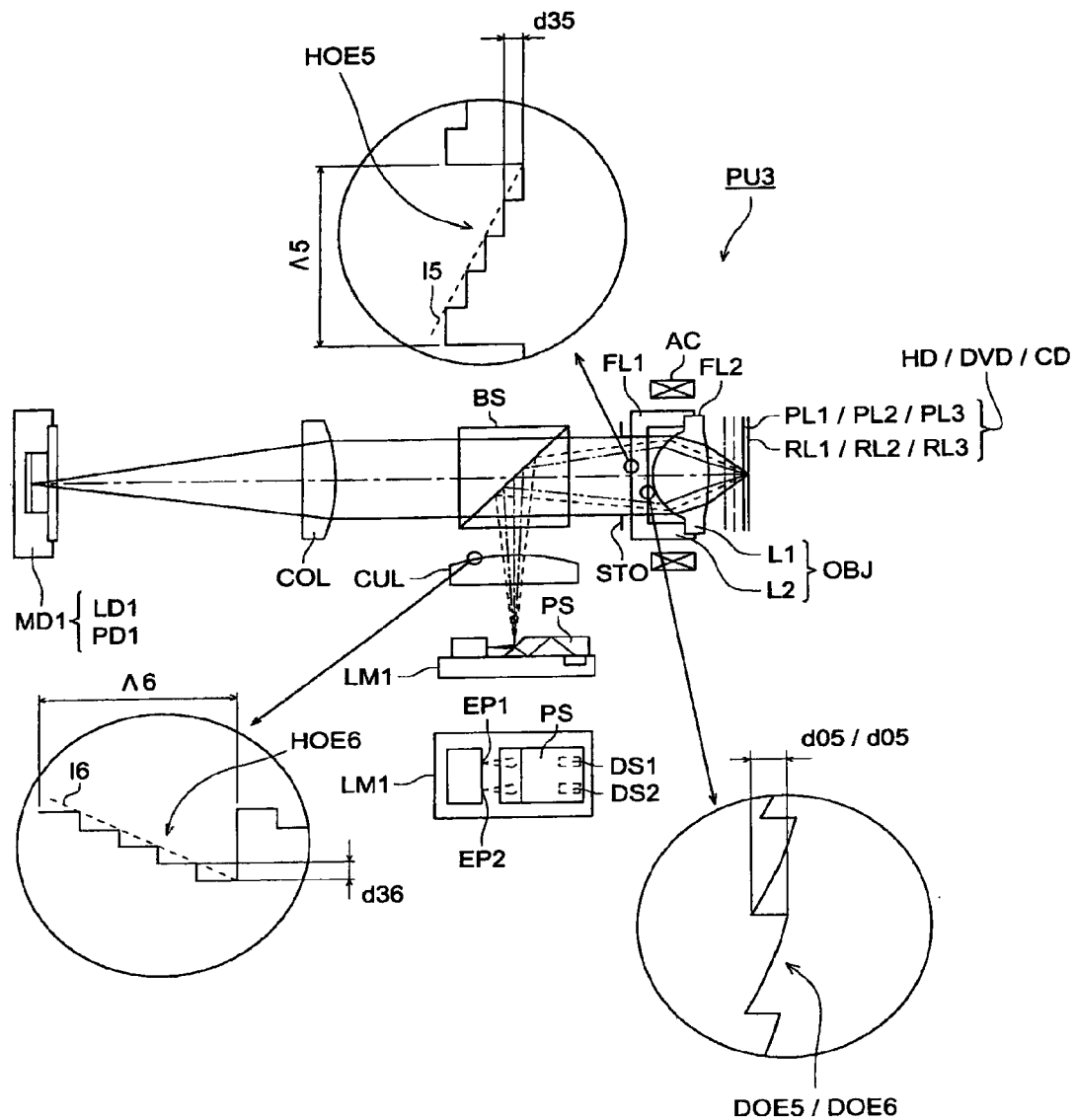
FIG. 5 is a plan view of a main portion showing a structure of an optical pickup device.

FIG. 5 is a view generally showing a structure of the third optical pickup device PU3 by which the recording/reproducing of the information can be adequately conducted for any one of the high density optical disk, DVD and CD. The optical specification of the high density optical disk is the wavelength λ1=408 nm, the thickness t1 of the protective layer PL1=0.0875 mm, numerical aperture NA1=0.85, the optical specification of DVD is the wavelength λ2=658 nm, the thickness t2 of the protective layer PL2=0.6 mm, numerical aperture NA2=0.67, and the optical specification of CD is the wavelength λ3=785 nm, the thickness t3 of the protective layer PL3=1.2 mm, numerical aperture NA3=0.51. However, a combination of the wavelength, thickness of the protective layer, and numerical aperture is not limited to this.

The optical pickup device PU3 is structured by: a laser module LM1 for DVD/CD structured by the module MD1 for high density optical disk HD in which the blue violet semiconductor laser LD1 which is made to emit light when the recording/reproducing of the information is conducted for the high density optical disk HD and which projects the laser light flux of 408 nm, and the light detector PD1 are integrated, the first light emitting point EP1 which is made to emit light when the recording/reproducing of the information is conducted for DVD, and which projects the laser light flux of 658 nm, the second light emitting point EP2 which is made to emit light when the recording/reproducing of the information is conducted for CD, and which projects the laser light flux of 785 nm, the first light receiving section DS1 which light-receives the reflected light flux from the information recording surface RL2 of DVD, the second light receiving section DS2 which light-receives the reflected light flux from the information recording surface RL3 of CD, and a prism PS; the objective optical system OBJ structured by an aberration correcting element L1 and a light converging element L2 having a function by which the laser light flux transmitted this aberration correcting element L1 is light-converged on the information recording surfaces RL1, RL2, RL3, and both surfaces of which are aspherical surfaces; 2-axis actuator AC; stop STO corresponding to numerical aperture NA 0.85 of the high density optical disk HD; polarized beam splitter BS; collimator lens COL; and coupling lens CUL.

Hereupon, as the light source for the high density optical disk HD, other than the above-described blue violet semiconductor laser LD1, a blue violet SHG laser can also be used.

In the optical pickup device PU2, when the recording/reproducing of the information is conducted for the high density optical disk HD, as its ray of light path is drawn by a solid line in FIG. 5, the module MD1 for the high density optical disk HD, is actuated and the blue violet semiconductor laser LD1 is made to emit light. The divergent light flux projected from the blue violet semiconductor laser LD1 is made almost parallel light flux via the collimator lens COL, and after transmits the polarized beam splitter BS, the light flux diameter is regulated by stop STO, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery. The reflected light flux modulated by the information pit on the information recording surface RL1 is, after it transmits again the objective optical system OBJ, stop STO, polarized beam splitter BS and collimator lens COL, it becomes the converged light flux, and is converged on the light receiving surface of the light detector PD1 of the module MD1 for the high density optical disk HD. Then, by using the output signal of the light detector PD1, the information recorded in the high density optical disk HD can be read.

Further, in the optical pickup device PU3, when the recording/reproducing of the information is conducted for DVD, the first light emitting point EP1 is made to emit light. The divergent light flux projected from the first light emitting point EP1 is, as the ray of light path is drawn by a wave line in FIG. 5, reflected by the prism PS, and after its divergent angle is converted by the coupling lens CUL, it is reflected by the polarized beam splitter BS, and it becomes a spot formed on the information recording surface RL2 through the protective layer PL2 of the DVD by the objective optical system OBJ. The objective optical system OBJ conducts the focusing and tracking by 2-axis actuator AC arranged in its periphery. The reflected light flux modulated by the information pit on the information recording surface RL2 is, after it transmits again the objective optical system OBJ, and reflected by the polarized beam splitter BS, the divergent angle is converted by the coupling lens CUL, and it is reflected by 2 times inside the prism PS, and light-converged in the light receiving section DS1. Then, by using the output signal of the light receiving section DS1, the information recorded in DVD can be read.

Further, in the optical pickup device PU3, when the recording/reproducing of the information is conducted for CD, the second light emitting point EP2 is made to emit light. The divergent light flux projected from the second light emitting point EP2 is, as the ray of light path is drawn by a two-dot chain line in FIG. 5, reflected by the prism PS, and after its divergent angle is converted by the coupling lens CUL, it is reflected by the polarized beam splitter BS, and it becomes a spot formed on the information recording surface RL1 through the protective layer PL1 of the CD by the objective optical system OBJ. The objective optical system OBJ conducts the focusing and tracking by 2-axis actuator AC arranged in its periphery. The reflected light flux modulated by the information pit on the information recording surface RL1 is, after it transmits again the objective optical system OBJ, and reflected by the polarized beam splitter BS, the divergent angle is converted by the coupling lens CUL, and it is reflected by 2 times inside the prism PS, and light-converged in the light receiving section DS2. Then, by using the output signal of the light receiving section DS2, the information recorded in CD can be read.

Next, a structure of the objective optical system OBJ will be described. The aberration correcting element L1 is a plastic lens, in which the refractive index nd on d-line is 1.5091, and Abbe's number νd is 56.5, and the refractive index to λ1 is 1.5242, the refractive index to λ2 is 1.5064, and the refractive index to λ3 is 1.5050. Further, the light converging element L2 is a plastic lens, in which the refractive index nd on d-line is 1.5435, and Abbe's number νd is 56.3. Further, in the periphery of respective optical function sections (areas of the aberration correcting element L1 and light converging element L2 through which the laser light flux from the blue violet semiconductor laser LD1 passes), flange sections FL1, FL2 integrally molded with the optical function section are provided, and when both of a part of such flange sections FL1, FL2 are mutually connected together, they are integrated.

Hereupon, when the aberration correcting element L1 and light converging element L2 are integrated, both may also be integrated through a connection member of separated member.

Figures 6A, 6B, 6C:
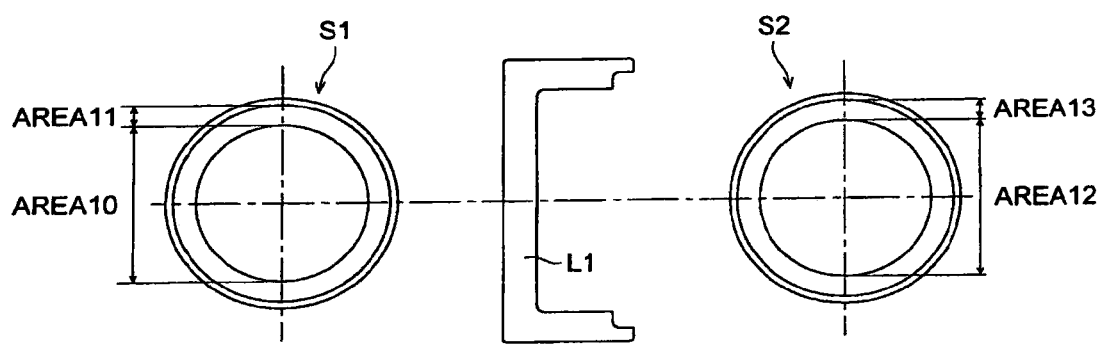
FIGS. 6(a) to 6(c) each is a view showing a structure of a superposition type diffraction optical element.

The optical function surface S1 on the semiconductor laser light source side of the aberration correcting element L1 is, as shown in FIG. 6, divided into the tenth optical function area AREA 10 including the optical axis corresponding to an area in the numerical aperture 0.67 of DVD, and the eleventh optical function area AREA 11 corresponding to an area from the numerical aperture 0.67 of DVD to the numerical aperture 0.85 of the high density optical disk, and in the tenth optical function area AREA 10, the superposition type diffractive structures HOE5, which is a structure in which a plurality of ring-shaped zones inside of which the step structure is formed, are arranged around the optical axis, is formed.

In the superposition type diffractive structures HOE5 formed in the tenth optical function area AREA 10, the depth d35 of step structure formed in each ring-shaped zone is set to a value calculated by $$d35 = 2\lambda 1/(n-1) \ (\mu m),$$

and the stepped section number N in each ring-shaped zone is set to 4. Where, λ1 is the wavelength of the laser light flux which is projected from the blue violet semiconductor laser LD1, and which is expressed in a micron unit, (herein, λ1=0.408 μm), and n is a refractive index to the wavelength λ1 of the aberration correcting element L1.

When the laser light flux of wavelength λ1 enters into the step structure whose depth in the optical axis direction is set in such a manner, the optical path difference of 2×λ1 (μm) is generated between adjoining step structures, and to the laser light flux of wavelength λ1, because the phase difference is not practically given, it is not diffracted and transmits as it is (0-degree diffracted light ray).

Further, when the laser light flux of the wavelength λ3 (herein, λ3=0.785 μm) enters into this step structure, because the wavelength λ3 is about 2 times of λ1, the optical path difference of 1×λ3 (μm) is generated between adjoining step structures, and in the same manner as the laser light flux of λ1, also to the laser light flux of wavelength λ3, because the phase difference is not practically given, it is not diffracted, and transmits as it is (0-degree diffracted light ray).

On the one hand, when the laser light flux of the wavelength λ2 (herein, λ2=0.658 μm) from the second light emitting point EP2 enters into this step structure, because the stepped section number N in each ring-shaped zone is set to 5, to the laser light flux of λ2, the phase difference is given corresponding to a part on which the light flux enters, of the superposition type diffractive structure HOE5, and the laser light flux is diffracted in +1-degree direction (+1-degree diffracted light ray). The diffraction efficiency of +1-degree diffracted light ray at this time is 87.5%, and it is a light amount sufficient for the recording/reproducing of the information for DVD.

The width Λ5 of each ring-shaped zone of the superposition type diffractive structure HOE5, and the inclination direction of each ring-shaped zone (in FIG. 5, the inclination direction of the envelop 15 of each step structure) are set so that, when the laser light flux of wavelength λ2 enters, the spherical aberration of under correction direction is added to +1-degree diffracted light ray by the diffraction action.

Further, the minimum value P of the width of the step structure of the superposition type diffractive structure HOE5 is set, for the purpose that the metallic molding by SPDT is made easy, and to the wavelength λ1 of the blue violet area, the diffraction efficiency lowering by the shape error of the metallic mold is not too large, so as to satisfy the above expression (9). Therefore, by only the action of superposition type diffractive structure HOE5, the spherical aberration in the over correction direction, generated due to the thickness of the protective layer PL1 of the high density optical disk HD and the protective layer PL2 of DVD can not be corrected.

Accordingly, the magnification m2 to the wavelength λ2 of the objective optical system OBJ is set so that the spherical aberration in the over correction direction remained without the correction being enabled, is corrected. Hereby, the laser light flux of wavelength λ2 transmitted the superposition type diffractive structure HOE5 and the protective layer PL2 of DVD, forms a good spot on the information recording surface RL2 of DVD.

In the above description, the superposition type diffractive structure HOE5 is made a structure in which, when the laser light flux of wavelength λ2 enters, the spherical aberration of the under correction direction is generated, however, a structure in which the diffraction power of the superposition type diffractive structure HOE5 is set so as to be negative, and when the laser light flux of wavelength λ2 enters, the divergent degree of the laser light flux of wavelength λ2 is increased, and it is projected, may also be applied.

In this case, in the laser light flux of wavelength λ2 incident on the superposition type diffractive structure HOE5, its divergent degree is increased and it is projected. Because this corresponds to a case where the magnification is reduced, for the light converging element L2, to the laser light flux of the wavelength λ2 incident on the light converging element L2, the spherical aberration in the under correction direction is added by this magnification change. Also in this case, the width Λ4 between respective ring-shaped zones of the superposition type diffractive structure HOE5 and the inclination direction of each ring-shaped zone are determined so that above-described expression (9) is satisfied, and the magnification m2 to the wavelength λ2 of the objective optical system OBJ is determined so that the spherical aberration in the over correction direction remained without the correction being enabled, is corrected.

Further, the optical function surface S2 on the optical disk side of the aberration correcting element L1 is, as shown in FIG. 6, divided into the twelfth optical function area AREA 12 including the optical axis corresponding to an area in numerical aperture 0.67 of DVD, and the thirteenth optical function area AREA 13 corresponding to an area from the numerical aperture 0.67 of DVD to the numerical aperture 0.85 of the high density optical disk HD, and the diffractive structures DOE5, DOE6 structured by a plurality of ring-shaped zones including the optical axis, whose sectional shape is the saw-toothed shape, are respectively formed in the optical function area AREA 12 and the optical function area AREA 13.

The diffractive structures DOE5, DOE6 are structures for suppressing the chromatic aberration of the objective optical system OBJ in the blue violet area, and the spherical aberration change following the temperature change, and because the specific structure of them is the same as diffractive structures DOE3, DOE4 of the optical pickup device PU2, the detailed description is neglected herein.

In the aberration correcting element L1 of the present embodiment, a structure in which the superposition type diffractive structure is formed on the optical function surface S1 on the semiconductor laser light source side, and diffractive structure is formed on the optical function surface S2 on the optical disk side, is applied, in contrast to this, a structure in which the diffractive structure is formed on the optical function surface S1 on the semiconductor laser light source side, and the superposition type diffractive structure is formed on the optical function surface S2 on the optical disk side, may also be applied.

Further, the coupling lens CUL is an optical element for the purpose in which the divergent angle of the laser light flux of wavelength $\lambda 2$ projected from the first light emitting point EP1 and the divergent angle of the laser light flux of wavelength $\lambda 3$ projected from the second light emitting point EP2, are respectively converted into the magnification m2 to the wavelength $\lambda 2$ of the objective optical system OBJ and the magnification m3 to the wavelength $\lambda 3$, and they are projected.

The coupling lens CUL is a plastic lens in which the refractive index nd on d-line is 1.5091, and Abbe's number vd is 56.5, and the refractive index to the wavelength $\lambda 2$ is 1.5064, and the refractive index to the wavelength $\lambda 3$ is 1.5050.

Herein, the paraxial refractive power to the wavelength $\lambda 2$ is determined so that the divergent angle of the laser light flux of wavelength $\lambda 2$ projected from the first light emitting point EP1 is converted into the divergent angle corresponding to the magnification m2 to the wavelength $\lambda 2$ of the objective optical system OBJ, and it can be projected.

The optical function surface S2 on the optical disk side of the coupling lens CUL is divided into the fourteenth optical function area AREA 14 (graphic display is neglected) including the optical axis corresponding to an area in numerical aperture 0.51 of CD, and the fifteenth optical function area AREA 15 (graphic display is neglected) corresponding to an area from numeral aperture 0.51 of CD to numeral aperture 0.67 of DVD, and the superposition type diffractive structure HOE6 which is a structure in which a plurality of ring-shaped zones inside of which step structure is formed, are arranged around the optical axis, is formed in the optical function area AREA 14.

In the superposition type diffractive structure HOE6 formed in the fourteenth optical function area AREA 14, the depth d36 of the step structure formed in each ring-shaped zone is set to a value calculated by $d36 = 1 \lambda 2/(n-1)$ (μm), and the number of stepped sections N is set to 5. However, $\lambda 2$ is a wavelength in which the wavelength of the laser light flux projected from the first light emitting point EP1 is expressed in micron unit, and n is a refractive index of the coupling lens CUL to the wavelength $\lambda 2$. On the step structure in which the depth in the optical axis direction is set in such a manner, when the laser light flux of the wavelength $\lambda 2$ enters, between adjoining step structures, the optical path difference of $1 \times \lambda 1$ (μm) is generated, and because, to the laser light flux of the wavelength $\lambda 2$, the phase difference is not practically given, it is not diffracted and it passes as it is (0-degree diffracted light ray).

On the one hand, when the laser light flux of the wavelength $\lambda 3$ from the second light emitting point EP2 enters into this step structure, because the stepped section number N in each ring-shaped zone is set to 5, to the laser light flux of $\lambda 3$, the phase difference is given corresponding to a part on which the light flux enters, of the superposition type diffractive structure HOE6, and the laser light flux is diffracted in −1-degree direction (−1-degree diffracted light ray). The diffraction efficiency of −1-degree diffracted light ray at this time is 91.1%, and it is a light amount sufficient for the recording/reproducing of the information for CD.

The paraxial diffraction power to the wavelength $\lambda 3$ of the superposition type diffractive structure HOE6 is set so as to be negative, and the width $\Lambda 6$ of each ring-shaped zone of the superposition type diffractive structure HOE6, and the inclination direction of each ring-shaped zone (in FIG. 5, the inclination direction of the envelop 16 of each step structure) are determined so that, the divergent angle of the laser light flux of wavelength $\lambda 3$ projected from the second light emitting point EP2 is converted into the divergent angle corresponding to the magnification m3 to the wavelength $\lambda 3$ of the objective optical system OBJ.

In this manner, when the wavelength selectivity of the diffraction action of the superposition type diffractive structure HOE6 is used, even when the magnification m2 to the wavelength $\lambda 2$ of the objective optical system OBJ, and the magnification m3 to the wavelength $\lambda 3$ are different each other, the laser module LM1 for DVD/CD in which the laser light source for DVD and the laser light source for CD are integrated, can be used.

Herein, the aperture switching when the recording/reproducing of the information is conducted for DVD and CD in the third optical pickup device PU3 of the present embodiment, will be described.

Because in the third optical pickup device PU3, NA1, NA2 and NA3 are respectively different, when the recording/reproducing of the information is conducted for DVD and CD, it is necessary that, corresponding to numerical apertures of respective optical disks, the aperture is switched.

Because the superposition type diffractive structure HOE5 is formed in the tenth optical function area AREA 10 including the optical axis, the spherical aberration to the wavelength $\lambda 2$ is corrected only for the light flux passing the tenth optical function area AREA 10, and for the light flux passing the eleventh optical function area AREA 11 surrounding its periphery, it is not corrected. Accordingly, in the light fluxes of wavelength $\lambda 2$ incident on the objective optical system OBJ, the light flux which passes the eleventh optical function area AREA 11, becomes a flare component which does not contribute the spot formation onto the information recording surface RL2 of DVD.

Because this is equivalent to a case where the aperture switching is automatically conducted corresponding to NA2, it is not necessary that the aperture limit element corresponding to the numerical aperture NA2 of DVD is provided separately, in the third optical pickup device PU3.

On the one hand, because the objective optical system OBJ is not provided with the aperture switching function to the wavelength $\lambda 3$, it is necessary that the aperture limit element corresponding to the numerical aperture NA3 of CD, is provided separately, and in the objective optical system OBJ, as such an aperture limit element, a wavelength selection filter WF is formed on the optical function surface S1 on the semiconductor laser light source side of the aberration correcting element L1.

The wavelength selection filter WF has, as shown in FIG. 12, the wavelength selectivity of the transmission factor in which all of wavelengths of λ1 to λ3 are passed in an area in NA3, and in an area of the outside of NA3, only the wavelength λ3 is cut off, and by such a wavelength selectivity, the aperture switching corresponding to NA3 is conducted.

Hereupon, to the wavelength selection filter WF, the wavelength selectivity of transmission factor as shown in FIG. 13, may also be given. Because this wavelength selection filter WF has the wavelength selectivity of the transmission factor in which all of wavelengths of λ1 to λ3 are passed in an area in NA3, in an area from NA3 to NA2, only the wavelength λ3 is cut off, and in an area from NA2 to NA1, the wavelengths λ2 and λ3 are cut off, by such a wavelength selectivity, the aperture switching corresponding to NA2 and NA3 can be conducted.

Further, in the present embodiment, the wavelength selection filter WF is formed on the optical function surface of the aberration correcting element L1, however, it may also be formed on the optical function surface of the light converging element L2, or an aperture limit element AP in which such a wavelength selection filter WF is formed on its optical function surface, may be mounted separately. In this case, it is preferable that the aperture limit element AP and the objective optical system OBJ are integrally tracking-driven.

The Fourth Embodiment

FIG. 5 is a view generally showing a structure of the fourth optical pickup device PU4 by which the recording/reproducing of the information can be adequately conducted for any one of the high density optical disk, DVD and CD. The optical specification of the high density optical disk is the wavelength λ1=408 nm, the thickness t1 of the protective layer PL1=0.6 mm, numerical aperture NA1=0.65, the optical specification of DVD is the wavelength λ2=658 nm, the thickness t2 of the protective layer PL2=0.6 mm, numerical aperture NA2=0.65, and the optical specification of CD is the wavelength λ3=785 nm, the thickness t3 of the protective layer PL3=1.2 mm, numerical aperture NA3=0.50. However, a combination of the wavelength, thickness of the protective layer, and numerical aperture is not limited to this.

The optical pickup device PU4 is structured by: a laser module LM1 for DVD/CD structured by the module MD1 for high density optical disk HD in which the blue violet semiconductor laser LD1 which is made to emit light when the recording/reproducing of the information is conducted for the high density optical disk HD and which projects the laser light flux of 408 nm, and the light detector PD1 are integrated, the first light emitting point EP1 which is made to emit light when the recording/reproducing of the information is conducted for DVD, and which projects the laser light flux of 658 nm, the second light emitting point EP2 which is made to emit light when the recording/reproducing of the information is conducted for CD, and which projects the laser light flux of 785 nm, the first light receiving section DS1 which light-receives the reflected light flux from the information recording surface RL2 of DVD, the second light receiving section DS2 which light-receives the reflected light flux from the information recording surface RL3 of CD, and a prism PS; the objective optical system OBJ; 2-axis actuator AC; stop STO corresponding to numerical aperture NA 0.65 of the high density optical disk HD; polarized beam splitter BS; and collimator lens COL.

Hereupon, as the light source for the high density optical disk HD, other than the above-described blue violet semiconductor laser LD1, a blue violet SHG laser can also be used.

Figure 7:
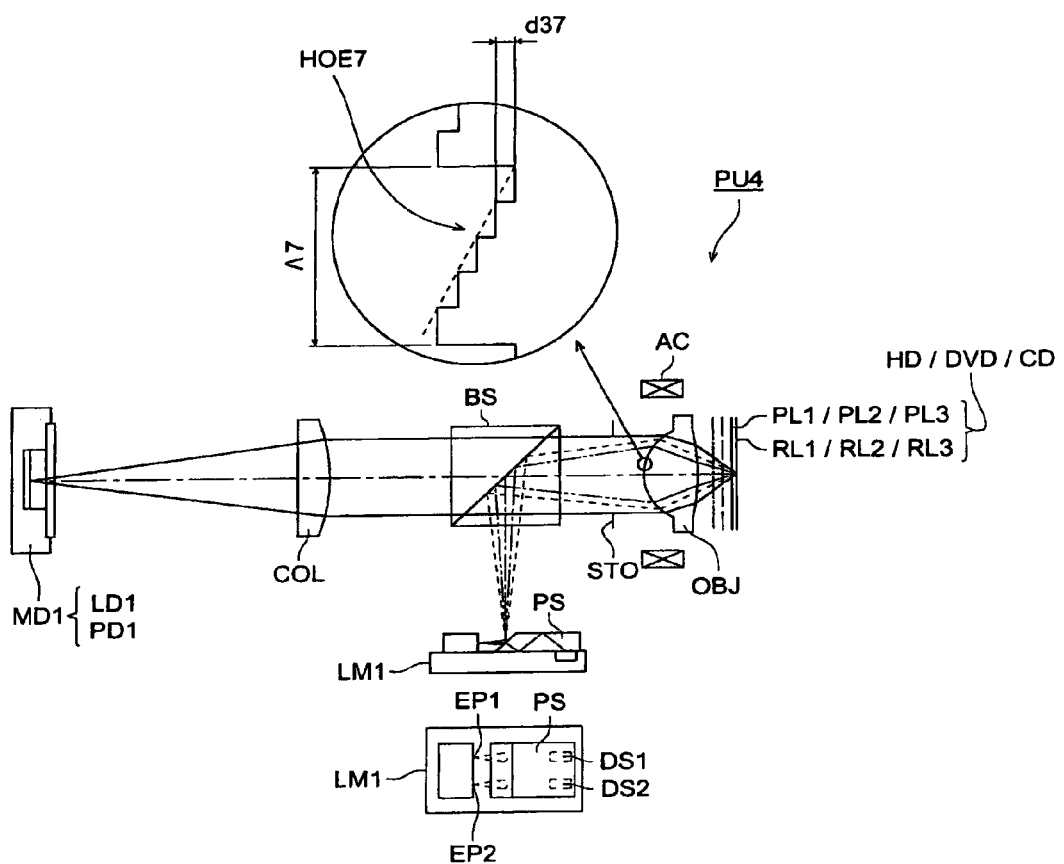
FIG. 7 is a plan view of a main portion showing a structure of an optical pickup device.

In the optical pickup device PU4, when the recording/reproducing of the information is conducted for the high density optical disk HD, as its ray of light path is drawn by a solid line in FIG. 7, the module MD1 for the high density optical disk HD, is actuated and the blue violet semiconductor laser LD1 is made to emit light. The divergent light flux projected from the blue violet semiconductor laser LD1 is made almost parallel light flux via the collimator lens COL, and after transmits the polarized beam splitter BS, the light flux diameter is regulated by stop STO, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery. The reflected light flux modulated by the information pit on the information recording surface RL1 is, after it transmits again the objective optical system OBJ, stop STO, polarized beam splitter BS and collimator lens COL, it becomes the converged light flux, and is converged on the light receiving surface of the light detector PD1 of the module MD1 for the high density optical disk HD. Then, by using the output signal of the light detector PD1, the information recorded in the high density optical disk HD can be read.

Further, in the optical pickup device PU4, when the recording/reproducing of the information is conducted for DVD, the first light emitting point EP1 is made to emit light. The divergent light flux projected from the first light emitting point EP1 is, as the ray of light path is drawn by a wave line in FIG. 7, reflected by the prism PS, and after reflected by the polarized beam splitter BS, it becomes a spot formed on the information recording surface RL2 through the protective layer PL2 of the DVD by the objective optical system OBJ. The objective optical system OBJ conducts the focusing and tracking by 2-axis actuator AC arranged in its periphery. The reflected light flux modulated by the information pit on the information recording surface RL2 transmits again the objective optical system OBJ, and after reflected by the polarized beam splitter BS, it is reflected two times inside the prism PS, and light converged in the light receiving section DS1. Then, by using the output signal of the light receiving section DS1, the information recorded in DVD can be read.

Further, in the optical pickup device PU4, when the recording/reproducing of the information is conducted for CD, the second light emitting point EP2 is made to emit light. The divergent light flux projected from the second light emitting point EP2 is, as the ray of light path is drawn by a two dot chain line in FIG. 7, reflected by the prism PS, and after reflected by the polarized beam splitter BS, it becomes a spot formed on the information recording surface RL1 through the protective layer PL1 of CD by the objective optical system OBJ. The objective optical system OBJ conducts the focusing and tracking by 2-axis actuator AC arranged in its periphery. The reflected light flux modulated by the information pit on the information recording surface RL1 transmits again the objective optical system OBJ, and after reflected by the polarized beam splitter BS, it is reflected two times inside the prism PS, and light converged in the light receiving section DS2. Then, by using the output signal of the light receiving section DS2, the information recorded in CD can be read.

Next, a structure of the objective optical system OBJ will be described. The objective optical system OBJ is a plastic lens, in which the refractive index nd on d-line is 1.5091, and Abbe's number λd is 56.5, and the refractive index to λ1 is 1.5242, the refractive index to λ2 is 1.5064, and the refractive index to λ3 is 1.5050.

The optical function surface S1 on the semiconductor laser light source side of the objective optical system OBJ is, as shown in FIG. 8, divided into the sixteenth optical function area AREA 16 including the optical axis corresponding to an area in the numerical aperture 0.50 of CD, and the seventeenth optical function area AREA 17 corresponding to an area from the numerical aperture 0.50 of CD to the numerical aperture 0.65 of the high density optical disk HD (DVD), and in the sixteenth optical function area AREA 16, the superposition type diffractive structures HOE7, which is a structure in which a plurality of ring-shaped zones inside of which the step structure is formed, are arranged around the optical axis, is formed.

The width Λ7 of each ring-shaped zone of the superposition type diffractive structure HOE7, and the inclination direction of each ring-shaped zone are set so that, when the laser light flux of wavelength λ2 enters into the superposition type diffractive structure HOE7, the spherical aberration amount of the over correction direction added to +1-degree diffracted light ray by the diffraction action, and the spherical aberration of under correction direction generated due to a case where the magnification m2 to wavelength λ2 and the magnification m3 to wavelength λ3 are made almost the same, are cancelled each other. Hereby, the laser light flux of wavelength λ2 which transmits the superposition type diffractive structure HOE1 and the protective layer PL2 of DVD, forms a good spot on the information recording surface RL2 of DVD.

Because a specific structure of the superposition type diffractive structure HOE7 is the same as the structure of the superposition type diffractive structure HOE1 of the optical pickup device PU1, the detailed description will be neglected herein.

Hereupon, also in the superposition type diffractive structure HOE7, in the same manner as in the superposition type diffractive structure HOE1 of the optical pickup device PU1, a structure in which it is set so that the paraxial diffraction power is positive, and when the laser light flux of wavelength λ2 enters, the divergent degree of the laser light flux of λ2 is made small, and projected, may also be applied.

Further, on the entire surface of the optical function surface S1 on the semiconductor laser light source side of the objective optical system OBJ, an optical pass difference grant structure NPS which is a structure for suppressing the spherical aberration change following the temperature change of the objective optical system OBJ in the blue violet area, is formed.

In the optical path difference grant structure NPS, the height d11 of the stepped section closest to the optical axis is designed so that the optical path difference of 10×λ1 (μm) is added to the wavelength λ1 between adjoining step structures.

By adjoining ring-shaped zones divided by this stepped section, when the optical path differences Φ2 and Φ3 added to each wavelength of wavelengths λ2 and λ3 are calculated, Φ2=5.99, Φ3=5.01. Because Φ2 and Φ3 are about integers, the generation of the high-degree of spherical aberration by the optical path difference grant structure NPS is small, and the high transmission factor can be realized.

Further, as shown in FIG. 8, in the optical path difference grant structure NPS, the ring-shaped zone adjoining the outside of the central area is formed by shifting in the optical axis direction so that the optical path length is shortened to the central area, and the ring-shaped zone in the maximum effective diameter position is formed by shifting in the optical axis direction so that the optical path length is lengthened to the ring-shaped zone adjoining its inside, and the ring-shaped zone in the position of 75% of the maximum effective diameter is formed by shifting in the optical axis direction so that the optical path length is shortened to the ring-shaped zone adjoining its inside, and to the ring-shaped zone adjoining its outside.

Because the optical path difference grant structure NPS of such a structure has a refractive index dependency of the spherical aberration in which the spherical aberration changes to under correction direction when the refractive index is lowered, and the spherical aberration changes to over correction direction when the refractive index is heightened, the spherical aberration change following the temperature change of the objective optical system OBJ in the blue violet area can be suppressed.

Hereupon, on the entire surface of the optical function surface on the optical disk side of the collimator lens COL, the diffractive structure DOE7 structured by a plurality of ring-shaped zones whose sectional shape including the optical axis is a saw-toothed shape, is formed, and this is a structure for suppressing the chromatic aberration of the objective optical system OBJ in the blue violet area.

Herein, an aperture switching when the recording/reproducing of the information is conducted for CD, in the fourth optical pickup device PU4 of the present embodiment, will be described.

In the fourth optical pickup device PU4, because NA1 (=NA2) and NA3 are different, when the recording/reproducing of the information is conducted for CD, it is necessary that the aperture is switched corresponding to the numerical aperture NA3.

Because the objective optical system OBJ is not provided with the aperture switching function to the wavelength λ3, it is necessary that the aperture limit element corresponding to the numerical aperture NA3 of CD, is provided separately, and in the objective optical system OBJ, as such an aperture limit element, a wavelength selection filter WF is formed on the optical function surface S1 on the semiconductor laser light source side.

The wavelength selection filter WF has, as shown in FIG. 12, the wavelength selectivity of the transmission factor in which all of wavelengths of λ1 to λ3 are passed in an area in NA3, and in an area of the outside of NA3, only the wavelength λ3 is cut off, and by such a wavelength selectivity, the aperture switching corresponding to NA3 is conducted.

Further, when NA1, NA2 and NA3 are different each other, it is preferable that, to the wavelength selection filter WF, the wavelength selectivity of transmission factor as shown in FIG. 13 is given. Because this wavelength selection filter WF has the wavelength selectivity of the transmission factor in which all of wavelengths of λ1 to λ3 are passed in an area in NA3, in an area from NA3 to NA2, only the wavelength λ3 is cut off, and in an area from NA2 to NA1, the wavelengths λ2 and λ3 are cut off, by such a wavelength selectivity, the aperture switching corresponding to NA2 and NA3 can be conducted.

Further, in the present embodiment, the wavelength selection filter WF is formed on the optical function surface of the objective optical system OBJ, however, an aperture limit element AP in which such a wavelength selection filter WF is formed on its optical function surface, may be mounted separately. In this case, it is preferable that the aperture limit element AP and the objective optical system OBJ are integrally tracking-driven by the two-axis actuator AC.

The Fifth Embodiment

Figure 14:
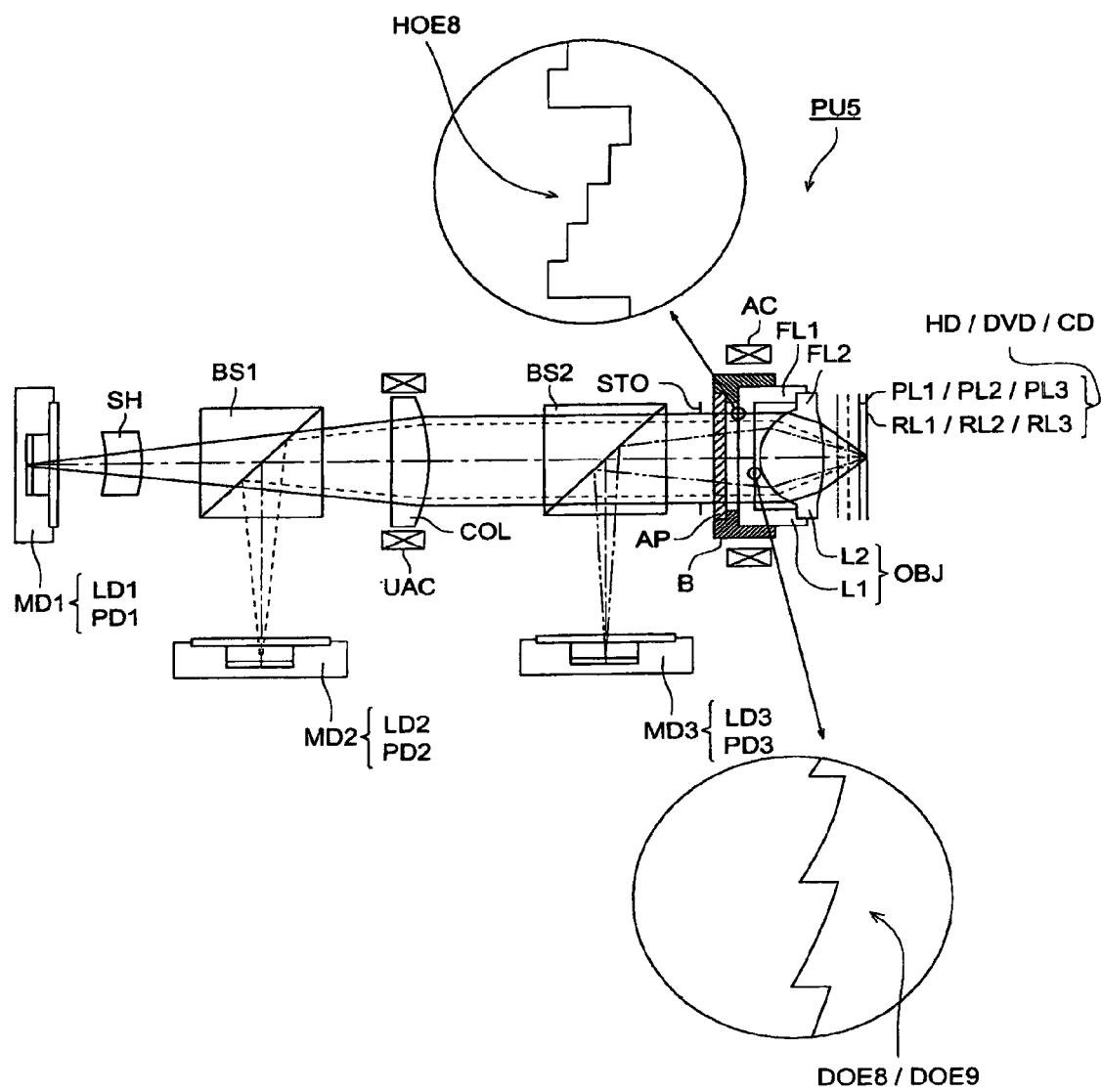
FIG. 14 is a plan view of a main portion showing a structure of an optical pickup device.

FIG. 14 is a view generally showing a structure of the fifth optical pickup device PU5 by which the recording/reproducing of the information can be adequately conducted for any one of the high density optical disk, DVD and CD. The optical specification of the high density optical disk is the wavelength $\lambda 1=408$ nm, the thickness t1 of the protective layer PL1=0.875 mm, numerical aperture NA1=0.85, the optical specification of DVD is the wavelength $\lambda 2=658$ nm, the thickness t2 of the protective layer PL2=0.6 mm, numerical aperture NA2=0.60, and the optical specification of CD is the wavelength $\lambda 3=785$ nm, the thickness t3 of the protective layer PL3=1.2 mm, numerical aperture NA3=0.45. However, a combination of the wavelength, thickness of the protective layer, and numerical aperture is not limited to this.

The optical pickup device PU5 is structured by: a module MD1 for high density optical disk HD in which the blue violet semiconductor laser LD1 which is made to emit light when the recording/reproducing of the information is conducted for the high density optical disk HD and which projects the laser light flux of 408 nm, and the light detector PD1 are integrated; the module MD2 for DVD in which the red semiconductor laser LD2 which is made to emit light when the recording/reproducing of the information is conducted for DVD and which projects the laser light flux of 658 nm, and the light detector PD2 are integrated; and module MD3 for CD in which the infrared semiconductor laser LD3 which is made to emit light when the recording/reproducing of the information is conducted for CD and which projects the laser light flux of 785 nm, and the light detector PD3 are integrated; the objective optical system OBJ structured by the aberration correcting element L1 and the light converging element L2 which has a function by which the laser light fluxes transmitted this aberration correcting element L1 are light converged on the information recording surfaces RL1, RL2, RL3, and whose both surfaces are aspherical surfaces; aperture limit element AP; 2-axis actuator AC; stop STO corresponding to numerical aperture NA 0.85 of the high density optical disk HD; first polarized beam splitter BS1; second polarized beam splitter BS2; collimator lens COL; 1-axis actuator UAC; and beam shaping element SH.

In the optical pickup device PU5, when the recording/reproducing of the information is conducted for the high density optical disk HD, as its ray of light path is drawn by a solid line in FIG. 14, the module MD1 for the high density optical disk HD is actuated and the blue violet semiconductor laser LD1 is made to emit light. The divergent light flux projected from the blue violet semiconductor laser LD1 is, when it transmits the beam shaping element SH, its sectional shape is shaped from elliptical to circular, and it transmits the first polarized beam splitter BS1, and after it is made almost parallel light flux by the collimator lens COL, it transmits the second polarized beam splitter BS2, and the light flux diameter is regulated by stop STO, it transmits the aperture limit element AP, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery. The reflected light flux modulated by the information pit on the information recording surface RL1, after it transmits again the objective optical system OBJ, aperture limit element AP, second polarized beam splitter BS2 and collimator lens COL, becomes the converged light flux, and transmits the first polarized beam splitter BS1 and beam shaping element SH, and is converged on the light receiving surface of the light detector PD1 of the module MD1 for the high density optical disk HD. Then, by using the output signal of the light detector PD1, the information recorded in the high density optical disk HD can be read.

Further, in the optical pickup device PU5, when the recording/reproducing of the information is conducted for DVD, as its ray of light path is drawn by a dotted line in FIG. 14, the module MD2 for DVD is actuated and the red semiconductor laser LD2 is made to emit light. The divergent light flux projected from the red semiconductor laser LD2 is reflected by the first polarized beam splitter BS1, and after it is converted into parallel light flux by the collimator lens COL, it transmits the second polarized beam splitter BS2, the light flux diameter is regulated by the aperture limit element AP, it becomes a spot formed on the information recording surface RL2 through the protective layer PL2 of DVD by the objective optical system OBJ. The objective optical system OBJ conducts the focusing and tracking by 2-axis actuator AC arranged in its periphery. The reflected light flux modulated by the information pit on the information recording surface RL2, after it transmits again the objective optical system OBJ, aperture limit element AP, second polarized beam splitter BS2 and collimator lens COL, becomes the converged light flux, and it is reflected by the first polarized beam splitter BS1, and converged on the light receiving surface of the light detector PD2 of the module MD2 for DVD. Then, by using the output signal of the light detector PD2, the information recorded in DVD can be read.

Further, when the recording/reproducing of the information is conducted for CD, as its ray of light path is drawn by a two dot chain line in FIG. 14, the module MD3 for CD is actuated and the infrared semiconductor laser LD3 is made to emit light. In the divergent light flux projected from the infrared semiconductor laser LD3, after it is reflected by the second polarized beam splitter BS2, the light flux diameter is regulated by the aperture limit element AP, it becomes a spot formed on the information recording surface RL3 through the protective layer PL3 of CD by the objective optical system OBJ. The objective optical system OBJ conducts the focusing and tracking by 2-axis actuator AC arranged in its periphery. The reflected light flux modulated by the information pit on the information recording surface RL3, after it transmits again the objective optical system OBJ, it is reflected by the second polarized beam splitter BS2, and converged on the light receiving surface of the light detector PD3 of the module MD3 for CD. Then, by using the output signal of the light detector PD3, the information recorded in CD can be read.

Next, a structure of the objective optical system OBJ will be described. The aberration correcting element L1 is a plastic lens, in which the refractive index nd on d-line is 1.5091, and Abbe's number vd is 56.5, and the refractive index to $\lambda 1$ is 1.5242, the refractive index to $\lambda 2$ is 1.5064, and the refractive index to $\lambda 3$ is 1.5050. Further, the light converging element L2 is a plastic lens, in which the refractive index nd on d-line is 1.5435, and Abbe's number vd is 56.3. Further, in the periphery of respective optical function sections (areas of the aberration correcting element L1 and light converging element L2 through which the laser light flux from the blue violet semiconductor laser LD1 passes), flange sections FL1, FL2 integrally molded with the optical function section are provided, and when both of a part of such flange sections FL1, FL2 are mutually connected together, they are integrated.

Figure 15:
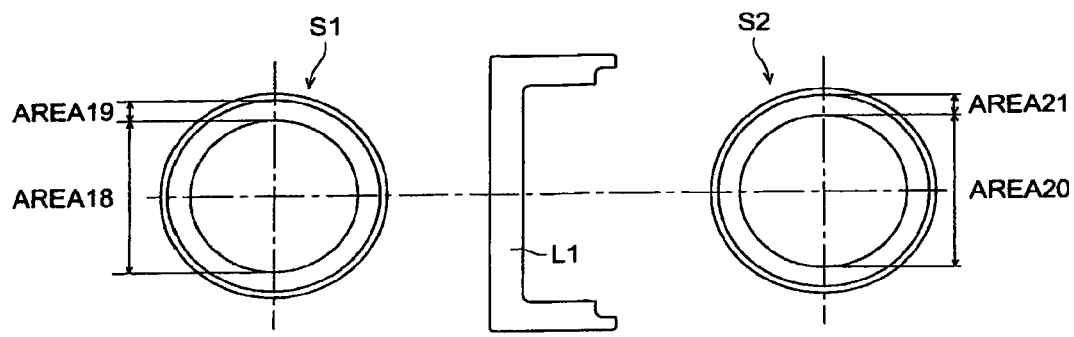
FIGS. 15(a) to 15(c) each is a view showing a structure of a superposition type diffraction optical element.

The optical function surface S1 on the semiconductor laser light source side of the aberration correcting element L1 is, as shown in FIG. 15(a), divided into the eighteenth optical function area AREA 18 including the optical axis corresponding to an area in the numerical aperture 0.60 of DVD, and the nineteenth optical function area AREA 19 corresponding to an area from the numerical aperture 0.60 of DVD to the numerical aperture 0.85 of the high density optical disk, and in the eighteenth optical function area AREA 18, the superposition type diffractive structure HOE8, which is a structure in which a plurality of ring-shaped zones inside of which the step structure is formed, are arranged around the optical axis, is formed.

Because a structure of the superposition type diffractive structure HOE8 formed in the eighteenth optical function area AREA 18 is the same as the superposition type diffractive structure HOE4 in the second optical pickup device PU2, the detailed description is omitted here.

Further, the optical function surface S2 on the optical disk side of the aberration correcting element L1 is, as shown in FIG. 15(c), divided into the twentieth optical function area AREA 20 including the optical axis corresponding to an area in numerical aperture 0.60 of DVD, and the twenty-first optical function area AREA 21 corresponding to an area from the numerical aperture 0.60 of DVD to the numerical aperture 0.85 of the high density optical disk HD, and the diffractive structures DOE8, DOE9 structured by a plurality of ring-shaped zones including the optical axis, whose sectional shape is the saw-toothed shape, are respectively formed in the optical function area AREA 20 and the optical function area AREA 21.

The diffractive structures DOE8, DOE9 are structures for suppressing the chromatic aberration of the objective optical system OBJ in the blue violet area, and the spherical aberration change following the temperature change, and because the structures of them are the same as diffractive structures DOE3, DOE4 in the optical pickup device PU2, the detailed description is omitted herein.

In the aberration correcting element L1 of the present embodiment, a structure in which the superposition type diffractive structure is formed on the optical function surface S1 on the semiconductor laser light source side, and diffractive structure is formed on the optical function surface S2 on the optical disk side, is applied, in contrast to this, a structure in which the diffractive structure is formed on the optical function surface S1 on the semiconductor laser light source side, and the superposition type diffractive structure is formed on the optical function surface S2 on the optical disk side, may also be applied.

Further, the collimator lens COL of the present embodiment is structured so that the position can be shifted in the optical axis direction by the 1-axis actuator UAC. Hereby, because the spherical aberration of a spot formed on the information recording surface RL1 of the high density optical disk HD can be corrected, a good recording/reproducing characteristic can be always maintained for the high density optical disk HD.

Causes of generation of the spherical aberration corrected by the position adjustment of the collimator lens COL are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

In above description, a case where the spherical aberration of a spot formed on the information recording surface RL1 of the high density optical disk HD is corrected, is described, however, it may also be allowable that the spherical aberration of a spot formed on the information recording surface RL2 of DVD, is corrected by the position adjustment of the collimator lens COL.

Further, in the present embodiment, when the recording/reproducing of the information is conducted for DVD or CD, as an element for switching the aperture of the objective optical system OBJ, corresponding to the numerical aperture NA of respective optical disks, an aperture limit element AP which is integrated with the objective optical system OBJ through a connection member B, is provided.

On the optical function surface of the aperture limit element AP, the wavelength selection filter WF having the wavelength selectivity of the transmission factor as shown in FIG. 13, is formed. Because this wavelength selection filter WF has the wavelength selectivity of the transmission factor in which all of wavelengths of $\lambda 1$ to $\lambda 3$ are passed in an area in NA3, and in an area from NA3 to NA2, only the wavelength $\lambda 3$ is cut off, and in an area from NA2 to NA1, wavelengths $\lambda 2$ and $\lambda 3$ are cut off, by such a wavelength selectivity, the aperture switching corresponding to NA3 is conducted.

Hereupon, to the wavelength selection filter WF, the wavelength selectivity of transmission factor as shown in FIG. 13, may also be given. Because this wavelength selection filter WF has the wavelength selectivity of the transmission factor in which all of wavelengths of $\lambda 1$ to $\lambda 3$ are passed in an area in NA3, in an area from NA3 to NA2, only the wavelength $\lambda 3$ is cut off, and in an area from NA2 to NA1, the wavelengths $\lambda 2$ and $\lambda 3$ are cut off, by such a wavelength selectivity, the aperture switching corresponding to NA2 and NA3 can be conducted.

Hereupon, because the objective optical system OBJ in the present embodiment has, in the same manner as the second optical pickup device PU2 and the third optical pickup device PU3, the aperture switching function corresponding to the numerical aperture NA2 of DVD, to the wavelength selection filter WF, the wavelength selectivity of transmission factor as shown in FIG. 12 may also be given.

The Sixth Embodiment

Figure 18:
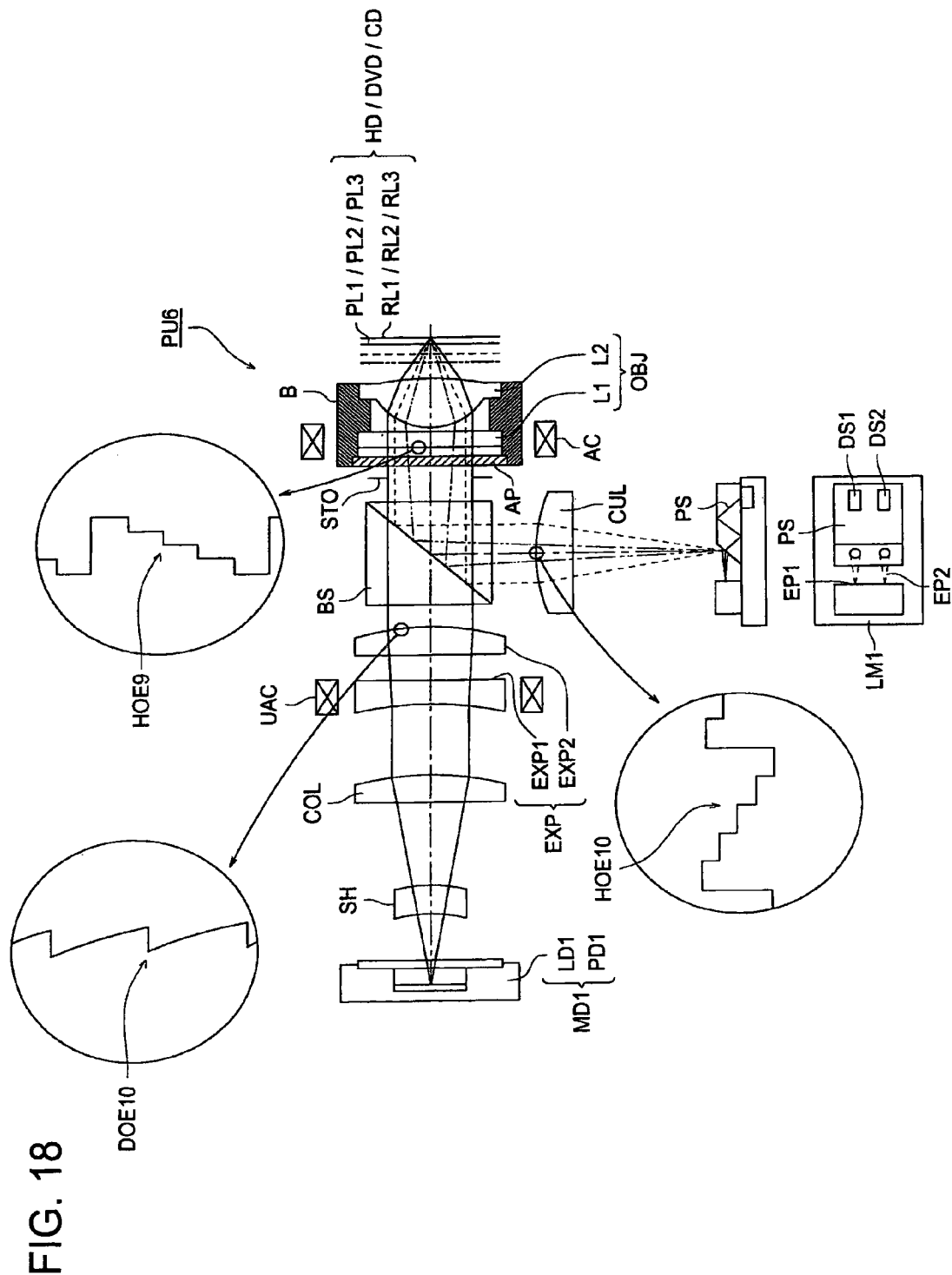
FIG. 18 is a plan view of a main portion showing a structure of an optical pickup device.

FIG. 18 is a view generally showing a structure of the sixth optical pickup device PU6 by which the recording/reproducing of the information can be adequately conducted for any one of the high density optical disk, DVD and CD. The optical specification of the high density optical disk is the wavelength $\lambda 1$=408 nm, the thickness t1 of the protective layer PL1=0.875 mm, numerical aperture NA1=0.85, the optical specification of DVD is the wavelength $\lambda 2$=658 nm, the thickness t2 of the protective layer PL2=0.6 mm, numerical aperture NA2=0.60, and the optical specification of CD is the wavelength $\lambda 3$=785 nm, the thickness t3 of the protective layer PL3=1.2 mm, numerical aperture NA3=0.45. However, a combination of the wavelength, thickness of the protective layer, and numerical aperture is not limited to this.

The optical pickup device PU6 is structured by: a module MD1 for high density optical disk HD in which the blue violet semiconductor laser LD1 which is made to emit light when the recording/reproducing of the information is conducted for the high density optical disk HD and which projects the laser light flux of 408 nm, and the light detector PD1 are integrated; laser module LM1 for DVD/CD structured: by the first light emitting point EP1 which is made to emit light when the recording/reproducing of the information is conducted for DVD and which projects the laser light flux of 658 nm; the second light emitting point EP2 which is made to emit light when the recording/reproducing of the information is conducted for CD and which projects the laser light flux of 785 nm; the first light receiving section DS1 which light receives the reflected light flux from the information recording surface RL2 of DVD; and the second light receiving section DS2 which light receives the reflected light flux from the information recording surface RL3 of CD; and prism PS; the objective optical system OBJ structured by the aberration correcting element L1 and the light converging element L2 which has a function by which the laser light fluxes transmitted this aberration correcting element L1 are light converged on the information recording surfaces RL1, RL2, RL3, LD3, and both surfaces of which are aspherical surfaces; an aperture limit element AP; 2-axis actuator AC; stop STO corresponding to the numerical aperture NA 0.85 of the high density optical disk HD; 1-axis actuator UAC; expander lens EXP; polarized beam splitter BS; collimator lens COL; coupling CUL; and beam shaping element SH.

Hereupon as the light source for the high density optical disk HD, other than the above blue violet semiconductor laser LD1, a blue violet SHG laser can also be used.

The expander lens EXP is structured by the first lens EXP1 whose paraxial refractive power is negative, and the second lens EXP2 whose paraxial refractive power is positive.

In the optical pickup device PU6, when the recording/reproducing of the information is conducted for the high density optical disk HD, as its ray of light path is drawn by a solid line in FIG. 18, the module MD1 for the high density optical disk HD is actuated and the blue violet semiconductor laser LD1 is made to emit light. The divergent light flux projected from the blue violet semiconductor laser LD1 is, when it transmits the beam shaping element SH, after its sectional shape is shaped from elliptical to circular, it is converted into parallel light flux by the collimator lens COL, and when it transmits the first lens EXP1, second lens EXP2, its diameter is enlarged, and after it transmits the polarized beam splitter BS, the light flux diameter is regulated by the stop STO, and it transmits the aperture limit element AP, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery.

The reflected light flux modulated by the information pit on the information recording surface RL1, after it transmits again the objective optical system OBJ, aperture limit element AP, polarized beam splitter BS, second lens EXP2, first lens EXP1, expander lens EXP and collimator lens COL, becomes the converged light flux and transmits the beam shaping element SH, and is converged on the light receiving surface of the light detector PD1 of the module MD1 for the high density optical disk HD. Then, by using the output signal of the light detector PD1, the information recorded in the high density optical disk HD can be read.

Further, in the optical pickup device PU6, when the recording/reproducing of the information is conducted for DVD, the first light emitting point EP1 is made to emit light. The divergent light flux projected from the first light emitting point EP1 is, as the ray of light path is drawn by a wave line in FIG. 18, reflected by the prism PS, and after it is converted into the parallel light flux by the coupling lens CUL, it is reflected by the polarized beam splitter BS, and it becomes a spot formed on the information recording surface RL2 through the protective layer PL2 of DVD by the objective optical system OBJ. The objective optical system OBJ conducts the focusing and tracking by 2-axis actuator AC arranged in its periphery.

The reflected light flux modulated by the information pit on the information recording surface RL2, after it transmits again the objective optical system OBJ, it becomes the converged light flux by the coupling lens CUL, and is reflected 2 times inside the prism PS, and light converged on the light receiving section DS1. Then, by using the output signal of the light detector DS1, the information recorded in DVD can be read.

Further, in the optical pickup device PU6, when the recording/reproducing of the information is conducted for DVD, the first light emitting point EP1 is made to emit light. The divergent light flux projected from the first light emitting point EP1 is, as the ray of light path is drawn by a wave line in FIG. 18, reflected by the prism PS, and after it is converted into the parallel light flux by the coupling lens CUL, it is reflected by the polarized beam splitter BS, and it becomes a spot formed on the information recording surface RL2 through the protective layer PL2 of DVD by the objective optical system OBJ. The objective optical system OBJ conducts the focusing and tracking by 2-axis actuator AC arranged in its periphery.

Further, in the optical pickup device PU6, when the recording/reproducing of the information is conducted for CD, the first light emitting point EP2 is made to emit light. The divergent light flux projected from the first light emitting point EP2 is, as the ray of light path is drawn by a two dot chain line in FIG. 18, after reflected by the prism PS, and the divergent angle is converted by the coupling lens CUL, and after reflected by the polarized beam splitter BS, the light flux diameter is regulated by the aperture limit element AP, and it becomes a spot formed on the information recording surface RL1 through the protective layer PL1 of CD by the objective optical system OBJ. The objective optical system OBJ conducts the focusing and tracking by 2-axis actuator AC arranged in its periphery. The reflected light flux modulated by the information pit on the information recording surface RL1, after it transmits again the objective optical system OBJ and aperture limit element AP, and reflected by the polarized beam splitter BS, and it is reflected two times inside the prism PS, and light converged on the light receiving section DS2. Then, by using the output signal of the light receiving section DS2, the information recorded in CD can be read.

Next, a structure of the objective optical system OBJ will be described. The aberration correcting element L1 is a plastic lens, in which the refractive index nd on d-line is 1.5091, and Abbe's number νd is 56.5, and the refractive index to λ1 is 1.5242, the refractive index to λ2 is 1.5064, and the refractive index to λ3 is 1.5050. Further, the light converging element L2 is a glass lens, in which the refractive index nd on d-line is 1.6062, and Abbe's number νd is 61.2. Further, the aberration correcting element L1, light converging element L2 and aperture limit element AP are integrated through a connection member B.

The optical function surface S1 on the semiconductor laser light source side of the aberration correcting element L1 is, although graphic display is neglected, divided into the 22-th optical function area AREA 22 including the optical axis corresponding to an area in the numerical aperture 0.60 of DVD, and the 23-th optical function area AREA 23 corresponding to an area from the numerical aperture 0.60 of DVD to the numerical aperture 0.85 of the high density optical disk HD, and in the 22-th optical function area AREA 22, the superposition type diffractive structure HOE9, which is a structure in which a plurality of ring-shaped zones inside of which the step structure is formed, are arranged around the optical axis, is formed.

Because the structure of the superposition type diffractive structure HOE9 formed in the 22-th optical function area AREA 22 is the same as the superposition type diffractive structure HOE4 in the second optical pickup device PU2, the detailed description will be omitted herein.

In the aberration correcting element L1 of the present embodiment, a structure in which the superposition type diffractive structure is formed on the optical function surface S1 on the semiconductor laser light source side, is applied, in contrast to this, a structure in which the superposition type diffractive structure is formed on the optical function surface S2 on the optical disk side, may also be applied.

Further, the first lens EXP1 of the expander lens EXP of the present embodiment is structured so that the position can be shifted in the optical axis direction by the 1-axis actuator UAC. Hereby, because the spherical aberration of a spot formed on the information recording surface RL1 of the high density optical disk HD can be corrected, a good recording/reproducing characteristic can be always maintained for the high density optical disk HD.

Causes of generation of the spherical aberration corrected by the position adjustment of the first lens EXP1 are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

Further, on the optical function surface on the optical disk side of the second lens EXP2, the diffractive structure DOE10 structured by a plurality of ring-shaped zones whose sectional shape is a saw-toothed shape, is formed. The diffractive structure DOE10 is a structure for correcting the chromatic aberration of the objective optical system OBJ in the blue violet area, and the paraxial diffraction power of the diffractive structure DOE10 is determined so that the paraxial power $P\lambda 1$ of the second lens EXP2 to the wavelength $\lambda 1$, the paraxial power $P\lambda 1+10$ of the second lens EXP2 to the wavelength $\lambda 1+10$ (nm), and the paraxial power $P\lambda 1-10$ of the second lens EXP2 to the wavelength $\lambda 1+10$ (nm), satisfy the following relationship:

$P\lambda 1+10 < P\lambda 1 < P\lambda 1-10.$

Further, the coupling lens CUL is an optical element by which the divergent angles of the laser light flux of the wavelength $\lambda 2$ projected from the first light emitting point EP1 and the laser light flux of the wavelength $\lambda 3$ projected from the second light emitting point EP2 are respectively converted into the divergent angles corresponding to the magnification m2 to the wavelength $\lambda 2$ of the objective optical system OBJ, and the magnification m3 to the wavelength $\lambda 3$, and they are projected. In the present embodiment, because m2=0, when the laser light flux of the wavelength $\lambda 2$ projected from the first light emitting point EP1 transmits the coupling lens CUL, it is converted into a parallel light flux.

The coupling lens CUL is a plastic lens in which the refractive index nd on d-line is 1.5091, and Abbe's number vd is 56.5, and the refractive index to $\lambda 2$ is 1.5064, and the refractive index to $\lambda 3$ is 1.5050.

The optical function surface on the optical disk side of the coupling lens CUL is, although graphic display is neglected, divided into the 24-th optical function area AREA 24 including the optical axis corresponding to an area in numerical aperture 0.45 of CD, and the 25-th optical function area AREA 25 corresponding to an area from numeral aperture 0.45 of CD to numeral aperture 0.60 of DVD, and the superposition type diffractive structure HOE10 which is a structure in which a plurality of ring-shaped zones inside of which step structure is formed, are arranged around the optical axis, is formed in the 24-th optical function area AREA 24.

Because the structure of the superposition type diffractive structure HOE10 formed in the 24-th optical function area AREA 24 is the same as the superposition type diffractive structure HOE6 in the third optical pickup device PU3, the detailed description will be omitted herein.

Further, in the present embodiment, when the recording/reproducing of the information is conducted for CD, as an element for switching the aperture of the objective optical system OBJ corresponding to the numerical aperture NA3 of CD, an aperture limit element AP integrated with the objective optical system OBJ through the connection member B is provided.

A wavelength selection filter WF having the wavelength selectivity of the transmission factor as shown in FIG. 12 is formed on the optical function surface of the aperture limit element AP. This wavelength selection filter WF has the wavelength selectivity of the transmission factor in which all of wavelengths of $\lambda 1$ to $\lambda 3$ are passed in an area in NA3, and in an area of the outside of NA3, only the wavelength $\lambda 3$ is cut off, and by such a wavelength selectivity, the aperture switching corresponding to NA3 is conducted.

Hereupon, the objective optical system OBJ in the present embodiment has the aperture switching function corresponding to the numerical aperture NA2 of DVD in the same as the second optical pickup device PU2, third optical pickup device PU3, and fifth optical pickup device PU5, and by this aperture switching function, the aperture switching corresponding to NA2 is conducted.

The Seventh Embodiment

Figure 19:
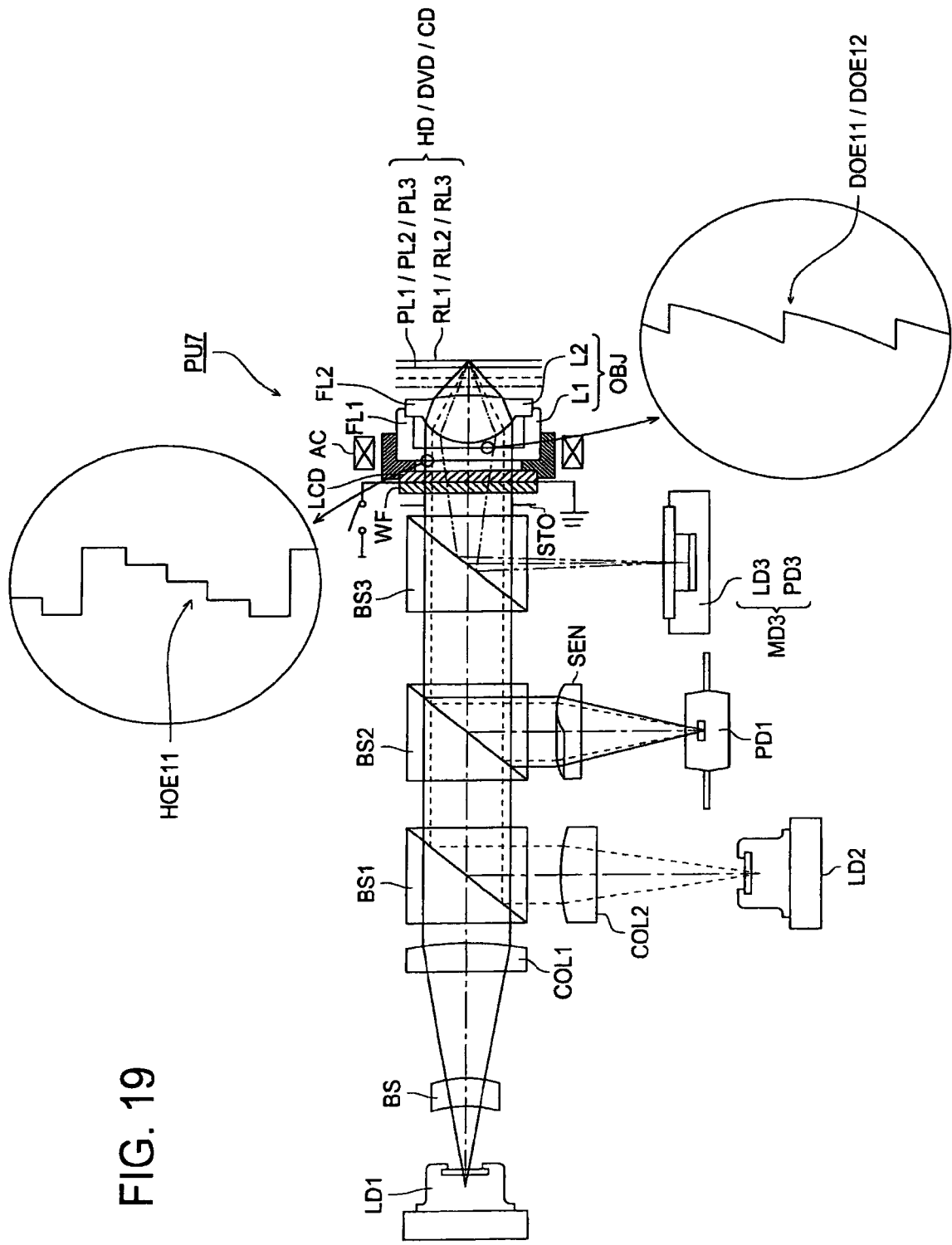
FIG. 19 is a plan view of a main portion showing a structure of an optical pickup device.

FIG. 19 is a view generally showing a structure of the seventh optical pickup device PU7 by which the recording/reproducing of the information can be adequately conducted for any one of the high density optical disk, DVD and CD. The optical specification of the high density optical disk HD is the wavelength $\lambda 1=408$ nm, the thickness t1 of the protective layer PL1=0.875 mm, numerical aperture NA1=0.85, the optical specification of DVD is the wavelength $\lambda 2=658$ nm, the thickness t2 of the protective layer PL2=0.6 mm, numerical aperture NA2=0.60, and the optical specification of CD is the wavelength $\lambda 3=785$ nm, the thickness t3 of the protective layer PL3=1.2 mm, numerical aperture NA3=0.45. However, a combination of the wavelength, thickness of the protective layer, and numerical aperture is not limited to this.

The optical pickup device PU7 is structured by: a module MD3 for CD in which the blue violet semiconductor laser LD1 which is made to emit light when the recording/reproducing of the information is conducted for the high density optical disk HD and which projects the laser light flux of 408 nm; red semiconductor laser LD2 which is made to emit light when the recording/reproducing of the information is conducted for DVD and which projects the laser light flux of 658 nm; light detector PD1 which is commonly used for the high density optical disk HD and DVD; the module MD3 for CD in which the infrared semiconductor laser LD3 which is made to emit light when the recording/reproducing of the information is conducted for CD and which projects the laser light flux of 785 nm, and the light detector PD3 are integrated; objective optical system OBJ structured by the aberration correcting element L1 and the light converging element L2 which has a function by which the laser light fluxes transmitted this aberration correcting element L1 are light converged on the information recording surfaces RL1, RL2, RL3, LD3, and both surfaces of which are aspherical surfaces; wavelength selection filter WF; liquid crystal phase control element LCD; 2-axis actuator AC; stop STO corresponding to the numerical aperture NA 0.85 of the high density optical disk HD; first polarized beam splitter BS1; second polarized beam splitter BS2; third polarized beam splitter BS3; first collimator lens COL1; second collimator lens Col2; sensor lens SEN; and beam shaping lens BS.

Hereupon, as the light source for the high density optical disk HD, other than the above blue violet semiconductor laser LD1, a blue violet SHG laser can also be used.

In the optical pickup device PU7, when the recording/reproducing of the information is conducted for the high density optical disk HD, as its ray of light path is drawn by a solid line in FIG. 19, the blue violet semiconductor laser LD1 is made to emit light. The divergent light flux projected from the blue violet semiconductor laser LD1 is, when transmits the beam shaping element SH, after its sectional shape is shaped from elliptical to circular, converted to parallel light flux by the first collimator lens COL, and after it transmits the first to third polarized beam splitters BS1, BS2, BS3, the light flux diameter is regulated by stop STO, and transmits the wavelength selection filter WF, liquid crystal phase control element LCD, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery. The reflected light flux modulated by the information pit on the information recording surface RL1 is, after it transmits again the objective optical system OBJ, liquid crystal phase control element LCD, wavelength selection filter WF, third polarized beam splitter BS3, reflected by the second polarized beam splitter BS2, and the astigmatism is given by the sensor lens SEN and it is converted into the converged light flux, and converged on the light receiving surface of the light detector PD1. Then, by using the output signal of the light detector PD1, the information recorded in the high density optical disk HD can be read.

Further, in the optical pickup device PU7, when the recording/reproducing of the information is conducted for DVD, as its ray of light path is drawn by a dotted line in FIG. 19, the red semiconductor laser LD2 is made to emit light. The divergent light flux projected from the red semiconductor laser LD2 is converted into parallel light flux by the second collimator lens COL2, and after it is reflected by the first polarized beam splitters BS1, it transmits the second and third polarized beam splitters BS2, BS3, and transmits the wavelength selection filter WF, liquid crystal phase control element LCD, and it becomes a spot formed on the information recording surface RL2 through the protective layer PL2 of DVD by the objective optical system OBJ. The objective optical system OBJ conducts the focusing and tracking by 2-axis actuator AC arranged in its periphery.

The reflected light flux modulated by the information pit on the information recording surface RL2 is, after it transmits again the objective optical system OBJ, liquid crystal phase control element LCD, wavelength selection filter WF, third polarized beam splitter BS3, reflected by the second polarized beam splitter BS2, and the astigmatism is given by the sensor lens SEN and it is converted into the converged light flux, and converged on the light receiving surface of the light detector PD1. Then, by using the output signal of the light detector PD1, the information recorded in DVD can be read.

Further, when the recording/reproducing of the information is conducted for CD, as its ray of light path is drawn by a two-dot chain line in FIG. 19, the module MD3 for CD is actuated, and the infrared semiconductor laser LD3 is made to emit light. The divergent light flux projected from the infrared semiconductor laser LD3, after it is reflected by the third polarized beam splitter BS3, the light flux diameter is regulated by the wavelength selection filter WF, it transmits the liquid crystal phase control element LCD, and it becomes a spot formed on the information recording surface RL3 through the protective layer PL3 of CD by the objective optical system OBJ. The objective optical system OBJ conducts the focusing and tracking by 2-axis actuator AC arranged in its periphery.

The reflected light flux modulated by the information pit on the information recording surface RL3 is, after it transmits again the objective optical system OBJ, liquid crystal phase control element LCD, wavelength selection filter WF, reflected by the third polarized beam splitter BS3, and converged on the light receiving surface of the light detector PD3 of the module MD3 for CD. Then, by using the output signal of the light detector PD3, the information recorded in CD can be read.

Next, a structure of the objective optical system OBJ will be described. The aberration correcting element L1 is a plastic lens, in which the refractive index nd on d-line is 1.5091, and Abbe's number vd is 56.5, and the refractive index to $\lambda 1$ is 1.5242, the refractive index to $\lambda 2$ is 1.5064, and the refractive index to $\lambda 3$ is 1.5050. Further, the light converging element L2 is a plastic lens, in which the refractive index nd on d-line is 1.5435, and Abbe's number vd is 56.3. Further, in the periphery of respective optical function section (an area of the aberration correcting element L1, and light converging element L2 through the laser light flux from the blue violet semiconductor laser LD1 passes), flange sections FL1, FL2 which are integrally molded with the optical function section, are provided, and they are integrated by mutually connecting both of a part of such flange sections FL1 and FL2.

The optical function surface S1 on the semiconductor laser light source side of the aberration correcting element L1 is, although graphic display is neglected, divided into the 26-th optical function area AREA 26 including the optical axis corresponding to an area in the numerical aperture 0.60 of DVD, and the 27-th optical function area AREA 27 corresponding to an area from the numerical aperture 0.60 of DVD to the numerical aperture 0.85 of the high density optical disk HD, and in the 26-th optical function area AREA 26, the superposition type diffractive structure HOE11, which is a structure in which a plurality of ring-shaped zones inside of which the step structure is formed, are arranged around the optical axis, is formed.

Because the structure of the superposition type diffractive structure HOE11 formed in the 26-th optical function area AREA 26 is the same as the superposition type diffractive structure HOE4 in the second optical pickup device PU2, the detailed description will be omitted herein.

Further, the optical function surface S2 on the optical disk side of the aberration correcting element L1 is, although graphic display is neglected, divided into the 28-th optical function area AREA 28 including the optical axis corresponding to an area in the numerical aperture 0.60 of DVD, and the 29-th optical function area AREA 29 corresponding to an area from the numerical aperture 0.60 of DVD to the numerical aperture 0.85 of the high density optical disk HD, and diffractive structures DOE11 and DOE12 structured by a plurality of ring-shaped zones whose sectional shape including the optical axis is a saw-toothed shape, are respectively formed in the 28-th optical function area AREA 28, and the 29-th optical function area AREA 29.

Diffractive structures DOE11 and DOE12 are structures for suppressing the chromatic aberration of the objective optical system OBJ in the blue violet area, and the spherical aberration change following the temperature change, and because the structure is the same as diffractive structures DOE3 and DOE4 in the second optical pickup device PU2, the detailed description will be omitted herein.

In the aberration correcting element L1 of the present embodiment, a structure in which the superposition type diffractive structure is formed on the optical function surface S1 on the semiconductor laser light source side, and the type diffractive structure is formed on the optical function surface S2, is applied, however, in contrast to this, a structure in which the type diffractive structure is formed on the optical function surface S1 on the semiconductor laser light source side, and superposition type diffractive structure is formed on the optical function surface S2 on the optical disk side, may also be applied.

Further, the liquid crystal phase control element LCD is structured by a liquid crystal layer by which the phase change is generated to the transmitting light flux by the impression of voltage, an electrode layer opposing each other to impress the voltage on the liquid crystal element, and a power source to supply the voltage to the electrode layer. At least one of the electrode layer opposing each other, is divided into a predetermined pattern, and when the voltage is impressed on this electrode layer, the orientation condition of the liquid crystal element is changed, and a predetermined phase can be added to the transmitting light flux. Hereby, because the spherical aberration of a spot formed on the information recording surface RL1 of the high density optical disk HD can be corrected, a good recording/reproducing characteristic can be always maintained to the high density optical disk HD.

Causes of generation of the spherical aberration corrected by the liquid crystal phase control element LCD are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

In the above description, a case where the spherical aberration of a spot formed on the information recording surface RL1 of the high density optical disk HD is corrected, is described, however, the spherical aberration formed on the information recording surface RL2 of DVD, or the spherical aberration formed on the information recording surface RL3 of CD, may also be corrected by the liquid crystal phase control element LCD. Particularly, when the recording/reproducing of the information is conducted for CD, by the liquid crystal phase control element LCD, by correcting the spherical aberration generated due to the difference between the protective layer PL1 and protective layer PL3, because the magnification m3 of the objective optical system OBJ to the third light flux can be set larger, the generation of coma at the time of tracking drive can be suppressed small.

Further, the objective optical system OBJ and the liquid crystal phase control element LCD are integrated through a connection member B.

Further, in the present embodiment, when the recording/reproducing of the information is conducted for CD, corresponding to numerical aperture NA3 of CD, the wavelength selection filter WF to switch the aperture of the objective optical system OBJ is formed on the semiconductor laser light source side of the liquid crystal phase control element LCD.

The wavelength selection filter WF has, as shown in FIG. 12, the wavelength selectivity of the transmission factor in which all of wavelengths of $\lambda 1$ to $\lambda 3$ are passed in an area in NA3, and in an area of the outside of NA3, only the wavelength $\lambda 3$ is cut off, and by such a wavelength selectivity, the aperture switching corresponding to NA3 is conducted.

Hereupon, the objective optical system OBJ in the present embodiment has, in the same manner as the second optical pickup device PU2, the third optical pickup device PU3, the fifth optical pickup device PU5, the aperture switching function corresponding to the numerical aperture NA2 of DVD, and by this aperture switching function, the aperture switching corresponding to NA2, is conducted.

The Eighth Embodiment

FIG. 19 is a view generally showing a structure of the seventh optical pickup device PU7 by which the recording/reproducing of the information can be adequately conducted for any one of the high density optical disk, DVD and CD. The optical specification of the high density optical disk HD is the wavelength $\lambda 1=408$ nm, the thickness t1 of the protective layer PL1=0.875 mm, numerical aperture NA1=0.85, the optical specification of DVD is the wavelength $\lambda 2=658$ nm, the thickness t2 of the protective layer PL2=0.6 mm, numerical aperture NA=0.60, and the optical specification of CD is the wavelength $\lambda 3=785$ nm, the thickness t3 of the protective layer PL3=1.2 mm, numerical aperture NA3=0.45. However, a combination of the wavelength, thickness of the protective layer, and numerical aperture is not limited to this.

The optical pickup device PU8 is structured by: a blue violet semiconductor laser LD1 which is made to emit light when the recording/reproducing of the information is conducted for the high density optical disk HD and which projects the laser light flux of 407 nm; red semiconductor laser LD2 which is made to emit light when the recording/reproducing of the information is conducted for DVD and which projects the laser light flux of 660 nm; light detector PD which is commonly used for the high density optical disk HD and DVD; objective optical system OBJ structured by the aberration correcting element L1 and the light converging element L2 which has a function by which the laser light fluxes transmitted this aberration correcting element L1 are light converged on the information recording surfaces RL1, RL2, and both surfaces of which are aspherical surfaces; liquid crystal phase control element LCD; 2-axis actuator AC; stop STO corresponding to the numerical aperture NA 0.85 of the high density optical disk HD; first polarized beam splitter BS1; second polarized beam splitter BS2; first collimator lens COL1; second collimator lens Col2; sensor lens SEN; and beam shaping lens BS.

Hereupon, as the light source for the high density optical disk HD, other than the above blue violet semiconductor laser LD1, a blue violet SHG laser can also be used.

Figure 20:
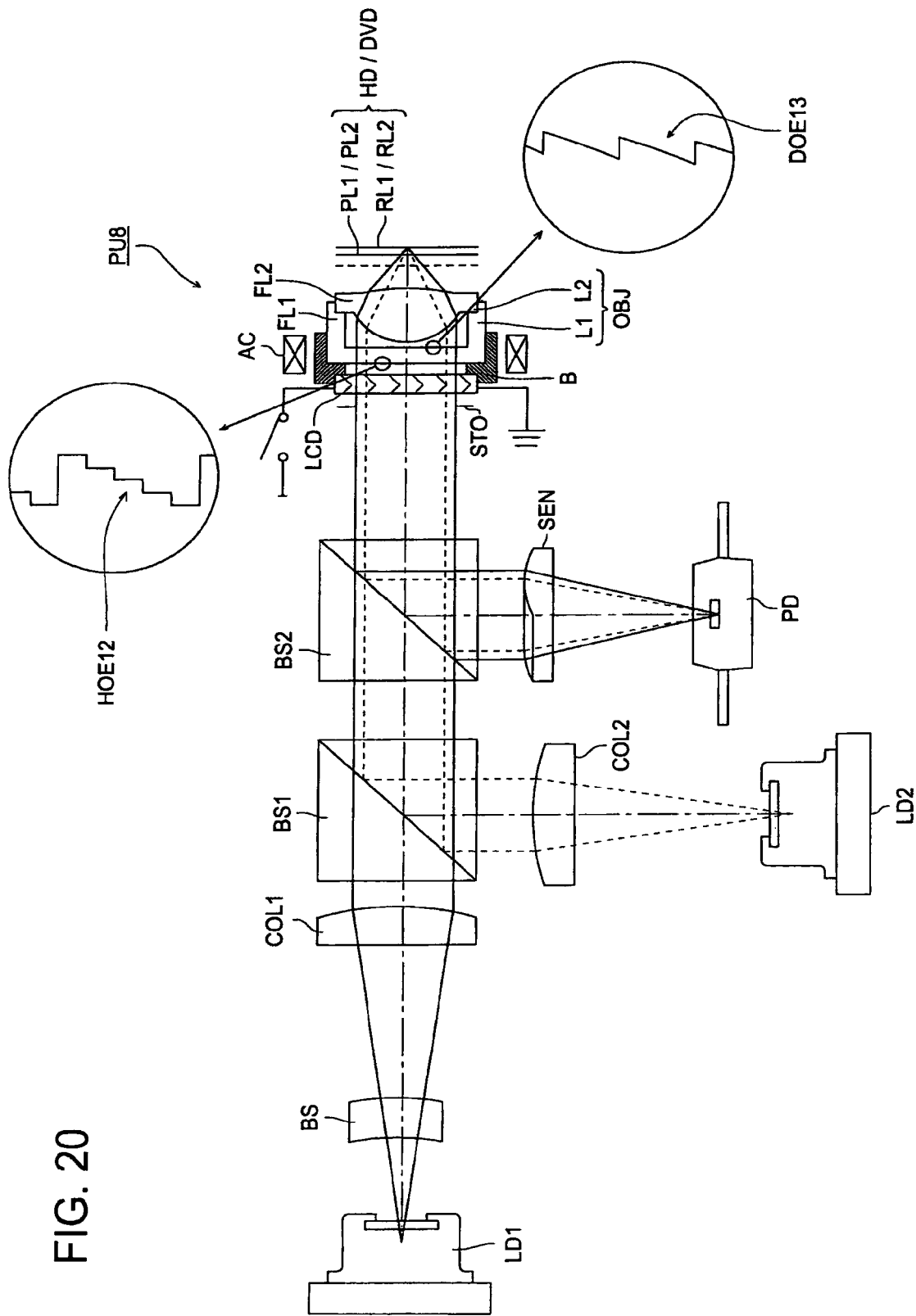
FIG. 20 is a plan view of a main portion showing a structure of an optical pickup device.

In the optical pickup device PU8, when the recording/reproducing of the information is conducted for the high density optical disk HD, as its ray of light path is drawn by a solid line in FIG. 20, the blue violet semiconductor laser LD1 is made to emit light. The divergent light flux projected from the blue violet semiconductor laser LD1 is, when transmits the beam shaping element SH, after its sectional shape is shaped from elliptical to circular, converted to parallel light flux by the first collimator lens COL, and after it transmits the first and second polarized beam splitters BS1, BS2, the light flux diameter is regulated by stop STO, and transmits the liquid crystal phase control element LCD, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery.

The reflected light flux modulated by the information pit on the information recording surface RL1 is, after it transmits again the objective optical system OBJ, and liquid crystal phase control element LCD, it is reflected by the second polarized beam splitter BS2, and the astigmatism is given by the sensor lens SEN and it is converted into the converged light flux, and converged on the light receiving surface of the light detector PD1. Then, by using the output signal of the light detector PD1, the information recorded in the high density optical disk HD can be read.

Further, in the optical pickup device PU8, when the recording/reproducing of the information is conducted for DVD, as its ray of light path is drawn by a dotted line in FIG. 20, the red semiconductor laser LD2 is made to emit light. The divergent light flux projected from the red semiconductor laser LD2 is converted into parallel light flux by the second collimator lens COL2, and after it is reflected by the first polarized beam splitter BS1, it transmits the second polarized beam splitter BS2, and liquid crystal phase control element LCD, and it becomes a spot formed on the information recording surface RL2 through the protective layer PL2 of DVD by the objective optical system OBJ. The objective optical system OBJ conducts the focusing and tracking by 2-axis actuator AC arranged in its periphery.

The reflected light flux modulated by the information pit on the information recording surface RL2, after it transmits again the objective optical system OBJ, and liquid crystal phase control element LCD, it is reflected by the second polarized beam splitter BS2, and the astigmatism is given by the sensor lens SEN, and it is converted into the converged light flux, and converged on the light receiving surface of the light detector PD1. Then, by using the output signal of the light detector PD1, the information recorded in DVD can be read.

Next, a structure of the objective optical system OBJ will be described. The aberration correcting element L1 and light converging element are plastic lenses. Further, in the periphery of respective optical function sections (areas of the aberration correcting element L1 and the light converging element L2, through which the laser light flux from the blue violet semiconductor laser LD1 passes), flange sections FL1 and FL2 integrally molded with the optical function section, are provided, and when both of a part of flange sections FL1 and FL2 are mutually connected, they are integrated.

The optical function surface S1 on the semiconductor laser light source side of the aberration correcting element L1 is, although graphic display is neglected, divided into the 30-th optical function area AREA 30 including the optical axis corresponding to an area in the numerical aperture 0.65 of DVD, and the 31-th optical function area AREA 31 corresponding to an area from the numerical aperture 0.65 of DVD to the numerical aperture 0.85 of the high density optical disk HD, and in the 30-th optical function area AREA 30, the superposition type diffractive structure HOE12, which is a structure in which a plurality of ring-shaped zones inside of which the step structure is formed, are arranged around the optical axis, is formed.

Because a structure of the superposition type diffractive structure HOE12 formed in the 30-th optical function area AREA 30 is the same as the superposition type diffractive structure HOE4, the detailed description will be omitted herein.

Further, on the optical function surface S2 on the optical disk side of the aberration correcting element L1, although graphic display is neglected, the diffractive structure DOE13 structured by a plurality of ring-shaped zones whose sectional shape including the optical axis is a saw-toothed shape, is formed.

The diffractive structure DOE13 is a structure for suppressing the axial chromatic aberration of the objective optical system OBJ in the blue violet area, and the spherical aberration following the temperature change, and the stepped section in the optical axis is designed so that, when the light flux of wavelength $\lambda 1=407$ nm enters, +5-degree diffracted light ray is generated in the diffraction efficiency of 100%. When the light flux of wavelength $\lambda 2=660$ nm enters into the diffractive structure DOE13, +3-degree diffracted light ray is generated in the diffraction efficiency of 99.8%, and the high diffraction efficiency can be secured also for any wavelength.

In the aberration correcting element L1 of the present embodiment, a structure in which the superposition type diffractive structure is formed on the optical function surface S1 on the semiconductor laser light source, and the type diffractive structure is formed on the optical function surface S2 on the optical disk side, is applied, however, in contrast to this, a structure in which the type diffractive structure is formed on the optical function surface S1 on the semiconductor laser light source side, and the superposition type diffractive structure is formed on the optical function surface S2 on the optical disk side, may also be applied.

Further, the liquid crystal phase control element LCD is structured by a liquid crystal layer by which the phase change is generated to the transmitting light flux by the impression of voltage, an electrode layer opposing each other to impress the voltage on the liquid crystal element, and a power source to supply the voltage to the electrode layer. At least one of the electrode layer opposing each other, is divided into a predetermined pattern, and when the voltage is impressed on this electrode layer, the orientation condition of the liquid crystal element is changed, and a predetermined phase can be added to the transmitting light flux. Hereby, because the spherical aberration of a spot formed on the information recording surface RL1 of the high density optical disk HD can be corrected, a good recording/reproducing characteristic can be always maintained to the high density optical disk HD.

Causes of generation of the spherical aberration corrected by the liquid crystal phase control element LCD are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

In the above description, a case where the spherical aberration of a spot formed on the information recording surface RL1 of the high density optical disk HD is corrected, is described, however, the spherical aberration of a spot formed on the information recording surface RL2 of DVD may also be corrected by the liquid crystal phase control element LCD.

Further, the objective optical system OBJ and the liquid crystal phase control element LCD are integrated through a connection member B.

Hereupon, the objective optical system OBJ in the present embodiment has, in the same manner as the second optical pickup device PU2, the third optical pickup device PU3, the fifth optical pickup device PU5, the seventh optical pickup device PU7, the aperture switching function corresponding to the numerical aperture NA2 of DVD, and by this aperture switching function, the aperture switching corresponding to NA2, is conducted.

The Ninth Embodiment

Figure 21:
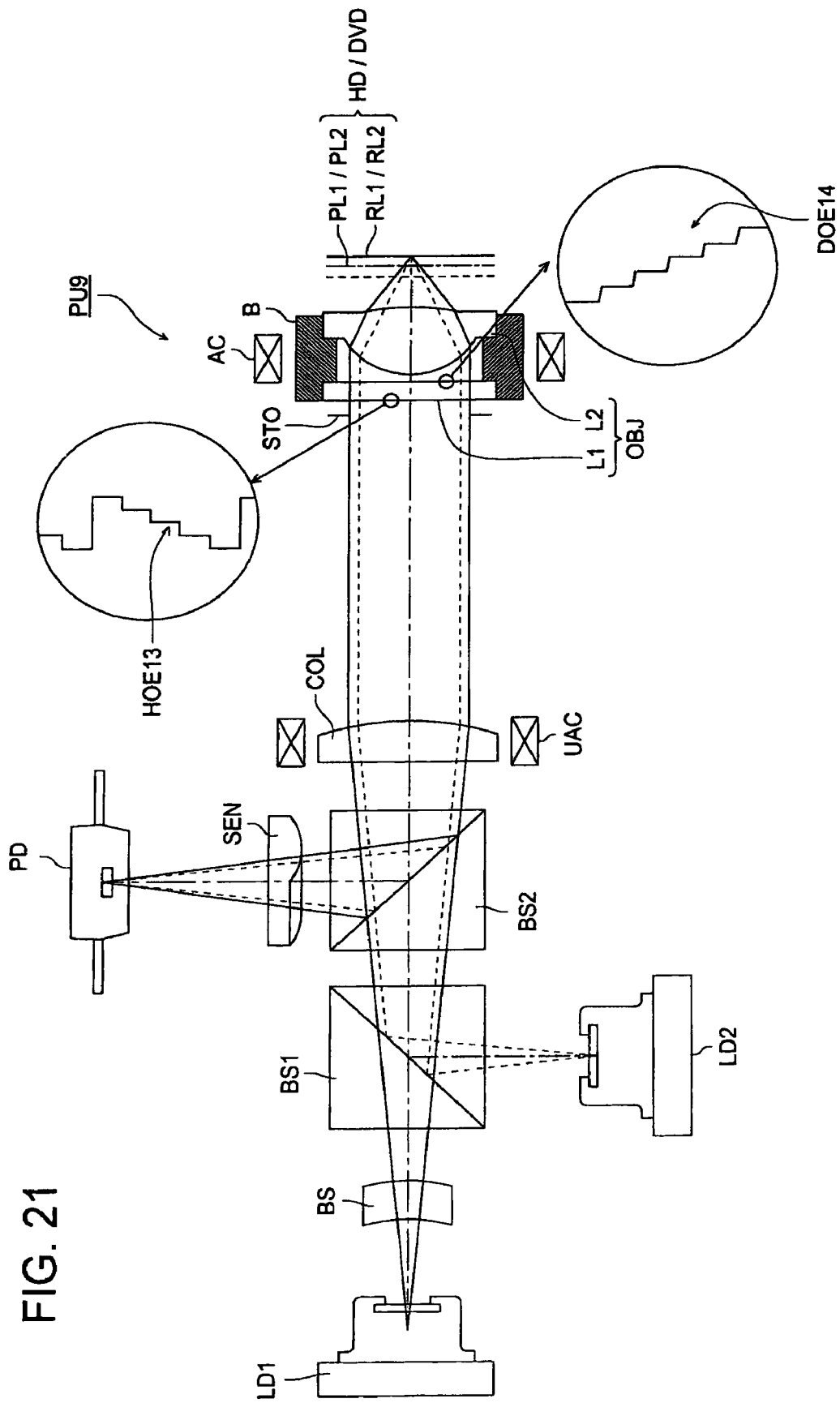
FIG. 21 is a plan view of a main portion showing a structure of an optical pickup device.

FIG. 21 is a view generally showing a structure of the ninth optical pickup device PU9 by which the recording/reproducing of the information can be adequately conducted also for any one of the high density optical disk, and DVD. The optical specification of the high density optical disk HD is the wavelength $\lambda1=405$ nm, the thickness t1 of the protective layer PL1=0.1 mm, numerical aperture NA1=0.85, the optical specification of DVD is the wavelength $\lambda2=650$ nm, the thickness t2 of the protective layer PL2=0.6 mm, numerical aperture NA=0.65. However, a combination of the wavelength, thickness of the protective layer, and numerical aperture is not limited to this.

The optical pickup device PU9 is structured by: the blue violet semiconductor laser LD1 which is made to emit light when the recording/reproducing of the information is conducted for the high density optical disk HD and which projects the laser light flux of 405 nm; red semiconductor laser LD2 laser which is made to emit light when the recording/reproducing of the information is conducted for DVD and which projects the laser light flux of 650 nm; light detector PD which is commonly used for the high density optical disk HD and DVD; objective optical system OBJ structured by the aberration correcting element L1 and the light converging element L2 which has a function by which the laser light fluxes transmitted this aberration correcting element L1 are light converged on the information recording surfaces RL1, RL2, and both surfaces of which are aspherical surfaces; 2-axis actuator AC; wavelength selection filter WF; liquid crystal phase control element LCD; 2-axis actuator AC; stop STO corresponding to the numerical aperture NA 0.85 of the high density optical disk HD; first polarized beam splitter BS1; second polarized beam splitter BS2; collimator lens COL; 1-axis actuator UAC; sensor lens SEN; and beam shaping lens BS.

Hereupon, as the light source for the high density optical disk HD, other than the above blue violet semiconductor laser LD1, a blue violet SHG laser can also be used.

In the optical pickup device PU9, when the recording/reproducing of the information is conducted for the high density optical disk HD, as its ray of light path is drawn by a solid line in FIG. 21, the blue violet semiconductor laser LD1 is made to emit light. The divergent light flux projected from the blue violet semiconductor laser LD1 is, when transmits the beam shaping element SH, after its sectional shape is shaped from elliptical to circular, converted to parallel light flux by the first collimator lens COL, after it transmits the first and second polarized beam splitters BS1, BS2, and the light flux diameter is regulated by stop STO, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery.

The reflected light flux modulated by the information pit on the information recording surface RL1 is, after it transmits again the objective optical system OBJ, and collimator lens COL, it is reflected by the second polarized beam splitter BS2, and the astigmatism is given by the sensor lens SEN and it is converted into the converged light flux, and converged on the light receiving surface of the light detector PD1. Then, by using the output signal of the light detector PD1, the information recorded in the high density optical disk HD can be read.

Further, in the optical pickup device PU9, when the recording/reproducing of the information is conducted for DVD, as its ray of light path is drawn by a dotted line in FIG. 21, the red semiconductor laser LD2 is made to emit light. The divergent light flux projected from the red semiconductor laser LD2 is, after it is reflected by the first polarized beam splitter BS1, it transmits the second polarized beam splitter BS2, and is converted to parallel light flux by the collimator lens COL, and it becomes a spot formed on the information recording surface RL2 through the protective layer PL2 of DVD by the objective optical system OBJ. The objective optical system OBJ conducts the focusing and tracking by 2-axis actuator AC arranged in its periphery.

The reflected light flux modulated by the information pit on the information recording surface RL2, after it transmits again the objective optical system OBJ, and collimator lens COL, it is reflected by the second polarized beam splitter BS2, and the astigmatism is given by the sensor lens SEN, and it is converted into the converged light flux, and converged on the light receiving surface of the light detector PD1. Then, by using the output signal of the light detector PD1, the information recorded in DVD can be read.

Next, a structure off the objective optical system OBJ will be described. The aberration correcting element L1 is a plastic lens, and the light converging element L2 is a glass lens. Further, the aberration correcting element L1 and the light converging element L2 are integrated through a connection member B.

The optical function surface S1 on the semiconductor laser light source side of the aberration correcting element L1 is, although graphic display is neglected, divided into the 32-th optical function area AREA 32 including the optical axis corresponding to an area in the numerical aperture 0.65 of DVD, and the 33-th optical function area AREA 33 corresponding to an area from the numerical aperture 0.65 of DVD to the numerical aperture 0.85 of the high density optical disk HD, and in the 32-th optical function area AREA 32, the superposition type diffractive structure HOE13, which is a structure in which a plurality of ring-shaped zones inside of which the step structure is formed, are arranged around the optical axis, is formed.

Because the structure of the superposition type diffractive structure HOE13 formed in the 32-th optical function area AREA 32 is the same as the superposition type diffractive structure HOE4 in the second optical pickup device PU2, the detailed description will be omitted herein.

Further, on the optical function surface S2 on the optical disk side of the aberration correcting element L1, although graphic display is neglected, the diffractive structure DOE14 structured by a plurality of ring-shaped zones whose sectional shape including the optical axis is a step shape, is formed.

The diffractive structure DOE14 is a structure for correcting the chromatic spherical aberration of the objective optical system OBJ in blue violet area, and the stepped section in the optical axis direction is designed so that, when the light flux of wavelength $\lambda1=405$ nm enters, +5-degree diffracted light ray is generated in the diffraction efficiency of 100%. When the light flux of wavelength $\lambda2=650$ nm enters into the diffractive structure DOE14, +3-degree diffracted light ray is generated in the diffraction efficiency of 100%, and the high diffraction efficiency is secured also for any wavelengths.

In the aberration correcting element L1 of the present embodiment, a structure in which the superposition type diffractive structure is formed on the optical function surface S1 on the semiconductor laser light source side, and type diffractive structure is formed on the optical function surface S2 on the optical disk side, is applied, however, in contrast to this, a structure in which the type diffractive structure is formed on the optical function surface S1 on the semiconductor laser light source side, and the superposition type diffractive structure is formed on the optical function surface S2 on the optical disk side, may also be applied.

Further, the collimator lens COL of the present embodiment is structured so that its position can be shifted in the optical axis direction by the 1-axis actuator UAC. Hereby, because the spherical aberration of a spot formed on the information recording surface RL1 of the high density optical disk HD can be corrected, a good recording/reproducing characteristic can be always maintained for the high density optical disk HD.

Causes of generation of the spherical aberration corrected by the position adjustment of the collimator lens COL are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

In the above description, a case where the spherical aberration of a spot formed on the information recording surface RL1 of the high density optical disk HD is corrected, is described, however, the spherical aberration of a spot formed on the information recording surface RL2 of DVD may also be corrected by the position adjustment of the collimator lens COL.

Hereupon, the objective optical system OBJ in the present embodiment has, in the same manner as the second optical pickup device PU2, the third optical pickup device PU3, the fifth optical pickup device PU5, the seventh optical pickup device PU7, and the eighth optical pickup device PU8, the aperture switching function corresponding to the numerical aperture NA2 of DVD, and by this aperture switching function, the aperture switching corresponding to NA2, is conducted.

The Tenth Embodiment

Figure 22:
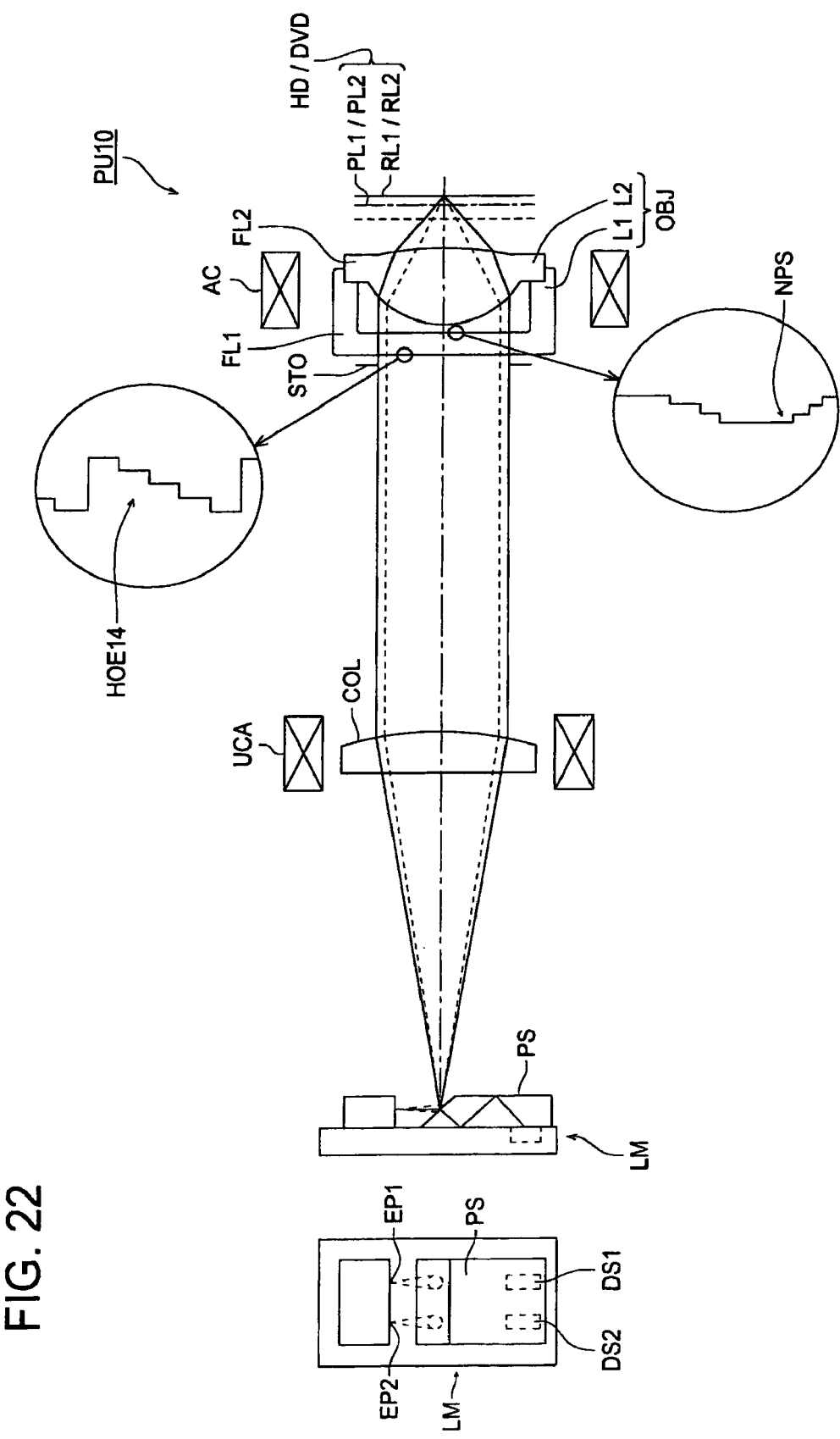
FIG. 22 is a plan view of a main portion showing a structure of an optical pickup device.

FIG. 22 is a view generally showing a structure of the tenth optical pickup device PU10 by which the recording/reproducing of the information can be adequately conducted for any one of the high density optical disk, and DVD. The optical specification of the high density optical disk HD is the wavelength $\lambda 1=407$ nm, the thickness t1 of the protective layer PL1=0.875 mm, numerical aperture NA1=0.85, and the optical specification of DVD is the wavelength $\lambda 2=660$ nm, the thickness t2 of the protective layer PL2=0.6 mm, numerical aperture NA=0.65. However, a combination of the wavelength, thickness of the protective layer, and numerical aperture is not limited to this.

The optical pickup device PU10 is structured by: a laser module LM for the high density optical disk/DVD structured by the first light emitting point EP1 which is made to emit light when the recording/reproducing of the information is conducted for the high density optical disk HD and which projects the laser light flux of 407 nm; the second light emitting point EP2 which is made to emit light when the recording/reproducing of the information is conducted for DVD and which projects the laser light flux of 660 nm; first light receiving section DS1 which light-receives the reflected light flux from the information recording surface RL1 of the high density optical disk HD; second light receiving section DS2 which light-receives the reflected light flux from the information recording surface RL2 of DVD; and prism PS; objective optical system OBJ structured by the aberration correcting element L1 and the light converging element L2 which has a function by which the laser light flux transmitted this aberration correcting element L1 is light converged on information recording surfaces RL1, RL2, and both surfaces of which are aspherical surfaces; 2-axis actuator AC; stop STO corresponding to numerical aperture NA 0.85 of the high density optical disk HD; collimator lens COL; and 1-axis actuator UAC.

Hereupon, as the light source for the high density optical disk HD, other than the above-described blue violet semiconductor laser LD1, a blue violet SHG laser can also be used.

Further, in the optical pickup device PU110, when the recording/reproducing of the information is conducted for the high density optical disk HD, the first light emitting point EP1 is made to emit light. The divergent light flux projected from the first light emitting point EP1 is, as its ray of light path is drawn by a solid line in FIG. 22, after reflected by the prism PS, it is converted into parallel light flux by the collimator lens COL, and it becomes a spot formed on the information recording surface RL1 through the protective layer PL1 of the high density optical disk HD by the objective optical system OBJ. The objective optical system OBJ conducts the focusing and tracking by 2-axis actuator AC arranged in its periphery. The reflected light flux modulated by the information pit on the information recording surface RL1 transmits again the objective optical system OBJ, and collimator lens COL, and is reflected two times inside the prism PS, and light-converged on the light receiving surface of the light detector section PD1. Then, by using the output signal of the light detector section PD1, the information recorded in the high density optical disk HD can be read.

Further, in the optical pickup device PU110, when the recording/reproducing of the information is conducted for DVD, the second light emitting point EP2 is made to emit light. The divergent light flux projected from the second light emitting point EP2 is, as its ray of light path is drawn by a dotted line in FIG. 22, after reflected by the prism PS, it transmits the collimator lens COL. Then, it enters into the objective optical system OBJ as the divergent light, and it becomes a spot formed on the information recording surface RL2 through the protective layer PL2 of DVD by the objective optical system OBJ. The objective optical system OBJ conducts the focusing and tracking by 2-axis actuator AC arranged in its periphery. The reflected light flux modulated by the information pit on the information recording surface RL2 transmits again the objective optical system OBJ, and collimator lens COL, and is reflected two times inside the prism PS, and light-converged on the light detector section PD2. Then, by using the output signal of the light detector section PD2, the information recorded in DVD can be read.

Next, a structure of the objective optical system OBJ will be described. Both of aberration correcting element L1 and light converging element L2 are plastic lenses. Further, in the periphery of respective optical function sections (areas of the aberration correcting element L1 and the light converging element L2, through which the laser light flux from the blue violet semiconductor laser LD1 passes), flange sections FL1 and FL2 integrally molded with the optical function section, are provided, and when both of a part of flange sections FL1 and FL2 are mutually connected, they are integrated.

The optical function surface S1 on the semiconductor laser light source side of the objective optical system OBJ is, although graphic display is neglected, divided into the 34-th optical function area AREA 34 including the optical axis corresponding to an area in the numerical aperture 0.65 of DVD, and the 35th optical function area AREA 35 corresponding to an area from the numerical aperture 0.65 of DVD to the numerical aperture 0.85 of the high density optical disk HD. Then, in the 34-th optical function area AREA 34, the superposition type diffractive structure HOE14, which is a structure in which a plurality of ring-shaped zones inside of which the step structure is formed, are arranged around the optical axis, is formed.

Because a structure of the superposition type diffractive structure HOE14 formed in the 34-th optical function area AREA 34 is the same as the superposition type diffractive structure HOE4 in the second optical pickup device PU2, the detailed description will be omitted herein.

On the optical function surface S2 on the optical disk side of the aberration correcting element L1, the optical path difference grant structure NPS which is a structure for suppressing the spherical aberration following the temperature change of the objective optical system OBJ in the blue violet area, is formed. The stepped section in the optical axis direction of this optical path difference grant structure NPS is set to a depth in which, in the design reference temperature of the objective optical system OBJ, 5-time optical path differences are given to the light flux of wavelength $\lambda 1$. When the light flux of wavelength $\lambda 2$ enters into the stepped section set to such a depth, because the optical path difference given to the light flux of wavelength $\lambda 2$ is 3 times of $\lambda 2$, the high transmission factor is secured also for any wavelength.

Because the optical path difference grant structure NPS has the refractive index dependency of the spherical aberration in which, when the refractive index is lowered, the spherical aberration changes in the under correction direction, and when the refractive index is increased, the spherical aberration changes in the over correction direction, the spherical aberration change following the temperature change of the objective optical system OBJ in the blue violet area, can be suppressed.

In the aberration correcting element L1 of the present embodiment, a structure in which the superposition type diffractive structure HOE14 is formed on the optical function surface S1 on the semiconductor laser light source side, and the optical path difference grant structure NPS is formed on the optical function surface S2 on the optical disk side, is applied, however, in contrast to this, a structure in which the optical path difference grant structure NPS is formed on the optical function surface S1 on the semiconductor laser light source side, and the superposition type diffractive structure HOE14 is formed on the optical function surface S2 on the Optical disk side, may also be applied.

Further, the collimator lens COL of the present embodiment is structured so that its position can be shifted in the optical axis direction by the 1-axis actuator UAC. Hereby, because the spherical aberration of a spot formed on the information recording surface RL1 of the high density optical disk HD can be corrected, a good recording/reproducing characteristic can be always maintained for the high density optical disk HD.

Causes of generation of the spherical aberration corrected by the position adjustment of the collimator lens COL are, for example, a wavelength dispersion by the production error of the blue violet semiconductor laser LD1, the refractive index change or refractive index distribution of the objective optical system OBJ following the temperature change, a focus-jump between layers at the time of recording/reproducing for the multi-layer disk such as 2-layer disk, 4-layer disk, and the thickness dispersion or thickness distribution by the production error of the protective layer PL1.

In the above description, a case where the spherical aberration of a spot formed on the information recording surface RL1 of the high density optical disk HD is corrected, is described, however, the spherical aberration of a spot formed on the information recording surface RL2 of DVD may also be corrected by the position adjustment of the collimator lens COL.

Hereupon, the objective optical system OBJ in the present embodiment has, in the same manner as the second optical pickup device PU2, the third optical pickup device PU3, the fifth optical pickup device PU5, the seventh optical pickup device PU7, the eighth optical pickup device PU8, and the ninth optical pickup device PU9, the aperture switching function corresponding to the numerical aperture NA2 of DVD, and by this aperture switching function, the aperture switching corresponding to NA2, is conducted.

Eleventh Embodiment

Figure 30:
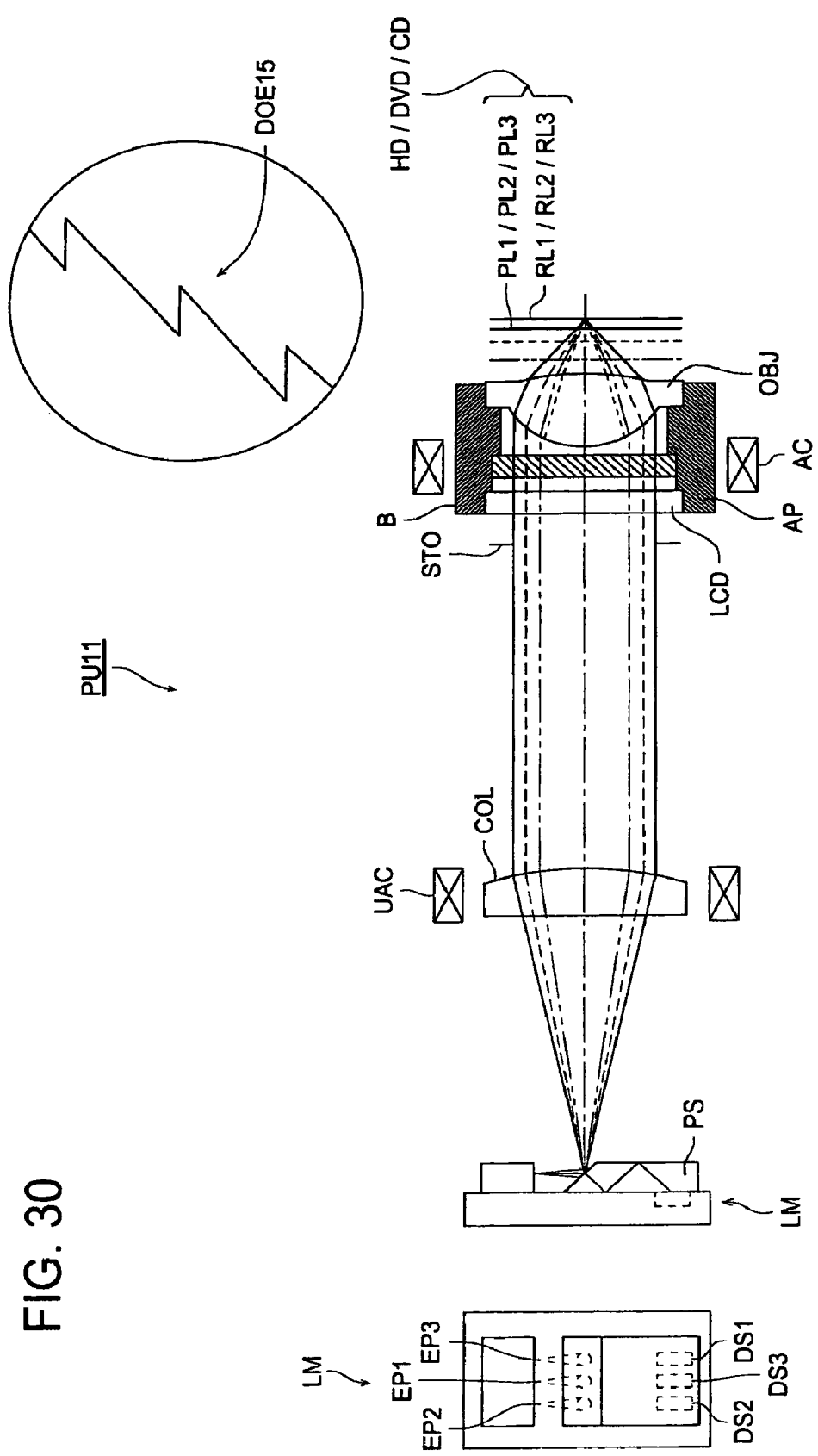
FIG. 30 is a plan view of a main portion showing a structure of an optical pickup device.

FIG. 30 is a diagram showing schematically the structure of $11^{th}$ optical pickup device PU 11 that can conduct recording/reproducing of information properly for any of high density optical disc HD, DVD and CD. In the optical specifications of the high density optical disc HD, wavelength $\lambda 1$ is equal to 408 nm, thickness t1 of protective layer PL1 is equal to 0.0875 mm and numerical aperture NA1 is equal to 0.85, in the optical specifications of DVD, wavelength $\lambda 12$ is equal to 658 nm, thickness t2 of protective layer PL2 is equal to 0.6 mm and numerical aperture NA2 is equal to 0.65, and in the optical specifications of CD, wavelength $\lambda 3$ is equal to 785 nm, thickness t2 of protective layer PL3 is equal to 1.2 mm and numerical aperture NA3 is equal to 0.45.

Optical pickup device PU11 is composed of laser module LM for high density optical disc HD/DVD/CD that is composed of light-emitting point EP1 (first light source) that emits a laser light flux (first light flux) with a wavelength of 408 nm which is emitted when conducting recording/reproducing of information for high density optical disc HD, light-emitting point EP2 (second light source) that emits a laser light flux (second light flux) with a wavelength of 658 nm which is emitted when conducting recording/reproducing of information for DVD, light-emitting point EP3 (second light source) that emits a laser light flux (third light flux) with a wavelength of 785 nm which is emitted when conducting recording/reproducing of information for CD, first light-receiving section DS1 that receives reflected light flux coming from information recording surface RL1 of high density optical disc HD, second light-receiving section DS2 that receives reflected light flux coming from information recording surface RL2 of DVD, third light-receiving section DS3 that receives reflected light flux coming from information recording surface RL3 of CD, and prism PS, objective optical system (light-converging element) OBJ wherein a diffractive structure (phase structure) is formed on its optical surface, and its both surfaces are aspherical, aperture regulating element AP for DVD/CD, biaxial actuator AC for driving objective optical element OBJ for focusing/tracking, diaphragm STO corresponding to numerical aperture NA1 of high density optical disc HD, collimator lens COL, uniaxial actuator UAC that drives collimator lens COL in the optical axis direction, liquid crystal phase control element LCD (spherical aberration correcting means), and holding member B that integrates objective optical system OBJ, aperture regulating element AP and liquid crystal phase control element LCD solidly. In the present embodiment, an aberration correcting element having a phase structure and a light-converging element which makes the first-third light fluxes to converge light respectively on information recording surface RL1 of high density optical disc HD, information recording surface RL2 of DVD and information recording surface RL3 of CD are integrated solidly in the structure.

In optical pickup device PU11, when conducting recording/reproducing of information for high density optical disc HD, laser module LM is operated to make the first light-emitting point EP1 to emit light. A divergent light flux emitted from the first light-emitting point EP1 is reflected by prism PS as its light path is drawn with solid lines in FIG. 30, then, it passes through collimator lens COL to be converted into a parallel light flux, then, the parallel light flux is regulated, in terms of its diameter, by diaphragm STO, and it passes through liquid crystal phase control element LCD and aperture regulating element AP to become a spot formed on information recording surface RL1 by objective optical system OBJ through the first protective layer PL1. The objective optical system OBJ conducts focusing and tracking with biaxial actuator AC1 arranged around the objective optical system OBJ. The reflected light flux modulated by information pits on information recording surface RL1 passes again through objective optical system OBJ, aperture regulating element AP and liquid crystal phase control element LCD to be converted into a converged light flux by collimator lens COL, and is reflected twice in prism PS to be converged on light-receiving section D51. Then, information recorded in high density optical disc HD can be read by using output signals of the light-receiving section DS1.

In optical pickup device PU11, when conducting recording/reproducing of information for DVD, collimator lens COL is moved by uniaxial actuator UAC so that a distance between objective optical system OBJ and collimator lens COL may be smaller than that in the case of conducting recording/reproducing of information for high density optical disc HD, so that the second light flux may emerge from collimator lens COL under the state of a parallel light flux. After that, laser module LM is operated to make the second light-emitting point EP2 to emit light. A divergent light flux emitted from the second light-emitting point EP2 is reflected by prism PS as its light path is drawn with dotted lines in FIG. 30, then, it passes through collimator lens COL to be converted into a parallel light flux, then, the parallel light flux passes through liquid crystal phase control element LCD and is regulated, in terms of its diameter, by aperture regulating element AP to become a spot formed on information recording surface RL2 by objective optical system OBJ through the second protective layer PL2. The objective optical system OBJ conducts focusing and tracking with biaxial actuator AC1 arranged around the objective optical system OBJ. The reflected light flux modulated by information pits on information recording surface RL2 passes again through objective optical system OBJ, aperture regulating element AP and liquid crystal phase control element LCD to be converted into a converged light flux by collimator lens COL, and is reflected twice in prism PS to be converged on light-receiving section DS2. Then, information recorded in DVD can be read by using output signals of the light-receiving section DS2.

When conducting recording/reproducing of information for CD in optical pickup device PU11, liquid crystal phase control element LCD is operated in a way that spherical aberration in the direction toward insufficient correction may be added to the third light flux that passes through the liquid crystal phase control element LCD, for correcting spherical aberration caused by a difference between thickness t1 of protective layer PL1 and thickness t3 of protective layer PL3. After that, laser module LM is operated to make the third light-emitting point EP3 to emit light. A divergent light flux emitted from the third light-emitting point EP3 is reflected by prism PS as its light path is drawn with two-dot chain lines in FIG. 30, then, it passes through collimator lens COL to be converted into a parallel light flux, then, the parallel light flux passes through liquid crystal phase control element LCD to be given spherical aberration in the direction toward insufficient correction, and is regulated, in terms of its diameter, by aperture regulating element AP to become a spat formed on information recording surface RL3 by objective optical system OBJ through the third protective layer PL3. The objective optical system OBJ conducts focusing and tracking with biaxial actuator AC1 arranged around the objective optical system OBJ. The reflected light flux modulated by information pits on information recording surface RL3 passes again through objective optical system OBJ, aperture regulating element AP and liquid crystal phase control element LCD to be converted into a converged light flux by collimator lens COL, and is reflected twice in prism PS to be converged on light-receiving section DS3. Then, information recorded in CD can be read by using output signals of the light-receiving section DS3.

Incidentally, in the same way as in the case of DVD, it is also possible to arrange so that collimator lens COL is moved by uniaxial actuator UAC so that a distance between objective optical system OBJ and collimator lens COL may be smaller than that in the case of conducting recording/reproducing of information for high density optical disc HD, so that the third light flux may emerge from collimator lens COL under the state of a parallel light flux.

Next, the structure of the objective optical system OBJ will be explained as follows. Diffractive structure DOE15 (its section is in a serrated form) formed on an optical surface on the laser module side LM is a structure to correct spherical aberration caused by a difference between thickness t1 of protective layer PL1 and thickness t2 of protective layer PL2. The objective optical system OBJ converges primary diffracted light ray of the first-third light fluxes generated by diffractive structure DOE15 respectively on information recording surface RL1 of high density optical disc HD, information recording surface RL2 of DVD and information recording surface RL3 of CD. Since the optical path difference function of the diffractive structure DOE15 is optimized so that spherical aberration caused by a difference between thickness t1 of protective layer PL1 and thickness t2 of protective layer PL2 may be corrected, spherical aberration caused by a difference between thickness t1 of protective layer PL1 and thickness t3 of protective layer PL3 cannot be corrected completely, and some spherical aberrations remain. In the present embodiment, however, compatibility between high density disc HD and CD is attained by correcting the residual spherical aberration with liquid crystal phase control element LCD.

The collimator lens COL in the present embodiment is constructed so that its position may be moved in the optical axis direction by uniaxial actuator UAC, which makes it possible to correct spherical aberration of a spot formed on information recording surface RL1 of high density optical disc HD. Causes for generation of spherical aberration corrected by position adjustment of the collimator lens COL include, for example, wavelength dispersion caused by manufacturing errors for the first light source, refractive index changes and refractive index distribution of objective optical system OBJ resulted from temperature changes, focus jump between layers in recording/reproducing for multi-layer disc such as 2-layer disc and 4-layer disc, and thickness dispersion and thickness distribution resulting from manufacturing errors for protective layer PL1.

In the explanation above, there has been described an occasion where spherical aberration of a spot formed on information recording surface RL1 of high density optical disc HD was corrected, spherical aberration of a spot formed on information recording surface RL2 of DVD may also be corrected by position adjustment for collimator lens COL.

Twelfth Embodiment

Figure 31:
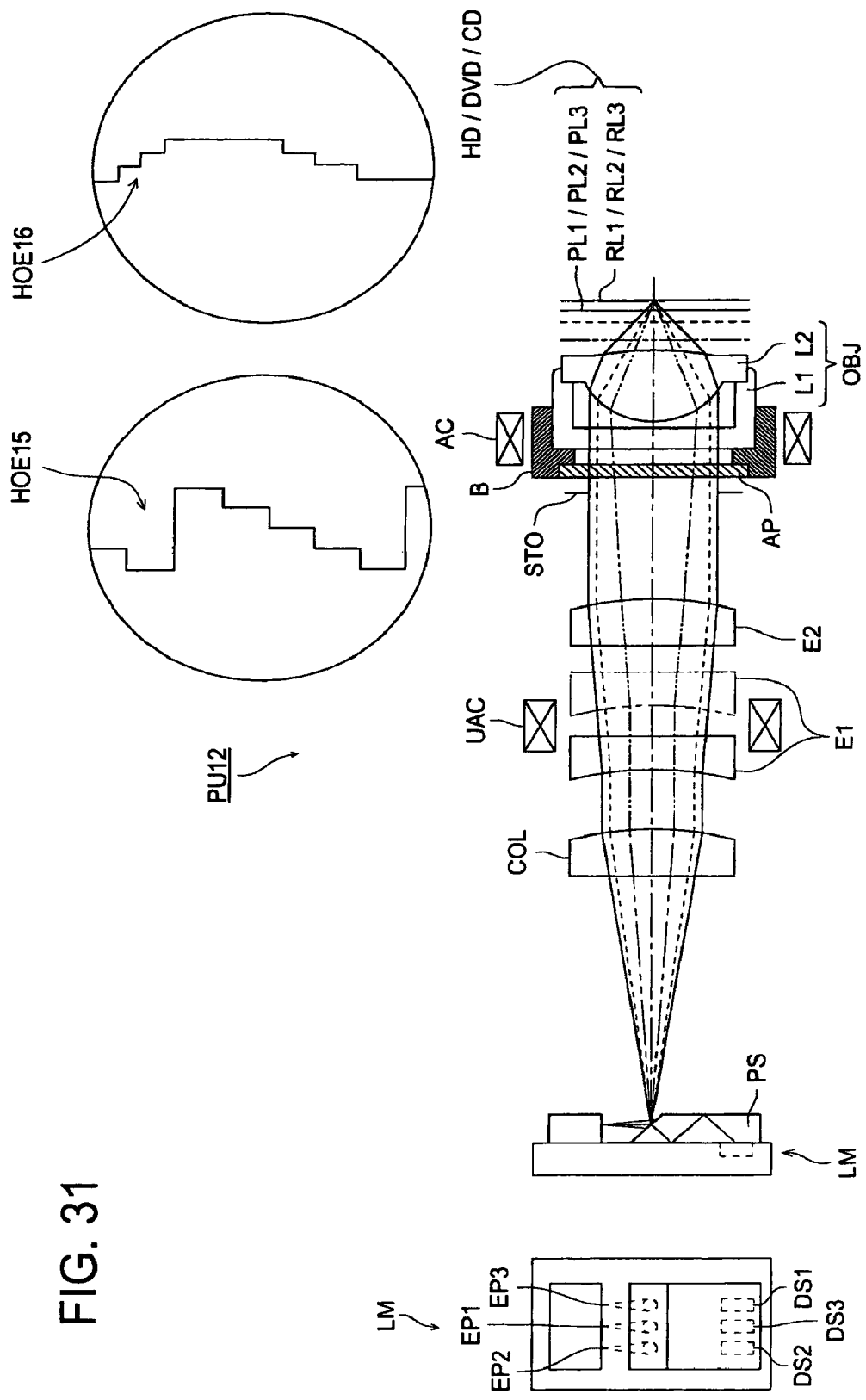
FIG. 31 is a plan view of a main portion showing a structure of an optical pickup device.

FIG. 31 is a diagram showing schematically the structure of $12^{th}$ optical pickup device PU12 that can conduct recording/reproducing properly for any of high density optical disc HD, DVD and CD. In the optical specifications of the high density optical disc HD, wavelength $\lambda 1$ is equal to 408 nm, thickness t1 of protective layer PL1 is equal to 0.0875 mm and numerical aperture NA1 is equal to 0.85, in the optical specifications of DVD, wavelength $\lambda 2$ is equal to 658 nm, thickness t2 of protective layer PL2 is equal to 0.6 mm and numerical aperture NA2 is equal to 0.65, and in the optical specifications of CD, wavelength $\lambda 3$ is equal to 785 nm, thickness t2 of protective layer PL3 is equal to 1.2 mm and numerical aperture NA3 is equal to 0.45. However, a combination of the wavelength, a thickness of a protective layer and a numerical aperture is not limited to the foregoing.

Optical pickup device PU11 is composed of laser module LM for high density optical disc HD/DVD/CD that is composed of light-emitting point EP1 (first light source) that emits a laser light flux (first light flux) with a wavelength of 408 nm which is emitted when conducting recording/reproducing of information for high density optical disc HD, light-emitting point EP2 (second light source) that emits a laser light flux (second light flux) with a wavelength of 658 nm which is emitted when conducting recording/reproducing of information for DVD, light-emitting point EP3 (second light source) that emits a laser light flux (third light flux) with a wavelength of 785 nm which is emitted when conducting recording/reproducing of information for CD, first light-receiving section DS1 that receives reflected light flux coming from information recording surface RL1 of high density optical disc HD, second light-receiving section DS2 that receives reflected light flux coming from information recording surface RL2 of DVD, third light-receiving section DS3 that receives reflected light flux coming from information recording surface RL3 of CD, and prism PS, objective optical system (light-converging element) OBJ composed of aberration correcting element L1 having on its optical surface the superposed diffractive structure (phase structure) and a diffractive structure (second diffractive structure) and of light-converging element L2 whose both surfaces are aspherical, aperture regulating element AP for CD, biaxial actuator AC for driving objective optical element OBJ for focusing/tracking, diaphragm STO corresponding to numerical aperture NA1 of high density optical disc HD, collimator lens COL, expander lens EXP (aspherical surface correcting means) composed of negative lens E1 and positive lens E2, uniaxial actuator UAC that drives negative lens E1 in the optical axis direction and holding member B that integrates objective optical system OBJ and aperture regulating element AP solidly.

In optical pickup device PU12, when conducting recording/reproducing of information for high density optical disc HD, laser module LM is operated to make the first light-emitting point EP1 to emit light. A divergent light flux emitted from the first light-emitting point EP1 is reflected by prism PS as its light path is drawn with solid lines in FIG. 31, then, it passes through collimator lens COL to be converted into a parallel light flux, then, the parallel light flux passes through expander lens EXP to be enlarged in terms of a light flux diameter, then is regulated, in terms of its diameter, by diaphragm STO, and it passes through aperture regulating element AP to become a spot formed on information recording surface RL1 by objective optical system OBJ through first protective layer PL1. The objective optical system OBJ conducts focusing and tracking with biaxial actuator AC1 arranged around the objective optical system OBJ. The reflected light flux modulated by information pits on information recording surface RL1 passes again through objective optical system OBJ, aperture regulating element AP and expander lens EXP to be converted into a converged light flux by collimator lens COL, and is reflected twice in prism PS to be converged on light-receiving section DS1. Then, information recorded in high density optical disc HD can be read by using output signals of the light-receiving section DS1.

In optical pickup device PU12, when conducting recording/reproducing of information for DVD, negative lens E1 is moved by uniaxial actuator UAC so that a distance between negative lens E1 and positive lens E2 may be larger than that in the case of conducting recording/reproducing of information for high density optical disc HD, so that the second light flux may emerge from expander lens EXP under the state of a parallel light flux. After that, laser module LM is operated to make the second light-emitting point EP2 to emit light. A divergent light flux emitted from the second light-emitting point EP2 is reflected by prism PS as its light path is drawn with dotted lines in FIG. 31, then, it passes through collimator lens COL to be converted into a parallel light flux, then, the parallel light flux passes through expander lens EXP to be enlarged in terms of a diameter of the light flux, and it becomes a spot formed on information recording surface RL2 by objective optical system OBJ through the second protective layer PL2, after passing through the aperture regulating element AP. The objective optical system OBJ conducts focusing and tracking with biaxial actuator AC1 arranged around the objective optical system OBJ. The reflected light flux modulated by information pits on information recording surface RL2 passes again through objective optical system OBJ, aperture regulating element AP and expander lens EXP to be converted into a converged light flux by collimator lens COL, and is reflected twice in prism PS to be converged on light-receiving section DS2. Then, information recorded in DVD can be read by using output signals of the light-receiving section DS2.

In optical pickup device PU12, when conducting recording/reproducing of information for CD, negative lens E1 is moved by uniaxial actuator UAC so that a distance between negative lens E1 and positive lens E2 may be smaller than that in the case of conducting recording/reproducing of information for high density optical disc HD, so that spherical aberration resulted from a difference between thickness t1 of protective layer PL1 and thickness t3 of protective layer PL3 may be corrected. After that, laser module LM is operated to make the third light-emitting point EP3 to emit light. A divergent light flux emitted from the third light-emitting point EP3 is reflected by prism PS as its light path is drawn with two-dot chain lines in FIG. 31, then, it passes through collimator lens COL to be converted into a substantially parallel light flux, then, the parallel light flux passes through expander lens EXP to be converted into divergent light flux and it becomes a spot formed on information recording surface RL3 by objective optical system OBJ through the third protective layer PL3, after being regulated by the aperture regulating element AP in terms of a light flux diameter. The objective optical system OBJ conducts focusing and tracking with biaxial actuator AC1 arranged around the objective optical system OBJ. The reflected light flux modulated by information pits on information recording surface RL3 passes again through objective optical system OBJ, aperture regulating element AP and expander lens EXP to be converted into a converged light flux by collimator lens COL, and is reflected twice in prism PS to be converged on light-receiving section DS3. Then, information recorded in CD can be read by using output signals of the light-receiving section DS3.

Next, the structure of objective optical element OBJ will be explained. Each of aberration correcting element L1 and light-converging element L2 is a plastic lens, and when flange portion FL1 and flange portion FL2 each being formed to be solid with an optical functional portion of the plastic lens are cemented each other, they are integrated solidly. Superposed type structure HOE15 formed on an optical surface of aberration correcting element L1 on the part of laser module LM is a structure to correct spherical aberration caused by a difference between thickness t1 of protective layer PL1 and thickness t2 of protective layer PL2. Since its specific structure and functions are the same as those of the superposed type diffractive structure HOE4 in the second optical pickup device PU2, detailed explanation for them will be omitted here. Incidentally, since the superposed type structure HOE15 is formed in only numerical aperture NA2 of DVD, the second light flux that passes through the area outside NA2 becomes a flare component on information recording surface RL2 of DVD, and aperture restriction for DVD is carried out automatically, in the structure.

Further, the objective optical system OBJ makes $5^{th}$ order diffracted light ray of the first light flux, $3^{rd}$ order diffracted light ray of the second light flux and $2^{nd}$ order diffracted light ray of the third light flux which are generated on diffractive structure DOE16 (its sectional view is a staircase form) formed on an optical surface of aberration correcting element L1 on the part of the optical disc to be converged respectively on information recording surface RL1 of high density optical disc, information recording surface RL2 of DVD and on information recording surface RL3 of CD. This diffractive structure DOE16 is a structure to reduce spherical aberration caused by a difference between t1 and t3 by adding to the third light flux an optical path difference that is a half integer multiple of λ3. Owing to this, it is possible to prevent that an absolute value of magnification m3 of objective optical system OBJ to the third light flux in the case of conducting recording/reproducing of information for CD becomes too great, thus, an amount of movement of negative lens E1 can be small, and tracking characteristics of objective optical system OBJ can be made excellent.

In the structure of the present embodiment, spherical aberration of the spot formed on information recording surface RL1 of high density optical disc HD is corrected when moving negative lens E1 is moved in the optical axis direction by uniaxial actuator UAC. Causes for generation of spherical aberration to be corrected by positional adjustment of negative lens E1 include, for example, wavelength dispersion caused by manufacturing errors of the first light source, refractive index changes and refractive index distribution of objective optical system OBJ resulting from temperature changes, focus jump between layers in the case of conducting recording/reproducing for multi-layer disc such as 2-layer disc and 4-layer disc and thickness dispersion and thickness distribution caused by manufacturing errors for protective layers PL1.

There has been explained an occasion wherein spherical aberration of a spot formed on information recording surface RL1 of high density optical disc HD is corrected. However, it is also possible to arrange so that spherical aberration of a spot formed on information recording surface RL2 of DVD may be corrected by positional adjustment of negative lens E1. Further, it is possible to employ the structure wherein positive lens E2 is moved in place of negative lens E1.

Further, it is possible to use, as aspherical aberration correcting means, a collimator lens and a coupling lens which can be moved in the optical axis direction by an actuator, in place of expander lens EXP.

Next, 8 examples (Example 1-8) of an optical element preferable as the objective optical system OBJ of the above-described optical pickup devices PI1-PU4, PU8-PU10, will be described by listing specific numeral values.

The aspherical surface of optical surface on which the superposition type diffraction structure and diffraction structure in each example are formed, is expressed by an arithmetic expression, that is, the following Arith-5 into which coefficients in Table 15-Table 22 are substituted, when the deformation amount from the plane tangent to an apex of the plane, is X (mm), the height in the direction perpendicular to the optical axis is h (mm), and radius of curvature is r (mm). Where, κ is a conical coefficient, and A2i is an aspherical surface coefficient.

$$x = \frac{h^2/r}{1+\sqrt{1-(1+\kappa)\cdot(h/r)^2}} + \sum_{i=2} A_{2i} h^{2i} \quad \text{(Arith-5)}$$

Further, the superposition type diffractive structure and the diffractive structure in each example are expressed by the optical path difference added to transmission wave-front by these structures. Such an optical path difference is expressed by the optical path difference function φb (mm) defined by the above-described Arith-1, when λ is the wavelength of the incident light flux, λB is production wavelength, height in the direction perpendicular to the optical axis is h (mm), B2j is an optical path difference function coefficient, and n is the diffraction order.

In Table 15-Table 25, NA1, f1, λ1, m1 and t1 represent respectively a numerical aperture of objective optical system OBJ in the case of using high density optical disc HD, a focal length of the objective optical system OBJ, a wavelength of the objective optical system OBJ, a magnification of the objective optical system OBJ, and a thickness of a protective layer, while, NA2, f2, λ2, m2 and t2 represent the same values in the case of using DVD and NA3, f3, λ3, m3 and t3 represent the same values in the case of using CD.

Further, r (mm) represents a radius of curvature, d1 (mm), d2 (mm) and d3 (mm) represent lens distances respectively in the case of using high density optical disc HD, DVD and CD, Nλ1, NA2 and Nλ3 represent lens diffractive indexes respectively for wavelength λ1, wavelength λ2 and wavelength λ3, while, υd represents Abbe's number of the lens for d line.

Further, n1, n2 and n3 represent diffraction orders of diffracted rays of light respectively for the first, second and third light fluxes generated by a superposed type diffractive structure and a diffractive structure.

In the optical element of Examples 1 to 3, the light converging element L2 which is a plastic lens whose numerical aperture is 0.85, in which the spherical aberration correction is optimized to the wavelength 408 nm, thickness of the protective layer 0.0875 mm, and magnification 1/18.215, is combined with the aberration correcting element L2 which is a plastic lens in which the superposition type diffractive structure is formed on the optical function surface S1 on the semiconductor laser side, and the diffractive structure is formed on the optical function surface S2 on the optical disk side.

In the optical element of Example 4, the light converging element L2 which is a plastic lens whose numerical aperture is 0.85, in which the spherical aberration correction is optimized to the wavelength 408 nm, thickness of the protective layer 0.0875 mm, and magnification 1/17.123, is combined with the aberration correcting element L2 which is a plastic lens in which the superposition type diffractive structure is formed on the optical function surface S1 on the semiconductor laser side, and the diffractive structure is formed on the optical function surface S2 on the optical disk side.

Further, in the optical element of Example 5, the light converging element L2 which is a glass lens whose numerical aperture is 0.85, in which the spherical aberration correction is optimized to the wavelength 408 nm, thickness of the protective layer 0.0875 mm, and magnification 0, is combined with the aberration correcting element L2 which is a plastic lens in which the superposition type diffractive structure is formed on the optical function surface S1 on the semiconductor laser side, and the diffractive structure is formed on the optical function surface S2 on the optical disk side.

In the optical element of Example 6, the light converging element L2 which is a plastic lens whose numerical aperture is 0.85, in which the spherical aberration correction is optimized to the wavelength 407 nm, thickness of the protective layer 0.0875 mm, and magnification 1/14.104, is combined with the aberration correcting element L1 which is a plastic lens in which the superposition type diffractive structure is formed on the optical function surface S1 on the semiconductor laser side, and the diffractive structure is formed on the optical function surface S2 on the optical disk side.

In the optical element of Example 7, the light converging element L2 which is a glass lens whose numerical aperture is 0.85, in which the spherical aberration correction is optimized to the wavelength 405 nm, thickness of the protective layer 0.1 mm, and magnification 0, is combined with the aberration correcting element L1 which is a plastic lens in which the superposition type diffractive structure is formed on the optical function surface S1 on the semiconductor laser side, and the diffractive structure is formed on the optical function surface S2 on the optical disk side.

In the optical element of Example 8, the light converging element L2 which is a glass lens whose numerical aperture is 0.85, in which the spherical aberration correction is optimized to the wavelength 407 nm, thickness of the protective layer 0.0875 mm, and magnification 1/11.416, is combined with the aberration correcting element L1 which is a plastic lens in which the optical path difference grant structure NPS is formed on the optical function surface S1 on the semiconductor laser side, and the superposition type diffractive structure HOE is formed on the optical function surface S2 on the optical disk side.

Example 1

The optical element of Example 1 is an optimum optical element as the objective optical system OBJ of the first optical pickup device PU1 as shown in FIG. 1, and its specific numerical value data is shown in Table 15.

TABLE 15

(Example 1)

(Optical specification)

HD: NA1 = 0.85, f1 = 2.200 mm, λ1 = 408 nm, m1 = 0, t1 = 0.0875 mm
DVD: NA2 = 0.60, f2 = 2.287 mm, λ2 = 658 nm, m2 = −1/8.104, t2 = 0.6 mm
CD: NA3 = 0.45, f3 = 2.281 mm, λ3 = 785 nm, m3 = −1/8.032, t3 = 1.2 mm (Paraxial data)

| Surface No. | r (mm) | d1 (mm) | d2 (mm) | d3 (mm) | Nλ1 | Nλ2 | Nλ3 | vd |
|---|---|---|---|---|---|---|---|---|
| OBJ | | ∞ | 19.680 | 19.466 | | | | |
| STO | | 0.050 | 0.050 | 0.050 | | | | |
| 1 | (lower table) | 0.900 | 0.900 | 0.900 | 1.52424 | 1.50643 | 1.50497 | 56.5 |
| 2 | (lower table) | 0.050 | 0.050 | 0.050 | | | | |
| 3 | 1.442 | 2.510 | 2.510 | 2.510 | 1.55965 | 1.54062 | 1.53724 | 56.3 |
| 4 | −4.596 | 0.684 | 0.720 | 0.334 | | | | |
| 5 | ∞ | 0.0875 | 0.600 | 1.200 | 1.62110 | 1.57975 | 1.57326 | 30.0 |
| 6 | ∞ | | | | | | | |

(Paraxial radius of curvature of the 1st surface and 2nd surface, aspherical surface coefficient, diffraction order, production wavelength, optical path difference function coefficient)

| The 1st surface | | | The 2nd surface | |
|---|---|---|---|---|
| AREA 1 | AREA 2 | AREA 3 | AREA 4 | AREA 5 |
| (0 ≦ h ≦ 1.10) | (1.10 ≦ h ≦ 1.40) | (1.40 ≦ h) | (0 ≦ h ≦ 1.45) | (1.45 ≦ h) |

TABLE 15-continued (Example 1)

| | | | | | |
|---|---|---|---|---|---|
| r | −133.777 | −179.615 | −97.345 | −391.560 | 5742.431 |
| κ | 0 | 0 | 0 | 0 | 0 |
| A4 | 1.6642E−03 | −4.9735E−04 | 8.5644E−04 | 3.7997E−03 | 9.0524E−04 |
| A6 | −2.9440E−03 | −1.5451E−03 | −4.5098E−04 | −1.6029E−03 | 2.2495E−04 |
| A8 | 1.1591E−03 | 1.1728E−03 | 2.5259E−04 | 3.0156E−04 | 2.5769E−04 |
| A10 | 0 | −1.9139E−04 | −2.7080E−05 | 1.5420E−04 | −5.0597E−06 |
| n1/n2/n3 | 0/+1/0 | 0/−1/−2 | 0/−2/±3 | +2/+1/+1 | +2/+1/+1 |
| λB | 658 nm | 658 nm | 658 nm | 390 nm | 408 nm |
| B2 | 0 | 0 | 0 | −6.6500E−03 | −7.4212E−03 |
| B4 | −1.4058E−03 | 1.8254E−03 | 9.1200E−04 | −4.1697E−04 | −3.4132E−04 |
| B6 | 2.5969E−03 | −3.2646E−03 | 0 | −6.1147E−04 | −1.2010E−05 |
| B8 | −1.4389E−03 | 1.6818E−03 | 0 | 4.8077E−04 | −3.7652E−05 |
| B10 | 4.2555E−04 | −4.0655E−04 | 0 | −1.2778E−04 | −2.9101E−06 |

(aspherical surface coefficient of the 3rd surface and the 4th surface)

| | 3rd surface | 4th surface |
|---|---|---|
| κ | −6.6181E−01 | −1.6733E+02 |
| A4 | 1.1149E−02 | 1.0501E−01 |
| A6 | 2.4988E−03 | −1.1650E−01 |
| A8 | 1.8506E−05 | 1.0619E−01 |
| A10 | 2.9476E−04 | −7.0978E−02 |
| A12 | 6.5641E−05 | 2.7327E−02 |
| A14 | −4.2096E−05 | −4.3888E−03 |
| A16 | −3.6165E−06 | |
| A18 | 7.9919E−06 | |
| A20 | −1.2231E−06 | |

By the action of the superposition type diffractive structure HOE1 formed in the first optical function area AREA 1, while the magnification m2 to the wavelength λ2 and the magnification m3 to the wavelength λ3 are made almost coincident, the spherical aberration due to the difference of thickness between protective layers of the high density optical disk and DVD is corrected. Further, the superposition type diffractive structure HOE2 formed in the second optical function area AREA 2 and the superposition type diffractive structure HOE3 formed in the third optical function area AREA 3 function in the same manner as the dichroic filter when the recording/reproducing of the information is conducted for DVD or CD, and the aperture limit is automatically conducted.

Further, by the action of the diffractive structure DOE1 formed in the fourth optical function area AREA 4 and the diffractive structure DOE2 formed in the fifth optical function area AREA 5, the chromatic aberration in the blue violet area and the spherical aberration following the incident wavelength change are corrected.

When the wavelength change amount of the blue violet semiconductor laser LD1 by the mode-hopping, is assumed as +1 nm, to the change amount 151 mλ RMS of the defocus component in only the light converging element L2, when the light converging element L2 and the aberration correcting element L1 are combined, it becomes 20 mλ RMS, and it can be seen that the change of defocus component by the mode-hopping can be finely corrected.

Further, when the wavelength dispersion by the production error of the blue violet semiconductor laser LD1 is assumed as +10 nm, to the change amount 74 mλ RMS of the spherical aberration component in only the light converging element L2, when the light converging element L2 and the aberration correcting element L1 are combined, it becomes 4 mλ RMS, and it can be seen that the spherical aberration change following the incident wavelength change can be finely corrected.

Example 2

An optical element of Example 2 is an optimum optical element as the objective optical system OBJ of the second optical pickup device PU2 as shown in FIG. 3 and the fifth optical pickup device PU5 as shown in FIG. 14, and its specific numeric value data will be shown in Table 16.

TABLE 16

(Example 2)

(Optical specification of the optical element)

HD: NA1 = 0.85, f1 = 2.200 mm, λ1 = 408 nm, m1 = 0, t1 = 0.0875 mm

DVD: NA2 = 0.67, f2 = 2.282 mm, λ2 = 658 nm, m2 = 0, t2 = 0.6 mm

CD: NA3 = 0.45, f3 = 2.281 mm, λ3 = 785 nm, m3 = −1/8.097, t3 = 1.2 mm

TABLE 16-continued (Example 2)

(Paraxial data of the optical element)

| Surface No. | r (mm) | d1 (mm) | d2 (mm) | d3 (mm) | Nλ1 | Nλ2 | Nλ3 | νd |
|---|---|---|---|---|---|---|---|---|
| OBJ | | ∞ | ∞ | 19.617 | | | | |
| STO | | 0.050 | 0.050 | 0.050 | | | | |
| 1 | (lower table) | 0.900 | 0.900 | 0.900 | 1.52424 | 1.50643 | 1.50497 | 56.5 |
| 2 | (lower table) | 0.050 | 0.050 | 0.050 | | | | |
| 3 | 1.442 | 2.510 | 2.510 | 2.510 | 1.55965 | 1.54062 | 1.53724 | 56.3 |
| 4 | −4.596 | 0.684 | 0.432 | 0.331 | | | | |
| 5 | ∞ | 0.0875 | 0.600 | 1.200 | 1.62110 | 1.57975 | 1.57326 | 30.0 |
| 6 | ∞ | | | | | | | |

(Paraxial data of the optical element + coupling lens)

| Surface No. | r (mm) | d3 (mm) | Nλ3 | νd |
|---|---|---|---|---|
| OBJ | | 7.000 | | |
| 1' | −9.315 | 2.000 | 1.50497 | 56.5 |
| 2' | −7.819 | 7.000 | | |
| STO | | 0.050 | | |
| 1 | (lower table) | 0.900 | 1.50497 | 56.5 |
| 2 | (lower table) | 0.050 | | |
| 3 | 1.442 | 2.510 | 1.53724 | 56.3 |
| 4 | −4.596 | 0.355 | | |
| 5 | ∞ | 1.200 | 1.57326 | 30.0 |
| 6 | ∞ | | | |

(Paraxial radius of curvature of the 1st surface and 2nd surface, aspherical surface coefficient, diffraction order, production wavelength, optical path difference function coefficient)

| | The 1st surface | | The 2nd surface | |
|---|---|---|---|---|
| | AREA 6 ($0 \leq h \leq 1.55$) | AREA 7 ($1.55 \leq h$) | AREA 8 ($0 \leq h \leq 1.53$) | AREA 9 ($1.53 \leq h$) |
| r | −113.707 | −70.279 | −57.498 | −56.666 |
| κ | 0 | 0 | 0 | 9.6772E+01 |
| A4 | −3.0576E−03 | −5.0921E−04 | −1.7128E−03 | −01.6692E−03 |
| A6 | 1.0766E−03 | 2.6280E−04 | 3.2682E−03 | 4.4185E−04 |
| A8 | 0 | 1.4914E−04 | −8.1260E−04 | 2.0756E−04 |
| A10 | 0 | −2.3320E−05 | 1.7830E−04 | 1.0485E−05 |
| n1/n2/n3 | 0/+1/0 | — | +2/+1/+1 | +2/+1/+1 |
| λB | 658 nm | — | 390 nm | 408 nm |
| B2 | 0 | 0 | −4.9000E−03 | −5.8114E−03 |
| B4 | −1.0292E−03 | 0 | −3.5147E−04 | −5.3146E−04 |
| B6 | −2.8510E−04 | 0 | −5.2410E−04 | −7.0255E−05 |
| B8 | 2.3248E−05 | 0 | 1.9011E−04 | −6.7478E−06 |
| B10 | −1.0191E−05 | 0 | −4.2545E−05 | −9.9430E−06 |

(Aspherical surface coefficient of the 3rd surface and the 4th surface)

| | 3rd surface | 4th surface |
|---|---|---|
| κ | −6.6181E−01 | −1.6733E+02 |
| A4 | 1.1149E−02 | 1.0501E−01 |
| A6 | 2.4988E−03 | −1.1650E−01 |
| A8 | 1.8506E−05 | 1.0619E−01 |
| A10 | 2.9476E−04 | −7.0978E−02 |
| A12 | 6.5641E−05 | 2.7327E−02 |
| A14 | −4.2096E−05 | −4.3888E−03 |
| A16 | −3.6165E−06 | |
| A18 | 7.9919E−06 | |
| A20 | −1.2231E−06 | |

TABLE 16-continued (Example 2)

(Aspherical surface coefficient of the 2nd' surface)

|  | The 2' surface |
|---|---|
| κ | 0 |
| A4 | −2.2210E−02 |
| A6 | 9.0770E−02 |
| A8 | −1.4749E−01 |
| A10 | 9.3254E−02 |

By the action of the superposition type diffractive structure HOE4 (HOE8) formed in the sixth (18th) optical function area AREA 6 (AREA 18), while the magnification m1 to the wavelength λ1 and the magnification m2 to the wavelength λ2 are made almost coincident with each other, the spherical aberration due to the difference of the thickness between protective layers of the high density optical disk HD and DVD, is corrected.

Further, by the action of the diffractive structure DOE3 (DOE8) formed in the 8th (the 20th) optical function. area AREA 8 (AREA 20) and the diffractive structure DOE4 (DOE9) formed in the 9th (the 21st) optical function area AREA 9 (AREA 21), the chromatic aberration in the blue violet area and the spherical aberration following the environmental temperature change are corrected.

When the wavelength change amount of the blue violet semiconductor laser LD1 by the mode-hopping, is assumed as +1 nm, to the change amount 151 mλ RMS of the defocus component in only the light converging element L2, when the light converging element L2 and the aberration correcting element L1 are combined, it becomes 27 mλ RMS, and it can be seen that the change of defocus component by the mode-hopping can be finely corrected.

Further, in the case where the environmental temperature rises by 30° C., when the oscillation wavelength of the blue violet semiconductor laser is 409.5 nm, the refractive index of the aberration correcting element at the time, is 1.52079, and the refractive index of the light converging element L2 is 1.55671, to the change amount 116 mλ RMS of the spherical aberration component in only the light converging element L2, when the light converging element L2 is combined with the aberration correcting element L1, it becomes 45 mλ RMS, and it can be seen that the spherical aberration change following the environmental temperature change, is finely corrected.

Further, in Table 16, the numeric data when the optical element of the present Example is combined with the coupling lens CUL as the coma correcting element, is also shown. When a shift amount in the direction perpendicular to the optical axis of the optical element when the recording/reproducing of the information is conducted for CD, is 0.2 mm, to the generation amount 51 mλ RMS of the coma in only the optical element, when the light converging element L2 is combined with the aberration correcting element L1, it becomes 20 mλ RMS, and it can be seen that the coma change following the shift of the optical element is finely corrected.

Example 3

An optical element of Example 3 is an optimum optical element as the objective optical system OBJ of the third optical pickup device as shown in FIG. 5, and its specific numeric data is shown in Table 17.

TABLE 17

(Example 3)

(Optical specification of the optical element)

HD: NA1 = 0.85, f1 = 2.200 mm, λ1 = 408 nm, m1 = 0, t1 = 0.0875 mm
DVD: NA2 = 0.67, f2 = 2.282 mm, λ2 = 658 nm, m2 = −1/16.051, t2 = 0.6 mm
CD: NA3 = 0.51, f3 = 2.281 mm, λ3 = 785 nm, m3 = −1/8.100, t3 = 1.2 mm (Paraxial data of the optical element)

| Surface No. | r (mm) | d1 (mm) | d2 (mm) | d3 (mm) | Nλ1 | Nλ2 | Nλ3 | νd |
|---|---|---|---|---|---|---|---|---|
| OBJ |  | ∞ | 37.788 | 19.623 |  |  |  |  |
| STO |  | 0.050 | 0.050 | 0.050 |  |  |  |  |
| 1 | (lower table) | 0.900 | 0.900 | 0.900 | 1.52424 | 1.50643 | 1.50497 | 56.5 |
| 2 | (lower table) | 0.050 | 0.050 | 0.050 |  |  |  |  |
| 3 | 1.442 | 2.510 | 2.510 | 2.510 | 1.55965 | 1.54062 | 1.53724 | 56.3 |
| 4 | −4.596 | 0.684 | 0.575 | 0.331 |  |  |  |  |
| 5 | ∞ | 0.0875 | 0.600 | 1.200 | 1.62110 | 1.57975 | 1.57326 | 30.0 |
| 6 | ∞ |  |  |  |  |  |  |  |

TABLE 17-continued

(Example 3)

(Paraxial data of the optical element + coupling lens)

| Surface No. | r (mm) | d2 (mm) | d3 (mm) | Nλ2 | Nλ3 | νd |
|---|---|---|---|---|---|---|
| OBJ |  | 15.000 | 15.000 |  |  |  |
| 1' | ∞ | 2.000 | 2.000 | 1.50643 | 1.50497 | 56.5 |
| 2' | −19.617 | 9.723 | 10.000 |  |  |  |
| STO |  | 0.050 | 0.050 |  |  |  |
| 1 | (lower table) | 0.900 | 0.900 | 1.50643 | 1.50497 | 56.5 |
| 2 | (lower table) | 0.050 | 0.050 |  |  |  |
| 3 | 1.442 | 2.510 | 2.510 | 1.54062 | 1.53724 | 56.3 |
| 4 | −4.596 | 0.573 | 0.296 |  |  |  |
| 5 | ∞ | 0.600 | 1.200 | 1.57975 | 1.57326 | 30.0 |
| 6 | ∞ |  |  |  |  |  |

(Paraxial radius of curvature of the 1st surface and 2nd surface, aspherical surface coefficient, diffraction order, production wavelength, optical path difference function coefficient)

|  | The 1st surface | | The 2nd surface | |
|---|---|---|---|---|
|  | AREA 10 ($0 \leq h \leq 1.53$) | AREA 11 ($1.53 \leq h$) | AREA 12 ($0 \leq h \leq 1.55$) | AREA 13 ($1.55 \leq h$) |
| r | −115.962 | −49.346 | −60.675 | −53.087 |
| κ | 0 | 0 | 0 | 9.6672E+01 |
| A4 | −2.7281E−03 | 3.1345E−03 | −1.4250E−03 | 1.6926E−03 |
| A6 | 9.9643E−04 | −9.2118E−04 | 1.9093E−03 | 5.7031E−04 |
| A8 | 0 | 2.4236E−05 | 5.0795E−05 | 1.1423E−04 |
| A10 | 0 | −1.6729E−06 | −1.9371E−06 | 2.3835E−05 |
| n1/n2/n3 | 0/+1/0 | — | +2/+1/+1 | +2/+1/+1 |
| λB | 658 nm | — | 390 nm | 408 nm |
| B2 | 0 | 0 | −5.0000E−03 | −5.8988E−03 |
| B4 | −5.0409E−04 | 0 | −3.3959E−04 | −3.8146E−04 |
| B6 | 1.2618E−04 | 0 | −2.0605E−04 | 1.9458E−05 |
| B8 | −4.3226E−05 | 0 | −2.5093E−05 | −6.1471E−05 |
| B10 | −5.0031E−06 | 0 | 2.4650E−06 | −2.4896E−06 |

(Aspherical surface coefficient of the 3rd surface and the 4th surface)

|  | 3rd surface | 4th surface |
|---|---|---|
| κ | −6.6181E−01 | −1.6733E+02 |
| A4 | 1.1149E−02 | 1.0501E−01 |
| A6 | 2.4988E−03 | −1.1650E−01 |
| A8 | 1.8506E−05 | 1.0619E−01 |
| A10 | 2.9476E−04 | −7.0978E−02 |
| A12 | 6.5641E−05 | 2.7327E−02 |
| A14 | −4.2096E−05 | −4.3888E−03 |
| A16 | −3.6165E−06 |  |
| A18 | 7.9919E−06 |  |
| A20 | −1.2231E−06 |  |

(Aspherical surface coefficient, diffraction order, production wavelength, and optical path difference function coefficient of the 2nd' surface)

|  | The 2nd' surface | |
|---|---|---|
|  | AREA 14 ($0 \leq h \leq 0.65$) | AREA 15 ($0.65 \leq h$) |
| κ | 1.2071E+02 | 1.2071E+02 |
| A4 | 1.7933E−03 | 1.7933E−03 |
| A6 | 4.7511E−04 | 4.7511E−04 |
| A8 | 0 | 0 |
| A10 | 0 | 0 |
| n2/n3 | 0/−1 | — |
| λB | 785 nm | — |
| B2 | −2.4556E−02 | 0 |
| B4 | 7.1633E−04 | 0 |
| B6 | 0 | 0 |

TABLE 17-continued (Example 3)

| | | |
|---|---|---|
| B8 | 0 | 0 |
| B10 | 0 | 0 |

By the action of the superposition type diffractive structure HOE5 formed in the tenth optical function area AREA 10, when the magnification m1 to the wavelength λ1 and the magnification m2 to the wavelength λ2 are made different from each other, the spherical aberration due to the difference of the thickness between protective layers of the high density optical disk HD and DVD, is corrected.

Further, by the action of the diffractive structure DOE5 formed in the 12th optical function area AREA 12 and the diffractive structure DOE6 formed in the 13th optical function area AREA 13, the chromatic aberration in the blue violet area and the spherical aberration following the environmental temperature change are corrected.

When the wavelength change amount of the blue violet semiconductor laser LD1 by the mode-hopping, is assumed as +1 nm, to the change amount 151 mλ RMS of the defocus component in only the light converging element L2, when the light converging element L2 is combined with the aberration correcting element L1, it becomes 32 mλ RMS, and it can be seen that the change of defocus component by the mode-hopping is finely corrected.

Further, in the case where the environmental temperature rises by 30° C., when the oscillation wavelength of the blue violet semiconductor laser LD1 is 409.5 nm, the refractive index of the aberration correcting element at the time, is 1.52079, and the refractive index of the light converging element L2 is 1.55671, to the change amount 116 mλ RMS of the spherical aberration component in only the light converging element L2, when the light converging element L2 is combined with the aberration correcting element L1, it becomes 45 mλ RMS, and it can be seen that the spherical aberration change following the environmental temperature change, is finely corrected.

Further, in Table 17, numeric value data when the optical element of the present Example is combined with the coupling lens CUL as the divergent angle conversion element, is also shown.

The coupling lens CUL is an optical element for the purpose in which, by using the action of the superposition type diffractive structure HOE6 formed in the 14th optical function area AREA 14, the divergent angles of the laser light flux of wavelength λ2 projected from the first light emitting point EP1 and the laser light flux of the wavelength λ3 projected from the second light emitting point EP2 are respectively converted into divergent angles corresponding to the magnification m2 to the wavelength λ2 of the objective optical system OBJ and the magnification m3 to the wavelength λ3, and they are projected.

Example 4

An optical element of Example 4 is an optimum optical element as the objective optical system OBJ of the second optical pickup device as shown in FIG. 3, and the fifth optical pickup device PU5 as shown in FIG. 14, and its specific numeric data is shown in Table 18.

TABLE 18

(Example 4)

(Optical specification of the optical element)

HD: NA1 = 0.85, f1 = 2.200 mm, λ1 = 408 nm, m1 = 0, t1 = 0.0875 mm
DVD: NA2 = 0.67, f2 = 2.309 mm, λ2 = 658 nm, m2 = 0, t2 = 0.6 mm
CD: NA3 = 0.51, f3 = 2.281 mm, λ3 = 785 nm, m3 = −1/8.000, t3 = 1.2 mm (Paraxial data)

| Surface No. | r (mm) | d1 (mm) | d2 (mm) | d3 (mm) | Nλ1 | Nλ2 | Nλ3 | vd |
|---|---|---|---|---|---|---|---|---|
| OBJ | | ∞ | ∞ | 19.387 | | | | |
| STO | | 0.050 | 0.050 | 0.050 | | | | |
| 1 | (lower table) | 0.900 | 0.900 | 0.900 | 1.52424 | 1.50643 | 1.50497 | 56.5 |
| 2 | (lower table) | 0.050 | 0.050 | 0.050 | | | | |
| 3 | 1.445 | 2.510 | 2.510 | 2.510 | 1.55965 | 1.54062 | 1.53724 | 56.3 |
| 4 | −4.540 | 0.679 | 0.477 | 0.330 | | | | |
| 5 | ∞ | 0.0875 | 0.600 | 1.200 | 1.62110 | 1.57975 | 1.57326 | 30.0 |
| 6 | ∞ | | | | | | | |

TABLE 18-continued (Example 4)

(Paraxial radius of curvature of the 1st surface and 2nd surface, aspherical surface coefficient, diffraction order, production wavelength, optical path difference function coefficient)

| | The 1st surface | | The 2nd surface | |
|---|---|---|---|---|
| | AREA 6 ($0 \leq h \leq 1.535$) | AREA 7 ($1.535 \leq h$) | AREA 8 ($0 \leq h \leq 1.53$) | AREA 9 ($1.53 \leq h$) |
| r | ∞ | 231.761 | −117.433 | −167.005 |
| κ | 0 | 0 | 0 | 9.6672E+01 |
| A4 | 0 | −1.2634E−04 | −2.3039E−03 | 1.0847E−03 |
| A6 | 0 | −1.4443E−03 | 3.1515E−03 | −2.2698E−04 |
| A8 | 0 | 6.3328E−04 | −2.1791E−04 | 4.0064E−04 |
| A10 | 0 | −6.8934E−05 | −5.9061E−05 | −1.3815E−05 |
| n1/n2/n3 | 0/+1/0 | — | +2/+1/+1 | +2/+1/+1 |
| λB | 658 nm | — | 390 nm | 408 nm |
| B2 | 4.7000E−03 | 0 | −5.3000E−03 | −5.2595E−03 |
| B4 | −5.5308E−04 | 0 | 5.6232E−04 | −3.8500E−04 |
| B6 | −2.5919E−04 | 0 | −7.7644E−04 | −2.8980E−04 |
| B8 | −2.0155E−05 | 0 | 5.1093E−05 | 5.6214E−05 |
| B10 | 2.0712E−07 | 0 | 1.4877E−05 | −1.4307E−05 |

(Aspherical surface coefficient of the 3rd surface and the 4th surface)

| | 3rd surface | 4th surface |
|---|---|---|
| κ | −6.6105E−01 | −1.5745E+02 |
| A4 | 1.1439E−02 | 1.0519E−01 |
| A6 | 2.5153E−03 | −1.1661E−01 |
| A8 | 8.3248E−06 | 1.0617E−01 |
| A10 | 2.9389E−04 | −7.0962E−02 |
| A12 | 6.6343E−05 | 2.7343E−02 |
| A14 | −4.2105E−05 | −4.3966E−03 |
| A16 | −3.6643E−06 | |
| A18 | 7.9754E−06 | |
| A20 | −1.2239E−06 | |

By the action of the superposition type diffractive structure HOE4 (HOE8) formed in the sixth (18th) optical function area AREA 6 (AREA 18), while the magnification ml to the wavelength λ1 and the magnification m2 to the wavelength λ2 are made almost coincident with each other, the spherical aberration due to the difference of the thickness between protective layers of the high density optical disk HD and DVD, is corrected.

As a method by which, by the action of the superposition type diffractive structure, the spherical aberration due to the difference of the thickness between protective layers of the high density optical disk HD and DVD, is corrected, there are a method by which an under correction spherical aberration is added to the light flux of wavelength λ2, and a method by which the paraxial diffraction power to the light flux of wavelength λ2 is set to negative, however, in the former, there is a problem in which the coma generation of the light flux of wavelength λ2 due to the optical axis shift of the aberration correcting element L1 and the light converging element L2 is large, and in the latter, there is a problem in which, when the off-axis light flux of wavelength λ2 enters, the coma generation is large.

In the superposition type diffractive structure HOE4 (HOE8) in the present Example, when both are combined with each other, the spherical aberration due to the difference of the thickness between protective layers of the high density optical disk HD and DVD, is corrected, and in the case where the paraxial diffraction power to the light flux of wavelength λ2 is determined, a case which is made so that, while the coma generation due to the optical axis shifting of the aberration correcting element L1 and the light converging element L2 is softened, the off-axis characteristic to the light flux of wavelength λ2 is not too deteriorated, is minded.

Further, the optical path difference function of the superposition type diffractive structure HOE4 (HOE8) has an inflection point in NA2=0.67, and before and after the inflection point, the inclination of the tangential line is switched from positive to negative. This corresponds to that the inclination direction (numeral 14 in FIG. 3) of the ring-shaped zone of the superposition type diffractive structure HOE4 (HOE8) is reversed at the midway, and when the optical path difference function is made so as to have the inflection point in this manner, the width (Λ4 in FIG. 3) of the ring-shaped zone can be secured large. In the present Example, the minimum value of the width of the ring-shaped zone is 70 μm.

Further, by the action of the superposition type diffractive structure HOE3 (HOE8) formed in the eighth (the 20th) optical function area AREA 8 (AREA 20) and the superposition type diffractive structure HOE4 (HOE9) formed in the ninth (the 21st) optical function area AREA 9 (AREA 21), the chromatic aberration in the blue violet area and the spherical aberration change following the environmental temperature change are corrected.

When the wavelength change amount of the blue violet semiconductor laser by the mode-hopping is assumed as +1 nm, to the change amount 151 mλ RMS of the defocus component in only the light converging element L2, when the light converging element L2 is combined with the aberration correcting element L1, it becomes 32 mλ RMS, and it can be seen that the change of defocus component by the mode-hopping is finely corrected.

Further, in the case where the environmental temperature rises by 30° C., when the oscillation wavelength of the blue violet semiconductor laser is 409.5 nm, the refractive index of the aberration correcting element L1 at the time, is 1.52079, and the refractive index of the light converging element L2 is 1.55671, to the change amount 114 mλ RMS of the spherical aberration component in only the light converging element L2, when the light converging element L2 is combined with the aberration correcting element L1, it becomes 46 mλ RMS, and it can be seen that the spherical aberration change following the environmental temperature change, is finely corrected.

Example 5

An optical element of Example 5 is an optimum optical element as an objective optical system OBJ of the second optical pickup device PU2 as shown in FIG. 3, and the fifth optical pickup device PU5 as shown in FIG. 14, and its specific numerical value data will be shown in Table 19.

TABLE 19

(Example 5)

(Optical specification)

HD: NA1 = 0.85, f1 = 2.200 mm, λ1 = 408 nm, m1 = 0, t1 = 0.0875 mm
DVD: NA2 = 0.67, f2 = 2.303 mm, λ2 = 658 nm, m2 = 0, t2 = 0.6 mm
CD: NA3 = 0.51, f3 = 2.272 mm, λ3 = 785 nm, m3 = −1/7.062, t3 = 1.2 mm (Paraxial data)

| Surface No. | r (mm) | d1 (mm) | d2 (mm) | d3 (mm) | Nλ1 | Nλ2 | Nλ3 | νd |
|---|---|---|---|---|---|---|---|---|
| OBJ | | ∞ | ∞ | 16.998 | | | | |
| STO | | 0.050 | 0.050 | 0.050 | | | | |
| 1 | (lower table) | 0.900 | 0.900 | 0.900 | 1.52424 | 1.50643 | 1.50497 | 56.5 |
| 2 | (lower table) | 0.050 | 0.050 | 0.050 | | | | |
| 3 | 1.547 | 2.510 | 2.510 | 2.510 | 1.62225 | 1.60306 | 1.59924 | 61.2 |
| 4 | −3.805 | 0.648 | 0.457 | 0.329 | | | | |
| 5 | ∞ | 0.0875 | 0.600 | 1.200 | 1.62110 | 1.57975 | 1.57326 | 30.0 |
| 6 | ∞ | | | | | | | |

(Paraxial radius of curvature of the 1st surface and 2nd surface, aspherical surface coefficient, diffraction order, production wavelength, optical path difference function coefficient)

| | The 1st surface | | The 2nd surface | |
|---|---|---|---|---|
| | AREA 6 (0 ≦ h ≦ 1.55) | AREA 7 (1.55 ≦ h) | AREA 8 (0 ≦ h ≦ 1.53) | AREA 9 (1.53 ≦ h) |
| r | ∞ | 173.175 | 22.784 | 20.692 |
| κ | 0 | 0 | −1.6342E+02 | −4.9171E+01 |
| A4 | 0 | −2.2422E−03 | 1.7644E−03 | 3.0880E−04 |
| A6 | 0 | 1.4856E−04 | 2.6776E−04 | 2.3114E−04 |
| A8 | 0 | 2.0769E−04 | 4.7721E−04 | 1.4576E−04 |
| A10 | 0 | −3.7154E−05 | −1.3338E−04 | 5.6460E−06 |
| n1/n2/n3 | 0/+1/0 | — | +2/+1/+1 | +3/+2/+2 |
| λB | 658 nm | — | 390 nm | 408 nm |
| B2 | 6.5000E−03 | 0 | −5.5000E−03 | −3.7674E−03 |
| B4 | −7.2989E−04 | 0 | −7.6775E−06 | −2.6456E−04 |
| B6 | −1.7631E−05 | 0 | −1.3428E−04 | −4.9605E−05 |
| B8 | −7.1954E−05 | 0 | −1.0951E−04 | 1.6919E−05 |
| B10 | 4.7865E−06 | 0 | 3.2640E−05 | −7.9084E−06 |

(Aspherical surface coefficient of the 3rd surface and the 4th surface)

| | 3rd surface | 4th surface |
|---|---|---|
| κ | −6.5500E−01 | −1.1767E+02 |
| A4 | 8.1711E−03 | 9.0672E−02 |
| A6 | −4.6002E−04 | −9.6820E−02 |
| A8 | 2.3310E−03 | 7.6345E−02 |
| A10 | −1.3988E−03 | −4.9000E−02 |
| A12 | 2.7074E−04 | 1.8605E−02 |

TABLE 19-continued (Example 5)

| | | |
|---|---|---|
| A14 | 2.2973E−04 | −2.9535E−03 |
| A16 | −1.6181E−04 | |
| A18 | 4.0853E−05 | |
| A20 | −3.8604E−06 | |

By the action of the superposition type diffractive structure HOE4 (HOE8) formed in the sixth (18th) optical function area AREA 6 (AREA 18), while the magnification m1 to the wavelength λ1 and the magnification m2 to the wavelength λ2 are made almost coincident with each other, the spherical aberration due to the difference of the thickness between protective layers of the high density optical disk HD and DVD, is corrected.

In the optical element of the present Example, in the same manner as the optical element of Example 4, when a method by which the under correction spherical aberration is added to the light flux of wavelength λ2, and a method by which the paraxial diffraction power to the light flux of wavelength λ2 is set to negative, are combined, the spherical aberration due to the difference of the thickness between protective layers of the high density optical disk HD and DVD, is corrected, and the minimum value of the width of ring-shaped zone is 81 μm.

Further, by the action of the diffractive structure DOE3 (DOE8) formed in the eighth (20th) optical function area AREA 8 (AREA 20), and the diffractive structure DOE4 (DOE9)formed in the ninth (21st) optical function area AREA 9 (AREA 21), the chromatic aberration in the blue violet area and the spherical aberration change following the incident wavelength change are corrected.

When the wavelength change amount of the blue violet semiconductor laser by the mode-hopping, is assumed as +1 nm, to the change amount 138 mλ RMS of the defocus component in only the light converging element L2, when the light converging element L2 is combined with the aberration correcting element L1, it becomes 18 mλ RMS, and it can be seen that the change of defocus component by the mode-hopping is finely corrected.

Further, when the wavelength dispersion by the production error of the blue violet semiconductor laser is assumed as +10 nm, to the change amount 54 mλ RMS of the spherical aberration component in only the light converging element L2, when the light converging element L2 is combined with the aberration correcting element L1, it becomes 4 mλ RMS, and it can be seen that the change of spherical aberration following the incident wavelength change is finely corrected.

In the optical element of Example 2, the sectional view of the superposition type diffractive structure HOE4 formed in the sixth optical function area AREA 6 is shown in FIG. 16, and in the optical element of Example 4, the sectional view of the superposition type diffractive structure HOE8 formed in the 18th optical function area AREA 18 is shown in FIG. 17. In views, the horizontal axis indicates the height h (mm) from the optical axis, and the vertical axis indicates the height D (mm) in the direction perpendicular to the optical axis of the superposition type diffractive structure HOE4 (HOE8).

Example 6

Figure 23:
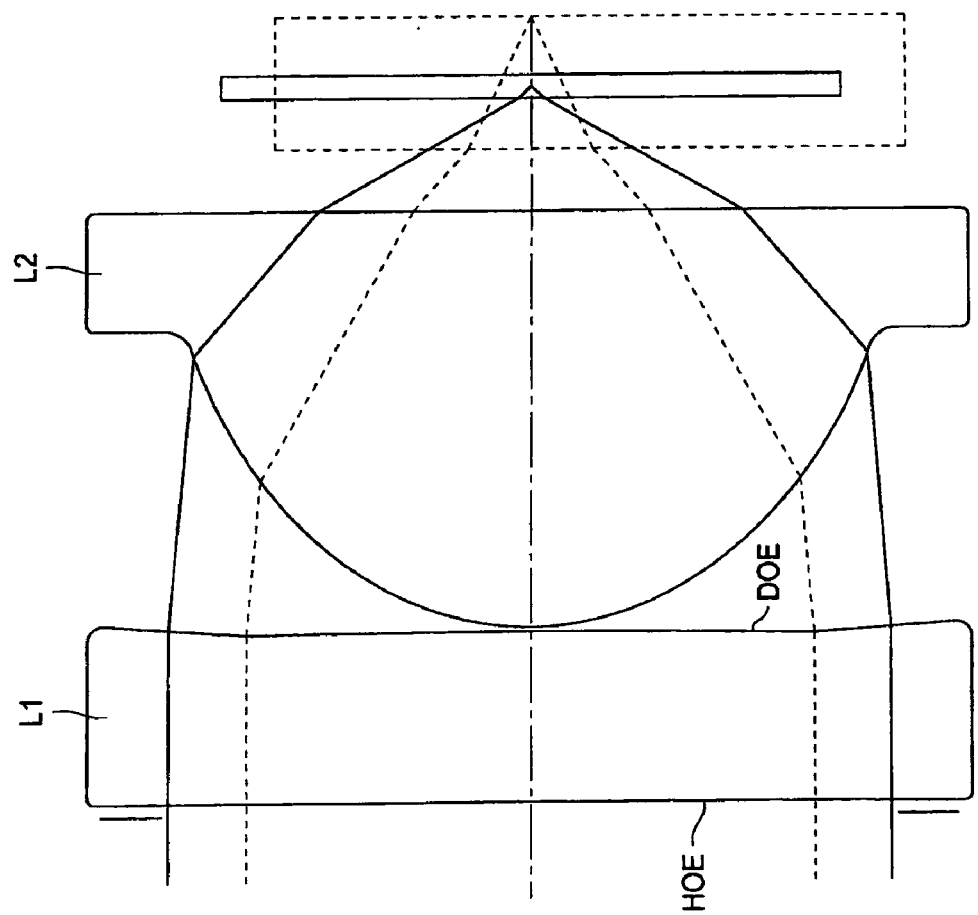
FIG. 23 is an optical path view of an optical pickup device.

An optical element of Example 6 is an optimum optical element as an objective optical system OBJ of the eighth optical pickup device PU8 as shown in FIG. 20, and its specific numerical value data will be shown in Table 20. Further, the optical path view is shown in FIG. 23.

TABLE 20

(Example 6)

(Optical specification)

HD: NA1 = 0.85, f1 = 1.762 mm, λ1 = 407 nm, m1 = 0, t1 = 0.1 mm
DVD: NA2 = 0.65, f2 = 1.839 mm, λ2 = 660 nm, m2 = 0, t2 = 0.6 mm (Paraxial data)

| Surface No. | r (mm) | d1 (mm) | d2 (mm) | Nλ1 | Nλ2 | νd |
|---|---|---|---|---|---|---|
| OBJ | ∞ | | ∞ | | | |
| STO | | 0.0500 | 0.0500 | | | |
| 1 | (lower table) | 0.8000 | 0.8000 | 1.52439 | 1.50635 | 56.5 |
| 2 | (lower table) | 0.0500 | 0.0500 | | | |
| 3 | 1.1578 | 1.9400 | 1.9400 | 1.55981 | 1.54055 | 56.3 |
| 4 | −4.3607 | 0.5503 | 0.3187 | | | |
| 5 | ∞ | 0.1000 | 0.6000 | 1.62000 | 1.58000 | 30.0 |
| 6 | ∞ | | | | | |

(Paraxial radius of curvature of the 1st surface and 2nd surface, aspherical surface coefficient, diffraction order, production wavelength, optical path difference function coefficient)

| | The 1st surface | | The 2nd surface |
|---|---|---|---|
| | AREA 30 (0 ≤ h ≤ 1.19) | AREA 31 (1.19 ≤ h) | |
| r | ∞ | −266.6972 | 30.0787 |
| κ | 0.0000E+00 | 0.0000E+00 | −1.3500E+02 |
| A4 | 0.0000E+00 | 4.1672E−03 | 3.1459E−03 |
| A6 | 0.0000E+00 | −3.2275E−03 | 1.7821E−03 |
| A8 | 0.0000E+00 | 9.6415E−04 | −4.7596E−04 |
| A10 | 0.0000E+00 | −7.1921E−05 | 3.5034E−04 |
| n1/n2 | 0/+1 | — | +5/+3 |
| λB | 660 nm | — | 407 nm |
| B2 | 6.0700E−03 | 0.0000E+00 | −2.3000E−03 |
| B4 | −1.7226E−03 | 0.0000E+00 | −4.3408E−04 |
| B6 | −4.9632E−04 | 0.0000E+00 | −1.0693E−04 |
| B8 | 2.8654E−05 | 0.0000E+00 | −5.8847E−06 |
| B10 | −9.6694E−05 | 0.0000E+00 | −2.2751E−05 |

(Aspherical surface coefficient of the 3rd surface and the 4th surface)

| | 3rd surface | 4th surface |
|---|---|---|
| κ | −6.6194E−01 | −2.0957E+02 |
| A4 | 2.3605E−02 | 1.8576E−01 |
| A6 | 7.3281E−03 | −3.1119E−01 |
| A8 | 1.1210E−03 | 4.5733E−01 |
| A10 | 2.0127E−03 | −4.9600E−01 |
| A12 | 6.6045E−04 | 3.0165E−01 |
| A14 | −8.1167E−04 | −7.4912E−02 |
| A16 | −2.3825E−05 | 0.0000E+00 |
| A18 | 3.8272E−04 | 0.0000E+00 |
| A20 | −1.0160E−04 | 0.0000E+00 |

By the action of the superposition type diffractive structure HOE12 formed in the 30th optical function area AREA 30, the spherical aberration due to the difference of thickness between the protective layers of the high density optical disk and DVD, is corrected and the aperture limit when DVD is used, is automatically conducted by the aberration correcting element L1.

In the optical element of the present Example, when a method by which, when signs of the second degree optical path difference function coefficient B2 and the 4th degree optical path difference function coefficient B4 of the superposition type diffractive structure HOE12 are made different, the under correction spherical aberration is added to the light flux of wavelength λ2, and a method by which the paraxial diffraction power to the light flux of wavelength λ2 is set to negative, are combined, the spherical aberration due to the difference of the thickness between protective layers of the high density optical disk HD and DVD, is corrected. The minimum value of the width of the ring-shaped zone of the superposition type diffractive structure is 117.4 μm, and because the sufficient width of the ring-shaped zone is obtained, the metallic mold processing is easy.

Further, by the action of the diffractive structure DOE13 formed on the optical function surface S2 on the optical disk side of the aberration correcting element L1, the axial chromatic aberration in the blue violet area and the spherical aberration change following the environmental temperature change are corrected.

When the wavelength change amount of the blue violet semiconductor laser by the mode-hopping, is assumed as +1 nm, to the change amount 119 mλ RMS of the defocus component in only the light converging element L2, when the light converging element L2 is combined with the aberration correcting element L1, it becomes 35 mλ RMS, and it can be seen that the change of defocus component by the mode-hopping is finely corrected.

Further, in the case where the environmental temperature rises by 30° C., when the oscillation wavelength of the blue violet semiconductor laser is 408.5 nm, the refractive index of the aberration correcting element L1 at the time, is 1.52094, and the refractive index of the light converging element L2 is 1.55687, to the change amount 89 mλ RMS of the spherical aberration component in only the light converging element L2, when the light converging element L2 is combined with the aberration correcting element L1, it becomes 28 mλ RMS, and it can be seen that the spherical aberration change following the environmental temperature change, is finely corrected.

Example 7

Figure 24:
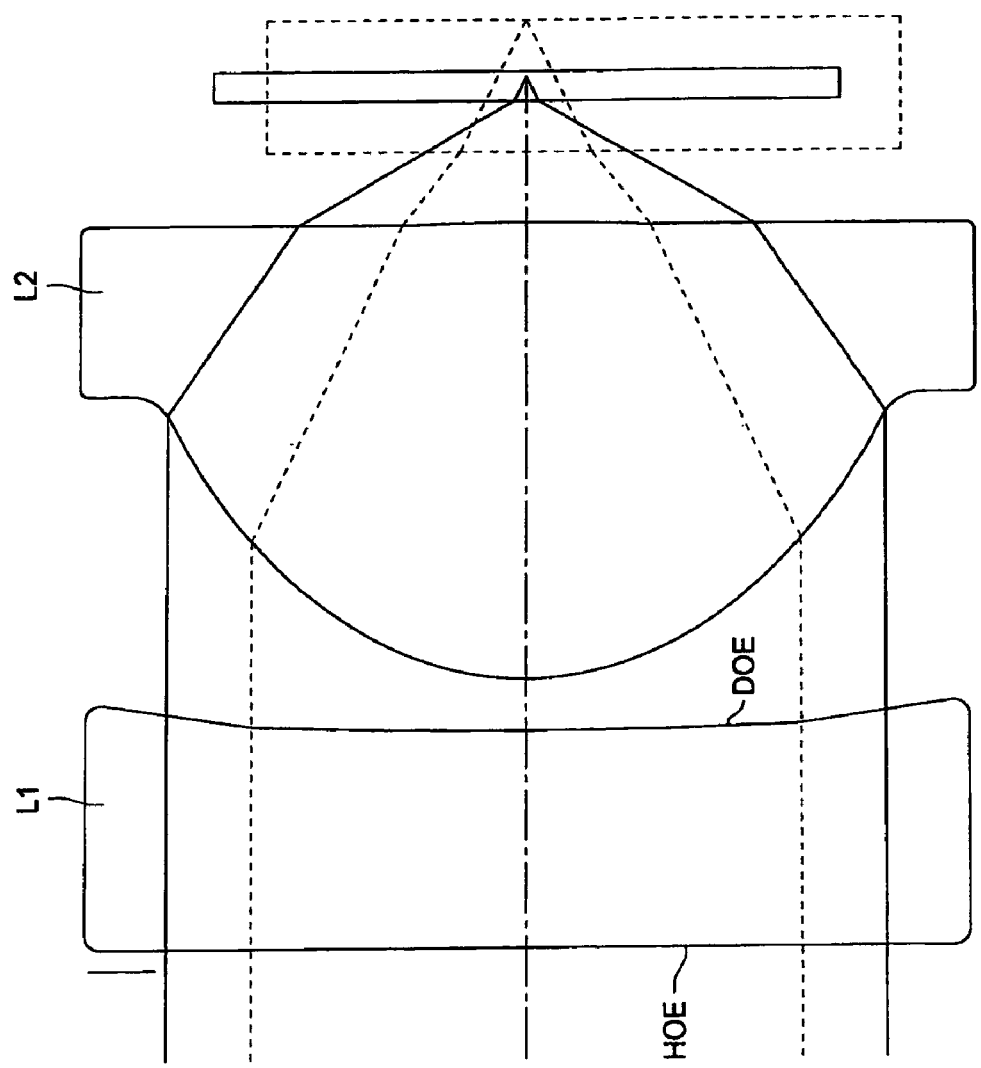
FIG. 24 is an optical path view of an optical pickup device.

An optical element of Example 7 is an optimum optical element as an objective optical system OBJ of the ninth optical pickup device PU9 as shown in FIG. 21, and its specific numerical value data will be shown in Table 21. Further, the optical path view is shown in FIG. 24.

TABLE 21

(Example 7)

(Optical specification)

HD: NA1 = 0.85, f1 = 1.765 mm, λ1 = 405 nm, m1 = 0, t1 = 0.1 mm
DVD: NA2 = 0.65, f2 = 1.826 mm, λ2 = 650 nm, m2 = 0, t2 = 0.6 mm (Paraxial data)

| Surface No. | r (mm) | d1 (mm) | d2 (mm) | Nλ1 | Nλ2 | vd |
|---|---|---|---|---|---|---|
| OBJ | ∞ | | | | | |
| STO | | 0.0500 | 0.0500 | | | |
| 1 | (lower table) | 1.0000 | 1.0000 | 1.52469 | 1.50668 | 56.5 |

TABLE 21-continued (Example 7)

| 2 | (lower table) | 0.2000 | 0.2000 | | | |
|---|---|---|---|---|---|---|
| 3 | 1.2372 | 2.1400 | 2.1400 | 1.62272 | 1.60337 | 61.2 |
| 4 | −3.3048 | 0.5319 | 0.3001 | | | |
| 5 | ∞ | 0.1000 | 0.6000 | 1.62000 | 1.58000 | 30.0 |
| 6 | ∞ | | | | | |

(Paraxial radius of curvature of the 1st surface and 2nd surface, aspherical surface coefficient, diffraction order, production wavelength, optical path difference function coefficient)

The 1st surface

| | AREA 32 (0 ≦ h ≦ 1.19) | AREA 33 (1.19 ≦ h) | The 2nd surface |
|---|---|---|---|
| r | ∞ | ∞ | 19.4381 |
| κ | 0.0000E+00 | 0.0000E+00 | 5.2930E+01 |
| A4 | 0.0000E+00 | 0.0000E+00 | 2.1118E−03 |
| A6 | 0.0000E+00 | 0.0000E+00 | 6.7171E−04 |
| A8 | 0.0000E+00 | 0.0000E+00 | 3.6437E−05 |
| A10 | 0.0000E+00 | 0.0000E+00 | 1.4947E−04 |
| n1/n2 | 0/+1 | — | +5/+3 |
| λB | 650 nm | — | 405 nm |
| B2 | 7.1500E−03 | 0.0000E+00 | −2.7000E−03 |
| B4 | −2.1522E−03 | 0.0000E+00 | −3.2200E−04 |
| B6 | 2.7312E−04 | 0.0000E+00 | −7.3772E−05 |
| B8 | −6.4452E−04 | 0.0000E+00 | −5.8735E−06 |
| B10 | 1.0262E−04 | 0.0000E+00 | −1.5541E−05 |

(Aspherical surface coefficient of the 3rd surface and the 4th surface)

| | 3rd surface | 4th surface |
|---|---|---|
| κ | −6.5735E−01 | −1.1212E+02 |
| A4 | 1.5546E−02 | 1.5169E−01 |
| A6 | −1.0395E−03 | −2.5481E−01 |
| A8 | 1.0347E−02 | 3.5667E−01 |
| A10 | −9.7392E−03 | −3.7802E−01 |
| A12 | 2.9457E−03 | 2.1856E−01 |
| A14 | 3.9500E−03 | −5.1014E−02 |
| A16 | −4.3906E−03 | 0.0000E+00 |
| A18 | 1.7571E−03 | 0.0000E+00 |
| A20 | −2.6284E−04 | 0.0000E+00 |

By the action of the superposition type diffractive structure HOE13 formed in the 32nd optical function area AREA 32, the spherical aberration due to the difference of thickness between the protective layers of the high density optical disk and DVD, is corrected and the aperture limit when DVD is used, is automatically conducted by the aberration correcting element L1.

In the optical element of the present Example, when a method by which, when signs of the second degree optical path difference function coefficient B2 and the 4th degree optical path difference function coefficient B4 of the superposition type diffractive structure HOE13 are made different, the under correction spherical aberration is added to the light flux of wavelength λ2, and a method by which the paraxial diffraction power to the light flux of wavelength λ2 is set to negative, are combined, the spherical aberration due to the difference of the thickness between protective layers of the high density optical disk HD and DVD, is corrected. The minimum value of the width of the ring-shaped zone of the superposition type diffractive structure is 93.8 μm, and because the sufficient width of the ring-shaped zone is obtained, the metallic mold processing is easy.

Further, by the action of the diffractive structure DOE13 formed on the optical function surface S2 on the optical disk side of the aberration correcting element L1, the axial chromatic aberration in the blue violet area and the spherical aberration change are corrected.

When the wavelength change amount of the blue violet semiconductor laser by the mode-hopping, is assumed as +1 nm, to the change amount 114 m$\lambda$ RMS of the defocus component in only the light converging element L2, when the light converging element L2 is combined with the aberration correcting element L1, it becomes 23 m$\lambda$ RMS, and it can be seen that the change of defocus component by the mode-hopping is finely corrected.

Further, in the case where the wavelength dispersion by the production error of the blue violet semiconductor laser is assumed as +10 nm, to the change amount 47 m$\lambda$ RMS of the spherical aberration component in only the light converging element L2, when the light converging element L2 is combined with the aberration correcting element L1, it becomes 4 m$\lambda$ RMS, and it can be seen that the spherical aberration change following the incident wavelength change, is finely corrected.

Example 8

Figure 25:
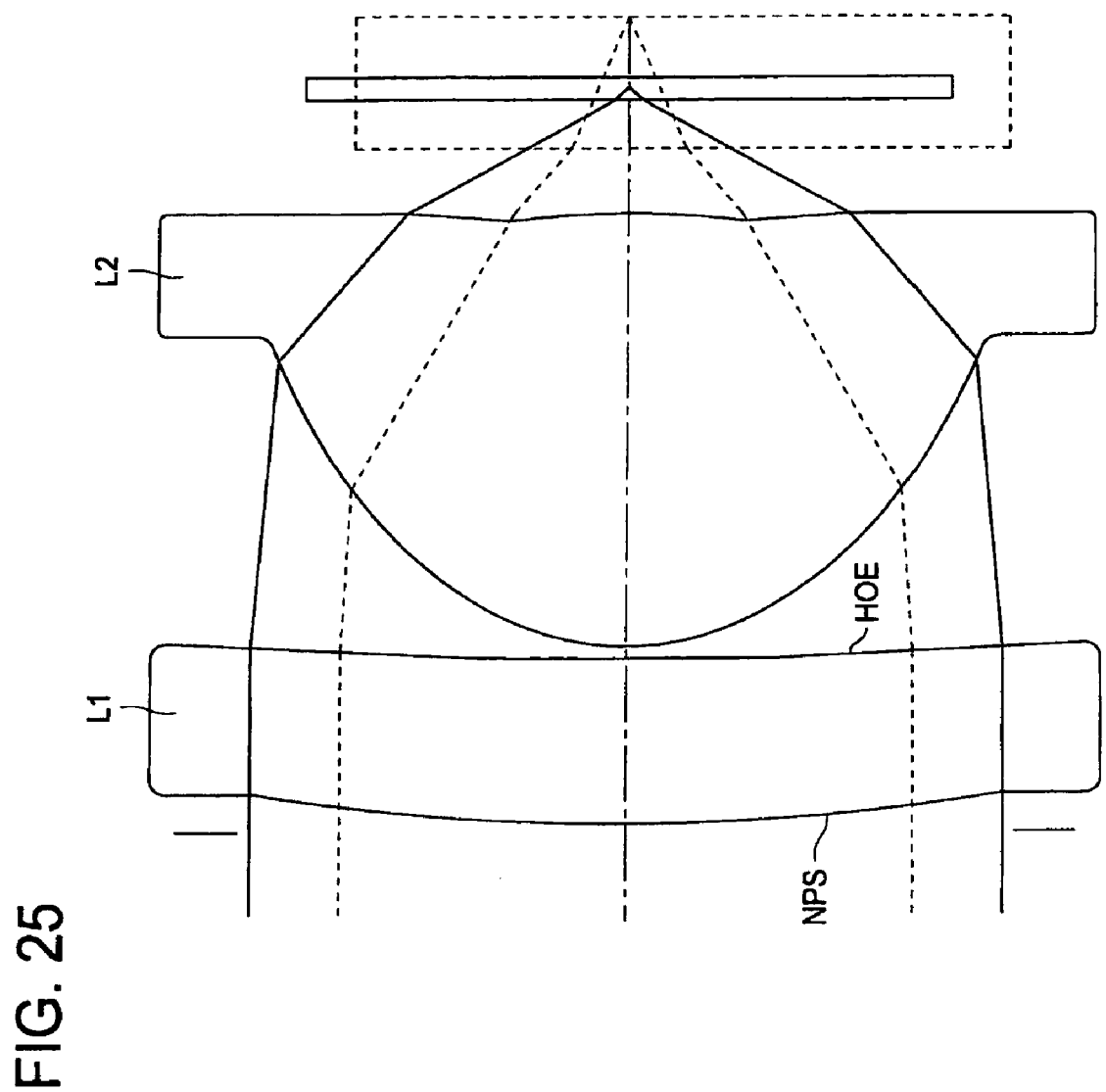
FIG. 25 is an optical path view of an optical pickup device.

An optical element of Example 8 is an optimum optical element as an objective optical system OBJ of the tenth optical pickup device PU10 as shown in FIG. 22, and its specific numerical value data will be shown in Table 22. Further, the optical path view is shown in FIG. 25.

TABLE 22

(Example 8)

(Optical specification)

HD: NA1 = 0.85, f1 = 1.802 mm, $\lambda$1 = 407 nm, m1 = 0, t1 = 0.0875 mm
DVD: NA2 = 0.65, f2 = 1.888 mm, $\lambda$2 = 660 nm, m2 = 0, t2 = 0.6 mm (Paraxial data)

| Surface No. | r (mm) | d1 (mm) | d2 (mm) | N$\lambda$1 | N$\lambda$2 | vd |
|---|---|---|---|---|---|---|
| OBJ | $\infty$ | | $\infty$ | | | |
| STO | | 0.0500 | 0.0500 | | | |
| 1 | 10.7695 (lower table) | 0.8000 | 0.8000 | 1.52439 | 1.50639 | 56.5 |
| 2 | (lower table) | 0.0500 | 0.0500 | | | |
| 3 | 1.1589 | 1.9400 | 1.9400 | 1.55981 | 1.54055 | 61.2 |
| 4 | −4.9861 | 0.5361 | 0.2719 | | | |
| 5 | $\infty$ | 0.0875 | 0.6000 | 1.62000 | 1.58000 | 30.0 |
| 6 | $\infty$ | | | | | |

(Paraxial radius of curvature of the 2nd surface, aspherical surface coefficient, diffraction order, production wavelength, optical path difference function coefficient)

| | The 2nd surface | |
|---|---|---|
| | AREA 34 (0 $\leq$ h $\leq$ 1.19) | AREA 35 (1.19 $\leq$ h) |
| r | $\infty$ | $\infty$ |
| $\kappa$ | 0.0000E+00 | 0.0000E+00 |
| A4 | 0.0000E+00 | 0.0000E+00 |
| A6 | 0.0000E+00 | 0.0000E+00 |
| A8 | 0.0000E+00 | 0.0000E+00 |
| A10 | 0.0000E+00 | 0.0000E+00 |

TABLE 22-continued (Example 8)

| n1/n2 | 0/+1 | — |
|---|---|---|
| $\lambda$B | 660 nm | — |
| B2 | 5.0000E−03 | 0.0000E+00 |
| B4 | −2.0707E−03 | 0.0000E+00 |
| B6 | −7.1074E−05 | 0.0000E+00 |
| B8 | −3.5082E−04 | 0.0000E+00 |
| B10 | −1.9639E−06 | 0.0000E+00 |

(Aspherical surface coefficient of the 1st surface, 3rd surface and 4th surface)

| | 1st surface | 3rd surface | 4th surface |
|---|---|---|---|
| $\kappa$ | 2.5831E−01 | −6.5345E−01 | −3.5746E+02 |
| A4 | −8.3565E−05 | 2.4534E−02 | 1.8708E−01 |
| A6 | 1.3321E−06 | 7.3164E−03 | −2.9678E−01 |
| A8 | 0.0000E+00 | 2.1062E−03 | 4.3464E−01 |
| A10 | 0.0000E+00 | 1.2314E−03 | −5.1105E−01 |
| A12 | 0.0000E+00 | 8.8703E−04 | 3.4582E−01 |
| A14 | 0.0000E+00 | −5.3424E−04 | −9.5672E−02 |
| A16 | 0.0000E+00 | −7.5068E−05 | 0.0000E+00 |
| A18 | 0.0000E+00 | 2.9623E−04 | 0.0000E+00 |
| A20 | 0.0000E+00 | −6.5778E−05 | 0.0000E+00 |

(Optical path difference grant structure of the 1st surface)

| i | $h_{is}$ (mm) | $h_{iL}$ (mm) | $m_{iLd}$ (mm) | $m_{i1}$ | $m_{i2}$ |
|---|---|---|---|---|---|
| 0 | 0.0000 | 0.5800 | 0.000000 | 0 | 0 |
| 1 | 0.5800 | 0.8600 | 0.003881 | −5 | −3 |
| 2 | 0.8600 | 1.3800 | 0.007761 | −10 | −6 |
| 3 | 1.3800 | 1.4500 | 0.003881 | −5 | −3 |
| 4 | 1.4500 | 1.5000 | 0.000000 | 0 | 0 |
| 5 | 1.5000 | 1.5300 | −0.003881 | 5 | 3 |
| 6 | 1.5300 | 1.5600 | −0.007761 | 10 | 6 |

By the action of the superposition type diffractive structure HOE14 formed in the 34th optical function area AREA 34, the spherical aberration due to the difference of thickness between the protective layers of the high density optical disk and DVD, is corrected and the aperture limit when DVD is used, is automatically conducted by the aberration correcting element L1.

In the optical element of the present Example, when a method by which, when signs of the second degree optical path difference function coefficient B2 and the 4th degree optical path difference function coefficient B4 of the superposition type diffractive structure HOE14 are made different, the under correction spherical aberration is added to the light flux of wavelength $\lambda$2, and a method by which the paraxial diffraction power to the light flux of wavelength $\lambda$2 is set to negative, are combined, the spherical aberration due to the difference of the thickness between protective layers of the high density optical disk HD and DVD, is corrected. The minimum value of the width of the ring-shaped zone of the superposition type diffractive structure HOE14 is 66.3 $\mu$m, and because the sufficient width of the ring-shaped zone is obtained, the metallic mold processing is easy.

Further, by the action of the optical path difference grant structure NPS formed on the optical function surface S1 on the semiconductor laser side of the aberration correcting element L1, the spherical aberration change following the environmental temperature change in the blue violet area are corrected.

Further, in the case where the environmental temperature rises by 30° C., when the oscillation wavelength of the blue violet semiconductor laser is 408.5 nm, the refractive index of the aberration correcting element L1 at the time, is 1.52094, and the refractive index of the light converging element L2 is 1.55687, to the change amount 81 m$\lambda$ RMS of the spherical aberration component in only the light converging element L2, when the light converging element L2 is combined with the aberration correcting element L1, it becomes 15 mλ RMS, and it can be seen that the spherical aberration change following the environmental temperature change, is finely corrected.

Hereupon, in (the optical path difference grant structure of the first surface) of Table 22-2, i shows the number of the central area and each ring-shaped zone, and the first ring shaped zone adjoining the outside of the central area is i=1, and the second ring-shaped zone adjoining the outside of the first ring-shaped zone is i=2. A sign $h_{is}$ shows the height of start point of the central area and each ring-shaped zone, and $h_{iL}$ shows the height of end point of the central area and each ring-shaped zone. Further, mild shows the shift amount in the optical axis direction of each ring-shaped zone to the central area. For example, the second ring-shaped zone (i=2) shifts toward the optical disk side by 7.761 μm to the central area (i=0), and the sixth ring-shaped zone (I=6) shifts toward the laser light source side by 7.761 μm to the central area (i=0).

Further, a sign mild is a value in which the optical path length difference of each ring-shaped zone to the central area is expressed by making the wavelength λ1 (=407 nm) as a unit, and $m_{i2}$ is a value in which the optical path length difference of each ring-shaped zone to the central area is expressed by making the wavelength λ2 (=660 nm) as a unit. For example, in the second ring-shaped zone, the optical path length is shorter by 10×λ1 (6×λ2) to the central area, and in the sixth ring-shaped zone, the optical path length is longer by 10×λ1 (6×λ2) to the central area.

Example 9

The optical system in Example 9 is an optical system composed of an expander lens that is composed of a negative lens and a positive lens both representing a plastic lens and of an objective optical system composed of an aberration correcting element and a light-converging element both representing a plastic lens, and it is most appropriate as an optical system for the $12^{th}$ optical pickup device PU12. Table 23 shows its specific numerical values data.

TABLE 23

(Example 9)

(Optical specifications)

f1 = 2.200, NA1 = 0.85, λ1 = 408 nm, d2 = 3.0000, d8 = 0.7190, d9 (t1) = 0.0875
f2 = 2.278, NA2 = 0.65, λ2 = 658 nm, d2 = 3.1800, d8 = 0.4770, d9 (t2) = 0.6
f3 = 2.275, NA3 = 0.45, λ3 = 785 nm, d2 = 0.2000, d8 = 0.4290, d9 (t3) = 1.2

(Paraxial data)

| Surface No. | r (mm) | d (mm) | Nλ1 | Nλ2 | Nλ3 | vd | Remarks |
|---|---|---|---|---|---|---|---|
| OBJ | ∞ | | | | | | Light-emitting point |
| 1 | −1.0991 | 0.8000 | 1.5242 | 1.5064 | 1.5050 | 56.5 | Expander lens |
| 2 | 1.9354 | d2 | | | | | |
| 3 | ∞ | 1.5000 | 1.5242 | 1.5064 | 1.5050 | 56.5 | |
| 4 | −2.8923 | 15.000 | | | | | |
| STO | | 0.5000 | | | | | Diaphragm |
| 5 | ∞ | 1.0000 | 1.5242 | 1.5064 | 1.5050 | 56.5 | Objective optical system |
| 6 | ∞ | 0.1000 | | | | | |
| 7 | 1.4492 | 2.6200 | 1.5596 | 1.5406 | 1.5372 | 56.3 | |
| 8 | −2.8750 | d8 | | | | | |
| 9 | ∞ | d9 | 1.6211 | 1.5798 | 1.5733 | 30.0 | Protective layer |
| 10 | ∞ | | | | | | |

(Aspherical surface coefficient)

| | First surface | Second surface | Fourth surface | Seventh surface | Eighth surface |
|---|---|---|---|---|---|
| κ | −0.10191E+01 | 0.11413E+01 | −0.42828E+00 | −0.65249E+00 | −0.43576E+02 |
| A4 | −0.54020E−01 | −0.59836E−01 | −0.29680E−04 | 0.77549E−02 | 0.97256E−01 |
| A6 | 0.00000E+00 | 0.00000E+00 | 0.00000E+00 | 0.29588E−03 | −0.10617E+00 |
| A8 | 0.00000E+00 | 0.00000E+00 | 0.00000E+00 | 0.19226E−02 | 0.81812E−01 |
| A10 | 0.00000E+00 | 0.00000E+00 | 0.00000E+00 | −0.12294E−02 | −0.41190E−01 |
| A12 | 0.00000E+00 | 0.00000E+00 | 0.00000E+00 | 0.29138E−03 | 0.11458E−01 |
| A14 | 0.00000E+00 | 0.00000E+00 | 0.00000E+00 | 0.21569E−03 | −0.13277E−02 |
| A16 | 0.00000E+00 | 0.00000E+00 | 0.00000E+00 | −0.16850E−03 | 0.00000E+00 |
| A18 | 0.00000E+00 | 0.00000E+00 | 0.00000E+00 | 0.44948E−04 | 0.00000E+00 |
| A20 | 0.00000E+00 | 0.00000E+00 | 0.00000E+00 | −0.43471E−05 | 0.00000E+00 |

TABLE 23-continued (Example 9)

Optical path difference function coefficient

|  | Fifth surface |
|---|---|
| n1/n2/n3 | 0/1/0 |
| λB | 658 nm |
| B2 | 3.6500E−03 |
| B4 | −1.0196E−03 |
| B6 | 1.6630E−05 |
| B8 | −9.3691E−05 |
| B10 | 9.0441E−06 |

The objective optical system is a HD/DVD compatible lens wherein spherical aberration caused by a difference of protective layer thickness between high density optical disc HD and DVD has been corrected by actions of a superposed type diffractive structure formed on an optical surface (Fifth surface in Table 23) closer to the light source on the aberration correcting element. Incidentally, the light-converging element is a lens optimized in terms of spherical aberration correction for high density optical disc HD.

Further, spherical aberration caused by a protective layer thickness difference between high density optical disc HD and CD is corrected by changing a magnification of an objective optical system by moving a negative lens of an expander lens in the optical axis direction.

When a wavelength of an incident light flux is changed, a degree of divergence of a light flux emerging from the expander lens is changed by an influence of chromatic aberration. When conducting recording/reproducing for DVD, therefore, a negative lens is moved to make a distance between the negative lens and a positive lens to be greater than that in the case of high density optical disc HD, so that the second light flux emerging from the expander lens may become a parallel light flux.

Incidentally, diffraction efficiency of 0-order diffracted light ray (transmitted light) of the first light flux generated by the superposed type diffractive structure is 100%, diffraction efficiency of first order diffracted light ray of the second light flux is 87% and diffraction efficiency of 0-order diffracted light ray (transmitted light) for the third light flux is 100%, and high diffraction efficiencies are obtained for all light fluxes.

Example 10

The optical system in Example 10 is an optical system composed of an expander lens which is a plastic lens and of an objective optical system which is a plastic lens, and it is most appropriate as an optical system for $12^{th}$ optical pickup device PU12. Further, the objective optical system in the present example is optimum as an objective optical system for $11^{th}$ optical pickup device PU11. Table 24 shows its specific numerical values data.

TABLE 24

(Example 10)

(Optical specifications)

f1 = 2.200, NA1 = 0.85, λ1 = 408 nm, d0 = 11.1247, d2 = 15.0000,
d4 = 0.6988, d5 (t1) = 0.0875
f2 = 2.264, NA2 = 0.60, λ2 = 658 nm, d0 = 11.5247, d2 = 14.6000,
d4 = 0.4280, d5 (t2) = 0.6
f3 = 2.276, NA3 = 0.45, λ3 = 785 nm, d0 = 9.1747, d2 = 16.9500,
d4 = 0.1325, d5 (t3) = 1.2

(Paraxial data)

| Surface No. | r (mm) | d (mm) | Nλ1 | Nλ2 | Nλ3 | νd | Remarks |
|---|---|---|---|---|---|---|---|
| OBJ | | d0 | | | | | Light-emitting point |
| 1 | 61.0791 | 1.5000 | 1.5242 | 1.5064 | 1.5050 | 56.5 | Collimator lens |
| 2 | −6.9631 | d2 | | | | | |
| STO | | 0.5000 | | | | | Diaphragm |
| 3 | 1.4293 | 2.6200 | 1.5596 | 1.5406 | 1.5372 | 56.3 | Objective optical system |
| 4 | −3.0401 | d4 | | | | | |
| 5 | ∞ | d5 | 1.6211 | 1.5798 | 1.5733 | 30.0 | Protective layer |
| 6 | ∞ | | | | | | |

TABLE 24-continued (Example 10)

(Aspherical surface coefficient)

| | First surface | Second surface | Third surface | Fourth surface |
|---|---|---|---|---|
| κ | −0.67089E+02 | −0.65737E+00 | −6.7004E−01 | −0.54707E+02 |
| A4 | 0.00000E+00 | 0.00000E+00 | 6.2259E−03 | 0.10933E+00 |
| A6 | 0.00000E+00 | 0.00000E+00 | 5.2878E−05 | −0.11038E+00 |
| A8 | 0.00000E+00 | 0.00000E+00 | 1.8134E−03 | 0.79680E−01 |
| A10 | 0.00000E+00 | 0.00000E+00 | −1.2562E−03 | −0.40854E−01 |
| A12 | 0.00000E+00 | 0.00000E+00 | 2.9205E−04 | 0.12151E−01 |
| A14 | 0.00000E+00 | 0.00000E+00 | 2.1716E−04 | −0.15470E−02 |
| A16 | 0.00000E+00 | 0.00000E+00 | −1.6878E−04 | 0.00000E+00 |
| A18 | 0.00000E+00 | 0.00000E+00 | 4.4777E−05 | 0.00000E+00 |
| A20 | 0.00000E+00 | 0.00000E+00 | −4.3471E−06 | 0.00000E+00 |

Optical path difference function coefficient

| | Third surface |
|---|---|
| n1/n2/n3 | 1/1/1 |
| λB | 480 nm |
| B2 | 0.00000E+00 |
| B4 | −2.0425E−03 |
| B6 | −2.0631E−04 |
| B8 | −8.8830E−05 |
| B10 | −1.0296E−05 |

The objective optical system is a HD/DVD compatible lens wherein spherical aberration caused by a difference of protective layer thickness between high density optical disc HD and DVD has been corrected by actions of a diffractive structure formed on an optical surface (Third surface in Table 24) closer to a light source.

Further, spherical aberration caused by a protective layer thickness difference between high density optical disc HD and CD is corrected by moving a collimator lens in the optical axis direction and thereby, by changing a magnification of an objective optical system, and spherical aberration caused by a protective layer thickness difference between high density optical disc HD and CD is reduced by utilizing primary diffracted rays of light of the first-third light fluxes on the diffractive structure, which makes an amount of movement of the collimator lens to be small, and improves tracking characteristics of the objective optical system.

Further, when a wavelength of an incident light flux is changed, a degree of divergence of a light flux emerging from the collimator lens is changed by an influence of chromatic aberration. When conducting recording/reproducing for DVD, therefore, a collimator lens is moved to make a distance between the collimator lens and an objective optical system to be smaller than that in the case of high density optical disc HD, so that the second light flux emerging from the collimator lens may become a parallel light flux.

Incidentally, diffraction efficiency of primary diffracted light ray of the first light flux generated by the diffractive structure is 88%, diffraction efficiency of primary diffracted light ray of the second light flux is 76% and diffraction efficiency of primary diffracted light ray of the third light flux is 50%, thus, by setting manufacture wavelength λB at 480 nm, high diffraction efficiencies are obtained for high density optical disc HD and DVD which are requested to have high speed recording.

Example 11

The optical system in Example 11 is an optical system composed of an expander lens which is composed of a negative lens and a positive lens both representing a plastic lens and of an objective optical system which is composed of an aberration correcting element and a light-converging element both representing a plastic lens, and it is most appropriate as an optical system for $12^{th}$ optical pickup device PU12. Table 25 shows its specific numerical values data.

TABLE 25

(Example 11)

(Optical specifications)

f1 = 2.200, NA1 = 0.85, λ1 = 408 nm, d2 = 3.0000, d8 = 0.7185,
d9 (t1) = 0.0875
f2 = 2.276, NA2 = 0.65, λ2 = 658 nm, d2 = 3.1400, d8 = 0.4835,
d9 (t2) = 0.6
f3 = 2.328, NA3 = 0.45, λ3 = 785 nm, d2 = 1.4900, d8 = 0.2633,
d9 (t3) = 1.2

TABLE 25-continued (Example 11)

(Paraxial data)

| Surface No. | r (mm) | d (mm) | Nλ1 | Nλ2 | Nλ3 | vd | Remarks |
|---|---|---|---|---|---|---|---|
| OBJ | | ∞ | | | | | Light-emitting point |
| 1 | −3.9344 | 0.8000 | 1.5242 | 1.5064 | 1.5050 | 56.5 | Expander lens |
| 2 | 5.1986 | d2 | | | | | |
| 3 | 30.1721 | 1.5000 | 1.5242 | 1.5064 | 1.5050 | 56.5 | |
| 4 | −4.9932 | 15.000 | | | | | |
| STO | | 0.5000 | | | | | Diaphragm |
| 5 | ∞ | 1.0000 | 1.5242 | 1.5064 | 1.5050 | 56.5 | Objective optical system |
| 6 | 6.55303 | 0.1000 | | | | | |
| 7 | 1.4492 | 2.6200 | 1.5596 | 1.5406 | 1.5372 | 56.3 | |
| 8 | −2.8750 | d8 | | | | | |
| 9 | ∞ | d9 | 1.6211 | 1.5798 | 1.5733 | 30.0 | Protective layer |
| 10 | ∞ | | | | | | |

(Aspheric surface coefficient)

| | First surface | Second surface | Third surface | Fourth surface | Sixth surface | Seventh surface | Eighth surface |
|---|---|---|---|---|---|---|---|
| κ | −0.68486E+00 | −0.51627E+00 | −0.53651E+02 | −0.12346E+00 | 0.00000E+00 | −0.65249E+00 | −0.43576E+02 |
| A4 | 0.00000E+00 | 0.00000E+00 | 0.00000E+00 | 0.00000E+00 | −1.45920E−02 | 0.77549E−02 | 0.97256E−01 |
| A6 | 0.00000E+00 | 0.00000E+00 | 0.00000E+00 | 0.00000E+00 | 2.32980E−05 | 0.29588E−03 | −0.10617E+00 |
| A8 | 0.00000E+00 | 0.00000E+00 | 0.00000E+00 | 0.00000E+00 | −5.48820E−06 | 0.19226E−02 | 0.81812E−01 |
| A10 | 0.00000E+00 | 0.00000E+00 | 0.00000E+00 | 0.00000E+00 | 2.68810E−07 | −0.12294E−02 | −0.41190E−01 |
| A12 | 0.00000E+00 | 0.00000E+00 | 0.00000E+00 | 0.00000E+00 | 0.00000E+00 | 0.29138E−03 | 0.11458E−01 |
| A14 | 0.00000E+00 | 0.00000E+00 | 0.00000E+00 | 0.00000E+00 | 0.00000E+00 | 0.21569E−03 | −0.13277E−02 |
| A16 | 0.00000E+00 | 0.00000E+00 | 0.00000E+00 | 0.00000E+00 | 0.00000E+00 | −0.16850E−03 | 0.00000E+00 |
| A18 | 0.00000E+00 | 0.00000E+00 | 0.00000E+00 | 0.00000E+00 | 0.00000E+00 | 0.44948E−04 | 0.00000E+00 |
| A20 | 0.00000E+00 | 0.00000E+00 | 0.00000E+00 | 0.00000E+00 | 0.00000E+00 | −0.43471E−05 | 0.00000E+00 |

(Optical path difference function coefficient)

| | Fifth surface | Sixth surface |
|---|---|---|
| n1/n2/n3 | 0/1/0 | 5/3/2 |
| λB | 658 nm | 408 nm |
| B2 | 3.6500E−03 | −8.0000E−03 |
| B4 | −9.6924E−04 | 1.4770E−03 |
| B6 | −5.2431E−05 | 0.0000E+00 |
| B8 | −5.7323E−05 | 0.0000E+00 |
| B10 | 1.6570E−06 | 0.0000E+00 |

The objective optical system is a HD/DVD compatible lens wherein spherical aberration caused by a difference of protective layer thickness between high density optical disc HD and DVD has been corrected by actions of a superposed type diffractive structure formed on an optical surface (Fifth surface in Table 25) closer to a light source on an aberration correcting element. Incidentally, the light-converging element is a lens which is optimized in terms of spherical aberration correction for high density optical disc HD.

Further, spherical aberration caused by a protective layer thickness difference between high density optical disc HD and CD is corrected by moving a negative lens of an expander lens in the optical axis direction and thereby, by changing a magnification of an objective optical system, and spherical aberration caused by a protective layer thickness difference between high density optical disc HD and CD is reduced by utilizing $5^{th}$ order diffracted light ray of the first light flux, $3^{rd}$ order diffracted light ray of the second light flux and $2^{nd}$ order diffracted light ray of the third light flux on the diffractive structure formed on an optical surface (sixth surface in Table 25) closer to an optical disc on the aberration correcting element, which makes an amount of movement of the negative lens to be small, and improves tracking characteristics of the objective optical system.

Further, when a wavelength of an incident light flux is changed, a degree of divergence of a light flux emerging from the expander lens is changed by an influence of chromatic aberration. When conducting recording/reproducing for DVD, therefore, a negative lens is moved to make a distance between the negative lens and the positive lens to be greater than that in the case of high density optical disc HD, so that the second light flux emerging from the expander lens may become a parallel light flux.

Incidentally, diffraction efficiency of 0-order diffracted light ray (transmitted light) of the first light flux generated by the superposed type diffractive structure is 100%, diffraction efficiency of first order diffracted light ray of the second light flux is 87% and diffraction efficiency of 0-order diffracted light ray (transmitted light) for the third light flux is 100%, while, diffraction efficiency of $5^{th}$ order diffracted light ray of the first light flux generated by the diffractive structure is 100%, diffraction efficiency of third order diffracted light ray of the second light flux is 100% and diffraction efficiency of $2^{nd}$ order diffracted light ray for the third light flux is 41%. Thus, the diffraction efficiencies by the two diffractive structures represent 100% for the first light flux, 87% for the second light flux and 41% for the third light flux, which means that high diffraction efficiencies are obtained for high density optical disc HD and for DVD both being requested to have high speed recording.

What is claimed is:

1. A light converging element for use in an optical pickup apparatus in which reproducing and/or recording information is conducted for a first optical information recording medium equipped with a protective layer having a thickness t1 by using a light flux having a first wavelength λ1 emitted from a first light source, reproducing and/or recording information is conducted for a second optical information recording medium equipped with a protective layer having a thickness t2 (t2>t1) by using a light flux having a second wavelength λ2 (λ2>λ1) emitted from a second light source, and reproducing and/or recording information is conducted for a third optical information recording medium equipped with a protective layer having a thickness t3 (t3≧t2) by using a light flux having a wavelength λ3 (λ3>λ2) emitted from a third light source, comprising:

an optical surface having a plurality of optical functional zones, wherein a superposition type diffractive structure is formed within an optical functional zone including an optical axis of the plurality of optical functional zones such that a plurality of ring-shaped zones are formed concentrically around the optical axis and plural stepped sections shaped stepwise are formed within each ring-shaped zone, and wherein a diffractive order generated by the light flux having the first wavelength λ1 passing through the superposition type diffractive structure, a diffractive order generated by the light flux having the second wavelength λ2 passing through the superposition type diffractive structure, and a diffractive order generated by the light flux having the third wavelength λ3 are all different from each other.

2. The light converging element of claim 1, wherein the first wavelength λ1 and a minimum value P of a distance in a direction perpendicular to the optical axis between neighboring stepped sections in each ring-shaped zone satisfy the following formulas (1) and (2):

$$0.39\ \mu m < \lambda 1 < 0.42 \quad (1)$$

$$P > 3\ \mu m \quad (2).$$

3. The light converging element of claim 1, wherein a central portion of the ring-shaped zone positioned at a predetermined height has a height from the optical axis that is 60% to 85% of a maximum effective radius.

4. The light converging element of claim 3, wherein F1 and F2 represented with formulas (9) and (10) satisfy formulas (11) to (13):

$$\phi 1 = d2(N\lambda 1-1)/\lambda 1 \quad (9)$$

$$\phi 2 = d2(N\lambda 2-1)/\lambda 2 \quad (10)$$

$$INT(F1)=20 \quad (11)$$

$$0 = |INT(F1)-F1| = 0.4 \quad (12)$$

$$0 = |INT(F2)-F2| = 0.4 \quad (13)$$

where INT(F1)(i=1, 2) is an integer obtained by rounding the value of F1,

λ1 is the first wavelength,

λ2 is the second wavelength, d2 is a depth, along the optical axis, of the stepped section located closest to the optical axis among the stepped sections in an optical path difference providing structure, where units of λ1, λ2 and d2 are μm, Nλ1 is a refractive index for the first wavelength λ1 of an optical element having a second optical surface among an objective optical system, and Nλ2 is a refractive index for the second wavelength λ2 of the optical element having the second optical surface among the objective optical system.

5. The light converging element of claim 4, wherein the optical element having the second optical surface has a refractive index of 1.5 to 1.6 and is made of a material having Abbe constant of 50 to 60 for d-line, and the following formulas (14) and (15) are satisfied:

$$INT(F1)=5p \quad (14)$$

$$INT(F2)=3p \quad (15),$$

where p represents an integer which is one or more.

6. The light converging element of claim 1, wherein the first wavelength λ1 and the second wavelength λ2 satisfy the formulas (2) and (3) respectively, where units of λ1 and λ2 are μm, $$0.39 < \lambda 1 < 0.42 \quad (2)$$

$$0.63 < \lambda 2 < 0.68 \quad (3).$$

7. The light converging element of claim 1, wherein the superposition type diffractive structure has a function to correct a spherical aberration caused due to a difference in thickness between the protective layer of the first optical information recording medium and the protective layer of the second optical information recording medium.

8. The light converging element of claim 1, wherein the light converging element is constructed with a single plastic lens structured with one group one lens and a paraxial power P1 of an aberration correction optical system for the first wavelength λ1 satisfies the following formula (20), where an unit of P1 is mm-1, $$P1>0 \quad (20).$$

9. The light converging element of claim 1, wherein the light converging element is a cyclic poly-olefin series plastic lens and the plastic lens satisfies the following formulas (22) to (24):

$$1.54 < N405 < 1.58 \quad (22)$$

$$50 < vd < 60 \quad (23)$$

$$-10 \times 10^{-5} (^\circ C.-1) < dN405/dT < -8 \times 10^{-5} (^\circ C.-1) \quad (24)$$

where N405 is a refractive index for a wavelength 405 nm at a temperature of 25° C., vd is Abbe's constant for d-line, and dN405/dT is a changing ratio of a refractive index for the wavelength of 405 nm when a temperature is changed within a temperature range of −5° C. to 70° C.

10. The light converging element of claim 1, wherein the light converging element has a wavelength dependency in a spherical aberration such that when the first wavelength λ1 changes toward a longer wavelength side, the spherical aberration changes toward being under-corrected, and when the first wavelength λ1 changes toward a shorter wavelength side, the spherical aberration changes toward being over-corrected.

* * * * *